United States Patent
Gerusz et al.

(10) Patent No.: US 12,473,283 B2
(45) Date of Patent: Nov. 18, 2025

(54) COMPOUNDS AND THEIR USE

(71) Applicant: Debiopharm International S.A., Lausanne (CH)

(72) Inventors: Vincent Gerusz, Neuvecelle (FR); Juan Bravo, Epalinges (CH); Heinz Pauls, Ontario (CA); Judd Berman, Encinitas, CA (US); Terry Finn, Geneva (CH)

(73) Assignee: Debiopharm International S.A., Lausanne (CH)

( * ) Notice: Subject to any disclaimer, the term of this patent is extended or adjusted under 35 U.S.C. 154(b) by 739 days.

(21) Appl. No.: 17/786,727

(22) PCT Filed: Dec. 18, 2020

(86) PCT No.: PCT/EP2020/087308
§ 371 (c)(1),
(2) Date: Jun. 17, 2022

(87) PCT Pub. No.: WO2021/123372
PCT Pub. Date: Jun. 24, 2021

(65) Prior Publication Data
US 2023/0159519 A1    May 25, 2023

(30) Foreign Application Priority Data
Dec. 19, 2019   (WO) .................. PCT/IB2019/061119

(51) Int. Cl.
*C07D 471/04*   (2006.01)
*A61P 31/04*    (2006.01)
*C07D 519/00*   (2006.01)

(52) U.S. Cl.
CPC ............ *C07D 471/04* (2013.01); *A61P 31/04* (2018.01); *C07D 519/00* (2013.01)

(58) Field of Classification Search
CPC .................................................. C07D 471/04
USPC .................................................. 514/210.16
See application file for complete search history.

(56) References Cited

U.S. PATENT DOCUMENTS 5,789,587 A * 8/1998 Fisher ............... C07D 487/04
540/521
2024/0317740 A1    9/2024 Gerusz et al.

FOREIGN PATENT DOCUMENTS

| WO | WO 01/27103 A1 | 4/2001 |
| WO | WO 03/088897 A2 | 10/2003 |
| WO | WO 2007/067416 A2 | 6/2007 |
| WO | WO 2008/009122 A1 | 1/2008 |
| WO | WO 2019/177975 A1 | 9/2019 |
| WO | WO 2020/099341 A1 | 5/2020 |
| WO | WO 2021/123372 A1 | 6/2021 |

OTHER PUBLICATIONS

International Search Report and Written Opinion, mailed Aug. 22, 2022 for International Application No. PCT/EP2022/067039.
International Search Report and Written Opinion, mailed Feb. 18, 2021 for International Application No. PCT/EP2020/087308.
International Preliminary Report on Patentability, mailed Jun. 30, 2022 for International Application No. PCT/EP2020/087308.
Bastin et al., Salt Selection and Optimisation Procedures for Pharmaceutical New Chemical Entities. Org Proc Res Dev. Jul. 19, 2000;4(5):427-35. doi: 10.1021/op000018u.
Berge et al., Pharmaceutical salts. J Pharm Sci. Jan. 1977;66(1):1-19. doi: 10.1002/jps.2600660104.
Boltromeyuk, General Chemistry. 2012. p. 65.

* cited by examiner

*Primary Examiner* — Niloofar Rahmani
(74) *Attorney, Agent, or Firm* — Wolf, Greenfield & Sacks, P.C.

(57) ABSTRACT

The present invention provides compounds of the general formula (I) or a pharmaceutically acceptable prodrugs, salts and/or solvates thereof, wherein LHS is selected from the group consisting of LHSa and LHSb And wherein, the asterisk (*) marks the point of attachment; These compounds exhibit antibacterial activity against Gram-negative and Gram-positive bacteria, especially *S. aureus*, *E. coli*, *K. pneumoniae* and *A. baumannii*. Pharmaceutical compositions containing these compounds, therapeutic uses thereof and methods for manufacturing the same are also provided.

22 Claims, 1 Drawing Sheet

COMPOUNDS AND THEIR USE

CROSS REFERENCE TO RELATED APPLICATION(S)

This Application is a National Stage filing under 35 U.S.C. § 371 of International PCT Application No. PCT/EP2020/087308, filed Dec. 18, 2020, which claims priority to International PCT Application No. PCT/IB2019/061119, filed Dec. 19, 2019. The entire contents of these applications are incorporated herein by reference in their entirety.

FIELD OF THE INVENTION

The present invention relates to antibiotic compounds, pharmaceutical compositions comprising them, and to the use of these compounds and compositions for the treatment of bacterial infections. The invention further relates to methods of making said compounds of the invention.

BACKGROUND OF THE INVENTION

Antibiotic resistance is rising to dangerously high levels in all parts of the world, threatening our ability to effectively treat and prevent an ever-increasing range of infections. Accordingly, there is a need for the development of novel antibiotic compounds that may show activity in cases where established antibiotics fail.

Whilst all types of bacteria (both Gram-negative and Gram-positive) are believed to have developed some measure of antibiotic resistance, certain bacterial species are more associated with antibiotic resistance than others e.g. *Staphylococcus aureus* (*S. aureus*), *Klebsiella pneumoniae* (*K. pneumoniae*), *Acinetobacter baumannii* (*A. baumannii*) and *Escherichia coli* (*E. coli*). Accordingly, there may be a particular need for novel antibiotic compound active against one or more of these species of bacteria.

A recently developed new class of antibiotics compounds are FabI inhibitors. These compounds inhibit the NADH-dependent enoyl reductase (FabI) from the type II bacterial fatty acid biosynthesis pathway (FAS-II), thereby providing an alternative approach for treating bacterial infections in cases where established antibiotics fail. Advantageously, this FabI mode of action is not expected to display any cross resistance to established antibiotics. However, whilst known FabI inhibitor compounds can be extremely effective against some bacterial species, said compounds may not be active or may have inadequate activity against other species such as *S. aureus, E. coli, A. baumannii*, and *K. pneumoniae*, and in particular the Gram-negative bacterial species *E. coli, A. baumannii*, and *K. pneumoniae*. This may be because of the challenge of penetrating both the outer and inner membranes of these Gram-negative bacteria, a challenge that can be further compounded by efflux. Accordingly, there is still a need for compounds and pharmaceutical compositions comprising the same that may show antibiotic activity (especially in cases where established antibiotics fail) against Gram-positive and/or Gram-negative bacteria, and especially against one or more of *S. aureus, E. coli, K. pneumoniae* and *A. baumannii*, and most especially *E. coli, K. pneumoniae* and *A. baumannii*. Furthermore, it is preferable that such compounds do not give rise to cross resistance to established antibiotics, and it is desirable that such compounds give rise to a low/acceptable rate of side effects.

It is an object of the invention to address one or more of these aforementioned needs. Further objectives and problems underlying the present invention may become apparent from the subsequent description of the invention.

SUMMARY OF THE INVENTION

Surprisingly the inventors have found that an objective of the invention may be accomplished by the compounds, pharmaceutical compositions, therapeutic uses thereof, and synthetic methods of the present invention. The present invention in particular includes the following items (representing the various aspects and embodiments):

1. A compound of formula (I)

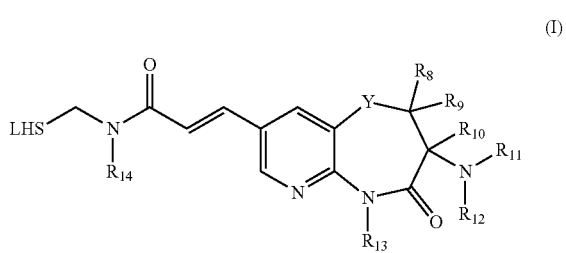

or a pharmaceutically acceptable prodrug, salt and/or solvate thereof, wherein

LHS is selected from the group consisting of LHSa and LHSb

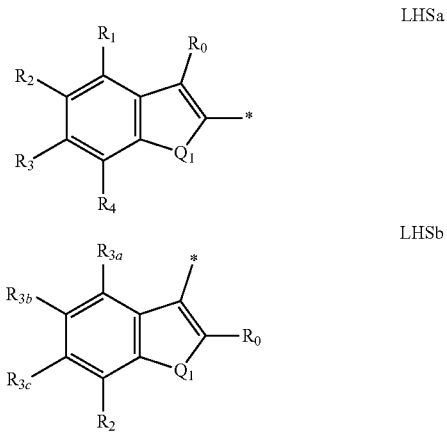

wherein, the asterisk (*) marks the point of attachment;

Y is selected from the group consisting of $CH_2$, NH, and $NR_d$;

$Q_1$ is selected from the group consisting of O, S, NH and N—$C_{1-4}$-alkyl;

$R_0$ is selected from the group consisting of $CH_3$ and Cl, or alternatively $R_0$ together with $R_{14}$ form a heterocycle comprising the N to which $R_{14}$ is attached and having 5 to 8 ring members, wherein preferably the only heteroatom in said ring is the N to which $R_{14}$ is attached;

$R_1$ is selected from the group consisting of H, F, Cl, Br, I, $C_{1-4}$-alkyl, $OR_5$, CN, $NR_5R_6$, CO—$NR_5R_6$, $C_{1-4}$-alkylene-$NR_5R_6$, $C_{1-4}$-alkylene-$OR_5$, NH—CO—$C_{1-4}$-alkylene-$R_5$, NH—CO—$NR_5R_6$, NH—COOR$_5$, $NHSO_2$—$C_{1-4}$-alkylene-$R_5$, $C_{3-6}$-cycloalkyl, phenyl, and a heterocyclic group having 5 or 6 ring members and 1, 2 or 3 heteroatoms independently selected from N, O and S, wherein said $C_{1-4}$-alkyl, cycloalkyl, phenyl, or heterocyclic group may optionally be substituted with 1-3 $R_7$ groups;

$R_2$ is selected from the group consisting of H, F, Cl, Br, I, $C_{1-4}$-alkyl, $OR_5$, $C_{1-4}$-alkylene-$OR_5$, CN, $NR_5R_6$, CO—$NR_5R_6$, $C_{1-4}$-alkylene-$NR_5R_6$, $C_{3-6}$-cycloalkyl, phenyl, and a heterocyclic group having 5 or 6 ring members and 1, 2 or 3 heteroatoms independently selected from N, O and S, wherein said $C_{1-4}$-alkyl, cycloalkyl, phenyl, or heterocyclic group may optionally be substituted with 1-3 $R_7$ groups;

$R_3$ is selected from the group consisting of H, F, Cl, Br, I, CN, $C_{1-4}$-alkyl, O—$C_{1-4}$ alkyl, OH, $NH_2$, $NHC_{1-4}$-alkyl, and S—$C_{1-4}$-alkyl;

$R_{3a}$, $R_{3b}$ and $R_{3c}$ are independently selected from the group consisting of H, F, Cl, Br, I, CN, $C_{1-4}$-alkyl, O—$C_{1-4}$-alkyl, OH, $NH_2$, $NHC_{1-4}$-alkyl, and S—$C_{1-4}$-alkyl;

$R_4$ is selected from the group consisting of H, F, Cl, Br, I, $C_{1-4}$-alkyl, $OR_5$, CN, $COR_{10}$, phenyl, OH, $NH_2$, S—$C_{1-4}$-alkyl, $NR_5R_6$, and a heterocyclic group having 5 or 6 ring members and 1, 2 or 3 heteroatoms independently selected from N, O and S;

$R_5$ and $R_6$ are independently selected from is selected from the group consisting of H, $COR_{10}$, $C_{1-4}$-alkyl, $C_{3-6}$-cycloalkyl, $SO_2R_7$, phenyl, and a heterocyclic group having 5 or 6 ring members and 1, 2 or 3 heteroatoms independently selected from N, O and S, wherein said cycloalkyl, phenyl, or heterocyclic group may optionally be substituted with 1-3 $R_7$ groups;

$R_7$ is selected from the group consisting of H, F, I, Br, Cl, O, $C_{1-4}$-alkyl, $C_{2-4}$-alkenyl, $C_{2-4}$-alkynyl, $CONH_2$, OH, $NH_2$, O—$C_{1-4}$-alkyl, NH—$C_{1-4}$-alkyl, $N(C_{1-4}$-alkyl$)_2$, $C_{1-4}$-alkylene-OH, and $C_{1-4}$-alkylene-$NH_2$, $NO_2$, CN, $C_{2-4}$-alkynylene-OH, $C_{2-4}$-alkynylene-$NH_2$, $SO_2CH_3$, and O—$C_{1-4}$-alkylene-OH;

$R_8$ and $R_9$ are independently selected from the group consisting of H, $C_{1-4}$-alkyl, $C_{1-4}$-alkyl-F, CN, OH, $NH_2$, O—$C_{1-4}$-alkyl, NH—$C_{1-4}$-alkyl, $N(C_{1-4}$-alkyl$)_2$, $C_{1-4}$-alkylene-OH, and $C_{1-4}$-alkylene-$NH_2$;

$R_{10}$ is selected from the group consisting of H, $C_{1-4}$-alkyl, $C_{1-4}$-alkyl-F, $C_{1-4}$-alkylene-OH, and $C_{1-4}$-alkylene-$NH_2$;

$R_{11}$ and $R_{12}$ are independently selected from the group consisting of H, $R_d$, $C_{1-4}$-alkyl, CO—$C_{1-4}$-alkyl, $SO_2(C_{1-4}$-alkyl$)_1$, $C_{1-4}$-alkyl-F, $C_{1-4}$-alkylene-OH, and $C_{1-4}$-alkylene-$NH_2$, or alternatively, $R_{11}$ and $R_{12}$ together with the N to which they are attached form a heterocyclic group having 4 to 9 ring members and 1, 2 or 3 heteroatoms independently selected from N, O and S or form a heterocyclic spiro group having 7 to 11 ring members and 1, 2 or 3 heteroatoms independently selected from N, O and S, wherein said heterocyclic or heterocyclic spiro group may be substituted with 1-3 $R_7$ groups;

$R_{13}$ is selected from the group consisting of H or $R_d$;

$R_{14}$ is $CH_3$, or alternatively $R_{14}$ together with $R_0$ of $LHS_a$ or $LHS_b$ form a heterocycle comprising the N to which $R_{14}$ is attached and having 5 to 8 ring members, wherein preferably the only heteroatom in said ring is the N to which $R_{14}$ is attached; and $R_d$ is selected from the group consisting of —$PO_3R_{e2}$, —$CH_2$—$OPO_3R_{e2}$, wherein $R_e$ is selected from the group consisting of H and a cation suitable for forming a pharmaceutically acceptable salt.

2. A compound according to item 1 wherein LHS is $LHS_a$.
3. A compound according to item 1 wherein LHS is $LHS_b$.
4. A compound according to any one of items 1 to 3 wherein $Q_1$ is selected from the group consisting of O or S.
5. A compound according to any one of items 1 to 4 wherein $R_0$ is $CH_3$ and $R_{14}$ is $CH_3$.
6. A compound according to any one of items 1 to 4 wherein $R_0$ together with $R_{14}$ form a heterocycle comprising the N to which $R_{14}$ is attached and having 5 to 8, preferably 7 ring members, wherein preferably the only heteroatom in said ring is the N to which $R_{14}$ is attached.
7. A compound according to any one of items 1 to 6 wherein $R_1$ is selected from the group consisting of H, F, Cl, Br, $C_{1-4}$-alkyl, $OR_5$, CN, $NR_5R_6$, $C_{1-4}$-alkylene-$NR_5R_6$, $C_{1-4}$-alkylene-$OR_5$, NH—CO—$C_{1-4}$-alkylene-$R_5$, NH—CO—$NR_5R_6$, NH—$COOR_5$, $NHSO_2$—$C_{1-4}$-alkylene-$R_5$, $C_{3-6}$-cycloalkyl, phenyl, and a heterocyclic group having 5 or 6 ring members and 1, 2 or 3 heteroatoms independently selected from N, O and S, wherein said $C_{1-4}$-alkyl, cycloalkyl, phenyl, or heterocyclic group may optionally be substituted with 1-3 $R_7$ groups, and preferably wherein $R_1$ is selected from the group consisting of H, F, Cl, $C_{1-4}$-alkyl, $OR_5$, $NR_5R_6$, $C_{1-4}$-alkylene-$NR_5R_6$, $C_{1-4}$-alkylene-$OR_5$, $C_{3-6}$-cycloalkyl, phenyl, and a heterocyclic group having 5 or 6 ring members and 1, 2 or 3 heteroatoms independently selected from N, O and S, wherein said $C_{1-4}$-alkyl, cycloalkyl, phenyl, or heterocyclic group may optionally be substituted with 1-3 $R_7$ groups, wherein $R_5$, $R_6$ and $R_7$ are as specified under item 1.
8. A compound according to any one of items 1 to 7 wherein $R_2$ is selected from the group consisting of H, F, Cl, Br, $C_{1-4}$-alkyl, $OR_5$, $C_{1-4}$-alkylene-$OR_5$, CN, $NR_5R_6$, $C_{1-4}$-alkylene-$NR_5R_6$, $C_{3-6}$-cycloalkyl, wherein said $C_{1-4}$-alkyl and cycloalkyl may optionally be substituted with 1-3 $R_7$ groups, and preferably wherein $R_2$ is selected from the group consisting of $C_{1-4}$-alkyl, H, F, Cl, $OR_5$, and $NR_5R_6$, wherein $R_5$, $R_6$ and $R_7$ are as specified under item 1.
9. A compound according to anyone of items 1 to 8 wherein $R_3$ is selected from the group consisting of H, F, Cl, Br, OH, $NH_2$, and $NHC_{1-4}$-alkyl, and preferably wherein $R_3$ is selected from the group consisting of H, F, Cl, OH, and $NH_2$.
10. A compound according to any one of items 1 to 9 wherein $R_{3a}$, $R_{3b}$ and $R_{3c}$ are independently selected from the group consisting of H, F, Cl, Br, OH, $NH_2$, and $NHC_{1-4}$-alkyl, and preferably wherein $R_{3a}$, $R_{3b}$ and $R_{3c}$ are independently selected from the group consisting of H, F, Cl, OH, and $NH_2$.
11. A compound according to any one of items 1 to 10 wherein $R_4$ is selected from the group consisting of H, F, Cl, Br, $OR_5$, $COR_{10}$, OH, $NH_2$, and $NR_5R_6$, and wherein $R_4$ is preferably selected from the group consisting of H, F, Cl, $OR_5$, OH, $NH_2$, and $NR_5R_6$.
12. A compound according to any one of items 1 to 11 wherein $R_7$ is selected from the group consisting of H, F, $C_{1-4}$-alkyl, $C_{2-4}$-alkenyl, $C_{2-4}$-alkynyl, OH, $NH_2$, O—$C_{1-4}$-alkyl, NH—$C_{1-4}$-alkyl, $N(C_{1-4}$-alkyl$)_2$, $C_{1-4}$-alkylene-OH, $C_{1-4}$-alkylene-$NH_2$, and O—$C_{1-4}$-alkylene-OH, $C_{2-4}$-alkynylene-OH, and $C_{2-4}$-alkynylene-$NH_2$ and preferably wherein $R_7$ is selected from the group consisting of H, F, $C_{1-4}$-alkyl, OH, $NH_2$, O—

$C_{1-4}$-alkyl, NH—$C_{1-4}$-alkyl, N($C_{1-4}$-alkyl)$_2$, $C_{1-4}$-alkylene-OH, and $C_{1-4}$-alkylene-NH$_2$.

13. A compound according to anyone of items 1 to 12 wherein $R_8$ and $R_9$ are independently selected from the group consisting of H, $C_{1-4}$-alkyl, $C_{1-4}$-alkyl-F, O—$C_{1-4}$-alkyl, and preferably wherein $R_8$ and $R_9$ are independently selected from the group consisting of H, and $C_{1-4}$-alkyl.

14. A compound according to anyone of items 1 to 13 wherein $R_{10}$ is selected from the group consisting of H, $C_{1-4}$-alkyl, $C_{1-4}$-alkyl-F, and preferably wherein $R_{10}$ is selected from the group consisting of H, and $C_{1-4}$-alkyl.

15. A compound according to anyone of items 1 to 14 wherein $R_{11}$ and $R_{12}$ are independently selected from the group consisting of H, $R_d$, $C_{1-4}$-alkyl, $C_{1-4}$-alkyl-F, $C_{1-4}$-alkylene-OH, and $C_{1-4}$-alkylene-NH$_2$, or alternatively, $R_{11}$ and $R_{12}$ together with the N to which they are attached form a heterocyclic group having 4 to 9 ring members and 1, 2 or 3 heteroatoms independently selected from N, O and S or form a heterocyclic spiro group having 7 to 11 ring members and 1, 2 or 3 heteroatoms independently selected from N, O and S, wherein said heterocyclic or heterocyclic spiro group may be substituted with 1-3 $R_7$ groups and wherein preferably $R_{11}$ and $R_{12}$ are independently selected from the group consisting of H, $R_d$, and $C_{1-4}$-alkyl, wherein $R_7$ and $R_d$ are as specified under item 1.

16. A compound according to anyone of items 1 to 15 wherein,
    $R_1$ is selected from the group consisting of H, F, Cl, Br, $C_{1-4}$-alkyl, OR$_5$, NR$_5$R$_6$, $C_{1-4}$-alkylene-NR$_5$R$_6$, $C_{1-4}$-alkylene-OR$_5$, NH—CO—$C_{1-4}$-alkylene-R$_5$, NH—CO—NR$_5$R$_6$, NH—COOR$_5$, NHSO$_2$—$C_{1-4}$-alkylene-R$_5$, $C_{3-6}$-cycloalkyl, wherein said $C_{1-4}$-alkyl and cycloalkyl, may optionally be substituted with 1-3 $R_7$ groups;
    $R_2$ is selected from the group consisting of H, F, Cl, Br, $C_{1-4}$-alkyl, OR$_5$, $C_{1-4}$-alkylene-OR$_5$, CN, NR$_5$R$_6$, $C_{1-4}$-alkylene-NR$_5$R$_6$, $C_{3-6}$-cycloalkyl, wherein said $C_{1-4}$-alkyl, cycloalkyl, phenyl, or heterocyclic group may optionally be substituted with 1-3 $R_7$ groups;
    $R_3$ is selected from the group consisting of H, F, Cl, Br, OH, NH$_2$, and NHC$_{1-4}$-alkyl;
    $R_{3a}$, $R_{3b}$ and $R_{3c}$ are independently selected from the group consisting of H, F, Cl, Br, OH, NH$_2$, and NHC$_{1-4}$-alkyl;
    $R_4$ is selected from the group consisting of H, F, Cl, Br, OR$_5$, COR$_{10}$, OH, NH$_2$, and NR$_5$R$_6$;
    $R_7$ is selected from the group consisting of H, F, $C_{1-4}$-alkyl, $C_{2-4}$-alkenyl, $C_{2-4}$-alkynyl, OH, NH$_2$, O—$C_{1-4}$-alkyl, NH—$C_{1-4}$-alkyl, N($C_{1-4}$-alkyl)$_2$, $C_{1-4}$-alkylene-OH, and $C_{1-4}$-alkylene-NH$_2$, O—$C_{1-4}$-alkylene-OH, $C_{2-4}$-alkynylene-OH, and $C_{2-4}$-alkynylene-NH$_2$;
    $R_8$ and $R_9$ are independently selected from the group consisting of H, $C_{1-4}$-alkyl, $C_{1-4}$-alkyl-F, and O—$C_{1-4}$-alkyl;
    $R_{10}$ is selected from the group consisting of H, $C_{1-4}$-alkyl, and $C_{1-4}$-alkyl-F;
    and,
    $R_{11}$ and $R_{12}$ are independently selected from the group consisting of H, $R_d$, $C_{1-4}$-alkyl, $C_{1-4}$-alkyl-F, $C_{1-4}$-alkylene-OH, and $C_{1-4}$-alkylene-NH$_2$, or alternatively, $R_{11}$ and $R_{12}$ together with the N to which they are attached form a heterocyclic group having 4 to 9 ring members and 1, 2 or 3 heteroatoms independently selected from N, O and S or form a heterocyclic spiro group having 7 to 11 ring members and 1, 2 or 3 heteroatoms independently selected from N, O and S, wherein said heterocyclic or heterocyclic spiro group may be substituted with 1-3 $R_7$ groups, wherein $R_5$, $R_6$ and $R_d$ are as specified under item 1.

17. A compound according to any one of items 1 to 16 wherein
    $R_1$ is selected from the group consisting of H, F, Cl, $C_{1-4}$-alkyl, OR$_5$, NR$_5$R$_6$, $C_{1-4}$-alkylene-NR$_5$R$_6$, $C_{1-4}$-alkylene-OR$_5$, $C_{3-6}$-cycloalkyl, phenyl, and a heterocyclic group having 5 or 6 ring members and 1, 2 or 3 heteroatoms independently selected from N, O and S, wherein said $C_{1-4}$-alkyl, cycloalkyl, phenyl, or heterocyclic group may optionally be substituted with 1-3 $R_7$ groups;
    $R_2$ is selected from the group consisting of H, F, Cl, OR$_5$, $C_{1-4}$-alkyl, and NR$_5$R$_6$;
    $R_3$ is selected from the group consisting of H, F, Cl, OH, and NH$_2$;
    $R_{3a}$, $R_{3b}$ and $R_{3c}$ are independently selected from the group consisting of H, F, Cl, OH, and NH$_2$;
    $R_4$ is selected from the group consisting of H, F, Cl, OR$_5$, OH, NH$_2$, and NR$_5$R$_6$;
    $R_7$ is selected from the group consisting of H, F, $C_{1-4}$-alkyl, OH, NH$_2$, O—$C_{1-4}$-alkyl, NH—$C_{1-4}$-alkyl, N($C_{1-4}$-alkyl)$_2$, $C_{1-4}$-alkylene-OH, and $C_{1-4}$-alkylene-NH$_2$;
    $R_8$ and $R_9$ are independently selected from the group consisting of H, and $C_{1-4}$-alkyl;
    $R_{10}$ is selected from the group consisting of H, and $C_{1-4}$-alkyl;
    and,
    $R_{11}$ and $R_{12}$ are independently selected from the group consisting of H, $R_d$, and $C_{1-4}$-alkyl, wherein $R_5$ and $R_6$ are as specified under item 1.

18. A compound according to any one of items 1 to 17 wherein Y is CH$_2$.

19. A compound according to any one of items 1 or 18 wherein Y is NH.

20. A compound according to item 1 wherein
    LHS is LHSa;
    Y is CH$_2$;
    Q 1 is O or S and most preferably O;
    $R_0$ is CH$_3$;
    $R_1$ is selected from the group consisting of H, F, Cl, Br, $C_{1-4}$-alkyl, OR$_5$, NR$_5$R$_6$, $C_{1-4}$-alkylene-NR$_5$R$_6$, $C_{1-4}$-alkylene-OR$_5$, NH—CO—$C_{1-4}$-alkylene-R$_5$, NH—CO—NR$_5$R$_6$, NH—COOR$_5$, NHSO$_2$—$C_{1-4}$-alkylene-R$_5$, $C_{3-6}$-cycloalkyl, wherein said $C_{1-4}$-alkyl and cycloalkyl, may optionally be substituted with 1-3 $R_7$ groups and preferably from the group consisting of H, F, Cl, $C_{1-4}$-alkyl, OR$_5$, NR$_5$R$_6$, $C_{1-4}$-alkylene-NR$_5$R$_6$, $C_{1-4}$-alkylene-OR$_5$, $C_{3-6}$-cycloalkyl, phenyl, and a heterocyclic group having 5 or 6 ring members and 1, 2 or 3 heteroatoms independently selected from N, O and S, wherein said $C_{1-4}$-alkyl, cycloalkyl, phenyl, or heterocyclic group may optionally be substituted with 1-3 $R_7$ groups;
    $R_2$ is selected from the group consisting of H, F, Cl, Br, $C_{1-4}$-alkyl, OR$_5$, $C_{1-4}$-alkylene-OR$_5$, CN, NR$_5$R$_6$, $C_{1-4}$-alkylene-NR$_5$R$_6$, $C_{3-6}$-cycloalkyl, wherein said $C_{1-4}$-alkyl, cycloalkyl, phenyl, or heterocyclic group may optionally be substituted with 1-3 $R_7$ groups and preferably from the group consisting of H, F, Cl, OR$_5$, $C_{1-4}$-alkyl, and NR$_5$R$_6$;

$R_3$ is selected from the group consisting of H, F, Cl, Br, OH, $NH_2$, and $NHC_{1-4}$-alkyl and preferably from the group consisting of H, F, Cl, OH, and $NH_2$;

$R_4$ is selected from the group consisting of H, F, Cl, Br, $OR_5$, $COR_{10}$, OH, $NH_2$, and $NR_5R_6$, and preferably from the group consisting of H, F, Cl, $OR_5$, OH, $NH_2$, and $NR_5R_6$;

$R_7$ is selected from the group consisting of H, F, $C_{1-4}$-alkyl, $C_{2-4}$-alkenyl, $C_{2-4}$-alkynyl, OH, $NH_2$, O—$C_{1-4}$-alkyl, NH—$C_{1-4}$-alkyl, $N(C_{1-4}$-alkyl$)_2$, $C_{1-4}$-alkylene-OH, and $C_{1-4}$-alkylene-$NH_2$, O—$C_{1-4}$-alkylene-OH, $C_{2-4}$-alkynylene-OH, and $C_{2-4}$-alkynylene-NH, and preferably from the group consisting of H, F, $C_{1-4}$-alkyl, OH, $NH_2$, O—$C_{1-4}$-alkyl, NH—$C_{1-4}$-alkyl, $N(C_{1-4}$-alkyl$)_2$, $C_{1-4}$-alkylene-OH, and $C_{1-4}$-alkylene-$NH_2$;

$R_8$ and $R_9$ are independently selected from the group consisting of H, $C_{1-4}$-alkyl, $C_{1-4}$-alkyl-F, and O—$C_{1-4}$-alkyl, and preferably from the group consisting of H, and $C_{1-4}$-alkyl;

$R_{10}$ is selected from the group consisting of H, $C_{1-4}$-alkyl, and $C_{1-4}$-alkyl-F, and preferably from the group consisting of H, and $C_{1-4}$-alkyl;

$R_{11}$ and $R_{12}$ are independently selected from the group consisting of H, $R_d$, $C_{1-4}$-alkyl, $C_{1-4}$-alkyl-F, $C_{1-4}$-alkylene-OH, and $C_{1-4}$-alkylene-$NH_2$, or alternatively, $R_{11}$ and $R_{12}$ together with the N to which they are attached form a heterocyclic group having 4 to 9 ring members and 1, 2 or 3 heteroatoms independently selected from N, O and S or form a heterocyclic spiro group having 7 to 11 ring members and 1, 2 or 3 heteroatoms independently selected from N, O and S, wherein said heterocyclic or heterocyclic spiro group may be substituted with 1-3 $R_7$ groups, and wherein preferably $R_{11}$ and $R_{12}$ are independently selected from the group consisting of H, $R_d$, and $C_{1-4}$-alkyl;

and, $R_{14}$ is $CH_3$, wherein $R_5$, $R_6$ and $R_d$ are as specified under item 1.

21. A compound according to item 1 wherein

LHS is LHSb;

Y is $CH_2$;

$Q_1$ is O or S and most preferably O;

$R_0$ is $CH_3$;

$R_1$ is selected from the group consisting of H, F, Cl, Br, $C_{1-4}$-alkyl, $OR_5$, $NR_5R_6$, $C_{1-4}$-alkylene-$NR_5R_6$, $C_{1-4}$-alkylene-$OR_5$, NH—CO—$C_{1-4}$-alkylene-$R_5$, NH—CO—$NR_5R_6$, NH—$COOR_5$, $NHSO_2$—$C_{1-4}$-alkylene-$R_5$, $C_{3-6}$-cycloalkyl, wherein said $C_{1-4}$-alkyl and cycloalkyl, may optionally be substituted with 1-3 $R_7$ groups and preferably from the group consisting of H, F, Cl, $C_{1-4}$-alkyl, $OR_5$, $NR_5R_6$, $C_{1-4}$-alkylene-$NR_5R_6$, $C_{1-4}$-alkylene-$OR_5$, $C_{3-6}$-cycloalkyl, phenyl, and a heterocyclic group having 5 or 6 ring members and 1, 2 or 3 heteroatoms independently selected from N, O and S, wherein said $C_{1-4}$-alkyl, cycloalkyl, phenyl, or heterocyclic group may optionally be substituted with 1-3 $R_7$ groups;

$R_{3a}$, $R_{3b}$ and $R_{3c}$ are independently selected from the group consisting of H, F, Cl, Br, OH, $NH_2$, and $NHC_{1-4}$-alkyl and preferably from H, F, Cl, OH, and $NH_2$;

$R_7$ is selected from the group consisting of H, F, $C_{1-4}$-alkyl, $C_{2-4}$-alkenyl, $C_{2-4}$-alkynyl, OH, $NH_2$, O—$C_{1-4}$-alkyl, NH—$C_{1-4}$-alkyl, $N(C_{1-4}$-alkyl$)_2$, $C_{1-4}$-alkylene-OH, and $C_{1-4}$-alkylene-$NH_2$, O—$C_{1-4}$-alkylene-OH, $C_{2-4}$-alkynylene-OH, and $C_{2-4}$-alkynylene-NH, and preferably from the group consisting of H, F, $C_{1-4}$-alkyl, OH, $NH_2$, O—$C_{1-4}$-alkyl, NH—$C_{1-4}$-alkyl, $N(C_{1-4}$-alkyl$)_2$, $C_{1-4}$-alkylene-OH, and $C_{1-4}$-alkylene-$NH_2$;

$R_8$ and $R_9$ are independently selected from the group consisting of H, $C_{1-4}$-alkyl, $C_{1-4}$-alkyl-F, and O—$C_{1-4}$-alkyl, and preferably from the group consisting of H, and $C_{1-4}$-alkyl;

$R_{10}$ is selected from the group consisting of H, $C_{1-4}$-alkyl, and $C_{1-4}$-alkyl-F, and preferably from the group consisting of H, and $C_{1-4}$-alkyl;

$R_{11}$ and $R_{12}$ are independently selected from the group consisting of H, $R_d$, $C_{1-4}$-alkyl, $C_{1-4}$-alkyl-F, $C_{1-4}$-alkylene-OH, and $C_{1-4}$-alkylene-$NH_2$, or alternatively, $R_{11}$ and $R_{12}$ together with the N to which they are attached form a heterocyclic group having 4 to 9 ring members and 1, 2 or 3 heteroatoms independently selected from N, O and S or form a heterocyclic spiro group having 7 to 11 ring members and 1, 2 or 3 heteroatoms independently selected from N, O and S, wherein said heterocyclic or heterocyclic spiro group may be substituted with 1-3 $R_7$ groups, and wherein preferably $R_{11}$ and $R_{12}$ are independently selected from the group consisting of H, $R_d$, and $C_{1-4}$-alkyl;

and, $R_{14}$ is $CH_3$, wherein $R_5$, $R_6$ and $R_d$ are as specified under item 1.

22. A compound according to item 1 wherein

LHS is LHSa;

Y is NH or $NR_d$ and preferably NH;

$Q_1$ is O or S and most preferably O;

$R_0$ is $CH_3$;

$R_1$ is selected from the group consisting of H, F, Cl, Br, $C_{1-4}$-alkyl, $OR_5$, $NR_5R_6$, $C_{1-4}$-alkylene-$NR_5R_6$, $C_{1-4}$-alkylene-$OR_5$, NH—CO—$C_{1-4}$-alkylene-$R_5$, NH—CO—$NR_5R_6$, NH—$COOR_5$, $NHSO_2$—$C_{1-4}$-alkylene-$R_5$, $C_{3-6}$-cycloalkyl, wherein said $C_{1-4}$-alkyl and cycloalkyl, may optionally be substituted with 1-3 $R_7$ groups and preferably from the group consisting of H, F, Cl, $C_{1-4}$-alkyl, $OR_5$, $NR_5R_6$, $C_{1-4}$-alkylene-$NR_5R_6$, $C_{1-4}$-alkylene-$OR_5$, $C_{3-6}$-cycloalkyl, phenyl, and a heterocyclic group having 5 or 6 ring members and 1, 2 or 3 heteroatoms independently selected from N, O and S, wherein said $C_{1-4}$-alkyl, cycloalkyl, phenyl, or heterocyclic group may optionally be substituted with 1-3 $R_7$ groups;

$R_2$ is selected from the group consisting of H, F, Cl, Br, $C_{1-4}$-alkyl, $OR_5$, $C_{1-4}$-alkylene-$OR_5$, CN, $NR_5R_6$, $C_{1-4}$-alkylene-$NR_5R_6$, $C_{3-6}$-cycloalkyl, wherein said $C_{1-4}$-alkyl, cycloalkyl, phenyl, or heterocyclic group may optionally be substituted with 1-3 $R_7$ groups and preferably from the group consisting of H, F, Cl, $OR_5$, $C_{1-4}$-alkyl, and $NR_5R_6$;

$R_3$ is selected from the group consisting of H, F, Cl, Br, OH, $NH_2$, and $NHC_{1-4}$-alkyl and preferably from the group consisting of H, F, Cl, OH, and $NH_2$;

$R_4$ is selected from the group consisting of H, F, Cl, Br, $OR_5$, $COR_{10}$, OH, $NH_2$, and $NR_5R_6$, and preferably from the group consisting of H, F, Cl, $OR_5$, OH, $NH_2$, and $NR_5R_6$;

$R_7$ is selected from the group consisting of H, F, $C_{1-4}$-alkyl, $C_{2-4}$-alkenyl, $C_{2-4}$-alkynyl, OH, $NH_2$, O—$C_{1-4}$-alkyl, NH—$C_{1-4}$-alkyl, $N(C_{1-4}$-alkyl$)_2$, $C_{1-4}$-alkylene-OH, and $C_{1-4}$-alkylene-$NH_2$, O—$C_{1-4}$-alkylene-OH, $C_{2-4}$-alkynylene-OH, and $C_{2-4}$-alkynylene-NH, and preferably from the group consisting of H, F, $C_{1-4}$-alkyl, OH, $NH_2$, O—$C_{1-4}$-alkyl, NH—$C_{1-4}$-alkyl, N($C_{1-4}$-alkyl)$_2$, $C_{1-4}$-alkylene-OH, and $C_{1-4}$-alkylene-$NH_2$;

$R_8$ and $R_9$ are independently selected from the group consisting of H, $C_{1-4}$-alkyl, $C_{1-4}$-alkyl-F, and O—$C_{1-4}$-alkyl, and preferably from the group consisting of H, and $C_{1-4}$-alkyl;

$R_{10}$ is selected from the group consisting of H, $C_{1-4}$-alkyl, and $C_{1-4}$-alkyl-F, and preferably from the group consisting of H, and $C_{1-4}$-alkyl;

$R_{11}$ and $R_{12}$ are independently selected from the group consisting of H, $R_d$, $C_{1-4}$-alkyl, $C_{1-4}$-alkyl-F, $C_{1-4}$-alkylene-OH, and $C_{1-4}$-alkylene-$NH_2$, or alternatively, $R_{11}$ and $R_{12}$ together with the N to which they are attached form a heterocyclic group having 4 to 9 ring members and 1, 2 or 3 heteroatoms independently selected from N, O and S or form a heterocyclic spiro group having 7 to 11 ring members and 1, 2 or 3 heteroatoms independently selected from N, O and S, wherein said heterocyclic or heterocyclic spiro group may be substituted with 1-3 $R_7$ groups, and wherein preferably $R_{11}$ and $R_{12}$ are independently selected from the group consisting of H, $R_d$, and $C_{1-4}$-alkyl;

and, $R_{14}$ is $CH_3$, wherein $R_5$, $R_6$ and $R_d$ are as specified under item 1.

23. A compound according to item 1 wherein

LHS is LHSb;

Y is NH or $NR_d$ and preferably NH;

$Q_1$ is O or S and most preferably O;

$R_0$ is $CH_3$;

$R_1$ is selected from the group consisting of H, F, Cl, Br, $C_{1-4}$-alkyl, $OR_5$, $NR_5R_6$, $C_{1-4}$-alkylene-$NR_5R_6$, $C_{1-4}$-alkylene-$OR_5$, NH—CO—$C_{1-4}$-alkylene-$R_5$, NH—CO—$NR_5R_6$, NH—$COOR_5$, $NHSO_2$—$C_{1-4}$-alkylene-$R_5$, $C_{3-6}$-cycloalkyl, wherein said $C_{1-4}$-alkyl and cycloalkyl, may optionally be substituted with 1-3 $R_7$ groups and preferably from the group consisting of H, F, Cl, $C_{1-4}$-alkyl, $OR_5$, $NR_5R_6$, $C_{1-4}$-alkylene-$NR_5R_6$, $C_{1-4}$-alkylene-$OR_5$, $C_{3-6}$-cycloalkyl, phenyl, and a heterocyclic group having 5 or 6 ring members and 1, 2 or 3 heteroatoms independently selected from N, O and S, wherein said $C_{1-4}$-alkyl, cycloalkyl, phenyl, or heterocyclic group may optionally be substituted with 1-3 $R_7$ groups;

$R_2$ is selected from the group consisting of H, F, Cl, Br, $C_{1-4}$-alkyl, $OR_5$, $C_{1-4}$-alkylene-$OR_5$, CN, $NR_5R_6$, $C_{1-4}$-alkylene-$NR_5R_6$, $C_{3-6}$-cycloalkyl, wherein said $C_{1-4}$-alkyl, cycloalkyl, phenyl, or heterocyclic group may optionally be substituted with 1-3 $R_7$ groups and preferably from the group consisting of H, F, Cl, $OR_5$, $C_{1-4}$-alkyl, and $NR_5R_6$;

$R_3$ is selected from the group consisting of H, F, Cl, Br, OH, $NH_2$, and $NHC_{1-4}$-alkyl and preferably from the group consisting of H, F, Cl, OH, and $NH_2$;

$R_4$ is selected from the group consisting of H, F, Cl, Br, $OR_5$, $COR_{10}$, OH, $NH_2$, and $NR_5R_6$, and preferably from the group consisting of H, F, Cl, $OR_5$, OH, $NH_2$, and $NR_5R_6$;

$R_7$ is selected from the group consisting of H, F, $C_{1-4}$-alkyl, $C_{2-4}$-alkenyl, $C_{2-4}$-alkynyl, OH, $NH_2$, O—$C_{1-4}$-alkyl, NH—$C_{1-4}$-alkyl, N($C_{1-4}$-alkyl)$_2$, $C_{1-4}$-alkylene-OH, and $C_{1-4}$-alkylene-$NH_2$, O—$C_{1-4}$-alkylene-OH, $C_{2-4}$-alkynylene-OH, and $C_{2-4}$-alkynylene-NH, and preferably from the group consisting of H, F, $C_{1-4}$-alkyl, OH, $NH_2$, O—$C_{1-4}$-alkyl, NH—$C_{1-4}$-alkyl, N($C_{1-4}$-alkyl)$_2$, $C_{1-4}$-alkylene-OH, and $C_{1-4}$-alkylene-$NH_2$;

$R_8$ and $R_9$ are independently selected from the group consisting of H, $C_{1-4}$-alkyl, $C_{1-4}$-alkyl-F, and O—$C_{1-4}$-alkyl, and preferably from the group consisting of H, and $C_{1-4}$-alkyl;

$R_{10}$ is selected from the group consisting of H, $C_{1-4}$-alkyl, and $C_{1-4}$-alkyl-F, and preferably from the group consisting of H, and $C_{1-4}$-alkyl;

$R_{11}$ and $R_{12}$ are independently selected from the group consisting of H, $R_d$, $C_{1-4}$-alkyl, $C_{1-4}$-alkyl-F, $C_{1-4}$-alkylene-OH, and $C_{1-4}$-alkylene-$NH_2$, or alternatively, $R_{11}$ and $R_{12}$ together with the N to which they are attached form a heterocyclic group having 4 to 9 ring members and 1, 2 or 3 heteroatoms independently selected from N, O and S or form a heterocyclic spiro group having 7 to 11 ring members and 1, 2 or 3 heteroatoms independently selected from N, O and S, wherein said heterocyclic or heterocyclic spiro group may be substituted with 1-3 $R_7$ groups, and wherein preferably $R_{11}$ and $R_{12}$ are independently selected from the group consisting of H, $R_d$, and $C_{1-4}$-alkyl;

and, $R_{14}$ is $CH_3$, wherein $R_5$, $R_6$ and $R_d$ are as specified under item 1.

24. A compound according to item 1 selected from the group consisting of (E)-3-((2R,3S)-3-Amino-2-methyl-4-oxo-2,3,4,5-tetrahydro-1H-pyrido[2,3-b][1,4]diazepin-8-yl)-N-((7-amino-2-methylbenzofuran-3-yl)methyl)-N-methylacrylamide, (E)-3-((2R,3S)-3-amino-2-methyl-4-oxo-2,3,4,5-tetrahydro-1H-pyrido[2,3-b][1,4]diazepin-8-yl)-N-methyl-N-((3-methylbenzofuran-2-yl)methyl)acrylamide, E)-3-(3-acetamido-4-oxo-2,3,4,5-tetrahydro-1H-pyrido[2,3-b][1,4]diazepin-8-yl)-N-methyl-N-((3-methylbenzofuran-2-yl)methyl)acrylamide, (S,E)-N-methyl-N-((2-methylbenzofuran-3-yl)methyl)-3-(4-oxo-3-(2-oxa-6-azaspiro[3.3]heptan-6-yl)-2,3,4,5-tetrahydro-1H-pyrido[2,3-b][1,4]diazepin-8-yl) acrylamide, E)-3-((R)-3-((2S,6R)-2,6-dimethylmorpholino)-4-oxo-2,3,4,5-tetrahydro-1H-pyrido[2,3-b][1,4]diazepin-8-yl)-N-methyl-N-((3-methylbenzofuran-2-yl)methyl)acrylamide, and (S,E)-3-(3-amino-4-oxo-2,3,4,5-tetrahydro-1H-pyrido[2,3-b][1,4]diazepin-8-yl)-N-methyl-N-((3-methylbenzofuran-2-1) methyl)acrylamide, and any pharmaceutically acceptable prodrugs, salts and/or solvates of any of the foregoing.

25. A compound according to item 1 selected from the group consisting of (E)-3-(7-amino-8-oxo-6,7,8,9-tetrahydro-5H-pyrido[2,3-b]azepin-3-yl)-N-((7-chloro-3-methylbenzofuran-2-yl)methyl)-N-methylacrylamide, (E)-3-(7-amino-8-oxo-6,7,8,9-tetrahydro-5H-pyrido[2,3-b]azepin-3-yl)-N-methyl-N-((2-methylbenzofuran-3-yl)methyl)acrylamide, (S,E)-3-(7-amino-8-oxo-6,7,8,9-tetrahydro-5H-pyrido[2,3-b]azepin-3-yl)-N-methyl-N-((3-methylbenzofuran-2-yl)methyl) acrylamide,-(E)-3-(7-(dimethylamino)-8-oxo-6,7,8,9-tetrahydro-5H-pyrido[2,3-b]azepin-3-yl)-N-methyl-N-((3-methylbenzofuran-2-yl)methyl)acrylamide, (S,E)-3-(7-(dimethylamino)-8-oxo-6,7,8,9-tetrahydro-5H-pyrido[2,3-b]azepin-3-yl)-N-methyl-N-((3-methylbenzofuran-2-yl)methyl)acrylamide, (S,E)-3-(7-amino-8-oxo-6,7,8,9-tetrahydro-5H-pyrido[2,3-b]azepin-3-yl)-N-((7-chloro-3-methylbenzofuran-2-yl)

methyl)-N-methylacrylamide, (S,E)-3-(7-amino-8-oxo-6,7,8,9-tetrahydro-5H-pyrido[2,3-b]azepin-3-yl)-N-((7-fluoro-3-methylbenzofuran-2-yl)methyl)-N-methylacrylamide, (S,E)-3-(7-amino-8-oxo-6,7,8,9-tetrahydro-5H-pyrido[2,3-b]azepin-3-yl)-N-methyl-N-((3-methylbenzo[b]thiophen-2-yl)methyl)acrylamide (S,E)-3-(7-amino-8-oxo-6,7,8,9-tetrahydro-5H-pyrido[2,3-b]azepin-3-yl)-N-((4-fluoro-3-methylbenzofuran-2-yl)methyl)-N-methylacrylamide,-(S,E)-3-(7-amino-8-oxo-6,7,8,9-tetrahydro-5H-pyrido[2,3-b]azepin-3-yl)-N-((7-fluoro-3-methylbenzo[b]thiophen-2-yl) methyl)-N-methylacrylamide, (S,E)-3-(7-amino-8-oxo-6,7,8,9-tetrahydro-5H-pyrido[2,3-b]azepin-3-yl)-N-methyl-N-((3-methyl-5-(pyridin-3-yloxy) benzofuran-2-yl)methyl)acrylamide, (E)-3-((S)-7-amino-8-oxo-6,7,8,9-tetrahydro-5H-pyrido[2,3-b]azepin-3-yl)-N-((4-(((1r,4r)-4-aminocyclohexyl)oxy)-3-methylbenzofuran-2-yl) methyl)-N-methylacrylamide;-(S,E)-3-(7-amino-8-oxo-6,7,8,9-tetrahydro-5H-pyrido[2,3-b]azepin-3-yl)-N-methyl-N-((3-methyl-4-((pyridin-3-ylamino) methyl)benzofuran-2-yl)methyl)acrylamide(S,E)-N-((7-fluoro-3-methylbenzofuran-2-yl)methyl)-N-methyl-3-(7-morpholino-8-oxo-6,7,8,9-tetrahydro-5H-pyrido[2,3-b]azepin-3-yl)acrylamide, (E)-N-methyl-N-((2-methylbenzofuran-3-yl)methyl)-3-(7-morpholino-8-oxo-6,7,8,9-tetrahydro-5H-pyrido[2,3-b]azepin-3-yl) acrylamide, (E)-N-methyl-N-((3-methylbenzofuran-2-yl)methyl)-3-(8-oxo-7-(7-oxa-2-azaspiro[3.5]nonan-2-yl)-6,7,8,9-tetrahydro-5H-pyrido[2,3-b]azepin-3-yl) acrylamide, (E)-3-(7-(1,1-Dioxidothiomorpholino)-8-oxo-6,7,8,9-tetrahydro-5H-pyrido[2,3-b]azepin-3-yl)-N-methyl-N-((3-methylbenzofuran-2-yl)methyl) acrylamide, (E)-N-Methyl-N-((3-methylbenzofuran-2-yl)methyl)-3-(8-oxo-7-(pyrrolidin-1-yl)-6,7,8,9-tetrahydro-5H-pyrido[2,3-b]azepin-3-yl)acrylamide, (E)-N-Methyl-N-((3-methylbenzofuran-2-yl)methyl)-3-(7-(4-(methylsulfonyl) piperazin-1-yl)-8-oxo-6,7,8,9-tetrahydro-5H-pyrido[2,3-b]azepin-3-yl)acrylamide, S,E)-N-methyl-N-((3-methylbenzofuran-2-yl)methyl)-3-(8-oxo-7-(2-oxa-6-azaspiro[3.3]heptan-6-yl)-6,7,8,9-tetrahydro-5H-pyrido[2,3-b]azepin-3-yl)acrylamide, ((S,E)-3-(7-(3-hydroxyazetidin-1-yl)-8-oxo-6,7,8,9-tetrahydro-5H-pyrido[2,3-b]azepin-3-yl)-N-methyl-N-((3-methylbenzofuran-2-yl)methyl)acrylamide, (E)-N-((7-Amino-2-methylbenzofuran-3-yl)methyl)-N-methyl-3-(8-oxo-7-(pyrrolidin-1-yl)-6,7,8,9-tetrahydro-5H-pyrido[2,3-b]azepin-3-yl)acrylamide, (S,E)-N-((7-amino-2-methylbenzofuran-3-yl)methyl)-3-(7-amino-8-oxo-6,7,8,9-tetrahydro-5H-pyrido[2,3-b] azepin-3-yl)-N-methylacrylamide, and (E)-3-((2R,3S)-3-hydroxy-2-methyl-4-oxo-2,3,4,5-tetrahydro-1H-pyrido[2,3-b][1,4]diazepin-8-yl)-N-methyl-N-((3-methyl-4-(pyridin-3-yloxy)benzofuran-2-yl)methyl) acrylamide, and any pharmaceutically acceptable prodrugs, salts and/or solvates thereof.
26. A pharmaceutical composition comprising a compound according as defined in any any preceding item (1 to 25).
27. A compound or composition according to any preceding item (1-26) for use in a method of therapy.
28. A compound or composition for use according to item 27 wherein the method of therapy is a method of treating a bacterial infection.
29. A compound or composition for use according to item 28 wherein the bacterial infection is associated with one or more of bacteria selected from the group consisting of *S. aureus, E. coli, K. pneumoniae* and *A. baumannii*.
30. A compound or composition for use according to item 28 or 29 wherein the bacterial infection is associated with *A. baumannii* and is preferably pneumonia and most preferably nosocomial pneumonia.
31. A method for producing a compound as defined in anyone of items 1 to 25 wherein said method is selected from a first variant that comprises the step of coupling a precursor compound of formula M1 or M1'

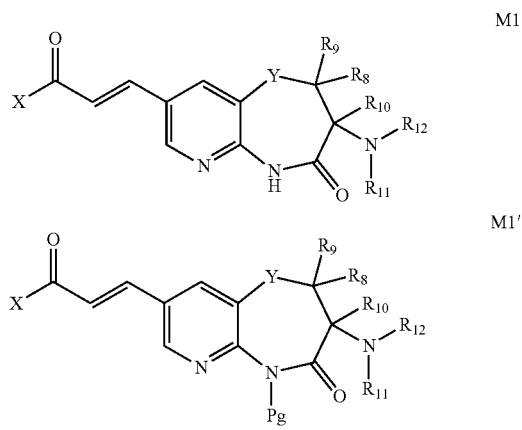

wherein X represents a leaving group, which is preferably selected from a hydroxyl group, a tosylate group, a triflate group, a mesylate group, iodide, bromide, chloride, methoxy, and ethoxy, and Pg represents a protective group, which is preferably selected from the Boc group, PMB group, and DMB group, and wherein $R_{11}$ and $R_{12}$ may be a group as defined in any of the claims or items disclosed herein with respect to $R_{11}$ and $R_{12}$ or may be such a defined group that also comprises a protective group, which is preferably selected from the Boc group, PMB group, and DMB group, with an amine compound of formula M2a or M2b, as appropriate

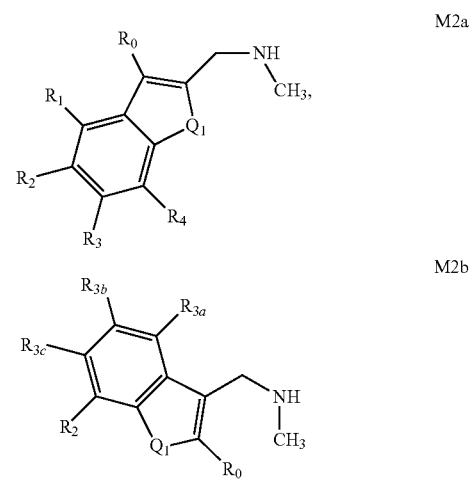

wherein Y, $Q_1$, and all R groups have the same meanings as specified in items 1 to 19;

and a second variant that comprises the step of coupling a compound of formula M6 or M6' wherein $R_{11}$ and $R_{12}$ may be a group as defined in any of the claims or items disclosed herein with respect to $R_{11}$ and $R_{12}$ or may be such a defined group that also comprises a protective group, which is preferably selected from the Boc group, PMB group, and DMB group,

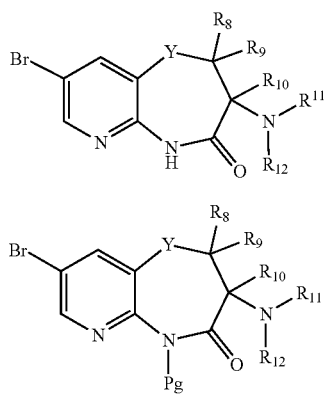

with a compound of formula M7a or M7b, as appropriate

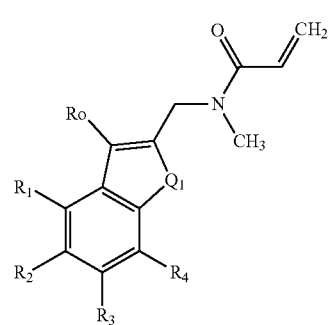

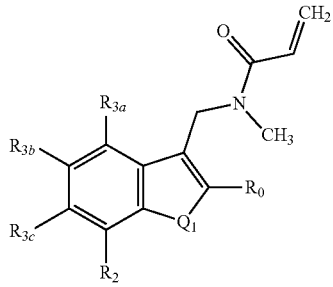

wherein Y, $Q_1$ and all R groups have the same meaning as specified in any one of items 1 to 23.

DETAILED DESCRIPTION OF THE INVENTION

DEFINITIONS

Figure 1:
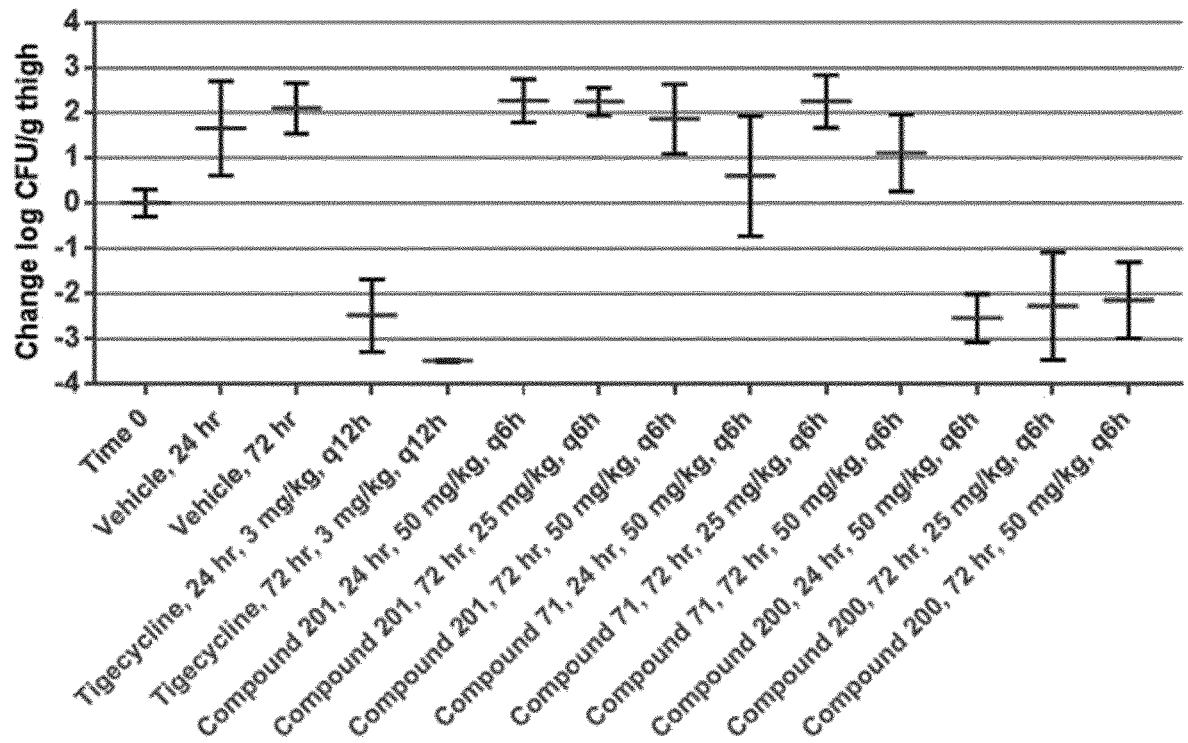
FIG. 1: Change log CFU per g in the mouse thigh model of Example 35 for the indicated dose regimens and treatment durations following SC administration of the test articles. Long horizontal lines show the mean, and the shorter horizontal lines show the standard deviation.
Figure 2:
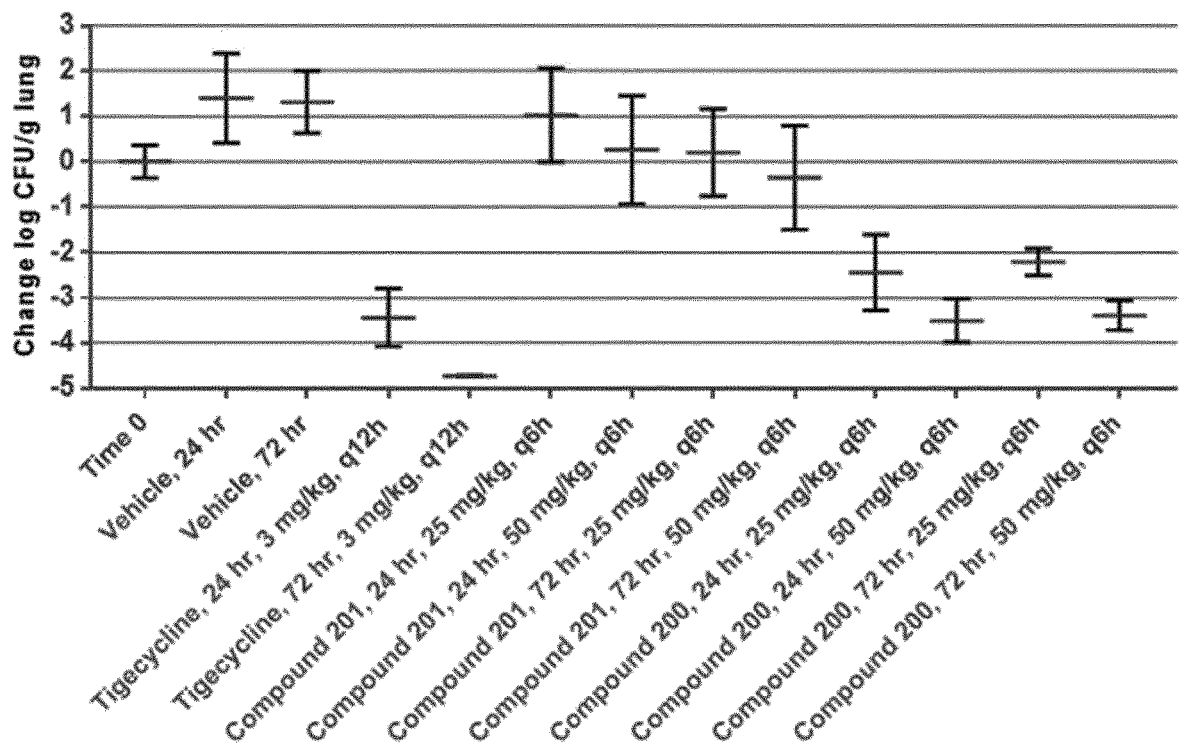
FIG. 2: Change log CFU per g lung in the mouse lung model of Example 35 for the indicated dose regimens and treatment durations following SC administration of the test articles. Long horizontal lines show the mean, and the shorter horizontal lines show the standard deviation.

The following definitions are provided to assist the reader. Unless otherwise defined, all terms of art, notations, and other scientific or medical terms or terminology used herein are intended to have the meanings commonly understood by those of skill in the chemical and medical arts. In some cases, terms with commonly understood meanings are defined herein for clarity and/or for ready reference, and the inclusion of such definitions herein should not be construed as representing a substantial difference over the definition of the term as generally understood in the art.

In some embodiments, the term "about" refers to a deviation of ±10% from the recited value. When the word "about" is used herein in reference to a number, it should be understood that still another embodiment of the invention includes that number not modified by the presence of the word "about"

"Administering" or "administration of" a drug to a patient (and grammatical equivalents of this phrase) refers to direct administration, which may be administration to a patient by a medical professional or may be self-administration, and/or indirect administration, which may be the act of prescribing a drug. E.g., a physician who instructs a patient to self-administer a drug or provides a patient with a prescription for a drug is administering the drug to the patient.

"Dose" and "dosage" refer to a specific amount of active or therapeutic agents for administration. Such amounts are included in a "dosage form," which refers to physically discrete units suitable as unitary dosages for human subjects and other mammals, each unit containing a predetermined quantity of active agent calculated to produce the desired onset, tolerability, and therapeutic effects, in association with one or more suitable pharmaceutical excipients such as carriers.

The terms "treatment" and "therapy", as used in the present application, refer to a set of hygienic, pharmacological, surgical and/or physical means used with the intent to cure and/or alleviate a disease and/or symptoms with the goal of remediating the health problem. The terms "treatment" and "therapy" include preventive and curative methods, since both are directed to the maintenance and/or reestablishment of the health of an individual or animal. Regardless of the origin of the symptoms, disease and disability, the administration of a suitable medicament to alleviate and/or cure a health problem should be interpreted as a form of treatment or therapy within the context of this application. "Unit dosage form" as used herein refers to a physically discrete unit of therapeutic formulation appropriate for the subject to be treated. It will be understood, however, that the total daily usage of the compositions of the present invention will be decided by the attending physician within the scope of sound medical judgment. The specific effective dose level for any particular subject or organism will depend upon a variety of factors including the disorder being treated and the severity of the disorder; activity of specific active agent employed; specific composition employed; age, body weight, general health, sex and diet of the subject; time of administration, and rate of excretion of the specific active agent employed; duration of the treatment; drugs and/or additional therapies used in combination or coincidental with specific compound(s) employed, and like factors well known in the medical arts.

The articles "a" and "an" are used herein to refer to one or to more than one (i.e., to at least one) of the grammatical object of the article. By way of example, "an element" means one element or more than one element.

The term "including" is used to mean "including but not limited to". "Including" and "including but not limited to" are used interchangeably. The term "comprising" is used to have the same meaning as "including". The term "consisting of" is used to indicate that the listed element(s) is/are present but no other unmentioned elements. The term "comprising" is used to include the meaning of "consisting of" as a preferred embodiment.

The term "FabI" is art-recognized and refers to the bacterial enzyme believed to function as an enoyl-acyl carrier protein (ACP) reductase in the final step of the four reactions involved in each cycle of bacterial fatty acid biosynthesis. This enzyme is believed to be widely distributed in bacteria and plants.

The term "enzyme inhibitor" refers to any compound that prevents an enzyme from effectively carrying out its respective biochemical roles. Therefore a "FabI inhibitor" is any compound that inhibits FabI from carrying out its biochemical role. The amount of inhibition of the enzyme by any such compound will vary and is described herein and elsewhere.

The term "antibiotic agent" or "antibacterial agent" shall mean any drug that is useful in treating, preventing, or otherwise reducing the severity of any bacterial disorder, or any complications thereof, including any of the conditions, disease, or complications arising therefrom and/or described herein. Antibiotic agents include, for example, cephalosporins, quinolones and fluoroquinolones, penicillins and beta lactamase inhibitors, carbapenems, monobactams, macrolides and lincosamides, glycopeptides, rifampin, oxazolidinones, tetracyclines, aminoglycosides, streptogramins, sulfonamides, and the like. Other antibiotic or antibacterial agents are disclosed herein, and are known to those of skill in the art. In certain embodiments, the term "antibiotic agent" does not include an agent that is a FabI inhibitor, so that the combinations of the present invention in certain instances will include one agent that is a FabI inhibitor and another agent that is not.

The term "drug" as used herein refers to any substance falling within at least one of the definitions given in Article 1, Items 2 (a), 2 (b) or 3a. of Directive 2001/83/EC of Nov. 6, 2001 in the version of Nov. 16, 2012 or in Article 1, Items 2 (a) or 2 (b) of Directive 2001/82/EC of Nov. 6, 2001 in the version of Aug. 7, 2009 and in Article 2 of Regulation (EC) No. 726/2004 of Mar. 31, 2004.

The term "illness" as used herein refers to any illness caused by or related to infection by an organism.

The term "bacterial illness" as used herein refers to any illness caused by or related to infection by bacteria.

The term "cis" is art-recognized and refers to the arrangement of two atoms or groups around a double bond such that the atoms or groups are on the same side of the double bond. Cis configurations are often labeled as (Z) configurations.

The term "trans" is art-recognized and refers to the arrangement of two atoms or groups around a double bond such that the atoms or groups are on the opposite sides of a double bond. Trans configurations are often labeled as (E) configurations.

The term "therapeutic effect" is art-recognized and refers to a local or systemic effect in animals, particularly mammals, and more particularly humans caused by a pharmacologically active substance. The term thus means any measurable effect in the diagnosis, cure, mitigation, treatment or prevention of disease or in the enhancement of desirable physical or mental development and/or conditions in an animal or human. The phrase "therapeutically-effective amount" means that amount of such a substance that produces some desired local or systemic effect at a reasonable benefit/risk ratio applicable to any treatment. The therapeutically effective amount of such substance will vary depending upon the subject and disease condition being treated, the weight and age of the subject, the severity of the disease condition, the manner of administration and the like, which can readily be determined by one of ordinary skill in the art. For example, certain compositions of the present invention may be administered in a sufficient amount to produce a at a reasonable benefit/risk ratio applicable to such treatment.

The term "chiral" is art-recognized and refers to molecules which have the property of non-superimposability of the mirror image partner, while the term "achiral" refers to molecules which are superimposable on their mirror image partner. A "prochiral molecule" is a molecule which has the potential to be converted to a chiral molecule in a particular process.

The compounds of the disclosure may contain one or more chiral centers and/or double bonds and, therefore, exist as geometric isomers, enantiomers or diastereomers. The enantiomer and diastereomers may be designated by the symbols "(+)", "(−)", "R" or "S," depending on the configuration of substituents around the stereogenic carbon atom, but the skilled artisan will recognize that a structure may denote one or more chiral centers implicitly. Mixtures of enantiomers or diastereomers may be designated "(±)" in nomenclature, but the skilled artisan will recognize that a structure may denote a chiral center implicitly. Geometric isomers, resulting from the arrangement of substituents around a carbon-carbon double bond or arrangement of substituents around a cycloalkyl or heterocyclic ring, can also exist in the compounds of the present invention.

The symbol ══ denotes a bond that may be a single, double or triple bond as described herein.

Substituents around a carbon-carbon double bond are designated as being in the "Z" or "E" configuration wherein the terms "Z" and "E" are used in accordance with IUPAC standards. Unless otherwise specified, structures depicting double bonds encompass both the "E" and "Z" isomers. Substituents around a carbon-carbon double bond alternatively can be referred to as "cis" or "trans," where "cis" represents substituents on the same side of the double bond and "trans" represents substituents on opposite sides of the double bond. The arrangement of substituents around a carbocyclic ring can also be designated as "cis" or "trans." The term "cis" represents substituents on the same side of the plane of the ring and the term "trans" represents substituents on opposite sides of the plane of the ring. Mixtures of compounds wherein the substituents are disposed on both the same and opposite sides of plane of the ring are designated "cis/trans" or "Z/E."

The term "stereoisomers" when used herein consist of all geometric isomers, enantiomers or diastereomers. The present invention encompasses various stereoisomers of these compounds and mixtures thereof. Conformational isomers and rotamers of disclosed compounds are also contemplated.

The term "IC50" is art-recognised and refers to the effectiveness of a substance in inhibiting a given biological or biochemical process (or component of a process, i.e. an enzyme, cell, cell receptor or microorganism). IC50 represents the concentration of a drug e.g. a compound of the invention, that is required for 50% inhibition in vitro.

The term "MIC" is art-recognised and refers to the Minimum Inhibitory Concentration, that is the lowest concentration of an antimicrobial that will inhibit the visible growth of a microorganism following overnight incubation, usually reported as mg/L or μg/mL.

The term "antimicrobial" is art-recognized and refers to the ability of the compounds disclosed herein to prevent, inhibit or destroy the growth of microbes such as bacteria, fungi, protozoa and viruses.

The term "antibacterial" is art-recognized and refers to the ability of the compounds disclosed herein to prevent, inhibit or destroy the growth of microbes of bacteria.

The term "microbe" is art-recognized and refers to a microscopic organism. In certain embodiments the term microbe is applied to bacteria. In other embodiments the term refers to pathogenic forms of a microscopic organism.

The term "alkyl" as used herein refers to a saturated straight or branched hydrocarbon, such as a straight or branched group of 1-8 or 1-6 carbon atoms referred to herein as $C_1$-$C_8$alkyl, or $C_1$-$C_6$alkyl, respectively. The term "lower alkyl" as used herein specifically refers to a saturated straight or branched hydrocarbon, such as a straight or branched group of 1-4 or 1-3 carbon atoms, referred to herein as $C_1$-$C_4$alkyl, and $C_1$-$C_3$alkyl, respectively. Exemplary alkyl groups and lower alkyl grous include, but are not limited to, methyl, ethyl, propyl, isopropyl, 2-methyl-1-propyl, 2-methyl-2-propyl, 2-methyl-1-butyl, 3-methyl-1-butyl, 3-methyl-2-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, and hexyl.

Moreover, the term "alkyl" (or "lower alkyl") includes also divalent saturated straight or branched hydrocarbon groups, which are sometimes referred to as alkanediyl groups or alkylene groups. The term "alkyl" not only covers unsubstituted groups but also "substituted alkyls", i.e. it should be understood as optionally carrying one or more substituents at one or more positions. That is, it refers also to alkyl moieties having one or more (e.g. two, three, four, five, six, etc.) substituents, each replacing a hydrogen on a carbon of the hydrocarbon backbone. Such substituents may include, for example, a hydroxyl, a carbonyl group (wherein the carbonyl group carries a hydrogen atom, an alkyl group or another group as defined in this paragraph, such as to yield a carboxyl, an alkoxycarbonyl, a formyl, or an acyl group), a thiocarbonyl-containing group (wherein the carbonyl group carries a hydrogen atom, an alkyl group or another group as defined in this paragraph, such as to yield a thioester, a thioacetate, or a thioformate), an alkoxyl, a phosphoryl, a phosphonate, a phosphinate, a phosphate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, a cycloalkyl, a heterocycle or an aromatic or heteroaromatic moiety. In all instances, wherein the above-mentioned groups have more than one valency, the further free valency can be saturated by a hydrogen atom, an alkyl group, a cycloalkyl group, a heterocyclic group, an aryl group or a heteroaryl group. It will further be understood by those skilled in the art that the moieties substituted on the hydrocarbon chain may themselves be substituted, if appropriate. For instance, the substituents of a substituted alkyl may include substituted and unsubstituted forms of amino, azido, imino, amido, phosphoryl (including phosphonate, phosphinate and phosphate), sulfonyl (including sulfate, sulfonamido, sulfamoyl and sulfonate), and silyl groups, as well as ethers, alkylthios, carbonyls (including ketones, aldehydes, carboxylates, and esters), nitrile and isonitrile. For the avoidance of doubt, an alkyl group carrying another alkyl group should not be regarded as an alkyl group substituted with another alkyl group, but as a single branched alkyl group.

The term "alkylene" is art-recognized and refers to a group corresponding to the alkyl group defined above, but having two free valencies. The alkylene group is sometimes also referred to as alkanediyl group.

The term "alkenyl" is art-recognized and refers to a group corresponding to the alkyl group defined above, but carrying one or more carbon-carbon double bonds. Of course, the total number of double bonds is restricted by the number of carbon atoms in the alkenyl group and in order to allow for at least one double bond, the alkenyl group must have at least two carbon atoms. Except for this difference, the definitions and characterizations given for the alkyl group above apply equally to the alkenyl group.

The term "alkynyl" is art-recognized and refers to a group corresponding to the alkyl group defined above, but carrying one or more carbon-carbon triple bonds. Of course, the total number of double bonds is restricted by the number of carbon atoms in the alkenyl group and in order to allow for at least one triple bond, the alkynyl group must have at least two carbon atoms. Except for this difference, the definitions and characterizations given for the alkyl group above apply equally to the alkynyl group.

The term "aryl" is art-recognized and refers to 5- or 6-membered single-ring aromatic groups that can be pure aromatic carbocycles or may include from zero to four heteroatoms, for example, benzene, pyrrole, furan, thiophene, imidazole, oxazole, thiazole, triazole, pyrazole, pyridine, pyrazine, pyridazine and pyrimidine, and the like. Those aryl groups having heteroatoms in the ring structure may also be referred to as "heteroaryl" or "heteroaromatics." The aromatic ring may be unsubstituted or substituted at one or more ring positions with such substituents as described above, for example, halogen, azide, alkyl, aralkyl, alkenyl, alkynyl, cycloalkyl, hydroxyl, alkoxyl, amino, nitro, sulfhydryl, imino, amido, phosphonate, phosphinate, phosphate, carbonyl, carboxyl, silyl, ether, alkylthio, sulfonyl, sulfonamido, ketone, aldehyde, ester, heterocyclyl, aromatic or heteroaromatic moieties, —$CF_3$, —CN, or the like. The term "aryl" also includes polycyclic ring systems having two or more cyclic rings in which two or more carbons are common to two adjoining rings (the rings are "fused rings") wherein at least one of the rings is aromatic as defined above, while there is no particular restriction regarding the fused further ring or rings, which may for instance be cycloalkyls, cycloalkenyls, cycloalkynyls, aryls and/or heterocyclyls.

The term "aralkyl" or "arylalkyl" is art-recognized and refers to an alkyl group substituted with an aryl group (e.g., an aromatic or heteroaromatic group).

The term "carbocycle" is art-recognized and refers to an aromatic or non-aromatic ring in which each atom of the ring is carbon.

The term "cycloalkyl" as used herein refers to a monocyclic saturated or partically unsatured alkyl or alkenyl group of for example 3-6, or 4-6 carbons, referred to herein, e.g., as "$C_{3-6}$cycloalkyl" or "$C_{4-6}$cycloalkyl," and derived from a cycloalkane. Exemplary cycloalkyl groups include, but are not limited to, cyclohexane, cyclohexene, cyclopentane, cyclobutane, cyclopropane or cyclopentene. Said cycloalkyl group may be unsubstituted or substituted at one or more positions with one or more substituents as described above.

The terms "halogen" as used herein refer to F, Cl, Br, or I. "Halide" designates the corresponding anion of the halogens.

The term "amino" as used herein refers to any group of the general structure —$NR_aR_b$, wherein, unless specified otherwise, $R_a$ and $R_b$ are independently selected from the group consisting of H, alkyl, cycloalkyl, alkenyl, alkynyl, aryl, heteroaryl, heterocyclic groups, as well as any other substituent group listed above with respect to the scope of substituted alkyl groups, with the exception of carbonyl groups, thiocarbonyl groups, imine groups, and substituent groups in which attachment to the remaining molecule is via a heteroatom selected from N, O, S and P. Alternatively, Ra and Rb may represent hydrocarbon groups that are linked to form a heterocycle together with the nitrogen atom to which they are attached.

The term "heteroaryl" as used herein refers to a monocyclic aromatic 5-6 membered ring system containing one or more heteroatoms, for example one to three heteroatoms, which may be the same or different, such as nitrogen, oxygen, and sulfur. Where possible, said heteroaryl ring may be linked to the adjacent radical through carbon or nitrogen. Examples of heteroaryl rings include but are not limited to furan, benzofuran, thiophene, pyrrole, thiazole, oxazole, isothiazole, isoxazole, imidazole, pyrazole, triazole, pyridine, and pyrimidine. Said heteroaryl group may be unsubstituted or substituted with one or more substituents as described for the aryl group above. The term "heteroaryl" also includes polycyclic ring systems having two or more cyclic rings in which two or more carbons or heteroatoms are common to two adjoining rings (the rings are "fused rings") wherein at least one of the rings is a heteroaryl as defined above whereas the other cyclic rings may be cycloalkyls, cycloalkenyls, cycloalkynyls, aromatic rings and/or saturated, unsaturated or aromatic heterocycles.

The term "heterocycle" as used herein refers to a monocyclic ring containing one or more heteroatoms, for example one to three heteroatoms, which may be the same or different, such as nitrogen, oxygen, and sulfur. The remaining ring members are formed by carbon atoms. The heterocycle typically has 4 to 8 ring members and preferably 5 or 6 ring members. Unless specified otherwise, a heterocycle may be aromatic, partially or fully saturated. Unless specified otherwise, it may or may not contain permissible substituents as specified herein.

The term "heterocyclic spiro" as used herein refers to a spirocyclic ring structure e.g. a bicyclic structure containing one or more heteroatoms, for example one to three heteroatoms, which may be the same or different, such as nitrogen, oxygen, and sulfur. The remaining ring members are formed by carbon atoms. The heterocyclic spiro typically has 7 to 11 ring members and preferably 7 or 9 ring members.

Unless specified otherwise, a heterocyclic spiro may be partially or fully saturated. Unless specified otherwise, it may or may not contain permissible substituents as specified herein.

The terms "hydroxy" and "hydroxyl" as used herein refer to the radical-OH.

The term "nitro" is art-recognized and refers to —$NO_2$; the term "sulfhydryl" is art-recognized and refers to —SH; and the term "sulfonyl" is art-recognized and refers to —$SO_2$—.

The definition of each expression, when it occurs more than once in any structure, is intended to be independent of its definition elsewhere in the same structure.

The terms "triflyl", "tosyl", "mesyl", and "nonaflyl" are art-recognized and refer to trifluoromethanesulfonyl, p-toluenesulfonyl, methanesulfonyl, and nonafluorobutanesulfonyl groups, respectively. The terms triflate, tosylate, mesylate, and nonaflate are art-recognized and refer to trifluoromethanesulfonate, p-toluenesulfonate, methanesulfonate, and nonafluorobutanesulfonate functional groups and molecules that contain said groups, respectively.

The abbreviations Me, Et, Ph, Tf, Nf, Ts, and Ms represent methyl, ethyl, phenyl, trifluoromethanesulfonyl, nonafluorobutanesulfonyl, p-toluenesulfonyl and methanesulfonyl, respectively. A more comprehensive list of the abbreviations utilized by organic chemists of ordinary skill in the art appears in the first issue of each volume of the Journal of Organic Chemistry; this list is typically presented in a table entitled Standard List of Abbreviations.

The term "prodrug" refers to a derivative of an active compound (drug) that undergoes a transformation under the conditions of use, such as within the body, to release the active drug. Prodrugs are frequently, but not necessarily, pharmacologically inactive until converted into the active drug.

It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, or other reaction.

The term "substituted" is also contemplated to include all permissible substituents of organic compounds. In a broad aspect, the permissible substituents include acyclic and cyclic, branched and unbranched, carbocyclic and heterocyclic, aromatic and nonaromatic substituents of organic compounds. Illustrative substituents include, for example, those described herein above, e.g. in connection with substituted alkyls. The permissible substituents may be one or more and the same or different for appropriate organic compounds. For purposes of this disclosure, the heteroatoms such as nitrogen may have hydrogen substituents and/or any permissible substituents of organic compounds described herein which satisfy the valences of the heteroatoms. In this context, the term "permissible substituents" means any substituent that can be bonded to the core molecule without contravening general principles of chemical bond formation such as the maximum number of valence electrons for an atom of interest, and without making the compound so toxic for the patient that unacceptable toxicity is found even at the minimum dosage required for achieving a therapeutic effect.

For purposes of this invention, the chemical elements are identified in accordance with the Periodic Table of the Elements, CAS version, Handbook of Chemistry and Physics, 67th Ed., 1986-87, inside cover. Also for purposes of the disclosure, the term "hydrocarbon" is contemplated to include all permissible compounds having at least one hydrogen and one carbon atom. In a broad aspect, the permissible hydrocarbons include acyclic and cyclic, branched and unbranched, carbocyclic and heterocyclic, aromatic and nonaromatic organic compounds that may be substituted or unsubstituted.

The term "pharmaceutically-acceptable salts" is art-recognized and refers to the relatively non-toxic, inorganic and organic acid addition salts, or inorganic or organic base addition salts of compounds, including, for example, those contained in compositions of the present invention, and including those present in other approved drugs (wherein approval may be by any competent authority in the EU, USA, CA, JP, CN or KR at date up to the effective date of the present application).

The term "treating" includes any significant effect, e.g., lessening, reducing, modulating, or eliminating, that results in the improvement of the condition, disease, disorder and the like.

The term "prophylactic" or "therapeutic" treatment is art-recognized and refers to administration to the host of one or more of the subject compositions. If it is administered prior to clinical manifestation of the unwanted condition (e.g., disease or other unwanted state of the host animal) then the treatment is prophylactic, i.e., it protects the host against developing the unwanted condition, whereas if administered after manifestation of the unwanted condition, the treatment is therapeutic (i.e., it is intended to diminish, ameliorate or maintain the existing unwanted condition or side effects therefrom).

A "patient," "subject" or "host" to be treated by the subject method may mean either a human or non-human animal. Non-human animals include companion animals (e.g. cats, dogs) and animals raised for consumption (i.e. food animals), such as cows, pigs, chickens. Non-human animals are preferably mammals.

The term "mammal" is known in the art, and exemplary mammals include humans, primates, bovines, porcines, canines, felines, and rodents (e.g., mice and rats).

The term "bioavailable" is art-recognized and refers to a form of the subject disclosure that allows for it, or a portion of the amount administered, to be absorbed by, incorporated to, or otherwise physiologically available to a subject or patient to whom it is administered.

The term "pharmaceutically acceptable carrier" is art-recognized and refers to a pharmaceutically-acceptable material, composition or vehicle, such as a liquid or solid filler, diluent, excipient, solvent or encapsulating material, involved in carrying or transporting any subject composition or component thereof from one organ, or portion of the body, to another organ, or portion of the body. Each carrier must be "acceptable" in the sense of being compatible with the subject composition and its components and not injurious to the patient. Some examples of materials which may serve as pharmaceutically acceptable carriers include: (1) sugars, such as dextrose, lactose, glucose and sucrose; (2) starches, such as corn starch and potato starch as well as starch derivatives such as cyclodextrins and modified cyclodextrins including preferably (2-hydroxypropyl)-β-cyclodextrin and sulfobutylether-β-cyclodextrin; (3) cellulose, and its derivatives, such as microcrystalline cellulose, sodium carboxymethyl cellulose, methyl cellulose, ethyl cellulose, hydroxypropylmethyl cellulose (HPMC), and cellulose acetate; (4) powdered tragacanth; (5) malt; (6) gelatin; (7) talc; (8) matrix-forming polymeric excipients such as polyvinyl pyrrolidine (PVP), e.g. PVP K30, acrylic polymers and co-polymers such as the different grades of Eudragit and preferably Eurdragit L100, hydroxypropylmethyl cellulose acetate succinate (HPMCAS), other copolymers such as polyethylene glycol-based copolymers like Soluplus; (9) excipients, such as cocoa butter and suppository waxes; (10) oils, such as peanut oil, cottonseed oil, safflower oil, sesame oil, olive oil, corn oil and soybean oil; (11) glycols, such as propylene glycol; (12) polyols, such as glycerin, sorbitol, mannitol and polyethylene glycol; (13) esters, such as ethyl oleate, glyceryl behenate and ethyl laurate; (14) agar; (15) buffering agents, such as magnesium hydroxide and aluminum hydroxide; (16) alginic acid; (17) pyrogen-free water; (18) isotonic saline; (19) Ringer's solution; (20) ethyl alcohol; (21) phosphate buffer solutions; and (22) other non-toxic compatible substances employed in pharmaceutical formulations. The disclosed excipients may serve more than one function. For example, fillers or binders may also be disintegrants, glidants, anti-adherents, lubricants, sweeteners and the like.

The term "solvent" is used herein to mean a liquid chemical substance that is capable of dissolving a significant quantity of another substance of interest, the "solute", to thereby generate a clear homogeneous solution. The term "significant quantity" is determined by the intended use of the solution in such a manner that the intended use must be possible by the dissolved quantity of the solute. For instance, if it is intended to administer a compound of the present invention in the form of a solution by injection, the solvent must be capable of dissolving the compound in such amounts, to make administration of a therapeutic dose possible.

The terms "acid" and "base" are used to have their conventional meanings as proton donators and proton acceptors, respectively (i.e. Broensted acids and bases). A "strong base" is meant to be any base having a basicity of t-BuOK in THF or stronger. A "mild acid" is meant to be any acid having acidity of 1M $H_2SO_4$ or weaker.

Unless specified otherwise, all reactions described herein are carried out at reaction temperatures that yield the desired target compound and that provide a reasonable compromise between reaction rate and selectivity. Typical reaction temperatures for Pd-based coupling reactions and Fe-based cyclization reactions are 80° C. to 90° C. while removal of protecting groups is typically accomplished at a temperature of from 0° C. to room temperature (25° C.).

Unless specified otherwise, all indications in dependent claims that variable groups are the same as specified for the compound of formula I and its specific embodiments of formulae Ia and Ib, are to be understood such that the more specific meanings described for these variable groups in other dependent claims, are also possible and even preferred. The same applies to the description of meanings of variable groups in the general description. It is particularly preferred to rely on a combination of meanings for the different variable groups, wherein two, three or more and ideally all of these meanings are individually described as being preferred.

Unless specified otherwise, the term "protective group" is used herein to characterize a group that is bonded to a functional group to prevent this functional group from participating in a contemplated chemical reaction. The protective group must be inert under the conditions of the contemplated chemical reaction, but it must be possible to remove the protective group from the compound such that no further transformations take place in other parts of the molecule. Suitable protective groups are described for each functional group in "Greene's Protective Groups in Organic Synthesis", Peter G. M. Wuts, Theodora W. Greene, John Wiley & Sons, 20 Dec. 2012.

Overview

Surprisingly, it has been found that antibacterial activity against Gram-positive and/or Gram-negative bacteria, and more specifically *S. aureus, E. coli, K. pneumoniae* and/or *A. baumannii*, may be accomplished with a compound of formula (I) as described herein. It has also surprisingly been found that a compound of the present invention may have a low MIC with respect to Gram-positive and/or Gram-negative bacteria and more specifically *S. aureus, E. coli, K. pneumoniae* and/or *A. baumannii*, indicating that a compound of formula (I) may not only be effective against these types of bacteria, but may also be effective in low dosages which can thereby minimize side effects. Without wishing to be bound by theory, the inventors believe that the compounds of the invention may work through the mechanism of FabI inhibition and, with respect to previous generations of FabI inhibitor compounds and Gram-negative bacteria such as *A. baumannii, E. coli, K. pneumoniae*, may be better able to penetrate the cytoplasm of such bacteria and or may be less prone to efflux from said bacteria and/or may be more potent.

Compounds of the Invention

The compounds of the present invention are represented by the following general formula I

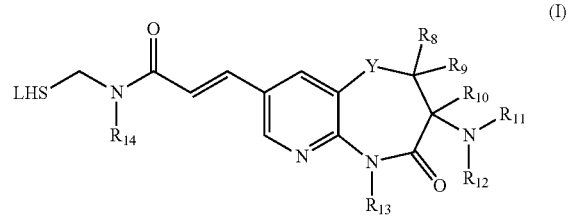
(I)

wherein LHS represents the left-hand-side moiety, which may be selected from LHSa and LHSb as shown below

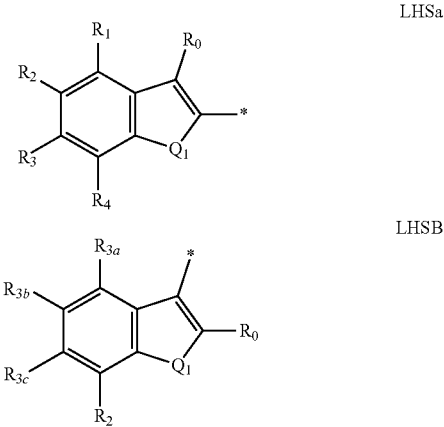

wherein the asterisk (*) marks the point of attachment of the remainder of the molecule,
such that the following two families of compounds of formulae Ia and Ib are covered:

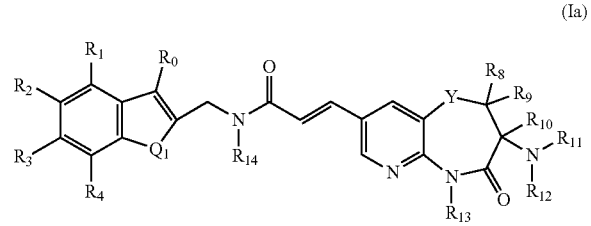
(Ia)

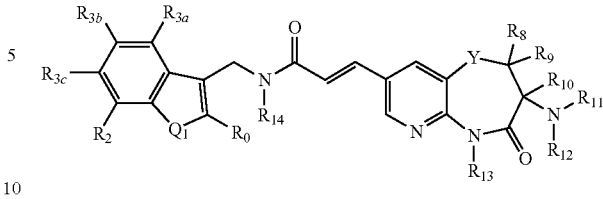
(Ib)

Meanings of the variable groups (Y, $Q_1$, and $R_0$ to $R_{13}$) are specified herein e.g. in the claims, and in items set out in the summary of the invention. The compounds of the invention may also be pharmaceutically acceptable prodrugs, salts and/or solvates of these compounds of formula (I).

Unless expressly specified otherwise, the present disclosure contemplates all such compounds, including cis- and trans-isomers, R- and S-enantiomers, diastereomers, (d)-isomers, (l)-isomers, the racemic mixtures thereof, and other mixtures thereof, as falling within the scope of the invention. However, the carbon-carbon double bond between the pyridine ring and the amide group in the center of the molecule must be in trans configuration, as shown in the above formulae. Additional asymmetric carbon atoms may be present in a substituent such as an alkyl group. All such isomers, as well as mixtures thereof, are intended to be included in this invention.

If, for instance, a particular enantiomer of a compound disclosed herein is desired, it may be prepared by asymmetric synthesis, or by derivation with a chiral auxiliary, where the resulting diastereomeric mixture is separated and the auxiliary group cleaved to provide the pure desired enantiomers. Alternatively, where the molecule contains a basic functional group, such as amino, or an acidic functional group, such as carboxyl, diastereomeric salts are formed with an appropriate optically-active acid or base, followed by resolution of the diastereomers thus formed by fractional crystallization or chromatographic means well known in the art, and subsequent recovery of the pure enantiomers.

Moreover, individual enantiomers and diastereomers of compounds of the present invention can be prepared synthetically from commercially available starting materials that contain asymmetric or stereogenic centers, or by preparation of racemic mixtures followed by resolution methods well known to those of ordinary skill in the art. These methods of resolution are exemplified by (1) attachment of a mixture of enantiomers to a chiral auxiliary, separation of the resulting mixture of diastereomers by recrystallization or chromatography and liberation of the optically pure product from the auxiliary, (2) salt formation employing an optically active resolving agent, (3) direct separation of the mixture of optical enantiomers on chiral liquid chromatographic columns or (4) kinetic resolution using stereoselective chemical or enzymatic reagents. Racemic mixtures can also be resolved into their component enantiomers by well known methods, such as chiral-phase gas chromatography or crystallizing the compound in a chiral solvent. Stereoselective syntheses, a chemical or enzymatic reaction in which a single reactant forms an unequal mixture of stereoisomers during the creation of a new stereocenter or during the transformation of a pre-existing one, are well known in the art. Stereoselective syntheses encompass both enantio- and diastereoselective transformations. For examples, see Carreira and Kvaerno, Classics in Stereoselective Synthesis, Wiley-VCH: Weinheim, 2009.

The invention also embraces isotopically labeled compounds of the invention which are as recited herein, except that one or more atoms are replaced by an atom having an atomic mass or mass number different from the atomic mass or mass number usually found in nature. Examples of isotopes that can be incorporated into compounds of the invention include isotopes of hydrogen, carbon, nitrogen, oxygen, phosphorus, fluorine and chlorine, such as $^{2}H$, $^{3}H$, $^{13}C$, $^{14}C$, $^{15}N$, $^{18}O$, $^{17}O$, $^{31}P$, $^{32}P$, $^{35}S$, $^{18}F$, and $^{36}Cl$, respectively. For example, a compound of the invention may have one or more H atom replaced with deuterium.

Certain isotopically-labeled disclosed compounds (e.g., those labeled with $^{3}H$ and $^{14}C$) are useful in compound and/or substrate tissue distribution assays. Tritiated (i.e., $^{3}H$) and carbon-14 (i.e., $^{14}C$) isotopes are particularly preferred for their ease of preparation and detectability. Further, substitution with heavier isotopes such as deuterium (i.e., $^{2}H$) may afford certain therapeutic advantages resulting from greater metabolic stability (e.g., increased in vivo half-life or reduced dosage requirements) and hence may be preferred in some circumstances. Isotopically labeled compounds of the invention can generally be prepared by following procedures analogous to those disclosed in the e.g., Examples herein by substituting an isotopically labeled reagent for a non-isotopically labeled reagent.

Prodrugs

Prodrugs of the present invention contain at least one prodrug moiety, i.e. a moiety that is cleaved under physiologic conditions to thereby release the active species. Such prodrug moieties may be attached to the compounds of the present invention in all positions showing sufficient reactivity for example a $R_{13}$ may be a prodrug moiety or there may be a prodrug moiety attached to Y if Y is N.

Salts, Solvates, Polymorphs

The compounds of the present invention may be used in the free form or, alternatively, in the form of pharmaceutically acceptable salts. Acid addition salts are particularly suitable. Pharmaceutically acceptable salts that can be used in the present invention are well-known to the skilled person and are disclosed, for instance, in S. M. Berge et al., J. Pharm. Sci., 1977, 66, 1, 1-19; R. J. Bastin, et al., Org. Proc. Res. Dev., 2000, 4, 427-435; and P. H. Stahl, C. G. Wermuth, Eds. "Pharmaceutical Salts: Properties, Selection, and Use", 2nd Ed. Wiley-VCH, 2011. Particularly effective salts may be hydrochloride salts e.g. hydrochloride or dihydrochloride salts, or fluoroacetate salts e.g. trifluoroacetate salts.

The prodrugs of the present invention may also be provided in the free form or in the form of pharmaceutically acceptable salts. Suitable are pharmaceutically acceptable salts well-known to the skilled person, e.g. as described in the literature cited above.

The compounds of the invention can exist in unsolvated forms as well as in solvated form with pharmaceutically acceptable solvents such as water, ethanol, and the like, and it is intended that the invention embrace both solvated and unsolvated forms.

The compounds of the invention may exist in single or multiple crystalline forms or polymorphs. In one embodiment, the compound is amorphous. In one embodiment, the compound is a single polymorph. In another embodiment, the compound is a mixture of polymorphs. In another embodiment, the compound is in a crystalline form.

Pharmaceutical Compositions

Compounds of the present invention may be comprised in pharmaceutical compositions. Said pharmaceutical compositions of the disclosure may be administered by various means and may take any appropriate form of formulation, depending on their intended use, as is well known in the art. For example, if compositions of the disclosure are to be administered orally, they may be formulated as tablets, capsules, granules, powders or syrups. Alternatively, compositions disclosed herein may be administered parenterally and formulated as injections/injectables (intravenous, intramuscular, intraperitoneal or subcutaneous), drop infusion preparations or suppositories. For application by the ophthalmic mucous membrane route, the compositions disclosed herein may be formulated as eye drops or eye ointments. The compositions may comprise any conventional additive, such as an excipient, a binder, a disintegrating agent, a lubricant, a corrigent, a solubilizing agent, a suspension aid, an emulsifying agent or a coating agent. Wetting agents, emulsifiers and lubricants, such as sodium lauryl sulfate and magnesium stearate, as well as coloring agents, release agents, coating agents, sweetening, flavoring and perfuming agents, preservatives and antioxidants may also be comprised in the compositions.

In the compositions of the invention, additives may serve more than one function. For example, fillers or binders may also be disintegrants, glidants, anti-adherents, lubricants, sweeteners and the like.

The compositions may be prepared by any conventional means, which may depend on the type of formulation in question e.g. tablet, injection etc. The composition may comprise any conventional excipient and/or additive e.g. one or more of those set out above.

The compositions may be formulated to be suitable for oral, nasal (e.g. by inhalation by formulating a dry powder formulation or a nebulized formulation), rectal, vaginal, aerosol and/or parenteral (e.g., by injection, for example, intravenous, intraperitoneal, intramuscular, or subcutaneous injection) administration. Said compositions may conveniently be presented in unit dosage form and may be prepared by any methods well known in the art of pharmacy. The amount of a compound disclosed herein that may be combined with an excipient e.g. carrier material to produce a single dose may vary depending upon the identity of the compound, the subject being treated, and the particular mode of administration.

As stated previously, the compositions of the invention may be prepared by any conventional means, said conventional means may depend on the desired form of the composition e.g. tablet, injection/injectable. Methods of preparing the compositions of the invention may include the step of bringing into association a composition of the disclosure with a carrier and, optionally, one or more additional additive ingredient. In general, the compositions are prepared by uniformly and intimately bringing into association compound of the invention with liquid carriers, or finely divided solid carriers, or both, and then, if necessary, shaping the product.

Composition for the invention formulated to be suitable for oral administration may be in the form of capsules, cachets, pills, tablets, lozenges (using a flavored basis, usually sucrose and acacia or tragacanth), powders, granules, or as a solution or a suspension in an aqueous or non-aqueous liquid, or as an oil-in-water or water-in-oil liquid emulsion, or as an elixir or syrup, or as pastilles (using an inert base, such as gelatin and glycerin, or sucrose and acacia), each containing a predetermined amount of a subject composition thereof as an active ingredient. Compositions of the disclosure may also be administered as a bolus, electuary, or paste.

In solid dosage forms for oral administration (capsules, tablets, pills, dragees, powders, granules and the like), the subject composition may be mixed with one or more pharmaceutically acceptable excipients selected from: (1) fillers or extenders, such as starches, dextrose, lactose, sucrose, glucose, mannitol, and/or silicic acid; (2) binders, such as, for example, celluloses (e.g., microcrystalline cellulose, methyl cellulose, hydroxypropylmethyl cellulose (HPMC) and carboxymethylcellulose), alginates, gelatin, polyvinyl pyrrolidone, sucrose and/or acacia; (3) humectants, such as glycerol; (4) disintegrating agents, such as croscarmellose sodium, sodium carboxymethyl starch (sodium starch glycolate), crosslinked polyvinylpyrrolidone (crospovidone), gellan gum, xanthan gum, agar-agar, calcium carbonate, potato or tapioca starch, alginic acid and sodium alginate, certain silicates and especially calcium silicate, and sodium carbonate; (5) dissolution retarding agents, such as paraffin; (6) absorption accelerators, such as quaternary ammonium compounds; (7) wetting agents, such as, for example, cetyl alcohol and glycerol monostearate; (8) absorbents, such as kaolin and bentonite clay; (9) lubricants, such as talc, calcium stearate, magnesium stearate, solid polyethylene glycols, sodium lauryl sulfate, and mixtures thereof; (10) coloring agents; (11) complexing agents such as cyclodextrins and modified cyclodextrins including preferably (2-hydroxypropyl)-β-cyclodextrin and sulfobutylether-β-cyclodextrin; (12) matrix-forming polymeric excipients such as polyvinyl pyrrolidone (PVP), e.g. PVP K30, acrylic polymers and co-polymers such as the different grades of Eudragit and preferably Eudragit L100, hydroxypropylmethyl cellulose acetate succinate (HPMCAS), other copolymers such as polyethylene glycol-based copolymers like Soluplus; and (13) carriers, such as sodium citrate or dicalcium phosphate. In the case of capsules, tablets and pills, the compositions may also comprise buffering agents. Solid compositions of a similar type may also be employed as fillers in soft and hard-filled gelatin capsules using such excipients as lactose or milk sugars, as well as high molecular weight polyethylene glycols and the like. The disclosed excipients may serve more than one function. For example, fillers or binders may also be disintegrants, glidants, antiadherents, lubricants, sweeteners and the like. It is possible in accordance with the present invention to use two or more excipients, wherein said two or more excipients may belong to the same and/or different categories. There is no restriction in this respect.

Composition of the invention formulated for parenteral administration, including intravenous, intramuscular, intraperitoneal or subcutaneous administration, may be provided in solid form in vials such that they can be diluted in a suitable solvent (e.g. oil, or water, aqueous NaCl solution e.g. 0.9 wt. % NaCl solution, aqueous glucose solution, dextrose solution). The solid form may comprise, a compound of formula (I) mixed with one or more of an excipient and/or an additional ingredient for example a buffer such as sodium citrate, a solubilizer (co-solvent) e.g. ethanol, a complexing agent (such as cyclodextrins and modified cyclodextrins including preferably (2-hydroxypropyl)-β-cyclodextrin and sulfobutylether-β-cyclodextrin), a stabilizer e.g. cellulose, 2-hydroxypropyl ether, Polyethylene Glycol 4000 crosslinked polyvinylpyrrolidone (crospovidone) and/or polyethylene glycols, an osmotic agent e.g. glucose or sodium chloride, a surfactant e.g. Polyoxyethylene 20 sorbitan monooleate, polyoxyl castor oil and/or sodium lauryl sulfate, a preservative or bacteriostat e.g. sodium citrate, benzyl alcohol and/or viscosity modifier as benzyl alcohol or carboxymethylcellulose. Other pharmaceutically acceptable excipients may also be suitable for inclusion in said solid forms e.g. one or more of the pharmaceutically acceptable excipients set out hereinabove as being suitable for inclusion in compositions formulated for oral administration. It is well within the purview of the skilled person to select appropriate excipients depending on the desired properties of the solid form. A composition formulated for parenteral administration may also be provided in liquid form, e.g. in an infusion bag or in a prefilled syringe. In this case, the same components as listed above may be present in the liquid formulation. The liquid formulation may be an aqueous formulation, aqueous NaCl solution, e.g. 0.9 wt. % NaCl solution, aqueous glucose solution, or dextrose solution, the liquid formulation may also be an oil formulation e.g. a stabilized oil in water emulsion, comprising medium chain triglycerides and long chain triglycerides, stabilized by phospholipids.

Further parenteral administration types are also conceivable, including in particular medical or antibiotic implants comprising a compound of the present invention in the medical or antibiotic implant or in a coating on the medical or antibiotic implant.

The term "medical implant" as used herein refers to any indwelling (placed inside the body of a patient) medical device intended to replace, support or enhance a biological structure. Medical implants may be placed permanently, e.g. a stent or prosthetic joint, alternatively they can be placed on a temporary basis and removed when they are no longer needed e.g. a chemotherapy port or orthopedic screw.

The term "antibiotic implant" as used herein refers to any indwelling (placed inside the body of a patient) medical device, wherein said medical device is implanted in a patient with the primary intention of treating or preventing infection e.g. bacterial infection through the delivery of antibiotics. Antibiotic implants may be placed permanently, alternatively they can be placed on a temporary basis and removed when they are no longer needed e.g. when an infection has been eradicated, or they may simply dissolve over time in the body.

The compound of the present invention may also be applied to medical instruments e.g. surgical instruments or sutures. This may prevent bacterial growth on said medical instrument. Said medical instrument may also deliver the antibiotic(s) at a surgical site, or a wound site e.g. in the case of a suture.

The term medical instrument as used herein refers to any tool used in a medical setting for the diagnosis or treatment of patients e.g. surgical tools such as scalpels and forceps, scissors and sutures. The term "medical instrument" as used herein encompasses dental instruments.

Common Excipients, Especially for Compositions Formulated for Oral or IV Administration Include, Stabilising Agents A stabilizing agent may be advantageously used to improve the formulation's physico-chemical stability. There is no particular limitation on the stabilizing agent that can be employed in the present invention.

The use of endotoxin controlled PVP and/or Polyvinylpyrrolidone may be preferred as a stabilizing agent for a composition formulated for parenteral administration.

The stabilizing agent may be present in a relative amount of from 0.01 wt % to 20 wt %, preferably from 0.1 wt % to 2 wt % and more preferably 0.1 wt % to 1 wt %.

Buffers

A buffer may be advantageously used to control the pH solution of a parenteral formulation There is no particular limitation on the buffer that can be employed in the present invention.

The employed buffer may depend on the physico chemical characteristics of a compound of the invention e.g. stability and solubility, the capacity of the buffer, and the desired pH. Phosphate, citrate, tris, succinate, and/or histidine buffer can for example be used.

The buffer may be present in a relative amount of from 0.01 wt % to 5 wt %, preferably from 0.01 wt % to 5 wt % and more preferably 0.01 wt % to 3 wt %.

Solubilizer (Co-Solvent)

A solubilizer (co-solvent) may be advantageously used to improve the solubility of a compound of the invention. There is no particular limitation on the solubilizer (co-solvent) that can be employed in the present invention.

The use of a biocompatible co-solvent may be preferred, e.g. Polyoxethylene 300 or 400, ethanol, propylene glycol and/or glycerin.

The co-solvent may be present in a relative amount of from 1 wt % to 60 wt %, preferably from 1 wt % to 30 wt % and more preferably 1 wt % to 15 wt %.

Osmotic Agents

An osmotic agent may be advantageously used to reach solution's isotonicity. There is no particular limitation on the osmotic agent that can be employed in the present invention.

The use of glucose and/or sodium chloride may be preferred.

The osmotic agent may be present in a relative amount of from 0.01 wt % to 20 wt %, preferably from 0.1 wt % to 5 wt % and more preferably 0.09 wt % to 5 wt %.

Preservatives

A preservative may be advantageously used to protect the compound from physico-chemical degradation, like oyxdation, light, temperature. There is no particular limitation on the preservative that can be employed in the present invention.

The use of sodium bisulfite, sodium metabisulfite, ascorbate, sodium sulfite, and/or thioglycerol may be preferred.

The preservative may be present in a relative amount of from 0.01 wt % to 3 wt %, preferably from 0.01 wt % to 2 wt % and more preferably 0.01 wt % to 0.01 wt %.

Binders

A binder may be advantageously used for increasing the particle size of active ingredient alone or with excipients and improve its handling properties. There is no particular limitation on the binder material that can be employed in the present invention.

Suitable binder materials include povidone (polyvinylpyrrolidone), copovidone (Poly (1-vinylpyrrolidone-co-vinyl acetate)), maltodextrin, poloxamer (a block copolymer with a first poly (ethylene oxide) block, a second and central poly (propylene oxide) block and a third poly (ethylene oxide) block), polyethylene glycol, polyethylene oxide, magnesium aluminosilicate, gelatin, acacia, alginic acid, carbomer (e.g. carbopol), dextrin, dextrates (a purified mixture of saccharides developed from the controlled enzymatic hydrolysis of starch), guar gum, hydrogenated vegetable oil, liquid glucose, wax, starch (pregelatinized and plain), sodium alginate and mixtures thereof.

The use of povidone and/or copovidone may be preferred.

The binder may be present in a relative amount of from 0.5 wt % to 15 wt %, preferably from 1 wt % to 12 wt % and more preferably 4 wt % to 10 wt %.

Diluents

A diluent may be advantageously used for increasing the bulk of the pharmaceutical composition and for facilitating handling of the composition. There is no particular limitation on the diluent material that can be employed in the present invention.

Suitable diluent materials include mannitol, isomalt, histidine, lactose (including anhydrous or monohydrate forms), calcium phosphate (including dibasic and tribasic calcium phosphate), calcium carbonate, calcium sulfate, sucrose, fructose, maltose, xylitol, sorbitol, maltitol, aluminium silicate, dextrose, starch (pregelatinized or plain), glucose, dextrates (a purified mixture of saccharides developed from the controlled enzymatic hydrolysis of starch), magnesium carbonate, and mixtures thereof.

The use of mannitol, xylitol, sorbitol, isomalt and/or histidine may be preferred. Mannitol may be particularly preferred.

The diluent may be present in a relative amount that is not particularly restricted. Suitable amounts may range from 2 wt % to 85 wt %, preferably from 8 wt % to 80 wt % and more preferably 10 wt % to 50 wt %.

Surfactant

A surfactant may advantageously be used for assisting wettability of the tablet and of the active ingredient. The surfactant is an optional but preferred component. There is no particular limitation on the surfactant material that can be employed in the present invention Suitable surfactant materials include sodium lauryl sulfate, poloxamer, sodium docusate, sorbitan esters, polyethylene oxide, polysorbate 20, polysorbate 40, polysorbate 60, polysorbate 80 (ethoxylated sorbitan esterified with fatty acids wherein the number indicates the number of repeating units of polyethylene glycol), and mixtures thereof.

The use of sodium lauryl sulfate may be preferred.

The surfactant may be present in a relative amount that is not particularly restricted. Suitable amounts may range from 0 wt % or more to 7 wt %, preferably from 0.1 wt % to 6.5 wt % and more preferably 1 wt % to 6 wt %.

Disintegrant

A disintegrant may be used for accelerating disintegration of the pharmaceutical composition to thereby assist in dissolution and uptake of the active ingredient. There is no particular limitation on the disintegrant material that can be employed in the present invention.

Suitable disintegrant materials include crosslinked polyvinylpyrrolidone (crospovidone), sodium carboxymethyl starch (sodium starch glycolate), croscarmellose sodium, gellan gum, xanthan gum, magnesium aluminosilicate, sodium alginate, pregelatinized starch, alginic acid, guar gum, homo- and copolymers of (meth)acrylic acid and salts thereof such as polacrillin potassium, and mixtures thereof. The Use of Crospovidone May be Preferred The disintegrant may be present in a relative amount that is not particularly restricted. Suitable amounts may range from 0 wt % or more to 20 wt %, preferably from 1 wt % to 15 wt % and more preferably 2 wt % to 10 wt %.

Glidant

A glidant may be advantageously used for improving flowability of the pharmaceutical composition to thereby improve its handling properties. The glidant is an optional but preferred component. There is no particular limitation on the glidant material that can be employed in the present invention.

Suitable glidant materials include colloidal silica dioxide, magnesium oxide, magnesium silicate, tribasic calcium phosphate, and mixtures thereof.

The use of colloidal silica dioxide may be preferred.

The glidant may be present in a relative amount that is not particularly restricted. Suitable amounts may range from 0 wt % or more to 5 wt %, preferably from 0.1 wt % to 4 wt % and more preferably 0.2 wt % to 1 wt %.

Lubricant

A lubricant may be advantageously used to facilitate tableting, in particular by preventing sticking of the tablets to the tablet punch. The lubricant is an optional but preferred component. There is no particular limitation on the lubricant material that can be employed in the present invention.

Suitable lubricant materials include magnesium stearate, sodium stearyl fumarate, talc, stearic acid, leucine, poloxamer, polyethylene glycol, glyceryl behenate, glycerin monostearate, magnesium lauryl sulfate, sucrose esters of fatty acids, calcium stearate, aluminum stearate, hydrogenated castor oil, hydrogenated vegetable oil, mineral oil, sodium benzoate, zinc stearate, palmitic acid, carnauba wax, sodium lauryl sulfate, polyoxyethylene monostearates, calcium silicate, and mixtures thereof.

The use of a lubricant selected from magnesium stearate and sodium stearyl fumarate, and combinations thereof may be preferred.

The lubricant may be present in a relative amount that is not particularly restricted. Suitable amounts may range from 0 wt % or more to 7 wt %, preferably from 0.1 wt % to 4 wt % and more preferably 0.5 wt % to 3.5 wt %.

Matrix Forming Polymers and Copolymers

A matrix forming polymer or copolymer may be used as an optional but preferred component.

Suitable matrix-forming polymers and copolymers include polyvinyl pyrrolidine (PVP), acrylic polymers and co-polymers such as the different grades of Eudragit, hydroxypropylmethyl cellulose acetate succinate (HPMCAS), as well as other copolymers such as polyethylene glycol-based copolymers like Soluplus.

Preferred matrix-forming polymers and copolymers may be HPMC AS and Soluplus.

The matrix-forming polymers and copolymers may be present in a relative amount that is not particularly restricted. Suitable amounts may range from 0.1 g to 10 g or 0.1 wt % to 10 wt %, preferably from 0.2 g to 5 g or 0.2 wt % to 5 wt %, and more preferably from 0.3 g to 4 g or 0.3 wt % to 4 wt %.

Complexing Agents

A complexing agent may be used as an optional but preferred component.

Suitable complexing agents include cyclodextrins and modified cyclodextrins.

Preferred complexing agents include (2-hydroxypropyl)-β-cyclodextrin and sulfobutylether-β-cyclodextrin.

The complexing agents may be present in a relative amount that is not particularly restricted. Suitable amounts may range from 0.1 g to 24 g or 0.1 wt % to 40 wt % or 30 wt % or 24 wt %, preferably from 0.1 g to 10 g or 0.1 wt % to 10 wt %, and more preferably from 0.1 g to 5 g or 0.1 wt % to 6 wt % or 5 wt %.

Other Types of Excipients

The composition of the present invention may contain further excipients that are commonly used in the art.

Such further excipients may include release rate modifiers, plasticizer, film forming agent, colorant, anti-tacking agent and/or pigment for coating the compositions of the present invention. Further types of excipients, which may be present, include flavoring agents, sweeteners, antioxidants, absorption accelerators and/or bulking agents. Relative amounts of such excipients are not particularly limited. They may be determined by the skilled person based on common general knowledge and routine procedures.

Film forming agents are advantageously used for providing a tablet of the invention with a coherent coating. Suitable film forming agents include isomalt, polyvinyl alcohol, polyethylene glycol, maltodextrin, sucrose, xylitol, maltitol, enteric coating agents such as materials selected from the group consisting of methyl acrylate-methacrylic acid copolymers, polyvinyl acetate phthalate (PVAP), methyl methacrylate-methacrylic acid copolymers, shellac, sodium alginate and zein.

Suitable plasticizers include sorbitol, triacetin, poloxamer, polyethylene glycol, glycerin, propylene glycol, polyethylene glycol monomethyl ether, acetyl tributyl citrate, acetyl triethyl citrate, castor oil, glyceryl monostearate, diacetylated monoglyerides, dibutyl sebacate, diethyl phthalate, triethyl citrate, and tributyl citrate.

For each of the above-mentioned categories of excipients it is possible to use only a single substance or a combination of two or more substances belonging to the same category. Of course, it is not necessary that members of each and every category are present.

The compositions of the invention may include the compounds disclosed herein in the form of particles of amorphous substance or in any crystalline form. The particle size is not particularly limited. For instance, compositions may include micronized crystals of the disclosed compounds. Micronization may be performed on crystals of the compounds alone, or on a mixture of crystals and a part or whole of pharmaceutical excipients or carriers. Mean particle size of micronized crystals of a disclosed compound may be for example about 5 to about 200 microns, or about 10 to about 110 microns. The compounds of the invention may also be present in the form of a molecular dispersion within a polymeric matrix. In yet another embodiment, the compounds of the invention may be complexed with suitable complexing agents such as cyclodextrins.

A tablet may be made by compression or molding, optionally with one or more accessory ingredients. Compressed tablets may be prepared using binder (for example, gelatin, microcrystalline cellulose, or hydroxypropylmethyl cellulose), lubricant, inert diluent, preservative, disintegrant (for example, sodium starch glycolate or cross-linked sodium carboxymethyl cellulose), surface-active or dispersing agent. Molded tablets may be made by molding in a suitable machine a mixture of the subject composition moistened with an inert liquid diluent. Tablets, and other solid dosage forms, such as dragees, capsules, pills and granules, may optionally be scored or prepared with coatings and shells, such as enteric coatings and other coatings well known in the pharmaceutical-formulating art. The disclosed excipients may serve more than one function. For example, fillers or binders may also be disintegrants, glidants, anti-adherents, lubricants, sweeteners and the like.

It will be appreciated that a disclosed composition may include lyophilized or freeze-dried compounds disclosed herein. For example, disclosed herein are compositions that comprise disclosed compounds in crystalline and/or amorphous powder forms. Such forms may be reconstituted for use as e.g., an aqueous composition.

Liquid dosage forms for oral administration include pharmaceutically acceptable emulsions, microemulsions, solutions, suspensions, syrups and elixirs. In addition to the subject composition, the liquid dosage forms may contain inert diluents commonly used in the art, such as, for example, water or other solvents, solubilizing agents and emulsifiers, such as ethyl alcohol, isopropyl alcohol, ethyl carbonate, ethyl acetate, benzyl alcohol, benzyl benzoate, propylene glycol, 1,3-butylene glycol, oils (in particular, cottonseed, groundnut, corn, germ, olive, castor and sesame oils), glycerol, tetrahydrofuryl alcohol, polyethylene glycols and fatty acid esters of sorbitan, cyclodextrins and mixtures thereof.

Suspensions, in addition to the subject composition, may contain suspending agents as, for example, ethoxylated isostearyl alcohols, polyoxyethylene sorbitol and sorbitan esters, microcrystalline cellulose, aluminum metahydroxide, bentonite, agar-agar and tragacanth, and mixtures thereof.

Compositions formulated for rectal or vaginal administration may be presented as a suppository, which may be prepared by mixing a subject composition with one or more suitable non-irritating excipients or carriers comprising, for example, cocoa butter, polyethylene glycol, a suppository wax or a salicylate, and which is solid at room temperature, but liquid at body temperature and, therefore, will melt in the body cavity and release the active agent. Compositions formulated into forms which are suitable for vaginal administration also include pessaries, tampons, creams, gels, pastes, foams or spray formulations containing such carriers as are known in the art to be appropriate.

Dosage forms for transdermal administration of a subject composition includes powders, sprays, ointments, pastes, creams, lotions, gels, solutions, and patches. The compound of the invention may be mixed under sterile conditions with a pharmaceutically acceptable carrier, and with any preservatives, buffers, or propellants that may be required.

The ointments, pastes, creams and gels, drops, may contain, in addition to a subject composition, excipients, such as animal and vegetable fats, oils, waxes, paraffins, starch, tragacanth, cellulose derivatives, polyethylene glycols, silicones, bentonites, silicic acid, talc and zinc oxide, or mixtures thereof.

Powders and sprays may contain, in addition to a subject composition, excipients such as lactose, talc, silicic acid, aluminum hydroxide, calcium silicates and polyamide powder, or mixtures of these substances. Sprays may additionally contain customary propellants, such as chlorofluorohydrocarbons and volatile unsubstituted hydrocarbons, such as butane and propane.

Compositions and compounds of the disclosure may alternatively be formulated into a form suitable for administration by aerosol. This may be accomplished by preparing an aqueous aerosol, liposomal preparation or solid particles containing the compound. A non-aqueous (e.g., fluorocarbon propellant) suspension could be used. Sonic nebulizers may be used because they minimize exposing the agent to shear, which may result in degradation of the compounds contained in the subject compositions.

Ordinarily, an aqueous aerosol is made by formulating an aqueous solution or suspension of a subject composition together with conventional pharmaceutically acceptable carriers and stabilizers. The carriers and stabilizers vary with the requirements of the particular subject composition, but typically include non-ionic surfactants (Tweens, pluronics, or polyethylene glycol), innocuous proteins like serum albumin, sorbitan esters, oleic acid, lecithin, amino acids such as glycine, buffers, salts, sugars or sugar alcohols. Aerosols generally are prepared from isotonic solutions.

It should be noted that excipients given as examples may have more than one function. For example, fillers or binders can also be disintegrants, glidants, anti-adherents, lubricants, sweeteners and the like. In one embodiment, fulfillment of amount indications specified hereinabove for different types of excipients is to be assessed for each type of excipient taking into account the total amount of all excipients having the specified function.

Pharmaceutical compositions of this disclosure suitable for parenteral administration comprise a compound of the invention in combination with one or more pharmaceutically-acceptable sterile isotonic aqueous or non-aqueous solutions, dispersions, suspensions or emulsions, or sterile powders. Said compositions may may be reconstituted into sterile injectable solutions or dispersions just prior to use. Said compositions may contain one or more excipients as set out hereinabove e.g. antioxidants, buffers, bacteriostats, solutes which render the formulation isotonic with the blood of the intended recipient, or suspending or thickening agents. For example, provided herein is an aqueous composition that includes a disclosed compound, and may further include for example, dextrose (e.g., about 1 to about 10 weight percent dextrose, or about 5 weight percent dextrose in water (D5W).

Examples of suitable aqueous and non-aqueous carriers which may be employed in the pharmaceutical compositions of the disclosure include water, ethanol, polyols (such as glycerol, propylene glycol, polyethylene glycol, and the like), and suitable mixtures thereof, vegetable oils, such as olive oil, and injectable organic esters, such as ethyl oleate and cyclodextrins. Proper fluidity may be maintained, for example, by the use of surfactants, such as lecithin, by the maintenance of the required particle size in the case of dispersions, and by the use of surfactants.

It will be appreciated that contemplated compositions and formulation forms, such as oral formulations (e.g. a pill or tablet) and parenteral formulations e.g. solutions for IV infusion, may be formulated as controlled release formulation, e.g., an immediate release formulation, a delayed release formulation, or a combination thereof.

In certain embodiments, the subject compounds and compositions may be formulated as a tablet, pill, capsule or other appropriate ingestible formulation (collectively hereinafter "tablet") or an aqueous or non-aqueous solutions, dispersions, suspensions or emulsions for parenteral administration. The compositions of the present disclosure may be formulated such that the resulting amount of antibacterial agent i.e. compounds of the invention provided/administered to a patient (human or non-human mammal), would provide a therapeutically effective amount (a therapeutic dose). Said therapeutically effective amount may be split across dosage units e.g. multiple i.v. administrations/day for example for 3 days to 5 weeks e.g. 7 days to 2 weeks. Said therapeutically effective amount may be an amount at which at least 50% e.g. at least 60, 70, 80, 90, 95% or 100% of individuals exhibit a statistically significant reduction in infection. Said amount should also take into consideration the toxicity of said antibacterial agent(s). The therapeutically effective amount may vary depending on size, weight, age, condition and type of subject, as well as on the infection being treated and the type of formulation e.g. tablet and/or mode of administration e.g. oral or parenteral e.g. subcutaneous, intramuscular or intravenous injection. It is well within the purview of the skilled person to determine such a therapeutically effective amount employing standard drug development techniques and methodology e.g. in-vitro and/or in-vivo experiments e.g. to determine Probability target attainment (PTA), and and/or through conducting dosage determining clinical trials and toxicity/maximum tolerated dose/safety studies e.g. in animals and/or humans.

Unit Dosages

If treatment of the patient by the pharmaceutical compositions of the present invention is by means of oral administration, a single unit dose of the pharmaceutical composition of the present invention is typically administered one, two or three times a day. The daily dosage (total dosage administered in one day) is determined by the physician in accordance with the above guidance taking the type and severity of the infection, gender, weight, age and general condition of the patient into account. Preferred oral daily dosages may range from 40 to 5000 mg e.g. 40 to 3000 mg, preferably 40 mg to 2000 mg e.g. 100 to 2000 mg. The daily dosage may vary depending on the intended frequency of administration e.g. daily, once per week.

In case of parenteral administration (for instance in intravenous (i.v.) or intramuscular (i.m.) or intraperitoneal (i.p) or subcutaneous administration), the pharmaceutical compositions of the present invention may be administered two, three or even more times a day. Preferred daily dosages are in the range of from 40 to 5000 mg, typical unit dosages may be from 40 to 3000 mg and preferably 100 to 1000 mg. The upper limits of the specified ranges are subject to their feasibility. For instance, in case of i.m. or subcutaneous administration, it may happen that the maximum dose that can be administered in a single shot is restricted due to low solubility and correspondingly increased volume of the drug solution. In such a case, the maximum unit dosages are limited by the maximum tolerated dose.

Drug Combinations

Compositions are also contemplated herein that include one or more of the disclosed compounds with a second component. Second components in such compositions of the present disclosure may be another antibiotic agent e.g. a FabI inhibitor, other than a compound disclosed herein. Other additional components may also be present, including other FabI inhibitors or other antibiotic agents. The contemplated methods of treatment disclosed herein, in some embodiments, may further comprise administering another agent such as another antibiotic agent (other than a compound disclosed herein). For example, a method of treating a bacterial infection is provided that comprises administering a disclosed compound and further comprises administering another antibiotic agent or antibacterial agent. The compound disclosed herein and the second component may be part of the same dosage form or may be formulated in two separate dosage forms. If they are formulated in two separate dosage forms, the dosage form with the second component may be administered at the same time, before or after the dosage form with the compound disclosed herein.

Medical Indications

The compounds and compositions of the present invention may be used for treating bacterial infections in a patient. They may, in particular, be suitable for the treatment of bacterial infections involving one or more of the following bacteria: *S. aureus, E. coli, Klebsiella pneumoniae* and/or *A. baumannii*. Such infections include, but are not limited to, wound infections e.g. infections of burn wounds or surgical sites, skin and soft tissue infections such as bacterial folliculitis, impetigo e.g. localised impetigo, cellulitis, boils, feruncles, carbuncles, abscesses, dermatitis e.g. eczema; bacteraemia and sepsis, meningitis, intra-abdominal infection, pleuropulmonary infection and pneumonia including hospital acquired pneumonia, nosocomial pneumonia, and ventilator associated pneumonia; infective endocarditis; diarrhea and food poisoning e.g. by *S. aureus* or *E. coli*; urinary tract infections including complicated urinary tract infections, thrombophlebitis when caused by bacteria, osteoarticular infections such as septic arthritis, diabetic food, bone and joint infections and prosthetic joint infections, medical device/implant related infections, infections of the oral cavity such as buccal ulcers e.g. periodontal abscess, dental infection e.g. odontogenic infection, and gingivitis; ophthalmic infections e.g. corneal ulcers; colonisation of the nasal passages by *S. aureus*.

In particular the compounds and compositions of the invention may be effective in the treatment of a bacterial infection associated with *A. baumannii* wherein said infection may be pneumonia and most preferably nosocomial pneumonia or ventilator associated pnemonia.

Administration Types

As previously set out, the compounds and compostions of the present invention may be administered to the patient by intravenous, intramuscular, intraperitoneal or subcutaneous administration or, alternatively, by oral administration. To increase solubility and or bioavailability, the compounds may advantageously be administered in the form of prodrugs or salt form. Further administration forms are also conceivable, for instance by implantation (e.g. as part of a medical implant), by inhalation.

Dosages

The dosage of any disclosed compound or composition will vary depending on the symptoms, age and body weight of the patient, the nature and severity of the disorder to be treated or prevented, the route of administration, and the form of the subject composition. Any of the subject compositions may be administered in a single dose or in divided doses. Dosages for the compositions may be readily determined by techniques known to those of skill in the art or as taught herein.

In certain embodiments, the dosage of the subject compounds will generally be in the range of about 0.01 ng to about 10 g per kg body weight, specifically in the range of about 1 ng to about 0.1 g per kg, and more specifically in the range of about 1 mg to 0.1 g per kg.

An effective dose or amount, and any possible effects on the timing of administration of the composition, may need to be identified for any particular composition of the disclosure. This may be accomplished by routine experiments, using one or more groups of animals (preferably at least 2 to 5 animals per group), or in human trials if appropriate. The effectiveness of any subject composition and method of treatment or prevention may be assessed by administering the composition and assessing the effect of the administration by measuring one or more applicable indices, and comparing the post-treatment values of these indices to the values of the same indices prior to treatment.

The precise time of administration and amount of any particular subject composition that will yield the most effective treatment in a given patient will depend upon the activity, pharmacokinetics, and bioavailability of a subject composition, physiological condition of the patient (including age, sex, disease type and stage, general physical condition, responsiveness to a given dosage and type of medication), route of administration, and the like. The guidelines presented herein may be used to optimize the treatment, e.g., determining the optimum time and/or amount of administration, which will require no more than routine experimentation consisting of monitoring the subject and adjusting the dosage and/or timing.

While the subject is being treated, the health of the patient may be monitored by measuring one or more of the relevant indices at predetermined times during the treatment period. Treatment, including composition, amounts, times of administration and formulation, may be optimized according to the results of such monitoring. The patient may be periodically reevaluated to determine the extent of improvement by measuring the same parameters. Adjustments to the amount(s) of subject composition administered and possibly to the time of administration may be made based on these reevaluations.

Treatment may be initiated with smaller dosages which are less than the optimum dose of the compound. Thereafter, the dosage may be increased by small increments until the optimum therapeutic effect is attained.

The use of the subject drug combinations may reduce the required dosage for any individual agent contained in the compositions because the onset and duration of effect of the different agents may be complimentary.

Toxicity and therapeutic efficacy of subject compositions may be determined by standard pharmaceutical procedures in cell cultures or experimental animals.

The data obtained from the cell culture assays and animal studies may be used in formulating a range of dosage for use in humans. The dosage of any subject composition lies preferably within a range of circulating concentrations that give rise to a statistically significant reduction in infection in at least 50% e.g. at least 60, 70, 80, 90, 95% or 100% of individuals with little or no toxicity. The dosage may vary within this range depending upon the dosage form employed and the route of administration utilized. For compositions of the disclosure, the therapeutically effective dose may be estimated initially from cell culture assays.

Administration Frequency

The compounds and compositions disclosed herein may be administered in any appropriate frequency. Said frequency may depend on the subject being treated and on the severity and type of the infection. Administrations may for example be once or multiple times a day. The number of administrations may also depend on the form of the composition and on the subject and medical condition e.g. bacterial infection, being treated.

Duration of Treatment

The compounds and compositions disclosed herein may be administered for an unlimited period of time. It is advantageous that they are administered for a period of time to eradicate the bacterial infection completely or at least to such an extent that the patient's immune system can cope with any remaining pathologic bacteria. Typical durations of administration may be from 3 days to 7 weeks, e.g. from 1 to 5 weeks, e.g. 7 days to 2 weeks. However, longer treatment durations may be necessary for some infections e.g. bone infections.

Methods of Treatment

The compounds and compositions disclosed herein may be used in a method of therapy. In particular the compounds and compositions disclosed herein may be used in a method of treating a bacterial infection, comprising administering to a patient in need thereof a disclosed compound of the invention or a pharmaceutical composition comprising a disclosed compound of the invention. The bacterial infection may be an infection by *S. aureus*, *E. coli*, *Klebsiella pneumoniae* and/or *A. baumannii*.

The compounds of the invention may also be used in the manufacture of a pharmaceutical composition for use in therapy and in particular in the treatment of a bacterial infection in a patient in need thereof, wherein said bacterial infection may be by *S. aureus*, *E. coli*, *Klebsiella pneumoniae* and/or *A. baumannii*.

A further embodiment relates to a method of treating a bacterial infection, such as an *S. aureus*, *E. coli*, *Klebsiella pneumoniae* and/or *A. baumannii* bacterial infection, in a patient in need thereof comprising administering a compound or composition of the invention.

Manufacture of the Compounds of the Invention

The compounds of the present invention can be prepared using established organic chemistry synthetic methods and procedures and/or information described hereinbelow. Starting materials may either be purchased (if commercially available) or synthesized using established organic chemistry synthetic methods and procedures and/or information described hereinbelow.

Compounds disclosed herein may be prepared by means of the following method, which comprises the step of coupling a precursor compound of formula M1 or M1'

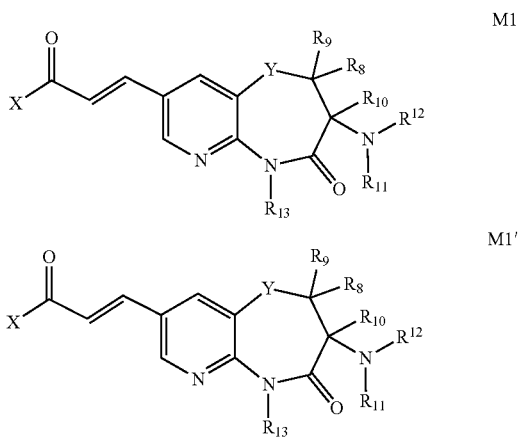

wherein X represents a leaving group, $R_{13}$ is as defined herein with the exception that if $R_{13}$ is —$PO_3R_{e2}$ or —$CH2$-$OPO_3R_{e2}$ each $R_e$ is a Pg group such as $TMSCH_2CH_2$ or $CNCH_2CH_2$, and Pg in M1' represents a protective group such as a BOC group, and wherein $R_{11}$ and $R_{12}$ may be a group as defined in any of the claims or items disclosed herein with respect to $R_{11}$ and $R_{12}$ or may be such a defined group that also comprises a protective group, which is preferably selected from the Boc group, PMB group, and DMB group, with an amine compound of formula M2a or M2b, as appropriate:

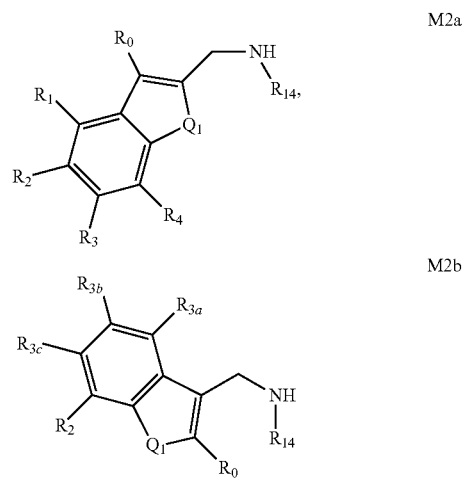

wherein $R_0$ to $R_{12}$, $R_{14}$, Y and $Q_1$ have the same meanings as specified for formula I. The leaving group X may be a hydroxyl group, a tosylate group, a triflate group, a mesylate group, iodide, bromide, chloride, methoxy, ethoxy, and the like.

The coupling reaction is preferably carried out in a solvent and in the presence of a coupling agent and a base. The solvent is preferably selected from DMF, 2-Me-THF, DCM, EtOAc, DMC, CPME (preferably the solvent is DMF if the leaving group is a hydroxyl group). The coupling agent is preferably selected from HATU, HBTU, HCTU, TBTU, COMU, TOMBU, COMBU, PyBOP, $T_3P$, DIC-HOBt, DCC, CDI, EDC, EDC-HOBt (preferably the coupling agent is HATU or $T_3P$ if the leaving group is a hydroxyl group). The reaction is typically carried out in the presence of a base. The base is preferably selected from DIPEA, TEA, pyridine or DMAP (preferably TEA is used as a base when $T_3P$ is used as a coupling agent). The protective group(s) of M1' may preferably be removed directly after the coupling reaction. While any protecting groups on $R_{13}$ and/or $R_{11}$ and/or $R_{12}$ are preferably removed as the final step.

An example reaction sequence is illustrated by the following Scheme 1. An analogous reaction scheme applies for the protected precursor M1'. Of course, this analogous scheme needs to be supplemented by a preceding protection reaction and a subsequent deprotection reaction.

Scheme 1

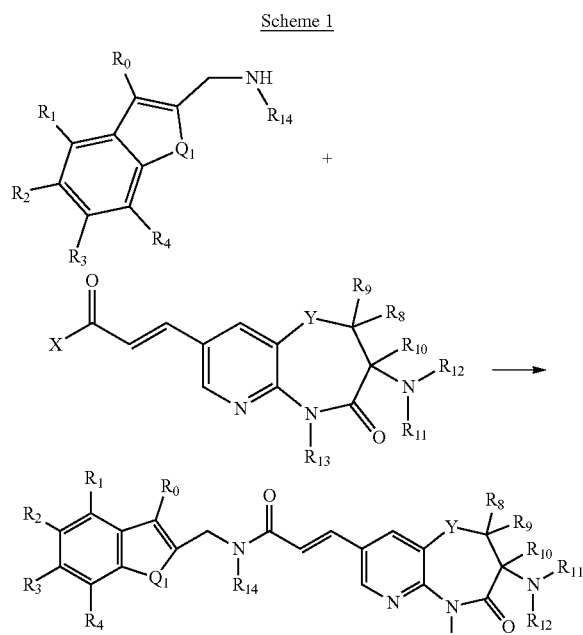

A similar reaction scheme applies for the synthesis of compounds of formula Ib, wherein merely the precursor compound M2a is replaced by precursor compound M2b.

Manufacture of Right-Hand Side Precursor

The precursor compound of formula M1' can be manufactured by reacting a compound of formula M3/M3', wherein Pg in M1' is a suitable protecting group such as Boc and wherein $R_{13}$ is as defined herein with the exception that if $R_{13}$ is —$PO_3R_{e2}$ or —$CH_2$—$OPO_3R_{e2}$ each $R_e$ is a Pg group such as $TMSCH_2CH_2$ or $CNCH_2CH_2$, and $R_{11}$ and or $R_{12}$ in addition of being as defined herein may also comprise a protective group, which is preferably selected from the Boc group, PMB group, and DMB group,

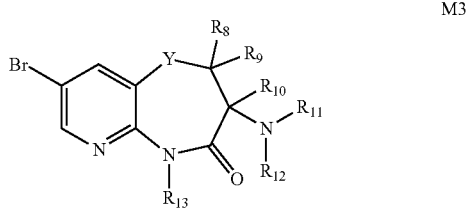

M3

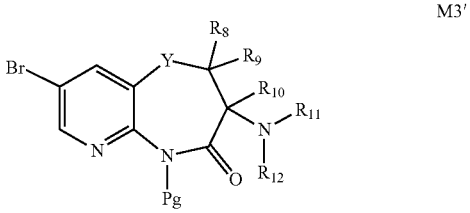

M3' with a carboxyl-protected acrylic acid, such as a $C_{1-4}$-alkyl ester (preferably tert-butyl, ethyl or methyl ester) of acrylic acid. This coupling reaction is carried out under Heck coupling conditions and preferably in the presence of a Pd(II)-salt such as $Pd(OAc)_2$ and a phosphine ligand such as Xantphos, XPhos, or tri-(o-tolyl) phosphine or 1,1-bis(diphenylphosphino) ferrocene (dppf). Highly Efficient Palladium catalyst-Pd-162 in the presence of $Cy_2NMe_2$ and $NBu_4Cl$ can also be applied. The reaction is typically carried out in the presence of a solvent such as DMF, proprionitrile, a combination thereof, or 1,4-dioxane, and also in the presence of a base such as DIPEA. Such a reaction sequence is illustrated by the following Scheme 2.

Scheme 2

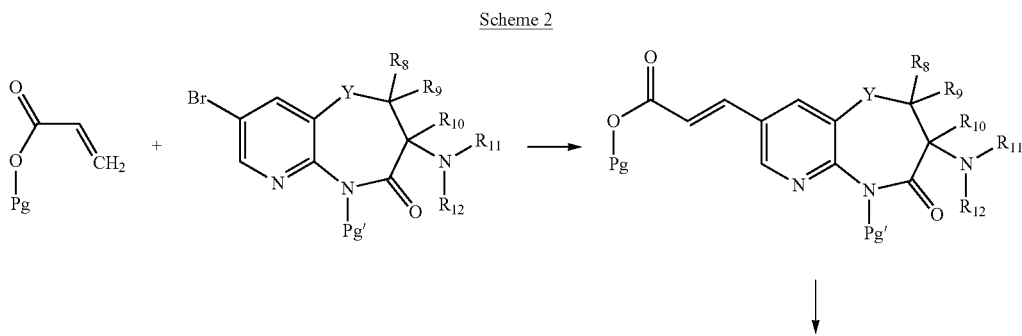

-continued

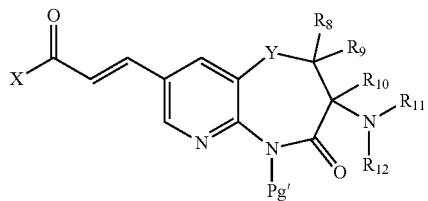

Pg = Me, Et, t-Bu
Pg' = H, Boc, —PO₃Pg''₂, —CH2—PO₃Pg''₂

The coupling reaction is followed by deprotection of the carboxyl group and optionally introduction of a leaving group other than hydroxyl. The leaving group X may be a hydroxyl group, a tosylate group, a triflate group, a mesylate group, iodide, bromide, chloride, and the like. Pg represents a protective group suitable for the carboxyl functional group to be protected, e.g. an alkyl group (Me, Et, t-Bu) for protection of the carboxyl group. The nitrogen atom in the amide group may optionally be protected with a suitable protective group (Pg'), such as a BOC group or alternatively a protected prodrug group wherein Pg'' group is a group such as TMSCH₂CH₂ or CNCH₂CH₂, and
wherein $R_{11}$ and $R_{12}$ may be a group as defined in any of the claims or items disclosed herein with respect to $R_{11}$ and $R_{12}$ or may be such a defined group that also comprises a protective group, which is preferably selected from the Boc group, PMB group, and DMB group.

The precursor compound M3 can be synthesized as shown in Schemes 3 and 4 as explained below.

Scheme 3

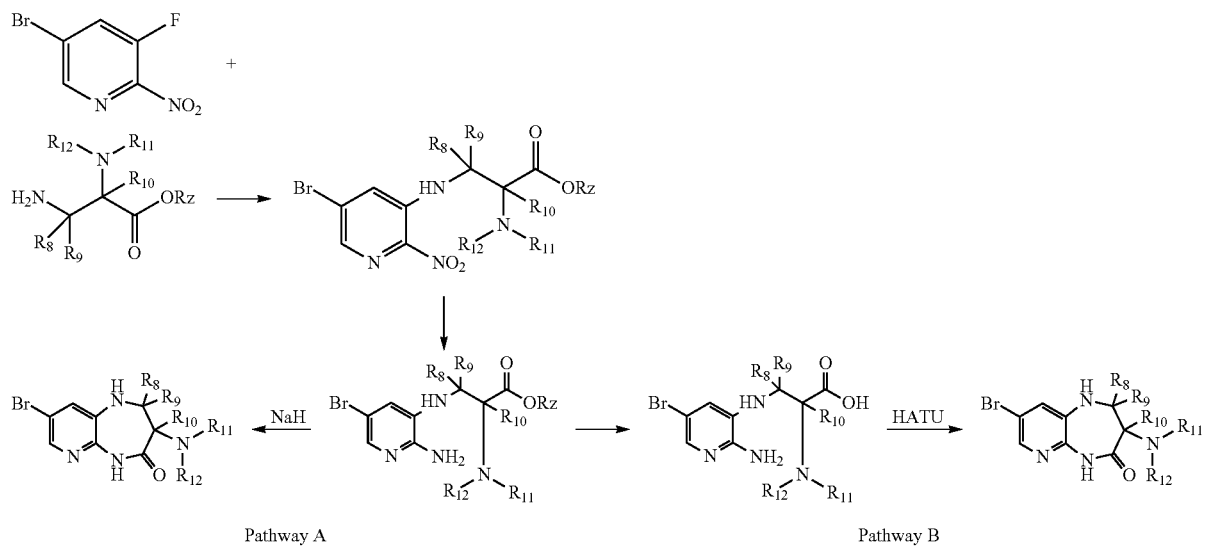

Pathway A    Pathway B

In Scheme 3 condensation of 5-bromo-3-fluoro-2-nitropyridine with appropriate acids, where $R_{11}$ and or $R_{12}$ in addition of being as defined herein may also comprise a protective group, which is preferably selected from the Boc group, PMB group, and DMB group, and where Rz=H, for instance ((S)-3-amino-2-((tert-butoxycarbonyl)amino)propanoic acid or esters in which Rz being $C_{1-4}$ alkyl, preferably methyl, for instance methyl 3-amino-2-((2S,6R)-2,6-dimethylmorpholino)propanoate or (2S,3R)-methyl 3-amino-2-((tert-butoxycarbonyl)amino)butanoate in THF or ACN in the presence of inorganic ($K_2CO_3$) or organic bases ($Et_3N$) leads to 3-(substituted-amino)propanoates or butanoates in good yield. The nitro group reduction at position 2 is carried out in the presence of a reducing agent such as Fe in acetic acid or mixture of water, ethanol and ammonium chloride at 80° C. The cyclization is accomplished using sodium hydride in DMF (Pathway A). This reaction sequence is illustrated by the Scheme 3. The protective group Rz is removed by basic hydrolysis using lithium hydroxide in a mixture of water and THF. The cyclization using agents such as HATU in the presence of a base like DIPEA and in a solvent such DMF (Pathway B) leads to the formation of 3-amino-8-bromo-1,2,3,5-tetrahydro-4H-pyrido[2,3-b][1,4]diazepin-4-one derivatives as shown in Scheme 3.

The precursor compound of formula M3 can be also manufactured by reaction a compound of formula M4.

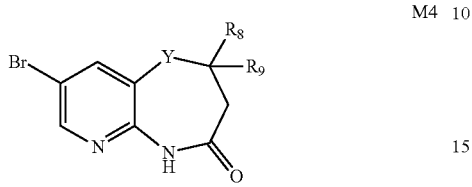

M4

Compound of formula M4 can be synthesized as described in AFFINIUM PHARMACEUTICALS, INC. WO2007/67416, 2007, A2 which is hereby incorporated by reference.

Scheme 4

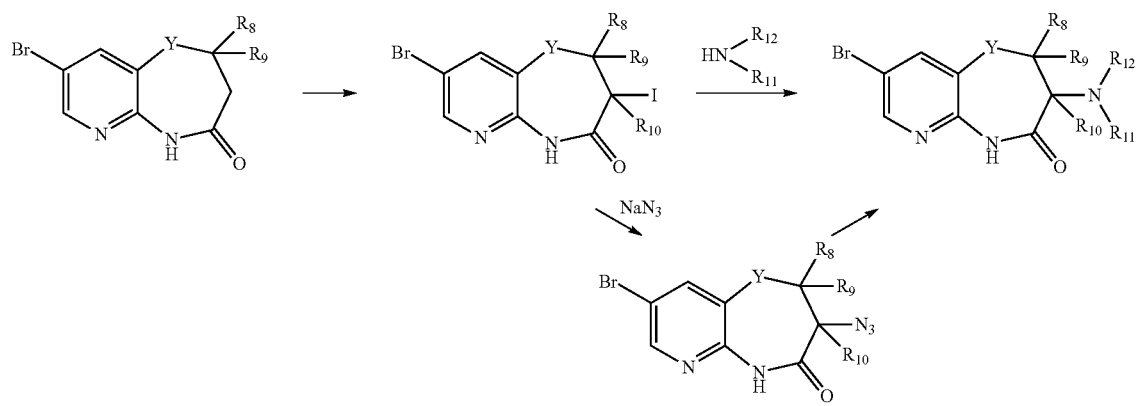

The direct iodination of 3-bromo-5,6,7,9-tetrahydro-8H-pyrido[2,3-b]azepin-8-one in the presence of TMEDA, TMSI, 12 in DCM led to the formation of expected iodide in good yield. The iodide can be easily converted into the corresponding amines (primary, secondary, tertiary and heterocyclic compounds) by its treatment with different amines $HNR_{12}R_{11}$ wherein $R_{12}$ and $R_{11}$ are as defined above with respect to formula I (e.g. azetidine-3-ol, morpholine, pyrrolidine and its derivatives, cyclopropanoamine, piperazine and its derivatives, 7-oxa-2-azaspiro[3.5]nonane, thiomorpholine 1,1-dioxide, etc) in acetonitrile at 50-80° C. in the presence of $K_2CO_3$ as a base. Alternatively, iodide reaction with sodium azide in DMF and its consecutive reduction provides the corresponding primary amines.

Manufacture of Left-Hand Side Precursor

The left-hand side precursors M2a and M2b can be prepared by means of the reaction sequence shown in the following Scheme 5 for M2a and an analogous reaction scheme for M2b. Reduction of the protected carboxyl group to the hydroxymethyl group can be accomplished using diisobutylaluminium hydride (DIBAL-H) in THF. The subsequent oxidation to the aldehyde can be carried out using Dess-Martin periodinane in DCM. The last reaction of this sequence can be performed by first reacting with methylamine in ethanol/THF followed by reduction with sodium borohydride in ethanol/THF. If it is desired to obtain precursor M2a or M2b in protected form, the obtained product, i.e. the compound shown below but with a hydrogen in the position of Pg, may be subjected to a final step of protection of the amino group with a suitable protective group, for instance the carboxybenzyl (Cbz) group, by reaction with carboxybenzylchloride in DCM in the presence of triethylamine. This optional final protection step is also shown in Scheme 5 below.

Scheme 5

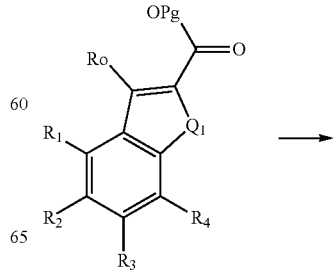

45

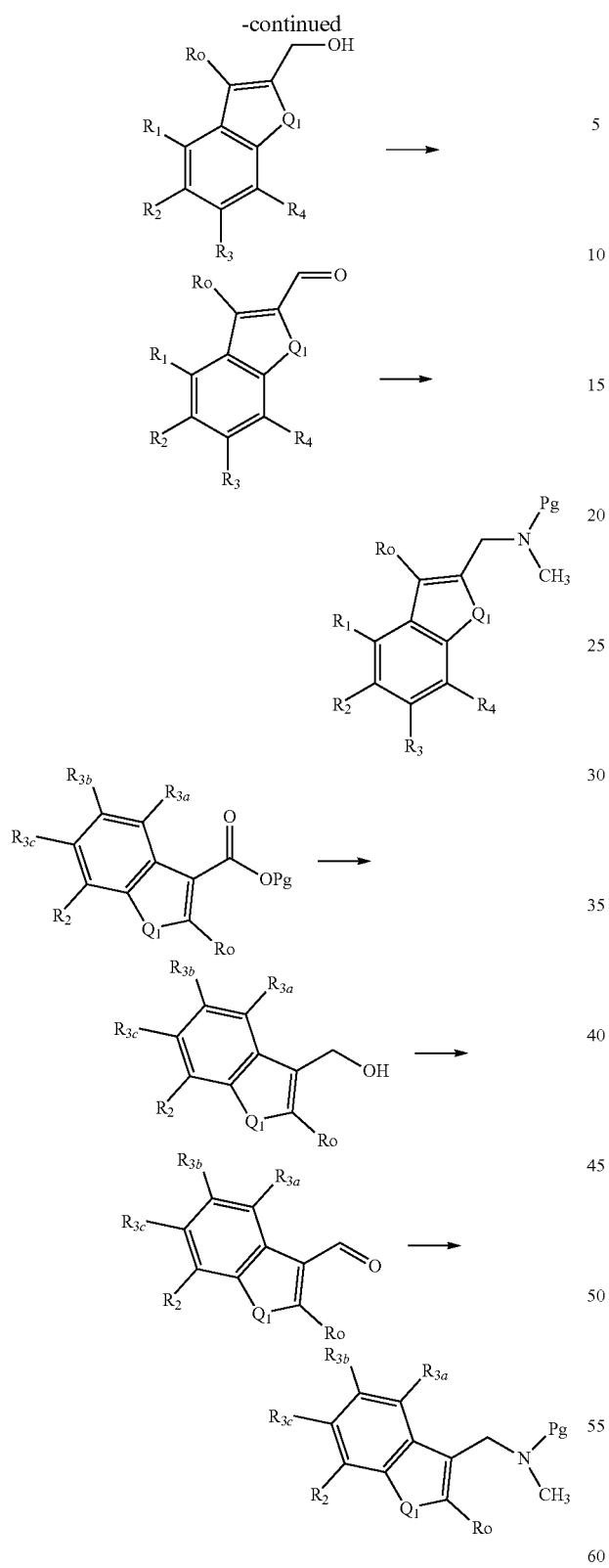

46 using BMS in THF or triflic anhydride/NaBH₄ in DCM) gives the corresponding amine.

Scheme 5'

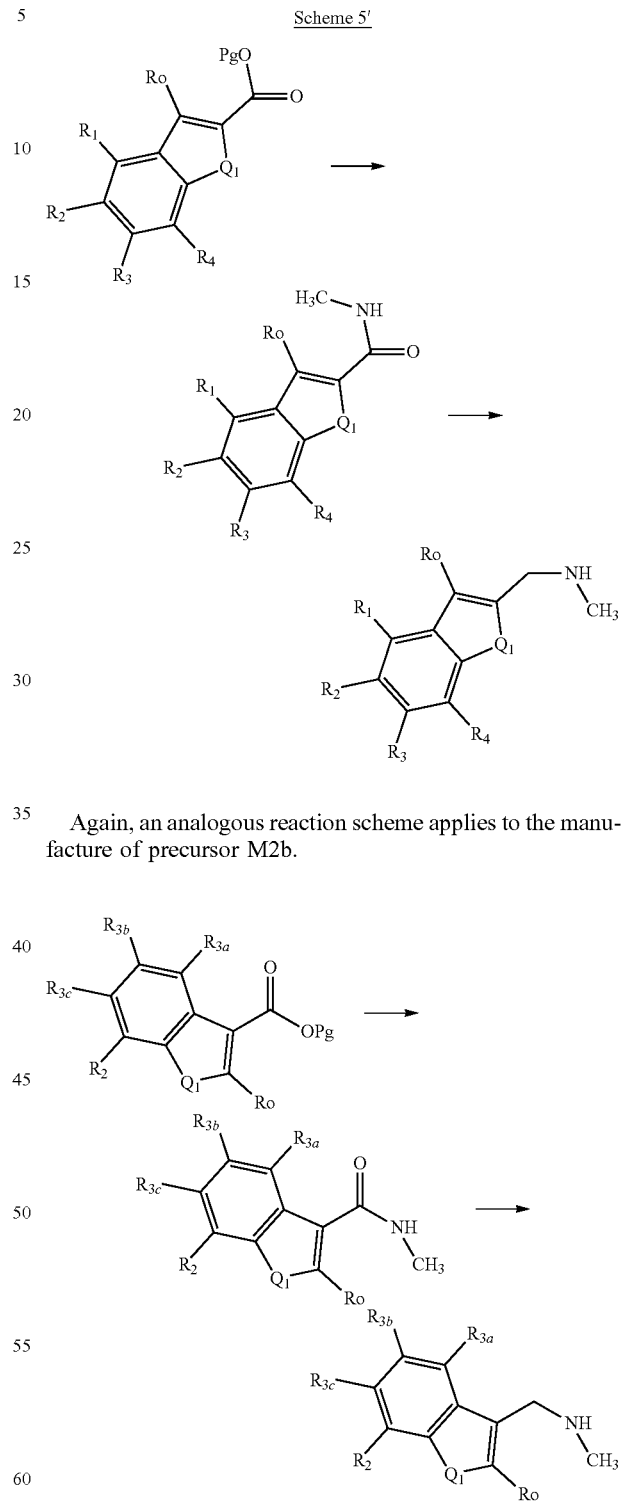

Again, an analogous reaction scheme applies to the manufacture of precursor M2b.

Alternatively the left-hand side precursor M2a or M2b can be prepared by means of the reaction sequences shown in scheme 5' wherein the carboxylic acid (or its alkyl ester) is converted into its corresponding amide via amidation (e.g. by means of MeNH₂·HCl, DIPEA, EDCl-HOBt, DMF or MeNH2/EtOH, reflux), after which amide reduction (e.g.

Alternatively still (when Q₁ is O), the left-hand side precursor M2a can be prepared by means of one of the reaction sequences shown in Scheme 5" wherein,
in pathway A, base-catalyzed (e.g. employing t-BuOK/THF) condensation of o-hydroxyphenones (i.e. compounds in the left-hand side of Scheme 5″ with $Q_1$ representing -OH) with 1,1-dichloroethylene in the presence of a strong base (for example in the presence of t-BuOK and THF) followed by further conversion under mild acidic conditions (e.g. employing 1 M $H_2SO_4$) yields carbaldehyde intermediate compounds as shown in scheme 5″, Pathway A, below. These carbaldehydes can be easily converted into their corresponding amines, i.e. precursor M2a. This conversion can rely on standard methodology, typically using the reductive amination conditions (e.g. employing 1. $MeNH_2$/THF; AcOH; 2. $NaBH_4$);

in pathway B condensation of substituted o-hydroxyphenones with compounds X—$CH_2$—$Y^1$ (wherein X is a leaving group as described above and wherein $Y^1$ is a protected carboxyl group such as a $C_{1-4}$-alkyl ester, or a carboxyl group precursor such as a nitrile group, e.g. chloroacetonitrile) in the presence of base (e.g. $K_2CO_3$/DMF), can lead to the formation of nitrile intermediates e.g 2-nitrile benzofuranes, which after basic hydrolysis give rise to the corresponding carboxylic acids as shown in the centre of Scheme 5″, pathway B. Said-carboxylic acids may be converted into corresponding amines. For instance, using the same strategy, the amine can also be prepared from o-hydroxyphenones and alkyl 2-bromoacetates (e.g in the presence of $K_2CO_3$ and acetone in a $1^{st}$ step followed by cylisation using NaOEt/EtOH and basic hydrolysis).

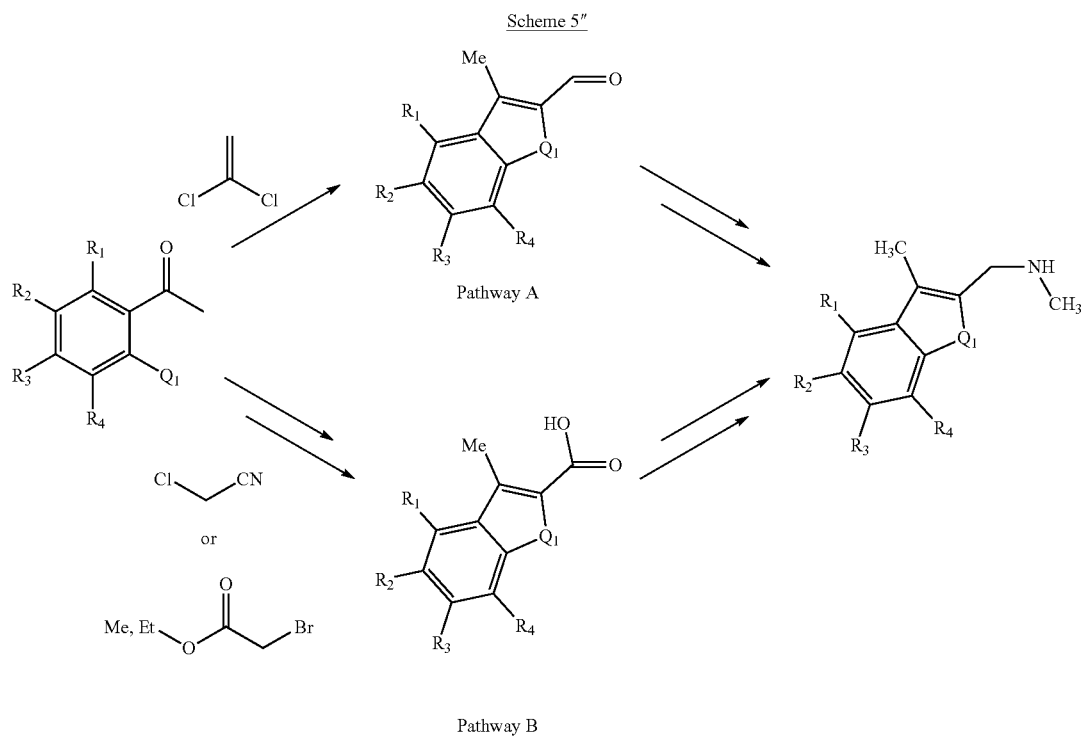

Scheme 5″

Alternatively still (when $Q_1$ is O), the left-hand side precursor M2b can be prepared by means of one of the reaction sequences shown in Scheme 5'' wherein a carboxyphenol is substituted using ethyl-2-bromopropanoate in the presence of a base such as $K_2CO_3$ or NaOH in solvents such as ACN or THF, followed by decarboxylative cyclization mediated by bases such as sodium acetate in acetic anhydride to provide the benzofuran bicycle in which a carbonyl moiety is introduced at 3-position using dichloro(methoxy)methane in the presence of a Lewis acid catalyst such as tin (IV) chloride:

preferably the only heteroatom in said ring is the N to which $R_{14}$ is attached) the precursor M2a can be prepared by means of the reaction sequences shown in scheme 5'''' wherein a lactam precursor is dihalogenated, converted to the piperidylenamine, then reacted with 1,4-benzoquinone and deaminated to afford the tricyclic benzofuran intermediate that can further be modified at $R_2$ position by conventional chemistry:

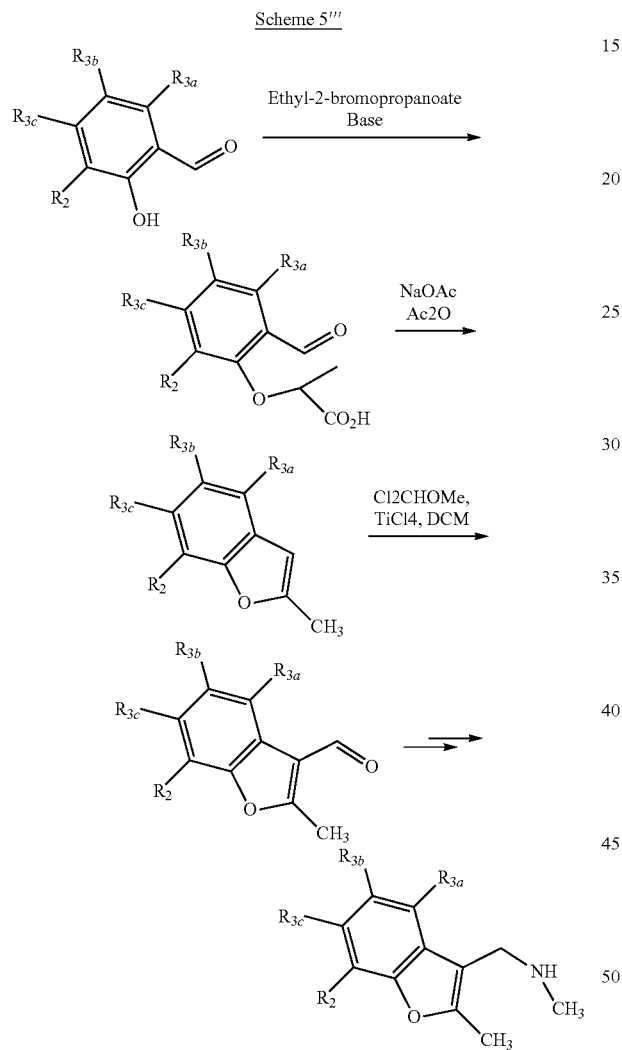

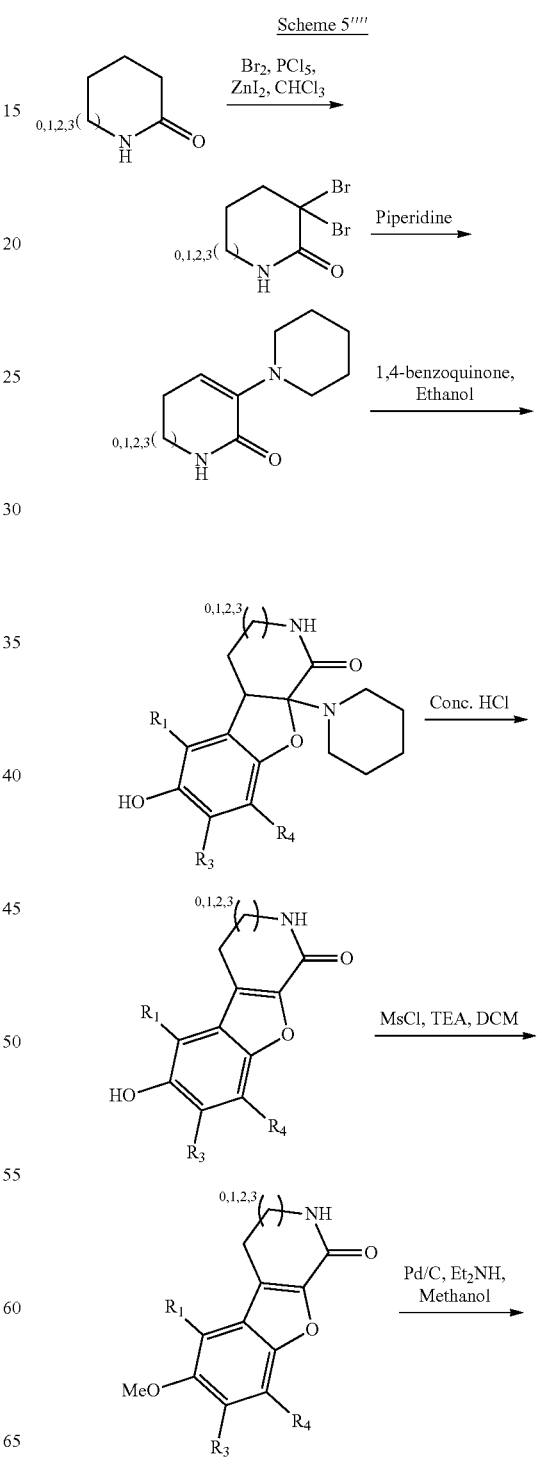

In Schemes 5, 5', 5'' and 5''', Pg represents a protective group such as a carboxybenzyl group (BOC group, PMB group, DMB group). $Q_1$ has the same meaning as $Q_1$ in formula I (but with the restrictions to $Q_1$ described for Scheme 5'' above). $R_1$ to $R_4$ (including $R_{3a}$, $R_{3b}$ and $R_{3c}$) may also have the same meanings as in formula I. Alternatively, one or more of these groups may be a precursor group that is later converted to the desired substituent in accordance with formula I. For instance, a Br substituent may be used as such a precursor.

When $R_{14}$ is different from $CH_3$ ($R_{14}$ together with $R_0$ of $LHS_a$ or LHS, form a heterocycle comprising the N to which $R_{14}$ is attached and having 5 to 8 ring members, wherein

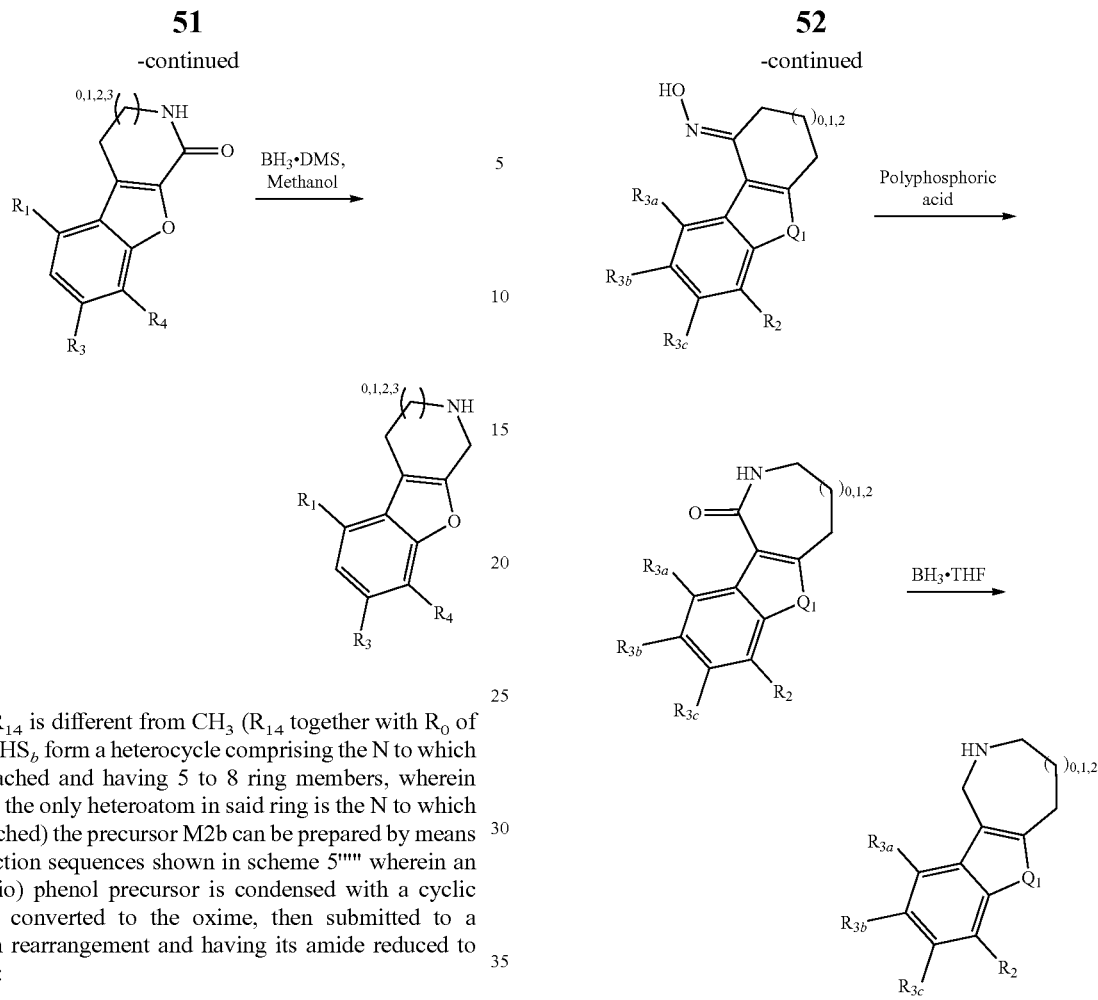

When R$_{14}$ is different from CH$_3$ (R$_{14}$ together with R$_0$ of LHS$_a$ or LHS$_b$ form a heterocycle comprising the N to which R$_{14}$ is attached and having 5 to 8 ring members, wherein preferably the only heteroatom in said ring is the N to which R$_{14}$ is attached) the precursor M2b can be prepared by means of the reaction sequences shown in scheme 5''''' wherein an amino (thio) phenol precursor is condensed with a cyclic 1,3-dione, converted to the oxime, then submitted to a Beckmann rearrangement and having its amide reduced to the amine:

Scheme 5'''''

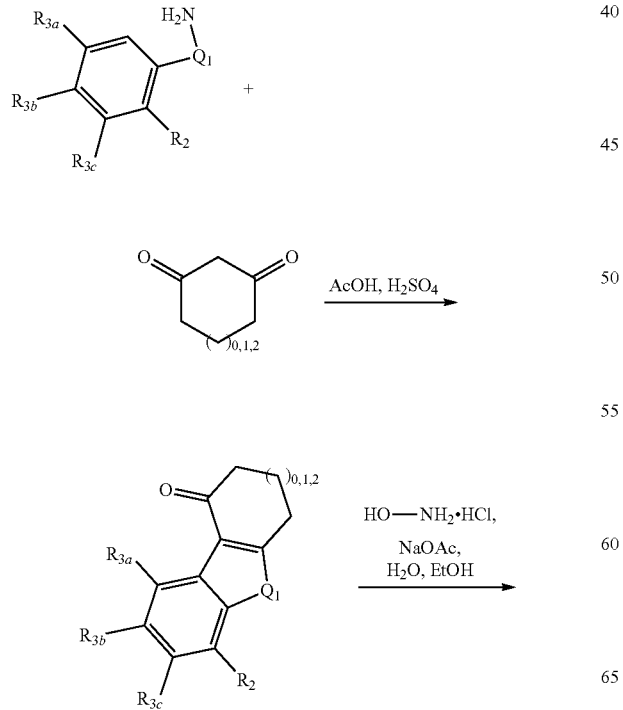

Alternative Route of Manufacture of Compounds of Invention

As an alternative to the synthetic strategy described above, the compounds of the present invention may also be prepared by coupling a compound of formula M6 or its protected form M6'

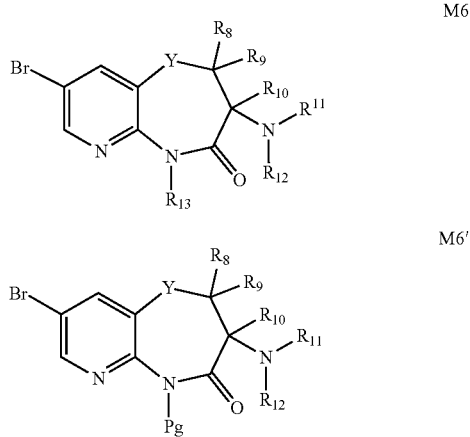

with a compound of formula M7a or M7b:

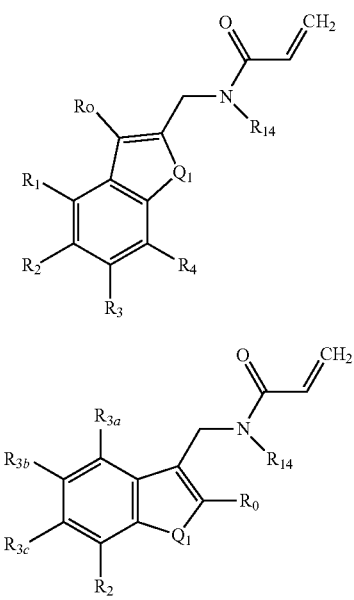

wherein Y and $Q_1$ have the same meaning as specified for formula (I), and all R groups ($R_0$ to $R_{14}$) have the same meanings as specified for formula I, or may be precursors thereof e.g. Br as a precursor for other groups e.g. CN, OH, esters, etc., or $R_{11}$ and or $R_{12}$ in addition of being as defined herein may also comprise a protective group, which is preferably selected from the Boc group, PMB group, and DMB group, This coupling may be carried out under Heck coupling conditions. Typically, it is carried out in the presence of a Pd(II) complex such as Pd-162 (i.e. [P(tBu)$_3$] Pd(crotyl) Cl), tetrabutylammonium chloride, N-cyclohexyl-N-methylcyclohexanamine (DIPEA) and dioxane. It is also possible to use a combination of a Pd(II)-salt such as Pd(OAc)$_2$ with a phosphine ligand such as tri-o-tolylphosphine, a base like DIPEA and a solvent such as a mixture of DMF and propionitrile, or 1,4-dioxane. The reaction is illustrated for compounds of formula Ia by the following reaction scheme:

Scheme 6

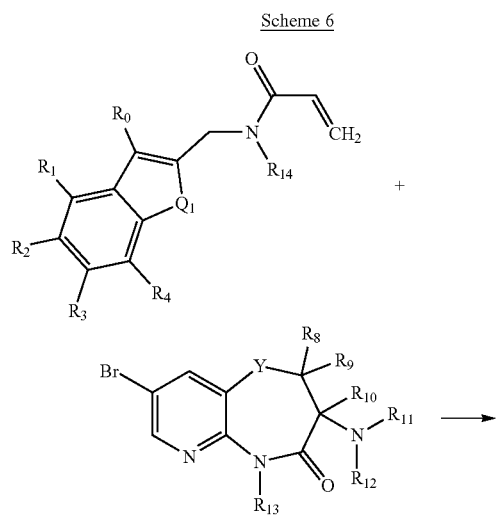

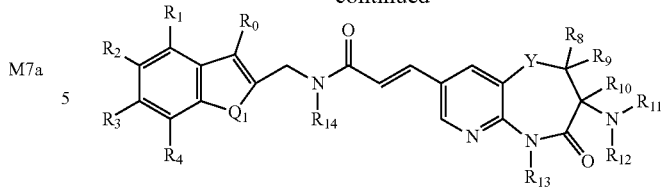

Again, an analogous reaction scheme applies to the manufacture of compounds of formula Ib.

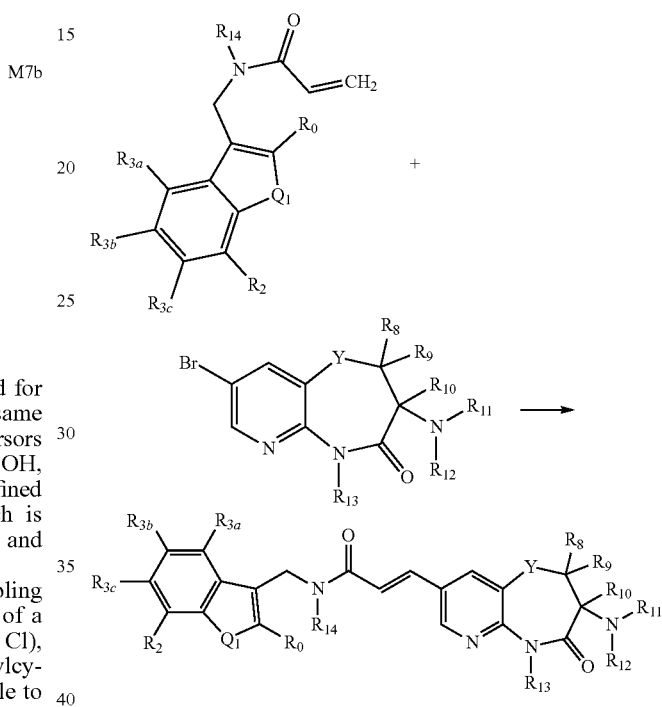

It is advantageous to use the protected precursor M6' in this reaction sequence. In this case, the reaction sequence shown in the above scheme may be followed by a deprotection step to obtain the reaction product shown above.

Y and $Q_1$ have the same meanings as specified for formula I, and $R_0$ to $R_{12}$ have the same meanings as specified for formula (I) or may be precursors thereof e.g. Br as a precursor for other groups e.g. CN, OH, esters, etc., or $R_{11}$ and or $R_{12}$ in addition of being as defined herein may also comprise a protective group, which is preferably selected from the Boc group, PMB group, and DMB group, while $R_{13}$ is hydrogen.

The preparation of prodrugs of the compounds of the invention e.g. wherein $R_{13}$ is —PO$_3$R$_{e2}$ or —CH$_2$—OPO$_3$R$_{e2}$, is typically accomplished by converting the respective compound of the invention with $R_{13}$ being hydrogen to a compound of the same structure except that $R_{13}$ represents a prodrug moiety that is cleavable under physiologic conditions for instance a phosphate-containing group as specified above. The prodrug moiety is preferably a methylene phosphate moiety or a phophoramidate moiety. Such prodrug moieties and suitable reaction conditions for manufacturing methylene phosphate prodrugs are described in WO 2013/190384 A1 (methylenephosphate) and J. Med. Chem. 2000, 43, 1234-1241 (phosphoramidate).

| | Abbreviations |
|---|---|
| | The following abbreviations are used in the present disclosure. |
| CC | Column chromatography |
| DCM | Dichloromethane |
| N | Normal |
| g | Gram |
| pH | Potential of Hydrogen |
| mol | Mole |
| v/v | Volume/volume |
| vol | Volume |
| m/z | Mass to charge ratio |
| ° C. | degree Celsius |
| TEA, Et$_3$N | Triethylamine |
| Et2O | Diethyl ether |
| HPLC | High performance liquid chromatography |
| Boc | tert-butyloxycarbonyl |
| h | hour |
| mL | milliliter |
| eq. | Equivalent |
| M | Mass |
| MeOH | Methanol |
| AcOH | Acetic acid |
| THF | Tetrahydrofuran |
| DIPEA | N,N-Diisopropylethylamine |
| Pd(OAc)$_2$ | Palladium(II) acetate |
| EtOH | Ethanol |
| DCE | 1,2-Dichloroethane |
| EtOAc | Ethyl acetate |
| Aq. | Aqueous |
| RT, rt | Room temperature |
| Rt, tret | Retention time |
| DMF | Dimethylformamide |
| ACN | Acetonitrile |
| NH$_4$OAc | Ammonium acetate |
| TFA | Trifluoroacetic acid |
| HOBT/HOBt | 1-Hydroxybenzotriazole |
| TLC | Thin layer chromatography |
| H$_2$O | Water |
| sat. | Saturated |
| sol. | Solution |
| EDCI | 1-Ethyl-3-(3-dimethylaminopropyl)carbodiimide |
| NMR | Nuclear Magnetic Resonance |
| s | singlet |
| d | doublet |
| t | triplet |
| m | multiplet |
| dd | double of doublet |
| MHz | Megahertz |
| ppm | parts per million |
| H | Proton |
| J | Coupling constant |
| UPLC-MS | Ultra-performance liquid chromatography-tandem mass spectrometry |
| DMSO | Dimethyl sulfoxide |
| CDCl$_3$ | Deuterated chloroform |
| ML | Mother liquor |
| SCX | Strong Cation Exchange Chromatography |
| LCMS | Liquid Chromatography Mass Spectrometry |
| HATU | 1-[Bis(dimethylamino)methylene]-1H-1,2,3-triazolo[4,5-b]pyridinium 3-oxid hexafluorophosphate |
| HPLC | High-performance liquid chromatography |
| HBTU | (2-(1H-Benzotriazol-1-yl)-1,1,3,3-tetramethyluronium hexafluorophosphate, Hexafluorophosphate Benzotriazole Tetramethyl Uronium |
| Cy$_2$NCH$_3$, DCHMA | N-Cyclohexyl-N-methylcyclohexanamine |
| PMB | p-Methoxybenzyl |
| STAB | Sodium triacetoxyborohydride |
| DMC | Dimethyl carbonate |
| EtOAc | Ethyl acetate |
| HCTU | O-(1H-6-Chlorobenzotriazole-1-yl)-1,1,3,3-tetramethyluronium hexafluorophosphate |
| TBTU | 3-[Bis(dimethylamino)methyliumyl]-3H-benzotriazol-1-oxide hexafluorophosphate |
| COMU | (1-Cyano-2-ethoxy-2-oxoethylidenaminooxy)dimethylamino-morpholino-carbenium-hexafluorophosphate |
| TOMBU | N-{[1,3-Dimethyl-2,4,6-trioxotetrahydropyrimidin-5(6H)-ylidenaminooxy](dimethylamino)methylen}-N-methylmethanaminium hexafluorophosphate |
| COMBU | 4-{[1,3-Dimethyl-2,4,6-trioxotetrahydropyrimidin-5(6H)ylidenaminooxy](dimethylamino)methylen}morpholin-4-ium hexafluorophosphate |
| PyBOP | Benzotriazol-1-yloxy)tripyrrolidinophosphonium hexafluorophosphate |
| T$_3$P | 2,4,6-Tripropyl-1,3,5,2λ5,4λ5,6λ5-trioxatriphosphinane 2,4,6-trioxide |
| DIC | N,N'-Diisopropylcarbodiimide |

| Abbreviations | |
|---|---|
| \multicolumn{2}{c}{The following abbreviations are used in the present disclosure.} | |
| DCC | N,N'-Dicyclohexylcarbodiimide |
| CDI | 1,1'-Carbonyldiimidazole |
| EDC | 3-(Ethyliminomethyleneamino)-N,N-dimethylpropan-1-amine |
| DMAP | N,N-Dimethylpyridin-4-amine |
| DMB | 3,4-Dimethoxybenzyl |
| BMS | Borane-dimethyl sulfide |
| DIAD | Diisopropyl azodicarboxylate |
| BrettPhos | 2-(Dicyclohexylphosphino)3,6-dimethoxy-2',4',6'-triisopropyl-1,1'-biphenyl |
| DMP | Dess-Martin periodinane |
| DIBAL | Diisobutylaluminum hydride |
| Pd-162 | Tri-tert-butylphosphine(chloro)(crotyl)palladium(II) |
| Pd-173 | Crotyl(2-dicyclohexylphosphino-2',4',6'-triisopropyl-3,6-dimethoxy-1,1'-biphenyl)palladium(II) triflate |
| Pd-175 | Allyl(2-di-tert-butylphosphino-3,6-dimethoxy-2',4',6'-triisopropyl-1,1'-biphenyl)palladium(II) triflate |
| $Pd_2(dba)_3$ | Tris(dibenzylideneacetone)dipalladium(0) |
| NBS | 1-Bromo-2,5-pyrrolidinedione; N-bromosuccinimide |
| pTSA | 4-Methylbenzene-1-sulfonic acid |
| LDA | Lithium diisopropylamide |
| BINOL | 1,1'-Bi-2-naphthol |
| DMA | N,N-Dimethylacetamide |
| DABCO | 1,4-Diazabicyclo[2.2.2]octane |
| DPPF | 1,1'-Bis(diphenylphosphanyl)ferrocene |
| Xphos | 2-Dicyclohexylphosphino-2',4',6'-triisopropylbiphenyl |
| BuLi | n-Butyllithium |
| DPPA | Diphenylphosphoryl azide |
| mesyl | Methanesulfonyl |

It should be appreciated that all features of the present invention disclosed herein can be freely combined and that variations and modifications may be made without departing from the scope of the invention as defined in the claims. Where known equivalents exist to specific features, such equivalents are incorporated as if specifically referred to in this specification. Furthermore, it should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

EXAMPLES

The following examples are in no way intended to limit the scope of the present invention, but are provided only to illustrate the inventive compounds and their preparation.

General Procedures.

All starting materials and solvents were obtained either from commercial sources or prepared according to the literature citation. Unless otherwise stated all reactions were stirred. Organic solutions were routinely dried over anhydrous magnesium sulfate or sodium sulfate.

Column chromatography was performed on pre-packed silica (230-400 mesh, 40-63 μm) cartridges using the eluent indicated. SCX was purchased from Silicycle and treated with 1M hydrochloric acid prior to use. Unless stated otherwise the reaction mixture to be purified was first diluted with MeOH and made acidic with a few drops of AcOH. This solution was loaded directly onto the SCX and washed with MeOH. The desired material was then eluted by washing with 0.7 M $NH_3$ in MeOH.

Analytical Methods

Analytical LCMS was carried out using either acidic or basic methods as follows:

Method 1a: Waters X-Select CSH C18, 2.5 μm, 4.6×30 mm column eluting with a gradient of 0.1% Formic acid in MeCN in 0.1% Formic acid in water. The gradient from 5-95% 0.1% Formic acid in MeCN occurs between 0.00-3.00 minutes at 2.5 ml/min with a flush from 3.01-3.5 minutes at 4.5 ml/min. A column re-equilibration to 5% MeCN is from 3.60-4.00 minutes at 2.5 ml/min. UV spectra of the eluted peaks were measured using an Agilent 1260 Infinity or Agilent 1200 VWD at 254 nm. Mass spectra were measured using an Agilent 6120 or Agilent 1956 MSD running with positive/negative switching or an Agilent 6100 MSD running in either positive or negative mode.

Method 1b: Waters X-Select BEH C18, 2.5 μm, 4.6×30 mm column eluting with a gradient of MeCN in aqueous 10 mM ammonium bicarbonate. The gradient from 5-95% MeCN occurs between 0.00-3.00 minutes at 2.5 ml/min with a flush from 3.01-3.5 minutes at 4.5 ml/min. A column re-equilibration to 5% MeCN is from 3.60-4.00 minutes at 2.5 ml/min. UV spectra of the eluted peaks were measured using an Agilent 1260 Infinity or Agilent 1200 VWD at 254 nm. Mass spectra were measured using an Agilent 6120 or Agilent 1956 MSD running with positive/negative switching or an Agilent 6100 MSD running in either positive or negative mode.

Analytical UPLC/MS. Alternatively analytical UPLC/MS was carried out using either acidic or basic methods as follows:

Method 2a: Waters Acquity CSH C18, 1.7 μm, 2.1×30 mm column eluting with a gradient of 0.1% Formic acid in MeCN in 0.1% Formic acid in water. The gradient is structured with a starting point of 5% MeCN held from 0.0-0.11 minutes. The gradient from 5-95% occurs between 0.11-2.15 minutes with a flush from 2.15-2.56 minutes. A column re-equilibration to 5% MeCN is from 2.56-2.83 minutes. UV spectra of the eluted peaks were measured using an Acquity PDA and mass spectra were recorded using an Acquity QDa detector with ESI pos/neg switching.

Method 2b: Waters Acquity BEH C18, 1.7 μm, 2.1×30 mm column eluting with a gradient of MeCN in aqueous 10 mM Ammonium Bicarbonate. The gradient is structured with a starting point of 5% MeCN held from 0.0-0.11 minutes. The gradient from 5-95% occurs between 0.11-2.15 minutes with a flush from 2.15-2.56 minutes. A column re-equilibration to 5% MeCN is from 2.56-2.83 minutes. UV spectra of the eluted peaks were measured using an Acquity PDA and mass spectra were recorded using an Acquity QDa detector with ESI pos/neg switching.

Analytical LCMS (Other Methods)

Method 3. Liquid chromatography/mass spectrometry (LC/MS), HRMS data was obtained to verify molecular mass and analyze purity of products. The specifications of the LC/MS instrument are the following: Water UPLC, electrospray (+) ionization, mass range of 100-1000 Da, 20V cone voltage, Acquity BEH C-18 column (2.1×50 mm, 1.7 μm), and gradient mobile phase consisting of 5 mM ammonium acetate in water and acetonitrile, and a flow rate of 0.6 mL/min.

UPLC-MS analysis conditions: Column: Acquity HSS-T3 (2.1×100 mm, 1.8 μm). Mobile phase: A −0.1% TFA in water; B—acetonitrile: Flow mode: Gradient

| TIME | A | B |
|---|---|---|
| 0.0 | 90.0 | 10.0 |
| 1.0 | 90.0 | 10.0 |
| 2.0 | 85.0 | 15.0 |
| 4.5 | 45.0 | 55.0 |
| 6.0 | 10.0 | 90.0 |
| 8.0 | 10.0 | 90.0 |
| 9.0 | 90.0 | 10.0 |
| 10.0 | 90.0 | 10.0 |

Flow: 0.3 mL/min;
UV MAx: 214.0 nm;
Column TemP. 30° C.

Method 4. Method info: A: 0.1% TFA IN H2O, B: 0.1% TFA IN ACN; Flow Rate: 1.0 mL/min; COLUMN: Atlantis dC18 (50×4.6 mm, 52), positive mode

| TIME | % B |
|---|---|
| 0 | 05 |
| 8.0 | 100 |
| 8.1 | 100 |
| 8.5 | 05 |
| 10.0 | 05 |

Preparative HPLC

Preparative HPLC was carried out using a Waters Xselect CSH C18, 5 μm, 19×50 mm column using either a gradient of either 0.1% Formic Acid in MeCN in 0.1% aqueous Formic Acid or a gradient of MeCN in aqueous 10 mM Ammonium Bicarbonate; or a Waters Xbridge BEH C18, 5 μm, 19×50 mm column using a gradient MeCN in aqueous 10 mM Ammonium Bicarbonate. Fractions were collected following detection by UV at a single wavelength measured by a variable wavelength detector on a Gilson 215 preparative HPLC or Varian PrepStar preparative HPLC; by mass and UV at a single wavelength measured by a ZQ single quadrupole mass spectrometer, with positive and negative ion electrospray, and a dual wavelength detector on a Waters FractionLynx LCMS or Manual Prep System:-Waters 2545 Quaternary gradient Module with UV—Visible 2489 Detector. HPLC System: Waters Alliance 2695 with 2998/2996 PDA detector. SFC Prep—Waters SFC 200q with 2545 Quaternary Gradient Pump and 2489 UV-Vis Detector. Autopurification System-Waters 2767 Injector with 2545 Binary gradient pump and 2489UV/2998 PDA detectors and Agilent 1260 Autopurification with Binary Pump and DAD detector.

Preparative Chiral High Performance Liquid Chromatography

Method Ia: Chiralpak® IA (Daicel Ltd.) column (2×25 cm), flow rate 13.5 mL min-1 eluting with a mixture of (% of ethanol) ethanol in a 4:1 mixture of heptane+ 0.2% TFA and chloroform, UV detection at 254 nm. Samples were loaded onto the column via an at-column dilution pump, pumping chloroform (1.5 mL min-1) for the duration of the run, giving a combined flow rate of 15 mL min-1.

Method Ib: Chiralpak® IC (Daicel Ltd.) column (2×25 cm), flow rate 13.5 mL min-1 eluting with a mixture of (% of ethanol) ethanol in heptane+0.2% diethylamine, UV detection at 254 nm. Samples were loaded onto the column via an at-column dilution pump, pumping chloroform (1.5 ml min-1) for the duration of the run, giving a combined flow rate of 15 mL min-1.

Analytical Chiral High Performance Liquid Chromatography

Method IIa: Chiralpak® IA (Daicel Ltd.) column (4.6 mm×25 mm), flow rate 1 mL min-1 eluting with a mixture of (% of ethanol) ethanol in a 4:1 mixture of isohexane+0.2% TFA and chloroform, UV detection at 254 nm.

Method IIb: Chiralpak® IC (Daicel Ltd.) column (4.6 mm×25 mm), flow rate 1 mL min-1 eluting with a mixture of (% of ethanol) ethanol in isohexane+0.2% diethylamine, UV detection at 254 nm.

$^1$H NMR Spectroscopy $^1$H NMR Spectra were acquired on a Bruker Avance Ill spectrometer at 300 MHz or 400 MHz using residual undeuterated solvent as reference.

Example 1. Synthesis of (S,E)-3-(3-amino-4-oxo-2,3,4,5-tetrahydro-1H-pyrido[2,3-b][1,4]diazepin-8-yl)-N-methyl-N-((3-methylbenzofuran-2-yl)methyl) acrylamide (compound 8)

General Synthetic Scheme.

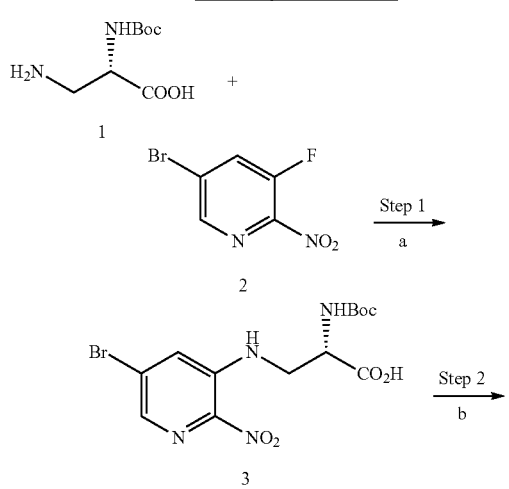

-continued

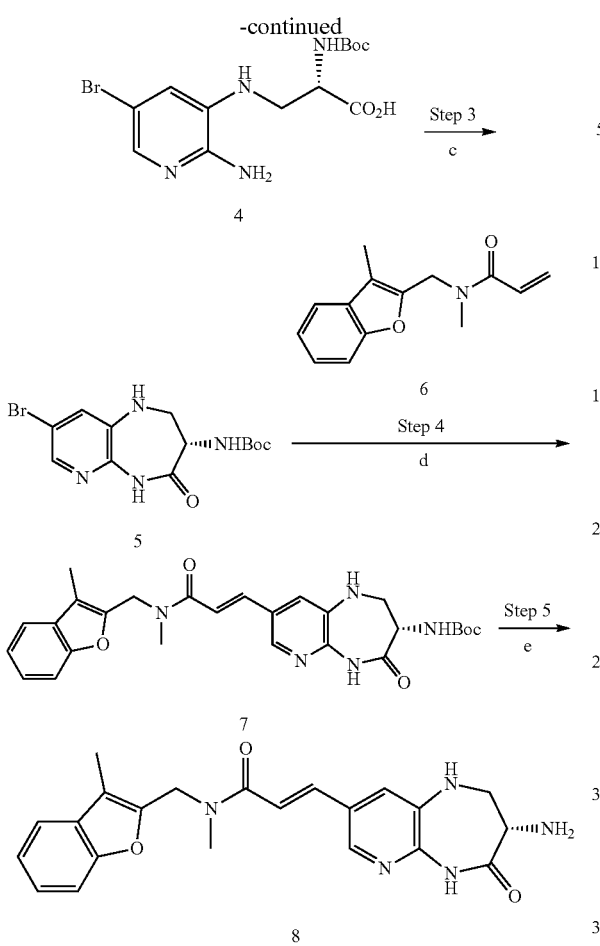

Reaction conditions:
a) K₂CO₃, EtOH, reflux;
b) Fe, NH₄Cl, EtOH, H₂O, reflux;
c) HATU, DIPEA, DMF, RT;
d) Pd-162, NCy₂Me, Bu₄NCl, 1,4-dioxane, 80° C.;
e) TFA, DCM, RT N-Methyl-N-((3-methylbenzofuran-2-yl)methyl)acrylamide (compound 6) was prepared as described in AFFINIUM PHARMACEUTICALS, INC.—WO2007/67416, 2007, A2 and/or VITAS PHARMA RESEARCH PRIVATE LIMITED, WO2013/42035, 2013, A1 patents.

Step 1. (S)-3-((5-Bromo-2-nitropyridin-3-yl)amino)-2-((tert-butoxycarbonyl)amino)propanoic acid (compound 3). A mixture of(S)-3-amino-2-((tert-butoxycarbonyl)amino)propanoic acid 1 (0.83 g, 4.07 mmol), potassium carbonate (1.13 g, 8.15 mmol) and 5-bromo-3-fluoro-2-nitropyridine 2 (0.6 g, 2.72 mmol) in a solvent of ethanol (70 mL) was heated under reflux for 2 hours. The reaction mixture was evaporated to dryness and the residue taken up into water (20 mL). The mixture was acidified to pH 3 by the addition of a solution of 1M HCl. The aqueous was extracted into ethyl acetate (2×20 mL). The organics were combined, dried over sodium sulfate, filtered and concentrated in vacuo to afford the title compound 3 as a yellow solid (1 g, 87%). $R^r$ 1.94 min (Method 1a) m/z 349/351 [M−tBu]⁺ (ES⁺); 403/405 [M−H]⁻ (ES⁻). ¹H NMR (400 MHZ, DMSO-d₆): δ, ppm 12.94 (s, 1H), 8.11-7.85 (m, 3H), 7.27 (d, J=8.3 Hz, 1H), 4.33-4.23 (m, 1H), 3.79 (dt, J=14.1, 5.6 Hz, 1H), 3.62 (ddd, J=14.4 Hz, 8.8 Hz, 6.4 Hz, 1H), 1.32 (s, 9H).

Step 2. (S)-3-((2-Amino-5-bromopyridin-3-yl)amino)-2-((tert-butoxycarbonyl)amino)propanoic acid (compound 4). A mixture of(S)-3-((5-bromo-2-nitropyridin-3-yl)amino)-2-((tert-butoxycarbonyl)amino)propanoic acid 3 (1 g, 2.47 mmol), iron powder (0.55 g, 9.87 mmol) and ammonium chloride (1.32 g, 24.7 mmol) in a solvent mixture of ethanol (70 mL) and water (20 mL) was heated and stirred under reflux for 1 hour. The reaction mixture was filtered through a plug of Celite while hot and the filtrate evaporated to dryness. The residue was triturated with water (30 mL). The solid was collected and dried to afford the title compound 4 as a buff solid (0.83 g, 85%). $R^r$ 0.75 min (Method 2a) m/z 375/377 [M+H]⁺ (ES⁺); 373/375 [M−H]⁻ (ES⁻).

Step 3. (S)-tert-Butyl (8-bromo-4-oxo-2,3,4,5-tetrahydro-1H-pyrido[2,3-b][1,4]diazepin-3-yl)carbamate 5). To a solution of(S)-3-((2-amino-5-bromopyridin-3-yl)amino)-2-((tert-(compound butoxycarbonyl)amino) propanoic acid 4 (0.83 g, 2.22 mmol) and DIPEA (1.16 mL, 6.65 mmol) in DMF (2 mL) was added HATU (1.27 g, 3.33 mmol). The reaction mixture was stirred at RT for 1 hour, diluted with water (20 mL). The solid was collected and purified by silica chromatography (0-50% EtOAc/isohexane) to afford the title compound 5 as a tan solid (0.41 g, 50%). $R^r$ 1.18 min (Method 2a) m/z 257/259 [M+H—CO₂ᵗBu]⁺ (ES⁺); 355/357 [M−H]⁻ (ES⁻). ¹H NMR (400 MHZ, DMSO-d₆): δ, ppm 10.16 (s, 1H), 7.81 (d, J=2.1 Hz, 1H), 7.35 (d, J=2.2 Hz, 1H), 6.99 (d, J=7.8 Hz, 1H), 6.31 (d, J=6.0 Hz, 1H), 4.18-4.09 (m, 1H), 3.46 (ddd, J=11.7, 6.5, 3.7 Hz, 1H), 3.34 (s, 1H), 1.38 (s, 9H).

Step 4. (S,E)-tert-Butyl (8-(3-(methyl((3-methylbenzofuran-2-yl)methyl)amino)-3-oxoprop-1-en-1-yl)-4-oxo-2,3,4,5-tetrahydro-1H-pyrido[2,3-b][1,4]diazepin-3-yl)carbamate (compound 7). A reaction vial was charged with N-methyl-N-((3-methylbenzofuran-2-yl)methyl)acrylamide 6 (257 mg, 1.12 mmol), (S)-tert-butyl (8-bromo-4-oxo-2,3,4,5-tetrahydro-1H-pyrido[2,3-b][1,4]diazepin-3-yl)carbamate 5 (400 mg, 1.12 mmol), tetrabutylammonium chloride hydrate (33 mg, 0.11 mmol), [P(tBu)₃]Pd(crotyl)Cl (Pd-162) (44 mg, 0.11 mmol). The reaction vial was flushed with nitrogen for 5 mins. 1,4-Dioxane (15 mL) and N-cyclohexyl-N-methylcyclohexanamine (0.48 mL, 2.24 mmol) were added and the reaction mixture was purged with nitrogen for a further 5 mins. The mixture was heated to 80° C. for 1 h. The mixture was allowed to cool to RT and the mixture evaporated to dryness. The crude product was triturated with isohexane (20 mL) the solid was collected and purified by silica chromatography (0-100% EtOAc/isohexane) to afford the title compound 7 as a yellow solid (0.47 mg, 81%). $R^r$ 2.92 min (Method 1a) m/z 506 [M+H]⁺ (ES⁺). ¹H NMR (400 MHZ, DMSO-d₆, 363 K): δ, ppm 9.40 (s, 1H), 7.99 (d, J=2.0 Hz, 1H), 7.60-7.54 (m, 1H), 7.51-7.38 (m, 3H), 7.32-7.24 (m, 2H), 7.12 (d, J=15.7 Hz, 1H), 5.84 (d, J=5.4 Hz, 1H), 4.84 (s, 2H), 3.57 (dd, J=9.3 Hz, 3.4 Hz, 1H), 3.44 (ddd, J=12.3 Hz, 6.1 Hz, 3.4 Hz, 1H), 3.24-3.17 (m, 1H), 3.06 (s, 3H), 2.28 (s, 3H), 1.83 (s, 2H).

Step 5. (S,E)-3-(3-Amino-4-oxo-2,3,4,5-tetrahydro-1H-pyrido[2,3-b][1,4]diazepin-8-yl)-N-methyl-N-((3-methylbenzofuran-2-yl)methyl)acrylamide (compound 8). To a solution of (S,E)-tert-butyl (8-(3-(methyl((3-methylbenzofuran-2-yl)methyl)amino)-3-oxoprop-1-en-1-yl)-4-oxo-2,3,4,5-tetrahydro-1H-pyrido[2,3-b][1,4]diazepin-3-yl)carbamate 7 (125 mg, 0.25 mmol) in DCM (4 mL) was added TFA (2 mL) and the mixture stirred at RT for 30 mins. The mixture was evaporated to dryness and the residue suspended in an aqueous solution of saturated sodium hydrogen carbonate (10 mL) and sonicated for 10 mins. The solid was collected and purified by silica chromatography (0-10% (0.7M $NH_3$ in MeOH)/DCM) to afford the title compound 8 as a yellow solid (51 mg, 50%). R$^t$ 1.09 min (Method 2b) m/z 406 [M+H]$^+$ (ES$^+$). $^1$H NMR (400 MHZ, DMSO-d$_6$, 363 K): δ, ppm 9.97 (s, 1H), 8.04 (d, J=8.9 Hz, 1H), 7.57 (d, J=7.6 Hz, 1H), 7.53-7.48 (m, 1H), 7.47-7.35 (m, 2.4 H), 7.32-7.23 (m, 2H), 7.09 (d, J=15.4 Hz, 0.6H), 6.04 (d, J=7.3 Hz, 1H), 4.96 (s, 0.8H), 4.80 (s, 1.2H), 3.51 (s, 1H), 3.41 (ddd, J=11.9 Hz, 6.3 Hz, 3.5 Hz, 1H), 3.17 (s, 2.7 H), 2.95 (s, 1.3H), 2.27 (d, J=3.6 Hz, 3H), 1.87 (d, J=5.3 Hz, 2H) (rotamers).

Example 2. Synthesis of (E)-3-((R)-3-((2S,6R)-2,6-dimethylmorpholino)-4-oxo-2,3,4,5-tetrahydro-1H-pyrido[2,3-b][1,4]diazepin-8-yl)-N-methyl-N-((3-methylbenzofuran-2-yl)methyl)acrylamide (compound 21)

General Synthetic Scheme.

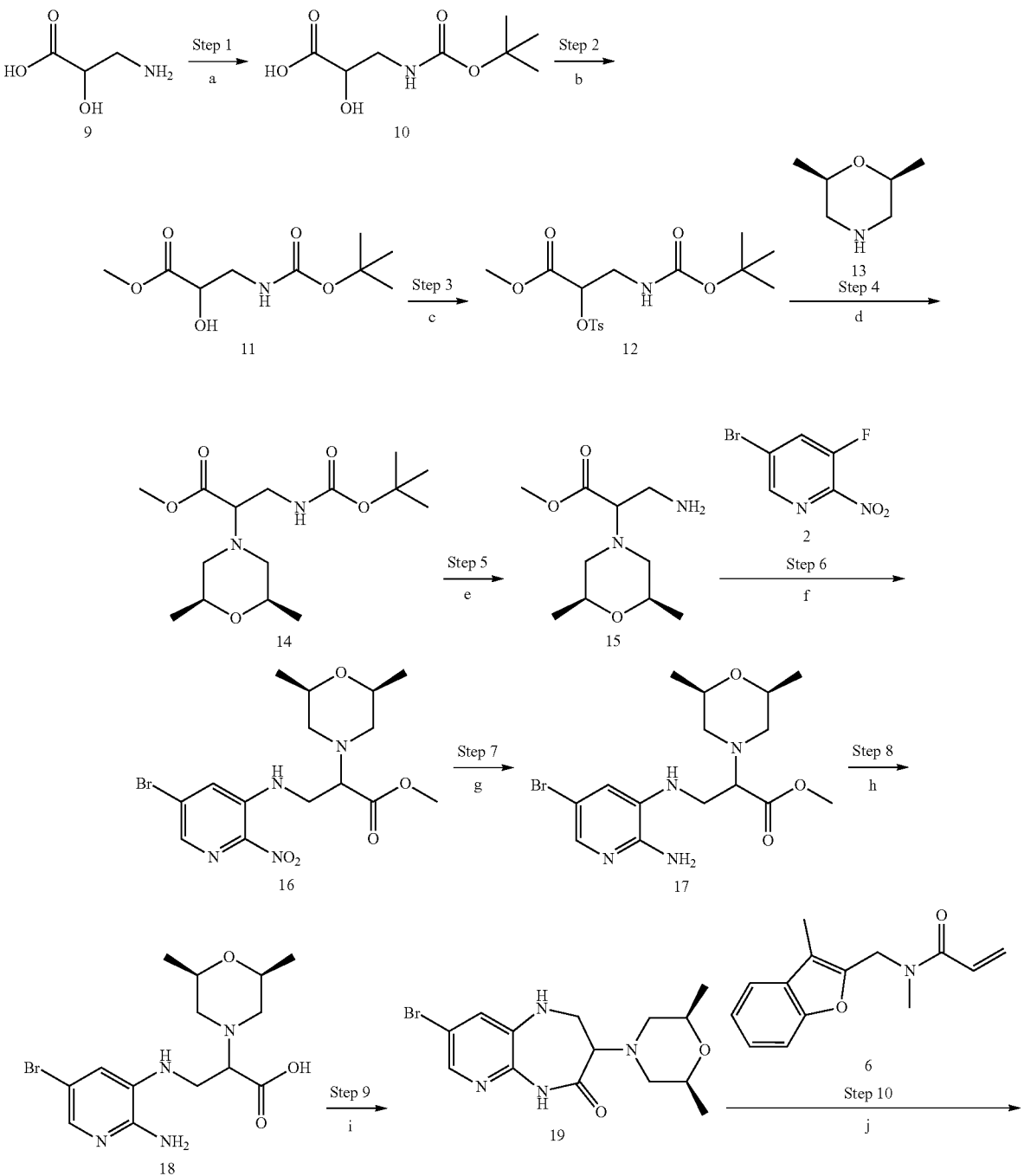

-continued

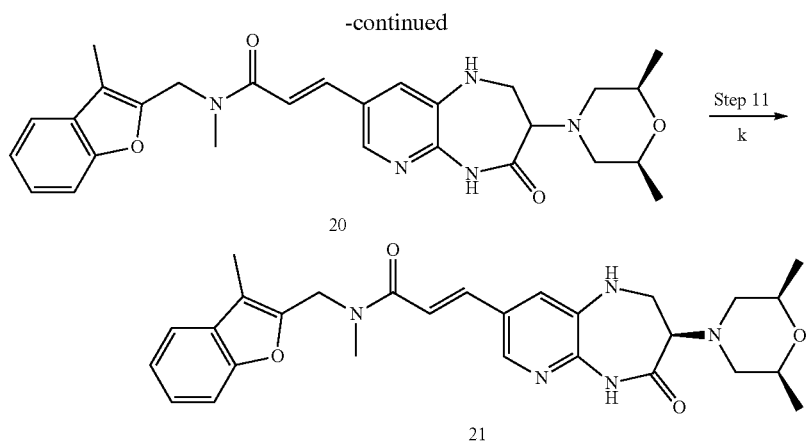

Reaction conditions: a) (Boc)₂O, NaOH/THF, 0° C.; b) K₂CO₃, MeI, DMFh; c) TsCl, DMAP, TEA, DCM, 0° C.; d) K₂CO₃, 50° C.;
e) TFA, 0°C.; f) K₂CO₃, reflux; g) Fe, AcOH, 90° C.; h) LiOH, THF:H₂O, RT; i) HATU, Hunig's base, DMF;
j) Pd-162, Bu₄NCl, Cy₂NMe, 80° C.; k) Chiralpak IC column, 20% EtOH in 4:1 isohexane + 0.2% Et₂NH:CHCl₃

Step 1. 3-((tert-Butoxycarbonyl)amino)-2-hydroxypropanoic acid (compound 10). To a stirred solution of 3-amino-2-hydroxypropanoic acid 9 (0.5 g, 4.8 mmol) in 1,4-dioxane (5 mL) was added NaOH (0.2 g, 4.8 mmol) in H₂O (5 mL). The reaction mixture was stirred at 0° C. for 1 h and di-tert-butyl dicarbonate (1.1 g, 5.2 mmol) was added. The reaction mixture was allowed to warm to room temperature and stirred o/n. The reaction mixture was quenched by addition of 1M HCl solution (5 mL) at 0° C. to adjust to pH~6. The aqueous phase was extracted with EtOAc (2×10 mL). The combined organic layers were dried (MgSO₄), filtered and concentrated in vacuo to give the crude title compound 10 as a colourless solid (0.8 g, 82%). ¹H NMR (400 MHZ, CDCl₃): δ, ppm 5.13 (s, 1H), 4.24 (t, J=4.2 Hz, 1H), 3.60-3.37 (m, 2H), 1.38 (s, 9H).

Step 2. Methyl 3-((tert-butoxycarbonyl)amino)-2-hydroxypropanoate (compound 11). To a stirred solution of 3-((tert-butoxycarbonyl)amino)-2-hydroxypropanoic acid 10 (0.47 g, 2.3 mmol) in DMF (5 mL) was added K₂CO₃ (0.34 g, 2.5 mmol) followed by MeI (0.16 mL, 2.5 mmol). The reaction mixture was stirred at room temperature for 72 hours and quenched by addition of water (5 mL). The aqueous phase was extracted with EtOAc (2×5 mL). The combined organic layers were washed with H₂O (3×5 mL), and brine (5 ml), dried (MgSO₄), filtered and concentrated in vacuo to give the crude title compound 11 as a yellow oil (0.28 g, 56%) which was used in the next step without further purification. ¹H NMR (400 MHz, CDCl₃): δ, ppm 4.86 (d, J=16.3 Hz, 1H), 4.20 (t, J=4.5 Hz, 1H), 3.74 (s, 3H), 3.43 (ddd, J=7.3 Hz, 4.7 Hz, 2.7 Hz, 2H), 1.37 (s, 9H).

Step 3. Methyl 3-((tert-butoxycarbonyl)amino)-2-(tosyloxy) propanoate (compound 12). To a stirred solution of methyl 3-((tert-butoxycarbonyl)amino)-2-hydroxypropanoate 11 (0.17 g, 0.78 mmol) in DCM (3 mL) was added TEA (0.54 mL, 3.88 mmol), 4-methylbenzene-1-sulfonyl chloride (0.30 g, 1.55 mmol), and catalytic amount of DMAP (9.5 mg, 0.08 mmol) at 0° C. After 15 min, the reaction mixture was allowed to warm to room temperature and stirred o/n. The reaction mixture was quenched by addition of 10% citric acid (5 ml), then diluted with EtOAc (5 mL). The aqueous phase was extracted with EtOAc (2×5 mL). The combined organic layers were dried (MgSO₄), filtered, and concentrated in vacuo. The crude product was purified by silica chromatography (0-100% EtOAc/isohexane) to afford the title compound 12 as a colourless oil (0.26 g, 68%). R$^t$ 2.22 min (Method 1a) m/z 274 [M+H-Boc]⁺ (ES⁺). ¹H NMR (400 MHZ, CDCl₃): δ, ppm 7.79-7.72 (m, 2H), 7.30-7.22 (m, 2H), 4.89 (dt, J=14.2, 5.5 Hz, 1H), 4.75 (s, 1H), 3.60 (s, 3H), 3.55 (d, J=5.2 Hz, 1H), 3.47-3.38 (m, 1H), 2.38 (s, 3H), 1.34 (s, 9H).

Step 4. Methyl 3-((tert-butoxycarbonyl)amino)-2-((2S, 6R)-2,6-dimethylmorpholino)propanoate (compound 14). To a stirred solution of methyl 3-((tert-butoxycarbonyl)amino)-2-(tosyloxy) propanoate 12 (0.26 g, 0.68 mmol) in MeCN (4 mL) was added (2R,6S)-2,6-dimethylmorpholine 13 (0.13 mL, 1.02 mmol) followed by K₂CO₃ (0.28 g, 2.05 mmol). The reaction mixture was stirred at 50° C. o/n. LC/MS showed incomplete reaction, a further aliquot of K₂CO₃ (200 mg) and (2R,6S)-2,6-dimethylmorpholine 13 (0.126 mL, 1.024 mmol) were added to the reaction mixture and stirred at 50° C. for a further 24 hours. The reaction mixture was allowed to cool to room temperature. H₂O (5 mL) was added and the aqueous phase was extracted with EtOAc (2×5 mL). The combined organic phase were washed with brine (10 mL), dried (MgSO₄), filtered, and concentrated in vacuo to give the crude title compound 14 as a colourless thick oil (73 mg, 34%). ¹H NMR (400 MHZ, CDCl₃): δ, ppm 4.83 (s, 1H), 3.68 (s, 4H), 3.40 (m, 4H), 2.47 (m, 3H), 1.38 (s, 9H), 1.08 (dd, J=6.3 Hz, 1.4 Hz, 6H).

Step 5. Methyl 3-amino-2-((2S,6R)-2,6-dimethylmorpholino)propanoate (compound 15). To a stirred solution of methyl 3-((tert-butoxycarbonyl)amino)-2-((2S, 6R)-2,6-dimethylmorpholino)propanoate 14 (73 mg, 0.23 mmol) in DCM (1 mL) was added 2,2,2-trifluoroacetic acid (1 mL) at 0° C. The reaction mixture was stirred for 30 min at 0° C. and allowed to warm to room temperature, and stirred o/n. The solvent was removed in vacuo and the resulting oil was taken up in MeOH (10 mL) and applied to an SCX column. The column was washed with methanol (20 mL) and the product eluted with 10% methanolic ammonia (20 mL) and afforded the title compound 15 as a colourless oil (61 mg, quant. yield). ¹H NMR (400 MHZ, CDCl₃): δ, ppm 5.34 (s, 1H), 3.67 (s, 3H), 3.66-3.51 (m, 2H), 3.25-3.15

(m, 1H), 2.95-2.89 (m, 2H), 2.58 (ddt, J=11.2 Hz, 6.9 Hz, 1.9 Hz, 2H), 2.31 (dd, J=11.3 Hz, 10.0 Hz, 1H), 1.90 (dd, J=11.4 Hz, 10.0 Hz, 1H), 1.08 (dd, J=6.3 Hz, 2.8 Hz, 6H).

Step 6. Methyl 3-((5-bromo-2-nitropyridin-3-yl)amino)-2-((2S,6R)-2,6-dimethylmorpholino)propanoate (compound 16). To a stirred solution of 5-bromo-3-fluoro-2-nitropyridine 2 (62 mg, 0.28 mmol) in THF (4 mL) was added methyl 3-amino-2-((2S,6R)-2,6-dimethylmorpholino)propanoate 15 (61 mg, 0.28 mmol) followed by potassium carbonate (78 mg, 0.56 mmol). The reaction mixture was stirred at reflux for 2 h. The reaction mass was allowed to cool to room temperature. The solvent was removed in vacuo. The residue was dissolved in $H_2O$ (10 mL) and EtOAc (10 mL) was added. The aqueous phase was separated, and extracted with EtOAc (2×10 mL). The combined organic phases were washed with brine (10 mL), passed through a phase separator, and concentrated in vacuo. The crude product was purified by silica chromatography (0-100% EtOAc/isohexane) to afford the title compound 16 as a yellow solid (88 mg, 75%). $R^t$ 1.44 min (Method 2a) m/z 417/419 $[M+H]^+$ ($ES^+$). $^1H$ NMR (400 MHZ, DMSO-$d_6$): δ, ppm 8.20 (d, J=6.8 Hz, 1H), 7.99 (d, J=1.9 Hz, 1H), 7.90 (d, J=1.9 Hz, 1H), 3.70 (m, 3H), 3.62-3.45 (m, 5H), 2.75 (t, J=10.7 Hz, 3H), 2.39 (t, J=10.7 Hz, 2H), 1.84 (t, J=10.6 Hz, 1H), 1.05 (dd, J=11.9 Hz, 6.3 Hz, 6H).

Step 7. Methyl 3-((2-amino-5-bromopyridin-3-yl)amino)-2-((2S,6R)-2,6-dimethylmorpholino)propanoate (compound 17). To a stirred solution of methyl 3-((5-bromo-2-nitropyridin-3-yl)amino)-2-((2S,6R)-2,6-dimethylmorpholino)propanoate 16 (88 mg, 0.21 mmol) in EtOH (2 mL) was added acetic acid (0.24 mL, 4.22 mmol) followed by iron powder (0.12 g, 2.11 mmol). The reaction mixture was stirred at 90° C. for 2 h. The reaction mixture was allowed to cool to room temperature and neutralised to pH 8 with solid $NaHCO_3$. The resulting reaction mixture was diluted with $H_2O$ (5 mL) and EtOAc (5 mL). The aqueous phase was separated, and extracted with EtOAc (2×5 mL). The combined organic phases were washed with $H_2O$ (5 ml), passed through a hydrophobic frit, and concentrated in vacuo to afford the title compound 17 as a brown solid (79 mg, 96%). $R^t$ 0.74 min (Method 2a) m/z 387/389 $[M+H]^+$ ($ES^+$).

Step 8. 3-((2-Amino-5-bromopyridin-3-yl)amino)-2-((2S,6R)-2,6-dimethylmorpholino)propanoic acid (compound 18). To a stirred solution of methyl 3-((2-amino-5-bromopyridin-3-yl)amino)-2-((2S,6R)-2,6-dimethylmorpholino)propanoate 17 (79 mg, 0.20 mmol) in THF (0.5 mL) was added a solution of LiOH (24 mg, 1.02 mmol) in $H_2O$ (0.5 mL). The reaction mixture was stirred at room temperature for 2 h. The solvent was evaporated to dryness to give the title compound 18 as a brown solid (80 mg, quant. yield) which was used in the next step without further purification. $R^t$ 0.33 min (Method 2a) m/z 373/375 $[M+H]^+$ ($ES^+$).

Step 9. 8-Bromo-3-((2S,6R)-2,6-dimethylmorpholino)-1,2,3,5-tetrahydro-4H-pyrido[2,3-b][1,4]diazepin-4-one (compound 19). To a stirred solution of 3-((2-amino-5-bromopyridin-3-yl)amino)-2-((2S,6R)-2,6-dimethylmorpholino)propanoic acid 18 (76 mg, 0.20 mmol) in DMF (1 mL) was added DIPEA (0.11 mL, 0.61 mmol) followed by HATU (0.12 g, 0.30 mmol). The reaction mixture was stirred at room temperature for 1 h. An aq. solution of $NH_4Cl$ (2 mL) was added. The aqueous phase was separated, and extracted with DCM (2×5 mL). The combined organic phases were washed with $H_2O$ (3×5 mL), passed through a hydrophobic frit, and concentrated in vacuo to afford the title compound 19 as a yellow solid (47 mg, 64%) which was used in the next step without further purification. $R^t$ 1.09 min (Method 1a) m/z 355/357 $[M+H]^+$ ($ES^+$). $^1H$ NMR (400 MHZ, DMSO-$d_6$): δ, ppm 9.87-9.77 (m, 1H), 7.59 (d, J=2.1 Hz, 1H), 7.14 (d, J=2.1 Hz, 1H), 6.34-6.20 (m, 1H), 3.60 (dt, J=12.8 Hz, 6.3 Hz, 1H), 3.49-3.41 (m, 1H), 3.25-3.12 (m, 2H), 3.09 (d, J=6.2 Hz, 1H), 2.82 (d, J=10.8 Hz, 1H), 1.93 (d, J=10.6 Hz, 1H), 1.79 (t, J=10.5 Hz, 1H), 0.99 (dd, J=16.8 Hz, 6.3 Hz, 6H).

Step 10. (E)-3-(3-((2S,6R)-2,6-Dimethylmorpholino)-4-oxo-2,3,4,5-tetrahydro-1H-pyrido[2,3-b][1,4]diazepin-8-yl)-N-methyl-N-((3-methylbenzofuran-2-yl)methyl) acrylamide (compound 20). A reaction vial was charged with N-methyl-N-((3-methylbenzofuran-2-yl)methyl)acrylamide 6 (31 mg, 0.13 mmol), 8-bromo-3-((2S,6R)-2,6-dimethylmorpholino)-2,3-dihydro-1H-pyrido[2,3-b][1,4]diazepin-4 (5H)-one 19 (47 mg, 0.13 mmol), tetrabutylammonium chloride hydrate (4 mg, 0.01 mmol), $[P(tBu)_3]Pd(crotyl)Cl$ (Pd-162) (5 mg, 0.01 mmol). The vial was flushed with nitrogen for 5 mins. 1,4-Dioxane (2 mL) and N-cyclohexyl-N-methylcyclohexanamine (0.06 mL, 0.27 mmol) were added and the reaction mixture was purged with nitrogen for a further 5 mins. The mixture was heated to 80° C. for 2 h and allowed to cool to room temperature. The solvent was evaporated to dryness. The residue was taken up in EtOAc (5 mL) and a solution of $NH_4Cl$ (5 mL) was added. The aqueous phase was separated and extracted with EtOAc (2×5 mL). The combined organic phases were passed through a phase separator and concentrated in vacuo. The crude product was purified by silica chromatography (0-10% MeOH/DCM) to afford the title compound as a racemic mixture of 20 as a yellow solid (43 mg, 59%). $R^t$ 1.06 min (Method 2a) m/z 504 $[M+H]^+$ ($ES^+$). $^1H$ NMR (400 MHZ, DMSO-$d_6$): δ, ppm 9.83 (s, 1H), 7.93 (d, J=7.3 Hz, 1H), 7.62-7.03 (m, 6H), 6.03 (s, 1H), 4.88 (d, J=62.9 Hz, 2H), 3.62-3.42 (m, 2H), 3.30-2.94 (m, 6H), 2.85 (d, J=11.0 Hz, 1H), 2.27 (s, 3H), 1.91 (dt, J=36.4 Hz, 10.5 Hz, 2H), 0.99 (dd, J=11.3 Hz, 6.2 Hz, 6H).

Step 11. (E)-3-((R)-3-((2S,6R)-2,6-Dimethylmorpholino)-4-oxo-2,3,4,5-tetrahydro-1H-pyrido[2,3-b][1,4]diazepin-8-yl)-N-methyl-N-((3-methylbenzofuran-2-yl)methyl)acrylamide (compound 21). Chiral separation of compound 20. The enantiomers were separated by chiral prep HPLC. Chirality of 21 was arbitrarily assigned. $R^t$ 1.66 min (Method 1a) m/z 504 $[M+H]^+$ ($ES^+$). $^1H$ NMR (400 MHZ, DMSO-$d_6$): δ, ppm 9.24 (s, 1H), 7.91 (d, J=1.9 Hz, 1H), 7.58-7.54 (m, 1H), 7.49-7.44 (m, 1H), 7.41 (d, J=15.5 Hz, 1H), 7.31-7.23 (m, 3H), 7.14-7.05 (m, 1H), 5.79 (s, 1H), 4.84 (s, 2H), 3.63-3.44 (m, 2H), 3.37-3.23 (m, 2H), 3.20 (d, J=5.3 Hz, 1H), 3.10 (s, 3H), 2.91-2.84 (m, 2H), 2.28 (s, 3H), 2.00 (dt, J=19.6 Hz, 10.6 Hz, 2H), 1.03-0.99 (m, 6H).

Example 3. Synthesis of (S,E)-N-methyl-N-((2-methylbenzofuran-3-yl)methyl)-3-(4-oxo-3-(2-oxa-6-azaspiro[3.3]heptan-6-yl)-2,3,4,5-tetrahydro-1H-pyrido[2,3-b][1,4]diazepin-8-yl)acrylamide (compound 35)
General Synthetic Scheme.
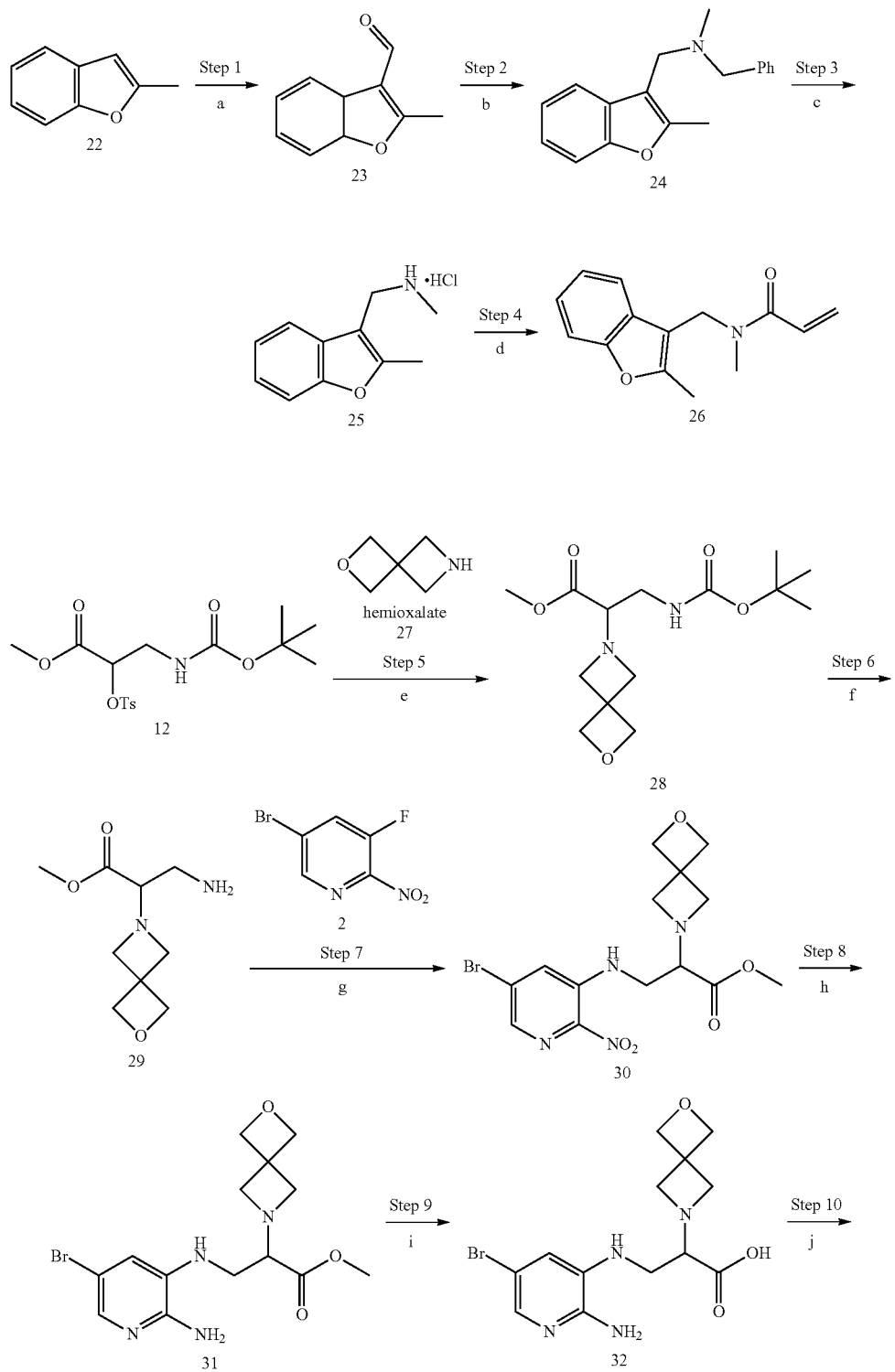

-continued

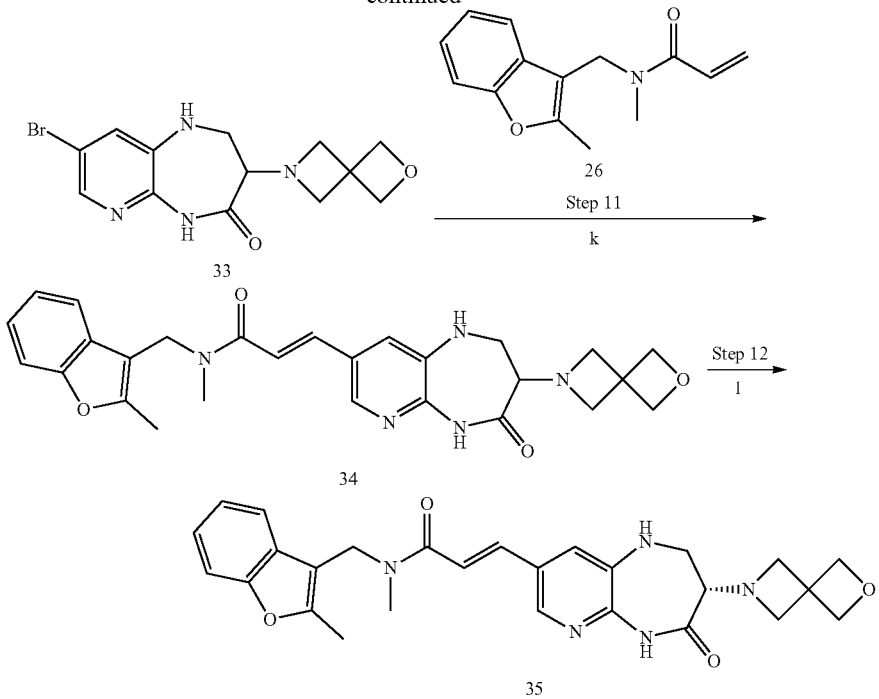

Reaction conditions: a) Cl$_2$CHOMe, TiCl$_4$, DCM; b) PhCH$_2$NHMe, Na(OAc)$_3$BH, DCE; c) Pd/C, H$_2$, MeOH, Aq. HCl; d) acryloyl chloride, TEA, THF; e) K$_2$CO$_3$, 50° C.; f) TFA, 0°C.; g) THF, K$_2$CO$_3$, reflux; h) Fe, AcOH, 90° C.; i) LiOH, THF:H$_2$O, RT; j) HATU, Hunig's base, DMF; RT; k) Pd-162, Bu$_4$NCl, Cy$_2$NMe, 80° C.; l) Chiralpak IA, 20% EtOH in 4:1 i-hexane + 0.2% Et$_2$NH:CHCl$_3$ Step 1. 2-Methylbenzofuran-3-carbaldehyde (compound 23). To a solution of dichloro(methoxy)methane (5.1 mL, 56.7 mmol) and 2-methylbenzofuran 22 (5.0 g, 37.8 mmol) in DCM (100 mL) stirred at 0° C. was added dropwise tin (IV) chloride (1M in DCM) (60.5 mL, 60.5 mmol) over 30 mins. Upon completion of addition the mixture was allowed to warm to RT over 30 mins, then poured onto ice cold saturated sodium hydrogen carbonate solution (500 mL). The mixture was extracted into DCM (2×100 ml) and the organics separated and dried. Filtration and evaporation gave the crude product which was purified by silica chromatography (0-50% EtOAc/isohexane) to afford the title compound 23 as a yellow solid (5.30 g, 86%). $^1$H NMR (400 MHZ, CDCl$_3$): δ, ppm 10.16 (s, 1H), 8.06-8.01 (m, 1H), 7.41-7.35 (m, 1H), 7.34-7.23 (m, 2H), 2.70 (s, 3H).

Step 2. N-Benzyl-N-methyl-1-(2-methylbenzofuran-3-yl) methanamine (compound 24). To a solution of 2-methylbenzofuran-3-carbaldehyde 23 (1.00 g, 6.24 mmol) and N-methyl-1-phenylmethanamine (0.98 mL, 7.49 mmol) in DCE (20 mL) was added sodium triacetoxyborohydride (1.99 g, 9.37 mmol) and the mixture stirred for 72 hours. The reaction mixture was washed with saturated sodium bicarbonate solution (20 mL) and dried over sodium sulfate. Filtration and evaporation gave the title compound 24 as a pale yellow oil (1.60 g, 94% yield) which was used without further purification. $^1$H NMR (400 MHZ, DMSO-d$_6$): δ, ppm 7.63-7.58 (m, 1H), 7.48-7.43 (m, 1H), 7.33 (d, J=4.8 Hz, 4H), 7.28-7.20 (m, 3H), 3.56 (s, 2H), 3.52 (s, 2H), 2.42 (s, 3H), 2.08 (s, 3H).

Step 3. N-Methyl-1-(2-methylbenzofuran-3-yl) methanamine hydrochloride (compound 25). A mixture of N-benzyl-N-methyl-1-(2-methylbenzofuran-3-yl) methanamine 24 (1.60 g, 6.03 mmol) and Pd-C 87L 5% on carbon (0.64 g, 6.03 mmol) in methanol (20 mL) acidified to pH 1 with 1M hydrochloric acid was hydrogenated at 5 bar and left to stir at RT for 18 hours. The catalyst was removed by filtration and the filtrate evaporated to dryness to give the title compound 25 as a white solid (737 mg, 56%). $^1$H NMR (400 MHZ, DMSO-d$_6$): δ, ppm 9.24 (s, 2H), 7.89-7.80 (m, 1H), 7.59-7.49 (m, 1H), 7.34-7.23 (m, 2H), 4.24 (s, 2H), 2.57 (s, 3H), 2.55 (s, 3H).

Step 4. N-Methyl-N-((2-methylbenzofuran-3-yl)methyl) acrylamide (compound 26). To a suspension of N-methyl-1-(2-methylbenzofuran-3-yl) methanamine hydrochloride 25 (300 mg, 1.42 mmol) and triethylamine (600 μL, 4.25 mmol) in dry THF (10 mL) was added acryloyl chloride (154 mg, 1.70 mmol) dropwise at RT over 15 mins. The mixture was allowed to stir for 1 hour and then poured onto water (30 mL). The organic solvent was removed by rotary evaporation to give a solid. This solid was collected by filtration, washed with water (10 mL) and dried to give the title compound 26 (316 mg, 95%) as a colourless solid. R$^t$ 1.94 min (Method 1b) m/z 230 [M+H]$^+$ (ES$^+$).

Step 5. Methyl 3-((tert-butoxycarbonyl)amino)-2-(2-oxa-6-azaspiro[3.3]heptan-6-yl) propanoate (compound 28). To a stirred solution of methyl 3-((tert-butoxycarbonyl)amino)-2-(tosyloxy) propanoate 12 (1 g, 2.7 mmol) in MeCN (4 mL) was added 2-oxa-6-azaspiro [3.3]heptane (hemioxalate) 27 (0.40 g, 4.0 mmol) followed by K$_2$CO$_3$ (1.1 g, 8.0 mmol). The reaction mixture was stirred at 50° C. overnight. The reaction mixture was allowed to cool to room temperature. The solvent was removed in vacuo. The crude product was purified by silica chromatography (0-100% EtOAc/isohexane) to afford the title compound 28 as a colourless oil (0.33 g, 42%). $^1$H NMR (400 MHZ, CDCl$_3$): δ, ppm 5.04 (dd, J=9.5 Hz, 5.4 Hz, 1H), 4.75 (s, 3H), 3.93-3.61 (m, 8H), 3.53-3.41 (m, 1H), 3.34-3.15 (m, 2H), 1.42 (s, 9H).

Step 6. Methyl 3-amino-2-(2-oxa-6-azaspiro[3.3]heptan-6-yl) propanoate (compound 29). To a stirred solution of methyl 3-((tert-butoxycarbonyl)amino)-2-(2-oxa-6-azaspiro[3.3]heptan-6-yl) propanoate 28 (0.33 g, 1.11 mmol) in DCM (2 mL) was added 2,2,2-trifluoroacetic acid (2 mL) at 0° C. The reaction mixture was stirred for 30 min at 0° C. and allowed to warm to room temperature and stirred for 1 h. The solvent was removed in vacuo and the resulting oil was taken up in MeOH (10 mL) and applied to an SCX column. The column was washed with methanol (20 mL) and the product eluted with 10% methanolic ammonia (20 mL) and afforded the title compound 29 as a colourless oil (0.16 g, 72%). $^1$H NMR (400 MHz, CDCl$_3$): δ, ppm 4.79-4.69 (m, 4H), 3.80-3.69 (m, 4H), 3.60-3.44 (m, 4H), 3.09 (t, J=4.9 Hz, 1H), 2.97-2.92 (m, 1H).

Step 7. Methyl 3-((5-bromo-2-nitropyridin-3-yl)amino)-2-(2-oxa-6-azaspiro[3.3]heptan-6-yl) propanoate (compound 30). To a stirred solution of 5-bromo-3-fluoro-2-nitropyridine 2 (62.3 mg, 0.28 mmol) in THF (4 mL) was added methyl 3-amino-2-(2-oxa-6-azaspiro[3.3]heptan-6-yl) propanoate 29 (0.16 g, 0.8 mmol) followed by potassium carbonate (0.22 g, 1.61 mmol). The reaction mixture was stirred at reflux for 1 h. The reaction mixture was allowed to cool to room temperature. The solvent was removed in vacuo. The residue was dissolved in H$_2$O (10 mL) and EtOAc (10 mL) was added. The aqueous phase was separated, and extracted with EtOAc (2×10 mL). The combined organic phases were washed with brine (10 mL), passed through a phase separator, and concentrated in vacuo. The crude product was purified by silica chromatography (0-100% EtOAc/isohexane) to afford the title compound 30 as a yellow solid (0.15 g, 45%). R$^t$ 0.90 min (Method 1a) m/z 401/403 [M+H]$^+$ (ES$^+$). $^1$H NMR (400 MHZ, DMSO-d$_6$): δ, ppm 7.98 (t, J=5.2 Hz, 1H), 7.94 (d, J=2.0 Hz, 1H), 7.91 (d, J=1.8 Hz, 1H), 4.63-4.58 (m, 4H), 3.63 (s, 3H), 3.55-3.41 (m, 7H).

Step 8. Methyl 3-((2-amino-5-bromopyridin-3-yl)amino)-2-(2-oxa-6-azaspiro[3.3]heptan-6-yl) propanoate (compound 31). To a stirred solution of methyl 3-((5-bromo-2-nitropyridin-3-yl)amino)-2-(2-oxa-6-azaspiro[3.3]heptan-6-yl) propanoate 30 (0.15 g, 0.36 mmol) in EtOH (3 mL) was added acetic acid (0.42 mL, 7.28 mmol) followed by iron powder (0.20 g, 3.64 mmol). The reaction mixture was stirred at 90° C. for 30 min. The reaction mixture was allowed to cool to room temperature and neutralised to pH 8 with solid NaHCO$_3$. The resulting reaction mixture was diluted with H$_2$O (5 mL) and EtOAc (5 ml). The aqueous phase was separated, and extracted with EtOAc (2×5 mL). The combined organic phases were washed with H$_2$O (5 mL), passed through a hydrophobic frit, and concentrated in vacuo to afford the title compound 31 as a brown solid (0.13 g, 96%). R$^t$ 0.15 min (Method 2a) m/z 371/373 [M+H]$^+$ (ES$^+$).

Step 9. 3-((2-Amino-5-bromopyridin-3-yl)amino)-2-(2-oxa-6-azaspiro[3.3]heptan-6-yl) propanoic acid (compound 32). To a stirred solution of methyl 3-((2-amino-5-bromopyridin-3-yl)amino)-2-((2S,6R)-2,6-dimethylmorpholino)propanoate 31 (0.13 g, 0.35 mmol) in THF (0.5 mL) was added a solution of LiOH (42 mg, 1.75 mmol) in H$_2$O (0.5 mL). The reaction mixture was stirred at room temperature for 30 min. The solvent was evaporated to dryness to give the title compound 32 (0.13 g, 0.35 mmol) as a white solid, which was used in the next step without further purification. R$^t$ 0.15 min (Method 2a) m/z 357/359 [M+H]$^+$ (ES$^+$).

Step 10. 8-Bromo-3-(2-oxa-6-azaspiro[3.3]heptan-6-yl)-1,2,3,5-tetrahydro-4H-pyrido[2,3-b][1,4]diazepin-4-one (compound 33). To a stirred solution of 3-((2-amino-5-bromopyridin-3-yl) amino)-2-(2-oxa-6-azaspiro[3.3]heptan-6-yl) propanoic acid 32 (0.13 g, 0.35 mmol) in DMF (2 mL) was added DIPEA (0.18 mL, 1.05 mmol) followed by HATU (0.2 g, 0.53 mmol). The reaction mixture was stirred at room temperature for 1 h. Water (2 mL) was added, the aqueous phase was separated, and extracted with DCM (2×5 mL). The combined organic phases were washed with H$_2$O (3×5 mL), passed through a hydrophobic frit, and concentrated in vacuo to afford the title compound 33 as a yellow solid (0.06 g, 52%). R$^t$ 0.26 min (Method 2a) m/z 339/341 [M+H]$^+$ (ES$^+$). $^1$H NMR (400 MHZ, DMSO-d$_6$): δ, ppm 9.82 (s, 1H), 7.66 (d, J=2.1 Hz, 1H), 7.21 (d, J=2.1 Hz, 1H), 6.31 (t, J=4.4 Hz, 1H), 4.55 (s, 4H), 3.43-3.35 (m, 4H), 3.29 (ddd, J=12.7 Hz, 5.2 Hz, 2.3 Hz, 1H), 3.25-3.17 (m, 1H), 3.12 (dd, J=7.7 Hz, 2.2 Hz, 1H).

Step 11. (E)-N-Methyl-N-((2-methylbenzofuran-3-yl)methyl)-3-(4-oxo-3-(2-oxa-6-azaspiro[3.3]heptan-6-yl)-2,3,4,5-tetrahydro-1H-pyrido[2,3-b][1,4]diazepin-8-yl)acrylamide (compound 34). A reaction vial was charged with N-methyl-N-((2-methylbenzofuran-3-yl)methyl)acrylamide 26 (42 mg, 0.18 mmol), 8-bromo-3-(2-oxa-6-azaspiro[3.3]heptan-6-yl)-1,2,3,5-tetrahydro-4H-pyrido[2,3-b][1,4]diazepin-4-one 33 (0.06 g, 0.18 mmol), tetrabutylammonium chloride hydrate (5 mg, 0.02 mmol), [P(tBu)$_3$]Pd(crotyl)Cl (Pd-162) (7 mg, 0.02 mmol). The vial was flushed with nitrogen for 5 mins. 1,4-Dioxane (3 mL) and N-cyclohexyl-N-methylcyclohexanamine (0.08 mL, 0.37 mmol) were added and the reaction mixture was purged with nitrogen for a further 5 mins. The mixture was heated to 80° C. for 1 h and allowed to cool to room temperature. The solvent was evaporated to dryness. The residue was taken up in EtOAc (5 mL) and H$_2$O (5 mL) was added. The aqueous phase was separated and extracted with EtOAc (2×5 mL). The combined organic phases were passed through a phase separator and concentrated in vacuo. The crude product was purified by silica chromatography (0-10% MeOH/DCM) to afford the title compound 34 as a racemic mixture (yellow solid).

Step 12. (S,E)-N-Methyl-N-((2-methylbenzofuran-3-yl)methyl)-3-(4-oxo-3-(2-oxa-6-azaspiro[3.3]heptan-6-yl)-2,3,4,5-tetrahydro-1H-pyrido[2,3-b][1,4]diazepin-8-yl)acrylamide (compound 35). The enantiomers were separated by chiral prep HPLC using Method Ia. Chirality of 35 was arbitrarily assigned. The title first eluting isomer (25 mg, 26%) was isolated. R$^t$ 019 min (Method IIa) min R$^t$ 0.85 min (Method 2a) m/z 488 [M+H]$^+$ (ES$^+$). $^1$H NMR (400 MHZ, DMSO-d$_6$): δ, ppm 9.22 (s, 1H), 7.95 (d, J=2.0 Hz, 1H), 7.54 (d, J=7.6 Hz, 1H), 7.50-7.41 (m, 2H), 7.32 (d, J=2.0 Hz, 1H), 7.25-7.16 (m, 2H), 7.12-7.04 (m, 1H), 5.73 (s, 1H), 4.77 (s, 2H), 4.56 (s, 4H), 3.47-3.41 (m, 4H), 3.35 (ddd, J=12.7 Hz, 4.8 Hz, 2.5 Hz, 1H), 3.27-3.19 (m, 1H), 3.15 (dd, J=7.5 Hz, 2.5 Hz, 1H), 3.00 (s, 3H), 2.88 (s, 3H).

Example 4. Synthesis of (E)-3-(3-acetamido-4-oxo-2,3,4,5-tetrahydro-1H-pyrido[2,3-b][1,4]diazepin-8-yl)-N-methyl-N-((3-methylbenzofuran-2-yl)methyl)acrylamide (compound 42)

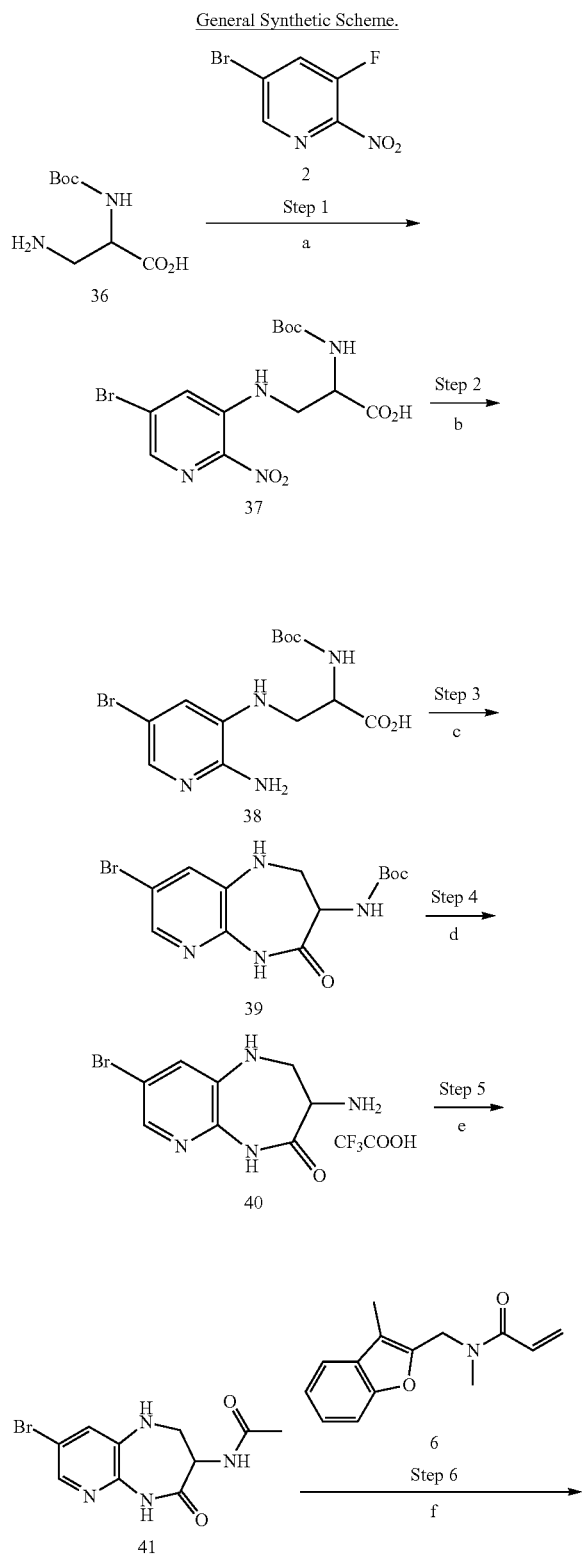

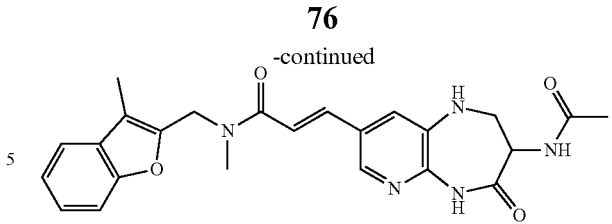

Reaction conditions: a) TEA, EtOH, reflux; b) Fe, NH₄Cl, EtOH, H₂O, reflux; c) HATU, DIPEA, DMF; d) TFA, DCM; e) AcCl, TEA, 0°C. to RT; f) Pd-162, NCy₂Me, Bu₄NCl, 1,4-dioxane, 80° C.

Step 1. 3-((5-Bromo-2-nitropyridin-3-yl)amino)-2-((tert-butoxycarbonyl)amino)propanoic acid (compound 37). A mixture of 3-amino-2-((tert-butoxycarbonyl)amino)propanoic acid 36 (0.51 g, 2.49 mmol), triethylamine (1.60 mL, 11.2 mmol) and 5-bromo-3-fluoro-2-nitropyridine 2 (0.5 g, 2.26 mmol) in EtOH (50 mL) was heated under reflux for 2 h. The reaction mixture was evaporated to dryness and the residue taken up into water (20 mL). The mixture was acidified to pH 3 by the addition of a solution of 1M HCl. The aqueous was extracted with ethyl acetate (2×20 mL) and the organic phases were combined, dried over sodium sulfate, filtered and concentrated in vacuo to afford the title compound 37 as a yellow solid (0.87 g, 90%). R$^t$ 1.88 min (Method 1a) m/z 403/405 [M−H]⁻ (ES⁻).

Step 2. 3-((2-Amino-5-bromopyridin-3-yl)amino)-2-((tert-butoxycarbonyl)amino)propanoic acid (compound 38). A mixture of 3-((5-bromo-2-nitropyridin-3-yl)amino)-2-((tert-butoxycarbonyl)amino)propanoic acid 37 (0.87 g, 2.15 mmol), iron powder (0.48 g, 8.59 mmol) and ammonium chloride (1.15 g, 21.5 mmol) in a solvent mixture of EtOH (80 mL) and water (20 mL) was heated and stirred under reflux for 1 h. The reaction mixture was filtered through a plug of Celite® while hot and the filtrate evaporated to dryness. The residue was triturated with water (30 mL) and the resulting solid was collected and dried to afford the title compound 38 as a buff solid (0.44 g, 52%). Rt 0.83 min (Method 2a) m/z 375/377 [M+H]⁺ (ES⁺). ¹H NMR (DMSO-d₆): δ, ppm 12.77 (s, 1H), 7.33 (d, J=2.1 Hz, 1H), 7.14 (d, J=8.7 Hz, 1H), 6.73 (d, J=2.1 Hz, 1H), 5.72 (s, 2H), 5.11 (s, 1H), 4.23-4.17 (m, 1H), 3.36 (d, J=5.7 Hz, 2H), 1.39 (s, 9H).

Step 3. tert-Butyl (8-bromo-4-oxo-2,3,4,5-tetrahydro-1H-pyrido[2,3-b][1,4]diazepin-3-yl)carbamate (compound 39). To a solution of 3-((2-amino-5-bromopyridin-3-yl)amino)-2-((tert-butoxycarbonyl)amino)propanoic acid 38 (0.44 g, 1.17 mmol) and DIPEA (0.61 mL, 3.52 mmol) in DMF (8.0 mL) was added HATU (0.54 g, 1.40 mmol). The reaction mixture was stirred at RT for 1 h, then was diluted with water (50 mL). The resulting solid was collected and purified by chromatography (0-50% EtOAc/isohexane) to afford the title compound 39 as a white solid (0.37 g, 85%). R$^t$ 1.79 min (Method 1a) m/z 355/357 [M−H]⁻ (ES⁻).

Step 4. 3-Amino-8-bromo-2,3-dihydro-1H-pyrido[2,3-b][1,4]diazepin-4 (5H)-one 2,2,2-trifluoroacetate (compound 40). tert-Butyl (8-bromo-4-oxo-2,3,4,5-tetrahydro-1H-pyrido[2,3-b][1,4]diazepin-3-yl)carbamate 39 (365 mg, 1.02 mmol) was dissolved in a mixture of TFA (5.0 mL) and DCM (5.0 mL) and allowed to stand at RT for 20 mins. The mixture was evaporated to dryness and the residue triturated with acetonitrile (10 mL). The resulting solid was collected by filtration and dried in vacuo to give the title compound 40 as a white solid (0.31 g, 78%). R$^t$ 0.95 min (Method 1a) m/z 257/259 [M+H]$^+$ (ES$^+$). 1H NMR (DMSO-d$_6$): δ, ppm 10.67 (s, 1H), 8.42 (s, 3H), 7.82 (d, J=2.1 Hz, 1H), 7.37 (d, J=2.1 Hz, 1H), 6.68 (dd, J=7.1, 1.8 Hz, 1H), 4.27 (dd, J=10.0, 3.0 Hz, 1H), 3.60 (ddd, J=12.3, 7.1, 3.1 Hz, 1H), 3.44 (ddd, J=11.9, 10.0, 1.7 Hz, 1H).

Step 5. N-(8-Bromo-4-oxo-2,3,4,5-tetrahydro-1H-pyrido[2,3-b][1,4]diazepin-3-yl) acetamide (compound 41). To an ice cooled suspension of 3-amino-8-bromo-2,3-dihydro-1H-pyrido[2,3-b][1,4]diazepin-4(5H)-one 2,2,2-trifluoroacetate 40 (310 mg, 0.64 mmol) in DCM (20 mL) was added TEA (445 µL, 3.20 mmol) and to this mixture was added dropwise a solution of acetyl chloride (45 µL, 0.64 mmol) in DCM (1.0 mL). Upon completion of addition the mixture was allowed to warm to RT and then was washed with water (20 ml). The organics were separated and dried over sodium sulfate. The crude product was purified by chromatography on silica gel (0-10% MeOH/DCM) to give the title compound 41 as a brown solid (69 mg, 33%). R$^t$ 1.05 min (Method 1a) m/z 299/301 (M+H)$^+$ (ES$^+$); 297/299 [M−H]$^−$ (ES$^−$). $^1$H NMR (DMSO-d$_6$): δ, ppm 10.20 (s, 1H), 8.18 (d, J=7.3 Hz, 1H), 7.79 (d, J=2.1 Hz, 1H), 7.35 (d, J=2.2 Hz, 1H), 6.41 (d, J=6.3 Hz, 1H), 4.44 (ddd, J=10.4, 7.3, 3.3 Hz, 1H), 3.46 (ddd, J=11.7, 6.6, 3.4 Hz, 1H), 3.31 (ddd, J=11.7, 10.0, 1.5 Hz, 1H), 1.89 (s, 3H).

Step 6. (E)-3-(3-Acetamido-4-oxo-2,3,4,5-tetrahydro-1H-pyrido[2,3-b][1,4]diazepin-8-yl)-N-methyl-N-((3-methylbenzofuran-2-yl)methyl)acrylamide (compound 42). A reaction vial was charged with N-methyl-N-((3-methylbenzofuran-2-yl)methyl)acrylamide 6 (42 mg, 0.18 mmol), N-(8-bromo-4-oxo-2,3,4,5-tetrahydro-1H-pyrido[2,3-b][1,4]diazepin-3-yl) acetamide 41 (55 mg, 0.18 mmol), NBu$_4$Cl (5 mg, 0.02 mmol) and [P(tBu)$_3$]Pd(crotyl)Cl (Pd-162) (7 mg, 0.02 mmol) and the vial was flushed with N$_2$ (5 mins). 1,4-Dioxane (5.0 mL) and N-cyclohexyl-N-methylcyclohexanamine (79 µL, 0.37 mmol) were then added and the reaction mixture was purged again with N$_2$ (5 mins), then the mixture was heated to 80° C. for 1 h. The mixture was allowed to cool to RT and the precipitate was collected by filtration and washed with 1,4-dioxane (2.0 mL). The crude product was purified by chromatography (0-10% MeOH/DCM) to give the title compound 42 as a yellow solid (34 mg, 40%). R$^t$ 1.71 min (Method 1a) m/z 448 [M+H]$^+$ (ES$^+$). $^1$H NMR (DMSO-d$_6$, 363 K): δ, ppm 9.68 (s, 1H), δ 8.05 (d, J=1.9 Hz, 1H), 7.86-7.79 (m, 1H), 7.56 (dd, J=7.8, 1.3 Hz, 1H), 7.50-7.42 (m, 3H), 7.31-7.24 (m, 2H), 7.15 (d, J=15.1 Hz, 1H), 5.93 (dd, J=6.5, 2.3 Hz, 1H), 4.85 (s, 2H), 4.50 (ddd, J=10.3, 7.3, 3.5 Hz, 1H), 3.56-3.50 (m, 1H), 3.32 (ddd, J=11.9, 9.6, 2.3 Hz, 1H), 3.10 (s, 3H), 2.28 (s, 3H), 1.91 (s, 3H).

Example 5. Synthesis of (E)-3-((2R,3S)-3-amino-2-methyl-4-oxo-2,3,4,5-tetrahydro-1H-pyrido[2,3-b][1,4]diazepin-8-yl)-N-methyl-N-((3-methylbenzofuran-2-yl)methyl)acrylamide (compound 52)

General Synthetic Scheme.

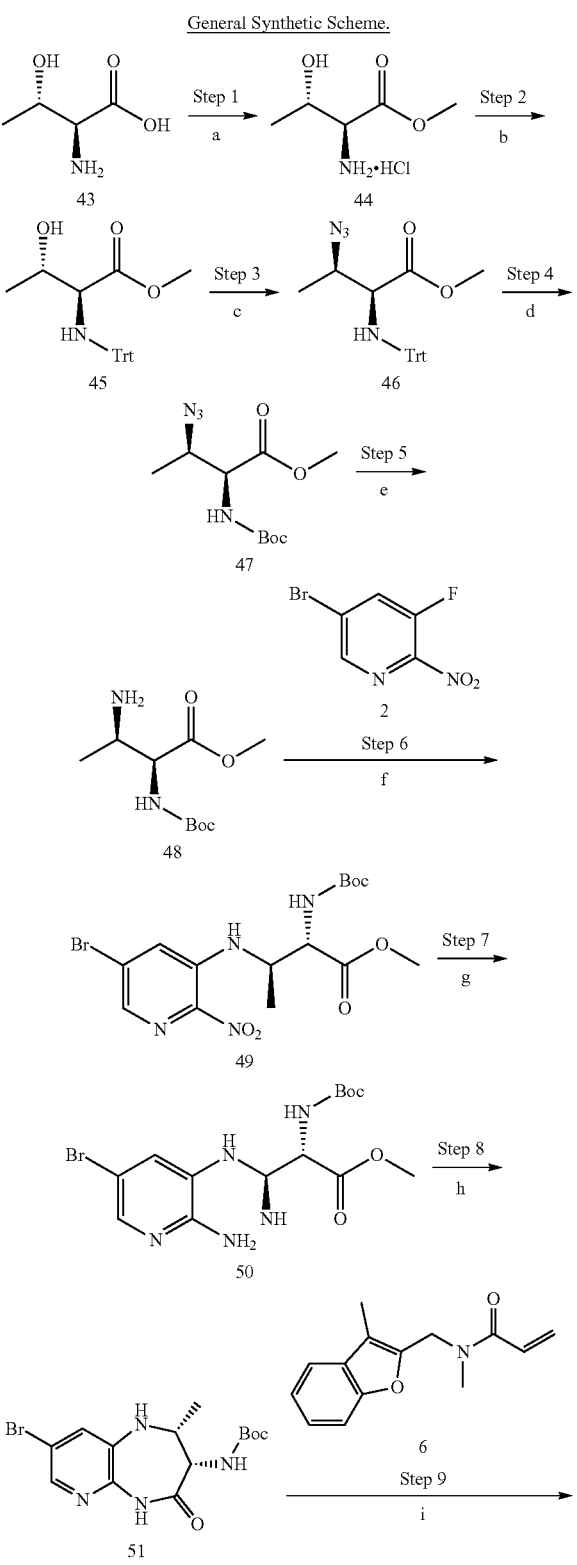

-continued

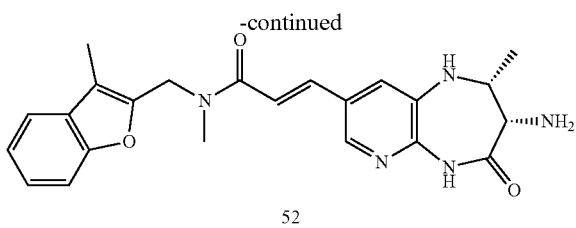

52

Reaction conditions: a) SOCl₂, MeOH, 0° C. to 65%; b) Trt-Cl, NEt₃, DCM, 0° C. to RT; c) DIAD, PPh₃, DPPA, THF, 0°C. to RT; d) i) 1M HCl, THF, 0° C. to RT; ii) Boc₂O, NEt₃, DCM; e) PPh₃, H₂O, THF, 60° C.; f) NEt₃, MeCN, 80° C.; g) Fe, NH₄Cl, EtOH, H₂O, 90° C.; h) NaH, DMF, 0° C. to RT; i) i) Pd-116, DIPEA, 1,4-Dioxane, 90° C.; ii) TFA, DCM.

Step 1. (2S,3S)-Methyl 2-amino-3-hydroxybutanoate hydrochloride (compound 44). Thionyl chloride (1.9 mL, 26.4 mmol) was added dropwise to a stirred suspension of (2S,3S)-2-amino-3-hydroxybutanoic acid 43 (3 g, 25.2 mmol) in MeOH (20 mL) at 0° C. and the reaction mixture was allowed to return to RT and was stirred for 30 mins. The reaction mixture was then heated to reflux for 1 h. The reaction was allowed to cool to RT and was concentrated in vacuo. The residue was azeotroped with MTBE (50 mL) and the resulting white gummy solid 44 (4.99 g, quant) was used in the next step without further purification. $^1$H NMR (500 MHZ, D₂O) δ 4.36 (qd, J=6.7, 3.4 Hz, 1H), 4.23 (d, J=3.5 Hz, 1H), 3.88 (s, 3H), 1.32 (d, J=6.7 Hz, 3H). Exchangeable protons not observed.

Step 2. (2S,3S)-Methyl 3-hydroxy-2-(tritylamino)butanoate (compound 45). TEA (5.3 mL, 37.8 mmol) was added dropwise to a stirred suspension of (2S,3S)-methyl 2-amino-3-hydroxybutanoate hydrochloride 44 (4.27 g, 25.2 mmol) in DCM (30 mL) at 0° C. and the reaction mixture was stirred for 5 min. A solution of trityl chloride (7.4 g, 26.5 mmol) in DCM (30 mL) was then added and the reaction was allowed to return to RT and was stirred for 72 h. The reaction mixture was filtered and the filtrate was washed with NaHCO₃ (100 mL, Sat Aq). The aqueous layer was extracted with DCM (3×100 mL) and the combined organic extracts were washed with Brine (1×100 mL), dried using a phase separation cartridge and concentrated in vacuo. The crude material was purified by column chromatography (0-50% EtOAc/isohexane) to give the desired product 45 as a white solid (3.55 g, 37%).

$R^t$ 2.52 min (Method 1a) m/z 398 (M+Na)⁺ (ES⁺); $^1$H NMR (500 MHZ, DMSO-d₆) δ δ 7.49-7.40 (m, 6H), 7.31-7.24 (m, 6H), 7.21-7.15 (m, 3H), 4.96 (d, J=5.1 Hz, 1H), 3.89-3.76 (m, 1H), 3.11 (dd, J=10.7, 4.1 Hz, 1H), 3.08 (s, 3H), 2.89 (d, J=10.7 Hz, 1H), 1.07 (d, J=6.4 Hz, 3H).

Step 3. (2S,3R)-Methyl 3-azido-2-(tritylamino)butanoate (compound 46). A solution of DIAD (2.90 mL, 14.9 mmol) in THF (20 mL) was added dropwise to a stirred solution of (2S,3S)-methyl 3-hydroxy-2-(tritylamino)butanoate 45 (3.5 g, 9.32 mmol) and triphenylphosphine (3.67 g, 14.0 mmol) in THF (45 mL) at 0° C. and the reaction mixture was stirred for 5 min. A solution of diphenyl phosphorazidate (3.3 mL, 15.4 mmol) in THF (30 mL) was then added and the reaction was allowed to return to RT and was stirred for ~16 h. The reaction mixture was concentrated in vacuo and purified by column chromatography (0-15% EtOAc/isohexane) to give the desired product 46 as a colourless oil (2.05 g, 47%). $R^t$ 2.69 min (Method 1a) m/z 423 (M+Na)+ (ES⁺); $^1$H NMR (500 MHZ, DMSO-d₆) δ 7.46-7.39 (m, 6H), 7.32-7.26 (m, 6H), 7.24-7.16 (m, 3H), 3.90 (p, J=6.6 Hz, 1H), 3.30-3.26 (m, 1H), 3.10 (s, 3H), 1.11 (d, J=6.2 Hz, 3H). Amine proton not observed.

Step 4. (2S,3R)-Methyl 3-azido-2-((tert-butoxycarbonyl)amino)butanoate (compound 47). HCl (4.12 mL, 16.5 mmol, 4M in Dioxane) was added dropwise to a stirred solution of (2S,3R)-methyl 3-azido-2-(tritylamino)butanoate 46 (0.66 g, 1.65 mmol) in THF (10 mL) at 0° C. and the reaction was stirred for 2 h. The solvent was concentrated in vacuo and the resulting solid was triturated with MTBE (10 mL) and collected by filtration to give a fluffy white solid (0.35 g, quant). The intermediate was suspended in DCM (10 mL) and triethylamine (0.69 mL, 4.94 mmol) followed by Boc₂O (0.36 g, 1.65 mmol) were added and the reaction mixture was stirred for ~16 h. The reaction mixture was concentrated in vacuo and purified by column chromatography (0-100% EtOAc/isohexane) to give the desired product 47 as a colourless oil (0.32 g, 72%). $^1$H NMR (500 MHZ, DMSO-d₆) δ 7.37 (d, J=8.9 Hz, 1H), 4.18 (dd, J=8.9, 4.9 Hz, 1H), 4.12-3.97 (m, 1H), 3.66 (s, 3H), 1.39 (s, 9H), 1.19 (d, J=6.6 Hz, 3H).

Step 5. (2S,3R)-Methyl 3-amino-2-((tert-butoxycarbonyl)amino)butanoate (compound 48). Triphenylphosphine (0.65 g, 2.48 mmol) and water (0.09 mL, 4.96 mmol) were added to a stirred solution of (2S,3R)-methyl 3-azido-2-((tert-butoxycarbonyl)amino)butanoate 47 (0.32 g, 1.24 mmol) in THF (10 mL) and the reaction mixture was heated to 60° C. and stirred for ~16 h. The reaction mixture was allowed to cool to RT, then NaHCO₃ (40 mL, Sat Aq) was added and the aqueous mixture was extracted with EtOAc (3×40 mL). The combined organic extracts were washed with Brine (1×40 mL), dried using MgSO₄, concentrated in vacuo and applied to a SCX column. The SCX column was washed with MeOH (30 mL) and the product was eluted with methanolic ammonia and concentrated in vacuo to give the desired product 48 as a colourless oil (0.24 g, 78%). $^1$H NMR (500 MHZ, DMSO-d₆) δ 6.97 (d, J=8.4 Hz, 1H), 3.88 (dd, J=8.4, 4.6 Hz, 1H), 3.62 (s, 3H), 3.16-3.10 (m, 1H), 1.52 (s, 2H), 1.39 (s, 9H), 0.97 (d, J=6.6 Hz, 3H).

Step 6. (2S,3R)-Methyl 3-((5-bromo-2-nitropyridin-3-yl)amino)-2-((tert-butoxycarbonyl)amino)butanoate (compound 49). A mixture of 5-bromo-3-fluoro-2-nitropyridine 2 (0.22 g, 0.99 mmol), (2S,3R)-methyl 3-amino-2-((tert-butoxycarbonyl)amino)butanoate 48 (0.23 g, 0.99 mmol) and triethylamine (0.55 mL, 3.96 mmol) in a solvent of MeCN (5 mL) was stirred at 80° C. for 5 h and at RT for 3 days. The reaction mixture was concentrated in vacuo and purified by column chromatography (0-50% EtOAc/isohexane) to give the desired product 49 as a yellow oil (0.37 g, 82%).

$R^t$ 1.80 min (Method 1a) m/z 377/379 (M-tBu)+ (ES⁺); $^1$H NMR (500 MHZ, DMSO-d₆) δ 7.98 (d, J=1.9 Hz, 1H), 7.88 (d, J=1.8 Hz, 1H), 7.73 (d, J=9.4 Hz, 1H), 7.68 (d, J=8.3 Hz, 1H), 4.44-4.35 (m, 1H), 4.33 (dd, J=8.4, 5.2 Hz, 1H), 3.59 (s, 3H), 1.37 (s, 9H), 1.23 (d, J=6.5 Hz, 3H).

Step 7. (2S,3R)-Methyl 3-((2-amino-5-bromopyridin-3-yl)amino)-2-((tert-butoxycarbonyl)amino)butanoate (compound 50). A mixture of (2,3R)-methyl 3-((5-bromo-2-nitropyridin-3-yl)amino)-2-((tert-butoxycarbonyl)amino)butanoate 49 (0.37 g, 0.85 mmol), iron powder (0.38 g, 6.83 mmol) and NH₄Cl (0.18 g, 3.42 mmol) in a mixture of EtOH (10 mL) and H₂O (2.5 mL) was heated and stirred at 90° C. for 2 h. The reaction mixture was filtered through Celite®, the cake was washed with EtOH (50 mL) and the filtrate was concentrated in vacuo. The crude material was purified by column chromatography (0-100% EtOAc/iso-hexane) to give the desired product 50 as a brown oil (0.22 g, 52%). R$^t$ 1.43 min (Method 1a) m/z 403/405 (M+H)+ (ES$^+$); $^1$H NMR (500 MHZ, DMSO-d$_6$) δ 7.31 (d, J=2.0 Hz, 1H), 7.15 (d, J=9.3 Hz, 1H), 6.75 (d, J=2.1 Hz, 1H), 5.68 (s, 2H), 4.53 (d, J=9.7 Hz, 1H), 4.29 (dd, J=9.3, 3.8 Hz, 1H), 4.11-4.05 (m, 1H), 3.56 (s, 3H), 1.42 (s, 9H), 1.11 (d, J=6.5 Hz, 3H).

Step 8. tert-Butyl ((2R,3S)-8-bromo-2-methyl-4-oxo-2,3,4,5-tetrahydro-1H-pyrido[2,3-b][1,4]diazepin-3-yl)carbamate (compound 51). NaH (50 mg, 1.23 mmol, 60% in mineral oil) was added to a stirred solution of (2S,3R)-methyl 3-((2-amino-5-bromopyridin-3-yl)amino)-2-((tert-butoxycarbonyl)amino)butanoate 50 (0.17 g, 0.41 mmol) in DMF (5 mL) at 0° C. The reaction mixture was allowed to return to RT and was stirred for 1.5 h, then the reaction was quenched with water (50 mL). The resulting precipitate was collected by filtration to give the desired product as an off-white solid (72 mg, 47%). The aqueous filtrate was then extracted with EtOAc (3×100 mL) and the combined organic layers were washed with Brine (1×50 mL), dried with MgSO$_4$ and concentrated in vacuo. The crude material was purified by column chromatography (EtOAc/isohexane) to give a further portion of the desired product 51 as a white solid (36 mg, 23%). R$^t$ 1.91 min (Method 1a) m/z 315/317 (M-tBu)$^+$ (ES$^+$); $^1$H NMR (500 MHZ, DMSO-d$_6$) δ 10.29 (s, 1H), 7.77 (d, J=2.1 Hz, 1H), 7.32 (d, J=2.1 Hz, 1H), 6.82 (d, J=7.6 Hz, 1H), 6.47 (d, J=6.4 Hz, 1H), 4.38-4.26 (m, 1H), 3.83-3.69 (m, 1H), 1.38 (s, 9H), 1.10 (d, J=6.5 Hz, 3H).

Step 9. (E)-3-((2R,3S)-3-Amino-2-methyl-4-oxo-2,3,4,5-tetrahydro-1H-pyrido[2,3-b][1,4]diazepin-8-yl)-N-methyl-N-((3-methylbenzofuran-2-yl)methyl)acrylamide (compound 52). A mixture of N-methyl-N-((3-methylbenzofuran-2-yl)methyl)acrylamide 6 (43 mg, 0.19 mmol), tert-butyl ((2R,3S)-8-bromo-2-methyl-4-oxo-2,3,4,5-tetrahydro-1H-pyrido[2,3-b][1,4]diazepin-3-yl)carbamate 51 (70 g, 0.19 mmol) and Pd-116 (10 mg, 0.02 mmol) was evacuated and backfilled with N$_2$ three times. 1,4-Dioxane (2 mL) and DIPEA (0.10 mL, 0.57 mmol) were added and the reaction mixture was heated to 90° C. and stirred for 2 h. The reaction mixture was allowed to cool to RT, then H2O (20 mL) was added and the resulting precipitate was collected by filtration. The crude material was purified by column chromatography (0-10% MeOH/DCM) to give the intermediate product 52 as a yellow solid (63 mg, 63%). The solid was dissolved in DCM (2 mL) and TFA (1 mL) was added and the reaction mixture was stirred for 30 min at RT. The solvent was removed in vacuo and NaHCO$_3$ (20 mL, Sat Aq) was added and the resulting suspension was stirred for 1 h. The aqueous mixture was extracted with DCM/10% MeOH (3×30 mL) and the combined organic layers were washed with brine (1×30 mL), dried by passing through a phase separation cartridge and concentrated in vacuo. The crude material was purified by column chromatography (0-10% MeOH (0.7M NH$_3$)/DCM) to give the desired product 52 as a yellow solid (36 mg, 44%). R$^t$ 1.31 min (Method 1a) m/z 420 (M+H)$^+$ (ES$^+$); $^1$H NMR (500 MHz, DMSO-d$_6$, 363K) δ 9.53 (s, 1H), 7.99 (d, J=2.0 Hz, 1H), 7.58-7.53 (m, 1H), 7.48-7.38 (m, 3H), 7.31-7.22 (m, 2H), 7.11 (d, J=15.5 Hz, 1H), 5.80 (d, J=5.6 Hz, 1H), 4.84 (s, 2H), 3.73-3.66 (m, 1H), 3.63 (d, J=3.3 Hz, 1H), 3.09 (s, 3H), 2.27 (s, 3H), 1.79 (s, 2H), 1.11 (d, J=6.5 Hz, 3H).

Example 6. Synthesis of (E)-3-((2R,3S)-3-amino-2-methyl-4-oxo-2,3,4,5-tetrahydro-1H-pyrido[2,3-b][1,4]diazepin-8-yl)-N-((7-amino-2-methylbenzofuran-3-yl)methyl)-N-methylacrylamide (compound 62)

General Synthetic Scheme.

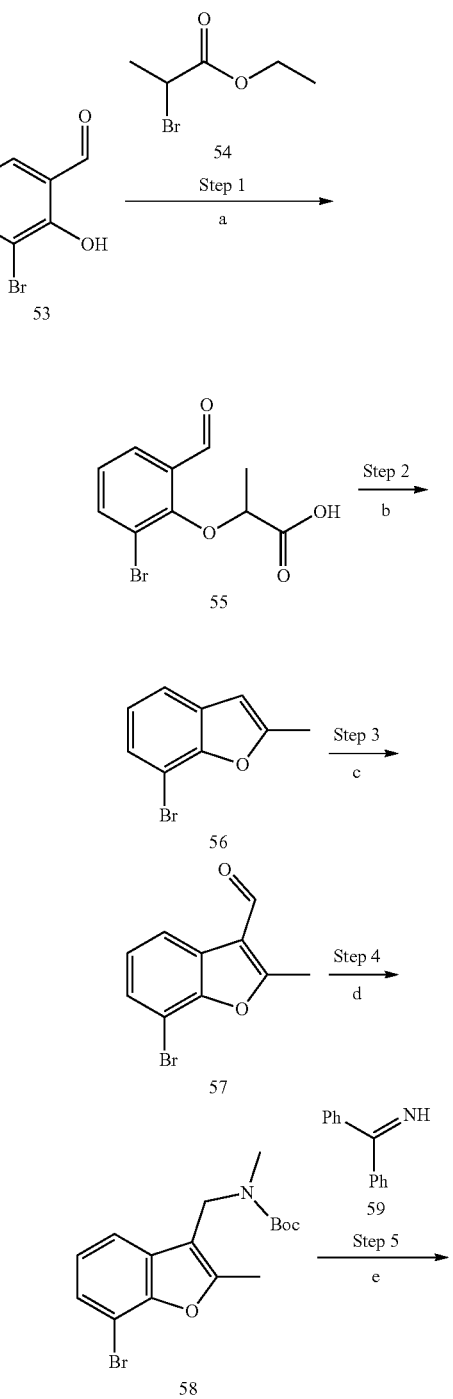

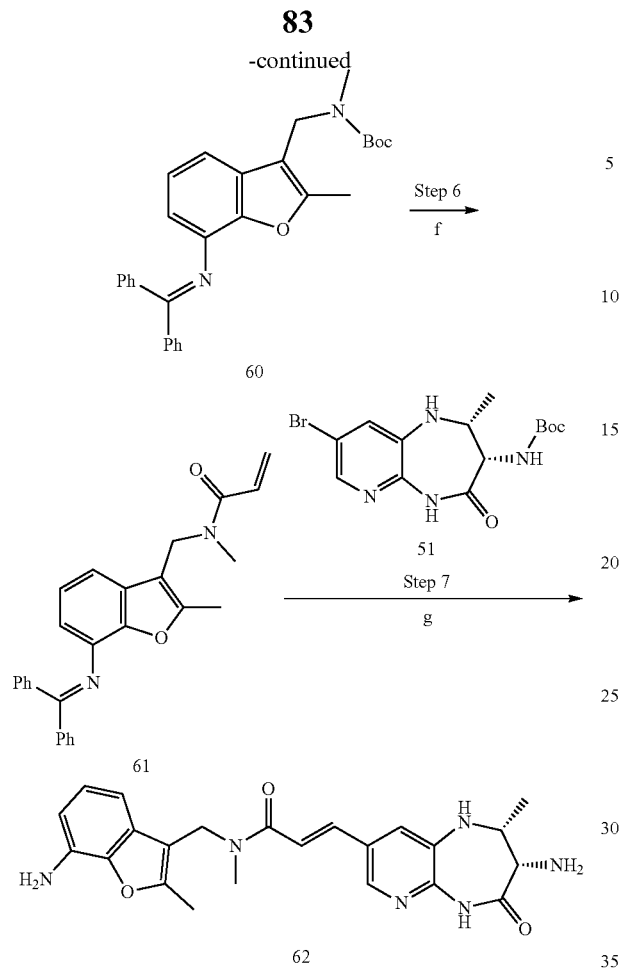

Reaction conditions: a) K$_2$CO$_3$, MeCN, reflux, then aq. NaOH, THF, reflux; b) NaOAc, Ac$_2$O, reflux; c) dichloro(methoxy)methane, SnCl$_4$ 1M in DCM, DCM, 0°C. to RT; d) i) NH$_2$Me, STAB, EtOH; ii) Boc$_2$O, DMAP, DCM; e) Pd$_2$(dba)$_3$, Xantphos, Cs$_2$CO$_3$, PhCH$_3$, 110° C.; f) i) TFA, DCM; ii) acryloyl chloride, TEA, DCM, 0° C. to RT; g) i) Pd-116, DIPEA, 1,4-Dioxane, 90° C.; ii) TFA, DCM; iii) HCl.

Step 1. 2-(2-Bromo-6-formylphenoxy) propanoic acid (compound 55). K$_2$CO$_3$ (13.8 g, 99 mmol) was added in one portion to a stirred solution of 3-bromo-2-hydroxybenzaldehyde 53 (10 g, 49.7 mmol) and ethyl 2-bromopropanoate 54 (5.9 mL, 45.2 mmol) in MeCN (80 mL) and the reaction was heated to reflux for 3 h. The reaction mixture was allowed to cool to RT, was filtered to remove K$_2$CO$_3$ and then concentrated in vacuo. The resulting residue was dissolved in THF (50 mL) and a solution of NaOH (2M in H$_2$O, 57 mL, 113 mmol) was added. The mixture was heated to reflux for 2 h, then cooled to RT and concentrated in vacuo. The remaining aqueous material was acidified to pH 1 by dropwise addition of concentrated HCl and the product precipitated. The product was collected by filtration and dried by azeotroping with MeCN (2×50 mL) to give the desired product 55 as an orange oil which crystallised on standing to give an off-white solid (13.5 g, 99% yield). R$^t$ 1.19 min (Method 2a) m/z 273/275 [M+H]$^+$ (ES$^+$). $^1$H NMR (400 MHZ, DMSO-d$_6$): δ, ppm 13.23 (s, 1H), 10.41 (d, J=0.8 Hz, 1H), 7.97 (dd, J=7.9, 1.7 Hz, 1H), 7.74 (dd, J=7.7, 1.7 Hz, 1H), 7.25 (td, J=7.8 Hz, 0.9 Hz, 1H), 4.93 (q, J=6.8 Hz, 1H), 1.60 (d, J=6.8 Hz, 3H).

Step 2. 7-Bromo-2-methylbenzofuran (compound 56). A mixture of 2-(2-bromo-6-formylphenoxy) propanoic acid 55 (13 g, 48 mmol) and sodium acetate (39 g, 48 mmol) in acetic anhydride (70 mL) was heated to reflux for 2 h. The mixture was allowed to cool to RT, then poured onto ice water (800 mL). The mixture was then extracted with DCM (3×300 mL) and the combined organic layers were washed with NaOH (2M aq, 2×200 mL) then brine (200 mL). The organic layer was dried by passing through a phase separator then concentrated in vacuo. The crude product was purified by column chromatography (5-10% EtOAc/isohexane) to give the desired product 56 as a colourless oil (6.72 g, 66% yield). R$^t$ 1.67 min (Method 2a) no m/z observed. $^1$H NMR (400 MHZ, DMSO-d$_6$): δ, ppm 7.53 (dd, J=7.7 Hz, 1.0 Hz, 1H), 7.43 (dd, J=7.8 Hz, 1.0 Hz, 1H), 7.13 (t, J=7.8 Hz, 1H), 6.71 (q, J=1.1 Hz, 1H), 2.48 (d, J=1.1 Hz, 3H).

Step 3. 7-Bromo-2-methylbenzofuran-3-carbaldehyde (compound 57). Tin (IV) chloride (38 mL, 38 mmol, 1M in DCM) was added dropwise over ~30 min to a stirred solution of dichloro(methoxy)methane (3.2 mL, 35 mmol) and 7-bromo-2-methylbenzofuran 56 (6.7 g, 32 mmol) in DCM (120 mL) at 0° C. The reaction was allowed to return to RT over ~90 mins then poured into ice cold saturated sodium hydrogen carbonate solution (500 mL). The organic material was separated and the aqueous phase was extracted again with DCM (3×150 mL). The combined organic layers were washed with brine (200 mL) then dried by passing through a phase separation cartridge and concentrated in vacuo. The crude material was purified by recrystallisation from EtOAc/Hexane (1:1) to yield the desired product 57 as a pale yellow solid (4.5 g, 59% yield). R$^t$ 1.48 min (Method 2a) m/z 239/241 [M+H]$^+$ (ES$^+$). $^1$H NMR (400 MHz, DMSO-d$_6$): δ, ppm 10.20 (s, 1H), 7.98 (dd, J=7.7 Hz, 1.1 Hz, 1H), 7.59 (dd, J=7.9 Hz, 1.1 Hz, 1H), 7.29 (t, J=7.8 Hz, 1H), 2.84 (s, 3H).

Step 4. tert-Butyl ((7-bromo-2-methylbenzofuran-3-yl)methyl)(methyl)carbamate (compound 58). Methanamine (33% in EtOH, 0.5 mL, 4.4 mmol) was added dropwise to a stirred solution of 7-bromo-2-methylbenzofuran-3-carbaldehyde 57 (2.8 g, 3.7 mmol) and sodium triacetoxyborohydride (STAB) (1.9 g, 9.2 mmol) in EtOH (100 mL) at 0° C. The reaction mixture was allowed to return to RT and stirred for 5 h. The reaction mixture was then concentrated in vacuo and the resulting residue was taken up in EtOAc (100 mL) and NaHCO$_3$(aq. sat. 100 mL). The organic material was separated and the aqueous phase was extracted with EtOAc (2×100 mL). The combined organic layers were washed with brine (100 mL), dried using MgSO$_4$ and concentrated in vacuo. The resulting residue was dissolved in DCM (80 mL), followed by addition of DMAP (0.6 g, 4.6 mmol) and di-tert-butyl dicarbonate (1.6 g, 7.3 mmol) and the reaction mixture was stirred at RT for 16 h. The crude reaction mixture was concentrated in vacuo and purified by column chromatography (0-50% EtOAc/isohexane) to afford the title compound 58 as a yellow oil which crystallised on standing (1.0 g, 69% yield). R$^t$ 1.86 min (Method 1a) m/z 376/378 [M+Na]$^+$ (ES$^+$). $^1$H NMR (400 MHZ, DMSO-d$_6$): δ, ppm 7.55 (br s, 1H), 7.46 (d, J=7.8 Hz, 1H), 7.17 (br s, 1H), 4.48 (s, 2H), 2.67 (s, 3H), 2.51 (s, 3H), 1.44 (s, 9H).

Step 5. tert-Butyl ((7-((diphenylmethylene)amino)-2-methylbenzofuran-3-yl)methyl)(methyl)carbamate (compound 60). tert-Butyl ((7-bromo-2-methylbenzofuran-3-yl)methyl)(methyl)carbamate 58 (2.0 g, 5.65 mmol), tris(dibenzylideneacetone) dipalladium (0.52 g, 0.57 mmol), $Cs_2CO_3$ (3.68 g, 11.3 mmol) and Xantphos (0.49 g, 0.85 mmol) were added to a flask and the flask was evacuated and back filled with $N_2$ three times. Toluene (40 mL) was added and $N_2$ was bubbled through the reaction mixture for 10 mins. Benzophenone imine 59 (1.1 mL, 6.78 mmol) was then added and the reaction mixture was heated to reflux for ~24 h. The reaction mixture was allowed to cool to RT, was stirred over the weekend and then was concentrated in vacuo. The crude material was purified by column chromatography (DCM) to give the desired product 60 as a yellow oil which crystallised on standing (1.67 g, 65%). $R^t$ 3.09 min (Method 1b); m/z 455 $[M+H]^+$ $(ES^+)$. $^1H$ NMR (500 MHZ, DMSO-$d_6$): δ, ppm 7.76-7.65 (m, 2H), 7.63-7.55 (m, 1H), 7.55-7.46 (m, 2H), 7.33-7.21 (m, 3H), 7.16-7.04 (m, 3H), 7.01-6.88 (m, 1H), 6.49 (d, J=7.6 Hz, 1H), 4.40 (s, 2H), 2.61 (s, 3H), 2.37 (s, 3H), 1.43 (s, 9H).

Step 6. N-((7-((Diphenylmethylene)amino)-2-methylbenzofuran-3-yl)methyl)-N-methylacrylamide (compound 61). TFA (15 mL, 195 mmol) was added dropwise to a stirred solution of tert-butyl ((7-((diphenylmethylene)amino)-2-methylbenzofuran-3-yl)methyl)(methyl)carbamate 60 (0.8 g, 1.76 mmol) in DCM (30 mL) and the reaction mixture was stirred at RT for 1 h. The reaction mixture was concentrated in vacuo and the resulting residue was taken up in DCM (30 mL), cooled to 0° C. and TEA (5.0 mL, 35.9 mmol) followed by acryloyl chloride (0.17 mL, 2.11 mmol) were added. The reaction was allowed to return to RT and was stirred for ~16 h. The reaction mixture was quenched with water (50 mL), then the organic phase was separated and the aqueous phase was extracted again with DCM (2×50 mL). The combined organic layers were dried by passing through a phase separation cartridge and concentrated in vacuo. The crude material was purified by column chromatography (0-3% MeOH/DCM) to give impure material which was purified again by column chromatography (0-30% EtOAc/iso-hexane) to give the desired product 61 as a yellow oil (0.16 g, 21% over 2 steps).

Step 7. (E)-3-((2R,3S)-3-Amino-2-methyl-4-oxo-2,3,4,5-tetrahydro-1H-pyrido[2,3-b][1,4]diazepin-8-yl)-N-((7-amino-2-methylbenzofuran-3-yl)methyl)-N-methylacrylamide (compound 62). A mixture of N-((7-((diphenylmethylene)amino)-2-methylbenzofuran-3-yl)methyl)-N-methylacrylamide 61 (50 mg, 0.12 mmol), tert-butyl ((2R,3S)-8-bromo-2-methyl-4-oxo-2,3,4,5-tetrahydro-1H-pyrido[2,3-b][1,4]diazepin-3-yl) carbamate 51 (35 mg, 0.09 mmol) and Pd-116 (5 mg, 9.4 µmol) was evacuated and backfilled with $N_2$ three times. 1,4-Dioxane (1.5 mL) and DIPEA (0.05 mL, 0.28 mmol) were added and the reaction mixture was heated to 90° C. and stirred for 1 h. The reaction mixture was allowed to cool to RT, then the solvent was concentrated in vacuo and the resulting residue was dissolved in DCM (2 mL), TFA (1 mL) was added, and the reaction mixture was stirred for 30 min at RT. The solvent was removed in vacuo, HCl (10 mL, 1M Aq) was added and the reaction mixture was stirred for a further 15 min. The aqueous material was extracted with DCM (3×20 mL) and the combined organic layers were back extracted with HCl (20 mL, 1M Aq). The aqueous layer was then basified with solid $NaHCO_3$ to ~pH 8 and extracted with DCM/10% MeOH (3×30 mL). The combined organic layers were washed with Brine (1×30 mL), dried by passing through a phase separation cartridge and concentrated in vacuo. The crude material was purified by column chromatography (0-10% MeOH/DCM) to give the desired product 62 as a yellow solid (14 mg, 32%). $R^t$ 0.93 min (Method 1a) m/z 435 (M+H)+ $(ES^+)$;

$^1H$ NMR (500 MHZ, DMSO-$d_6$, 363K) δ 9.53 (s, 1H), 7.98 (d, J=1.9 Hz, 1H), 7.45 (d, J=15.4 Hz, 1H), 7.40 (d, J=2.0 Hz, 1H), 7.09 (d, J=16.3 Hz, 1H), 6.87 (t, J=7.7 Hz, 1H), 6.74 (d, J=7.8 Hz, 1H), 6.53 (dd, J=7.7, 1.1 Hz, 1H), 5.78 (d, J=5.5 Hz, 1H), 4.87 (s, 2H), 4.71 (s, 2H), 3.72-3.64 (m, 1H), 3.62 (d, J=3.3 Hz, 1H), 2.98 (s, 3H), 2.47 (s, 3H), 1.82 (s, 2H), 1.10 (d, J=6.5 Hz, 3H).

Example 7. Synthesis of (S,E)-3-(7-amino-8-oxo-6,7,8,9-tetrahydro-5H-pyrido[2,3-b]azepin-3-yl)-N-methyl-N-((3-methylbenzofuran-2-yl)methyl)acrylamide hydrochloride (compound 71)

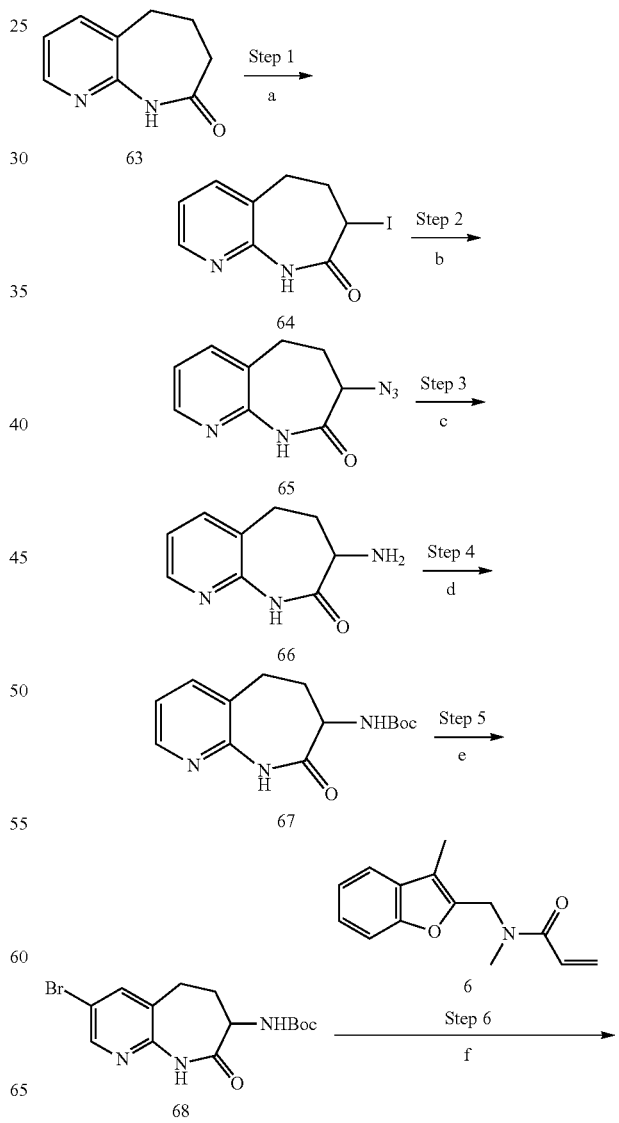

General Synthetic Scheme.

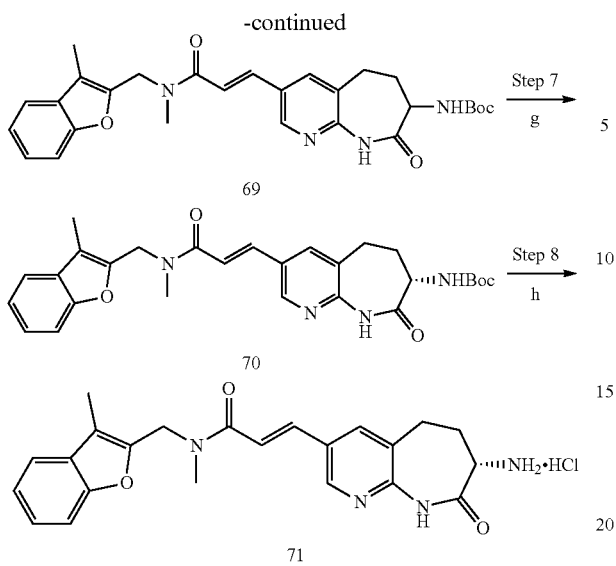

Reaction conditions: a) TMEDA, TMSI, I₂, DCM; b) NaN₃, DMF; c) Pd-C, H₂;
d) Boc₂O, TEA, DCM; e) K₂CO₃, Br₂, DCM; f) Pd(OAc)₂, trio(o-tolyl)phosphine,
DIPEA, propionitril; g) chiral separation; h) etheral HCl, DCM 5,6,7,9-Tetrahydro-8H-pyrido[2,3-b]azepin-8-one (compound 63) was prepared as described in AFFINIUM PHARMACEUTICALS, INC.—WO2007/67416, 2007, A2 and/or BANYU PHARMACEUTICAL CO., LTD.EP1726590, 2006, A1.

Step 1. 7-Iodo-5,6,7,9-tetrahydro-8H-pyrido[2,3-b]azepin-8-one (compound 64). To a stirred solution of 5,6,7,9-tetrahydro-8H-pyrido[2,3-b]azepin-8-one 63 (15 g, 0.0925 mol, 1.0 eq) in DCM (150 mL, 10 vol), TMEDA (42.9 g, 0.3703 mol, 4.0 eq) and TMSI (38.9 g, 0.1944 mol, 2.1 eq) were added under N₂ atmosphere. The reaction mixture was stirred for 1 h at 0° C. and iodine (35.3 g, 0.277 mol, 3.0 eq) was added and the mixture was stirred at 0° C. for an additional 1 h. The reaction mass was diluted with H₂O (150 mL) and extracted with DCM (300 mL). The combined organic layers were washed with aq. sodium thiosulphate (100 mL), dried (Na₂SO₄), filtered and concentrated under reduced pressure. The crude product was washed with MeOH to afford the title compound 64 (15 g, 0.05208 mol, 56%) as a white solid. LCMS (Method 3): m/z 289.17 [M+H].⁺

Step 2. 7-Azido-5,6,7,9-tetrahydro-8H-pyrido[2,3-b]azepin-8-one (compound 65). To a stirred solution of 7-iodo-5,6,7,9-tetrahydro-8H-pyrido[2,3-b]azepin-8-one 64 (14.5 g, 0.0503 mol, 1.0 eq) in DMF (150 mL), NaN₃ (26.18 g, 0.4027 mol, 8.0 eq) was added under N₂ atmosphere and the reaction was stirred at Rt for 16 h. Subsequently, the reaction mass was diluted with H₂O (200 mL) and extracted with EtOAc (2×300 mL). The combined organic layers were washed with brine (100 mL), dried (Na₂SO₄), filtered and concentrated under reduced pressure. The crude product was purified by CC (eluent: n-hexane/EtOAc, 20/80 v/v) to afford the title compound 65 (8 g, 0.0392 mol, 78.2%) as a white solid. LCMS (Method 3): m/z 204.13 [M+H].⁺

Step 3. 7-Amino-5,6,7,9-tetrahydro-8H-pyrido[2,3-b]azepin-8-one (compound 66). To a stirred solution of 7-azido-5,6,7,9-tetrahydro-8H-pyrido[2,3-b]azepin-8-one 65 (7.9 g, 0.0389 mol, 1.0 eq) in EtOH (80 mL), 10% Pd/C (1.5 g, 50% moisture) was added and then the reaction was stirred under H₂ atmosphere (ballon) at RT for 12 h (TLC monitoring). The catalyst was filtered off through a Celite bed, the Celite cake was washed with EtOH (50 mL) and the filtrate was concentrated under reduced pressure to afford the title compound 66 (6.5 g, 0.0367 mol, 95%) as a white solid. LCMS (Method 3): m/z 178.17 [M+H].⁺

Step 4. tert-Butyl (8-oxo-6,7,8,9-tetrahydro-5H-pyrido[2,3-b]azepin-7-yl)carbamate (compound 67). To a stirred solution of 7-amino-5,6,7,9-tetrahydro-8H-pyrido[2,3-b]azepin-8-one 66 (6.4 g, 0.0367 mol, 1.0 eq) in DCM (70 mL), TEA (11.12 g, 0.1101 mol, 3.0 eq) was added under N₂ atmosphere and the resulting mixture was stirred for 10 min. Subsequently, Boc₂O (8.8 g, 0.0403 mol, 1.1 eq) was added and the reaction was stirred overnight at RT (TLC control), then diluted with H₂O (100 mL) and extracted with DCM (300 mL). The combined organic layers were washed with brine (100 mL), dried (Na₂SO₄), filtered and concentrated under reduced pressure. The crude product was purified by CC (eluent: n-hexane/EtOAc, 20/80 v/v) to afford the title compound 67 (9 g, 0.0324 mol, 90%) as a white solid. LCMS (Method 3): m/z 278.23 [M+H].⁺

Step 5. tert-Butyl (3-bromo-8-oxo-6,7,8,9-tetrahydro-5H-pyrido[2,3-b]azepin-7-yl)carbamate (compound 68). To a stirred solution of tert-butyl (8-oxo-6,7,8,9-tetrahydro-5H-pyrido[2,3-b]azepin-7-yl)carbamate 67 (0.5 g, 0.0018 mol, 1.0 eq) in DCM (5 mL) under N₂ atmosphere, K₂CO₃ (0.74 g, 0.0054 mol, 3.0 eq) and Br₂ (0.42 g, 0.0027 mol, 1.5 eq) were added and stirred at RT for 12 h (TLC control). The reaction mixture was diluted with H₂O (50 mL) and extracted with DCM (100 ml). The combined organic layers were washed with brine (100 mL), dried (Na₂SO₄), filtered and concentrated under reduced pressure. The crude product was purified by CC (eluent: n-hexane/EtOAc, 20/80 v/v) to afford the title compound 68 (0.3 g, 0.0008 mol, 46.87%) as a white solid. LCMS (Method 3): m/z 356.07 [M+H].⁺

Step 6. tert-Butyl (E)-(3-(3-(methyl((3-methylbenzofuran-2-yl)methyl)amino)-3-oxoprop-1-en-1-yl)-8-oxo-6,7,8,9-tetrahydro-5H-pyrido[2,3-b]azepin-7-yl)carbamate (compound 69). A 20 mL vial flask was successively charged with N-methyl-N-((3-methylbenzofuran-2-yl)methyl)acrylamide 6 (0.709 g, 0.003098 mol, 1.1 eq), tert-butyl (3-bromo-8-oxo-6,7,8,9-tetrahydro-5H-pyrido[2,3-b]azepin-7-yl)carbamate 68 (1.0 g, 0.002816 mol, 1.0 eq), DIPEA (2.9 g, 0.02253 mol, 8.0 eq) and CH₃CH₂CN:DMF mixture (8:2 v/v) (20 mL). The nitrogen was bubbled into the reaction mixture for 10 min. Pd(OAc)₂ (0.063 g, 0.0002816 mol, 0.1 eq) and tri (o-tolyl) phosphine (0.176 g, 0.000563 mol, 0.2 eq) were added and the nitrogen was bubbled for an additional 5 min. The reaction vial was sealed and heated overnight at 100° C. (16 h). The crude reaction mixture was cooled to RT, diluted with water (50 mL), extracted with EtOAc (2×50 mL), dried (Na₂SO₄), filtered and concentrated under reduced pressure. The product was isolated by CC purification (eluent: DCM/MeOH, 96/4 v/v). The desired molecule 69 as a yellow solid (0.9 g, 0.001783 mol, 63.4%) was obtained (racemic mixture). LCMS (Method 3): m/z 509.44 [M+H].⁺

Step 7. tert-Butyl (S,E)-(3-(3-(methyl((3-methylbenzofuran-2-yl)methyl)amino)-3-oxoprop-1-en-1-yl)-8-oxo-6,7,8,9-tetrahydro-5H-pyrido[2,3-b]azepin-7-yl)carbamate (compound 70) was obtained by chiral separation of 0.9 g of racemic tert-butyl (E)-(3-(3-

(methyl((3-methylbenzofuran-2-yl)methyl)amino)-3-oxoprop-1-en-1-yl)-8-oxo-6,7,8,9-tetrahydro-5H-pyrido[2,3-b]azepin-7-yl)carbamate (compound 69). The title product 70 was obtained as a yellowish solid (0.35 g, PEAK-1). LCMS (Method 3): m/z 505.33 [M+H].+

Chiral method separation: Column Name: Chiralpak IC (4.6×250) mm, 5μ. Mobile phase: 0.1% DEA in Hexane/EtOH=10/90 (v/v). Flow rate: 1.0 mL/min. Flow mode: isocratic. Temperature: Ambient.

Step 8. (S,E)-3-(7-Amino-8-oxo-6,7,8,9-tetrahydro-5H-pyrido[2,3-b]azepin-3-yl)-N-methyl-N-((3-methylbenzofuran-2-yl)methyl)acrylamide hydrochloride (compound 71). To a stirring solution of tert-butyl (S,E)-(3-(3-(methyl((3-methylbenzofuran-2-yl)methyl)amino)-3-oxoprop-1-en-1-yl)-8-oxo-6,7,8,9-tetrahydro-5H-pyrido[2,3-b]azepin-7-yl)carbamate 70 (0.35 g, 0.00069 mol, 1.0 eq) in DCM (5 mL), 2 M HCl in Et$_2$O (5 mL) was added dropwise at 0° C. The reaction mixture was gradually warmed from 0° C. to room temperature over 2 hrs, then Et$_2$O (5 mL) was added and the precipitate was formed. The solvents were decanted and the precipitate was triturated with diethyl ether (2×5 mL) to afford the title compound 71 (0.3 g, 0.00068 mol, 98.36%) as a white solid. LCMS (Method 3): m/z 405.24 [M+H].+ $^1$HNMR (DMSO-d$_6$, 400 MHZ): δ (ppm): 10.90 (s, 1H), 8.64-8.60 (m, 1H), 8.34-8.24 (m, 4H), 7.57-7.22 (m, 6H), 5.01-4.80 (2H), 3.86 (bs, 2H), 3.20-2.93 (m, 3H), 2.80-2.67 (m, 2H), 2.27 (s, 3H), 2.21-2.18 (m, 1H). The stereochemistry for compound 71 was arbitrarily attributed and later on confirmed by co-crystallization Example 8. Synthesis of (E)-3-((S)-7-amino-8-oxo-6,7,8,9-tetrahydro-5H-pyrido[2,3-b]azepin-3-yl)-N-((4-(((1r,4r)-4-aminocyclohexyl)oxy)-3-methylbenzofuran-2-yl)methyl)-N-methylacrylamide bis(2,2,2-trifluoroacetate) (compound 86)

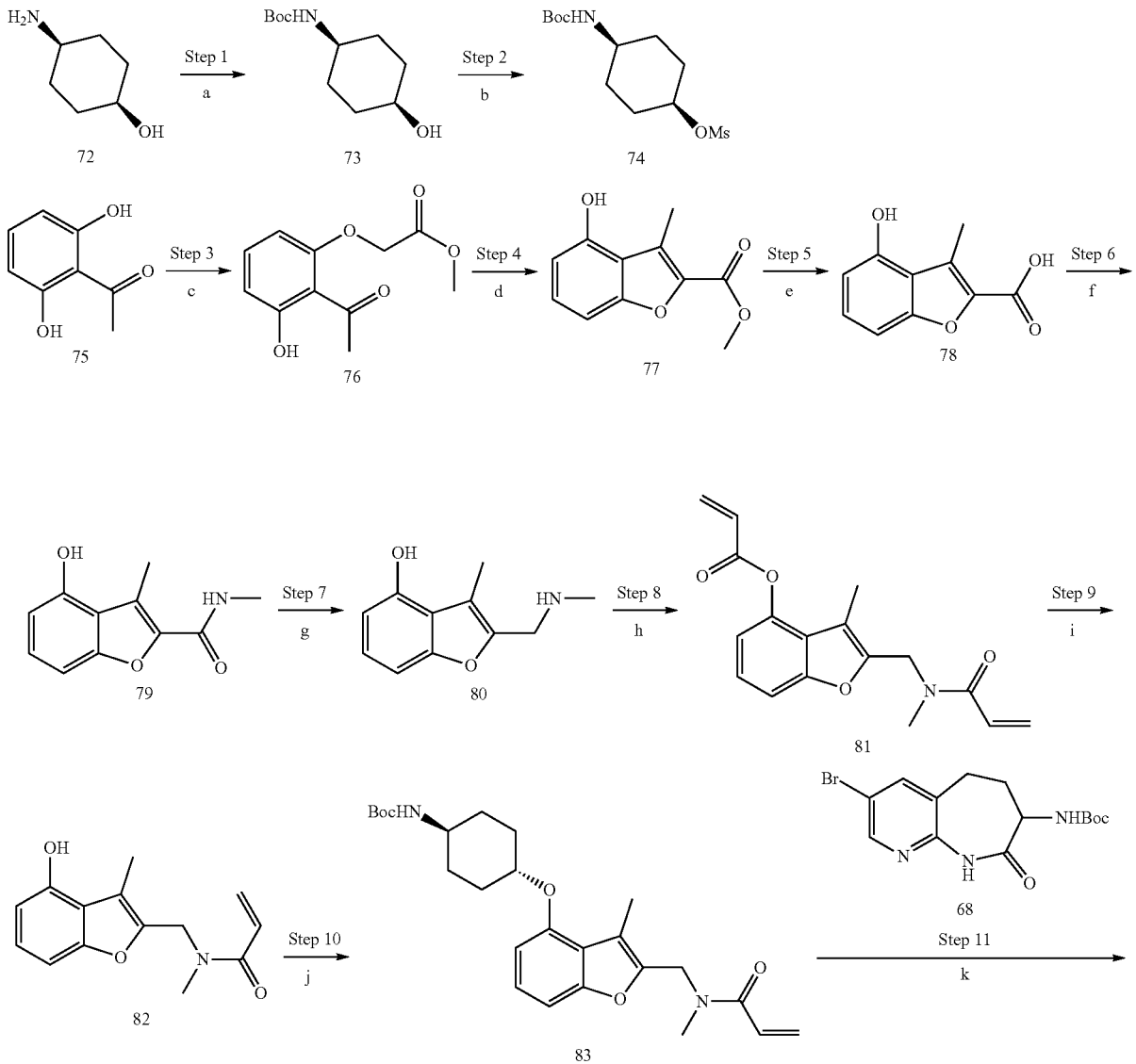

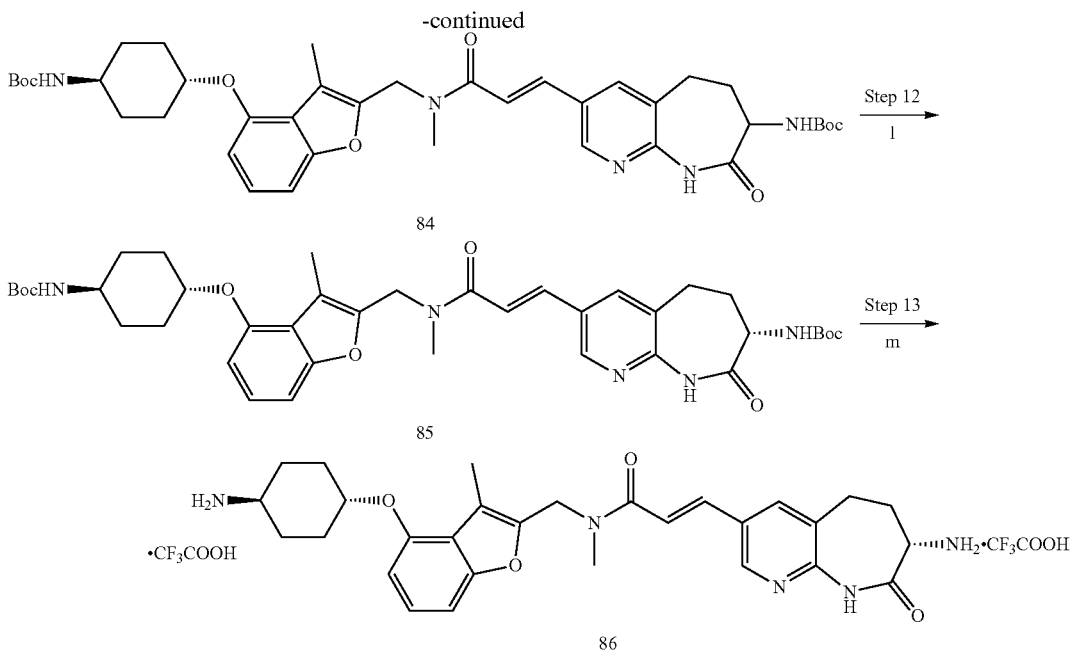

Reaction conditions: a) NaOH, (Boc)₂O; 1,4-dioxane:water, b) TEA, MsCl; DCM; c) methyl bromo acetate, K₂CO₃, acetone; d) NaOMe; e) NaOH, H₂O; f) methylamine, DIPEA, EDCl, HOBT, DMF; g) Tf₂O, NaBH₄; h) acryloyl chloride, 3N NaOH, THF; i) 3N NaOH, THF; j) K₂CO₃, ACN; k) Pd(OAc)₂; tri(o-tolyl)phosphine, DIPEA, propionitrile; l) chiral separation; m) i) Etheral HCl, DCM, ii) prep purification in TFA method Step 1. tert-Butyl ((1s,4s)-4-hydroxycyclohexyl)carbamate (compound 73). To a stirring solution of (1s,4s)-4-aminocyclohexan-1-ol 72 (1.0 g, 0.0086 mol, 1.0 eq) in a dioxane:water mixture (1:1 v/v, 20 mL), NaOH (1.39 g, 0.0347 mol, 4.0 eq) was added at 0° C. To this, Boc₂O (2.76 g, 0.0129 mol, 1.5 eq) was added dropwise and the reaction mixture was stirred at 0° C. to RT for 16 h (TLC monitoring).

Note: The same reaction was performed on a 1.0 g scale using (1s,4s)-4-aminocyclohexan-1-ol 72.

Both batches were combined, diluted with water (100 mL) and extracted with EtOAc (2×100 mL), dried (Na₂SO₄), filtered and evaporated to dryness to afford the title intermediate 73 (3.5 g, 0.01627 mol, 93.8%) as an off white solid. ¹H NMR (CDCl₃, 400 MHZ): δ(ppm): 6.68 (d, J=6.84 Hz, 1H), 4.27 (s, 1H), 3.66 (s, 1H), 3.22 (s, 1H), 1.58-1.49 (m, 4H), 1.42-1.36 (m, 4H), 1.36 (s, 9H).

Step 2. (1s,4s)-4-((tert-Butoxycarbonyl)amino)cyclohexyl methanesulfonate (compound 74). To a stirring solution of tert-butyl ((1s,4s)-4-hydroxycyclohexyl) carbamate 73 (2.0 g, 0.093 mol, 1.0 eq) in DCM (20 mL), TEA (3.74 g, 0.0372 mol, 4.0 eq) was added. Subsequently, mesyl chloride (1.58 g, 0.0139 mol, 1.5 eq) was added dropwise at 0° C. and the reaction mixture was stirred at 0° C. for 30 min. The reaction mixture was diluted with water (200 mL), extracted with DCM (2×100 mL), dried (Na₂SO₄), filtered and evaporated to afford the crude product 74 (2.8 g) as an off white solid and proceeded to the next step. ¹H NMR (CDCl₃, 400 MHZ): δ (ppm): 4.88 (bs, 1H), 4.46 (bs, 1H), 3.52 (bs, 1H), 3.01 (s, 3H), 2.06-2.02 (m, 2H), 1.85-1.82 (m, 2H), 1.76-1.69 (m, 2H), 1.60-1.56 (m, 2H), 1.44 (s, 9H).

Step 3. Methyl 2-(2-acetyl-3-hydroxyphenoxy) acetate (compound 76). To a stirred solution of K₂CO₃ (7.26 g, 0.052 mol, 1.6 eq) in acetone (50 mL) was added 1-(2,6-dihydroxyphenyl) ethan-1-one 75 (5.0 g, 0.03 mol, 1 eq). To this solution, methyl bromoacetate (5.03 g, 0.03 mol, 1.0 eq) was then added and the reaction mixture was heated at 60° C. for 0.5 h.

Note: Same reaction was performed with 20.0 g of starting (1-(2,6-dihydroxyphenyl) ethan-1-one) 75 and both batches were mixed together while work up and purification.

After the completion of the reaction, it was filtered through sintered funnel and washed with acetone (500 mL). The filtrate was concentrated under reduced pressure to give the title compound 76 with a purity of 86.16% (40 g, crude) as a brown oil. This material was used in the next step without further purification. LCMS (Method 3): m/z 225.26 [M+H].⁺

Step 4. Methyl 4-hydroxy-3-methylbenzofuran-2-carboxylate (compound 77). To a cooled (0° C.) solution of methyl 2-(2-acetyl-3-hydroxyphenoxy) acetate 76 (36.0 g, 0.16 mol, 1.0 eq) in methanol (300 mL) was added MeONa (13.0 g, 0.24 mol, 1.5 eq). The reaction mixture was heated at 60° C. for 2 h. After the completion of the reaction, it was concentrated under reduced pressure. The crude product was diluted with water (300 mL) and extracted with EtOAc (500 mL), dried (Na₂SO₄), filtered and evaporated to afford the title compound 77 (14.0 g, 0.067 mol, 42%) as an off-white solid. LCMS (Method 3): m/z 205.02 [M−H]⁻.

Step 5. 4-Hydroxy-3-methylbenzofuran-2-carboxylic acid (compound 78). To a stirred solution of methyl 4-hydroxy-3-methylbenzofuran-2-carboxylate 77 (1.0 g, 0.0048 mol, 1 eq) in MeOH (10 mL) and H₂O (10 mL) was added NaOH (1.53 g, 0.038 mol, 8.0 eq). The reaction was stirred at RT for 18 h.

Note: Same reaction was performed on a 13.0 g scale of starting (methyl 4-hydroxy-3-methylbenzofuran-2-carboxylate) 77 and both batches were mixed together while work up and purification.

The reaction mixture was cooled to 10° C., pH adjusted to ~2 with 1 N HCl (20 mL), extracted with EtOAc (300 mL), dried (Na$_2$SO$_4$), filtered and evaporated to afford the title compound 78 (13.0 g, 0.0677 mol, quantitative) as an off-white solid. LCMS (Method 3): m/z: 190.95 [M−H].

Step 6. 4-Hydroxy-N,3-dimethylbenzofuran-2-carboxamide (compound 79). To a stirred solution of the 4-hydroxy-3-methylbenzofuran-2-carboxylic acid 78 (0.5 g, 0.0026 mol) in DMF (10 mL) was added EDCI (0.74 g, 0.0039 mol, 1.5 eq), HOBt (0.52 g, 0.0039 mol, 1.5 eq), DIPEA (1.0 g, 0.0078 mol, 3.0 eq) and methylamine HCl (0.26 g, 0.0039 mol, 1.5 eq). The reaction was heated at 60° C. overnight.

Note: Same reaction was performed with 12.5 g of starting (4-hydroxy-3-methylbenzofuran-2-carboxylic acid) 78 and both batches were mixed together while work up and purification.

The reaction mixture was diluted with water (500 mL), extracted with EtOAc (300 mL), dried (Na$_2$SO$_4$), filtered and evaporated to afford the title compound 79 (9.3 g, 0.045 mol, 67%) as a light yellow solid.

LCMS (Method 3): m/z: 205.96 [M+H].$^+$

Step 7. 3-Methyl-2-((methylamino) methyl)benzofuran-4-ol (compound 80). To a cooled (0° C.) solution of 4-hydroxy-N,3-dimethylbenzofuran-2-carboxamide 79 (1.0 g, 0.0048 mol) in DCM (20 mL) was added Tf$_2$O (2.75 g, 0.0097 mol, 2 eq) dropwise at 0° C. The reaction mixture was stirred at 0° C. for 0.5 h. NaBH$_4$ (0.72 g, 0.019 mol, 4 eq) was added in one portion to the reaction mixture. THF (10 mL) was added dropwise to the mixture and was stirred at 0° C. to RT overnight.

Note: Same reaction was performed with 7.0 g of starting (4-hydroxy-N,3-dimethylbenzofuran-2-carboxamide) 79 and both batches were mixed together while work up and purification.

After the completion of the addition, the reaction mixture was poured into crushed ice (500 ml), neutralised with NaHCO$_3$, extracted with EtOAc (300 mL), dried (Na$_2$SO$_4$), filtered and evaporated to afford the title compound 80 (8.0 g, crude) as a brown oil. LCMS (Method 3): m/z 161.22 [M−30].+

Step 8. 3-Methyl-2-((N-methylacrylamido)methyl)benzofuran-4-yl acrylate (compound 81). To a solution of 3-methyl-2-((methylamino) methyl)benzofuran-4-ol 80 (1.1 g, 0.0057 mol) in THF (5 mL) was added 3N NaOH (5 ml). The reaction mixture was cooled to 0° C. Acryloyl chloride (0.67 g, 0.0074 mol, 1.0 eq) was added dropwise to the reaction mixture and allowed to stir at 0° C. for 0.5 h. After the completion of the reaction, it was diluted with H$_2$O (150 mL) and extracted with EtOAc (100 mL), dried (Na$_2$SO$_4$), filtered and evaporated to afford the title compound 81 (1.1 g, crude) as a brown oil. LCMS (Method 3): m/z: 300.3 [M+H].$^+$ Step 9. N-((4-Hydroxy-3-methylbenzofuran-2-yl)methyl)-N-methylacrylamide (compound 82). To a solution of 3-methyl-2-((N-methylacrylamido)methyl) benzofuran-4-yl acrylate 81 (1.1 g, 0.0036 mol) in THF (5 mL) was added 3N NaOH (5 mL). The reaction mixture was allowed to stir at RT for 1 h. After the completion of the reaction, it was diluted with H$_2$O (100 mL) and extracted with EtOAc (100 mL), dried (Na$_2$SO$_4$), filtered and evaporated to afford the crude product which was further purified by CC (eluent: n-Hexane/EtOAc, 70/30 v/v). The title compound 82 (0.5 g, 0.002 mol, 55%) as an off-white solid was obtained. LCMS (Method 3): m/z 246.21 [M+H].$^+$ Step 10. tert-Butyl ((1r,4r)-4-((3-methyl-2-((N-methylacrylamido)methyl)benzofuran-4-yl)oxy)cyclohexyl) carbamate (compound 83). To a stirring solution of N-((4-hydroxy-3-methylbenzofuran-2-yl)methyl)-N-methylacrylamide 82 (0.025 g, 0.000102 mol, 1.0 eq) and K$_2$CO$_3$ (0.138 g, 0.00102 mol, 10.0 eq) in MeCN (1.0 mL), (1s,4s)-4-((tert-butoxycarbonyl)amino)cyclohexyl methanesulfonate 74 (0.119 g, 0.000408 mol, 4.0 eq) in MeCN (2 mL) was added portionwise over a period of 2 h while heating at 100° C. and the reaction mixture was further heated at 100° C. for 16 h. The reaction mixture was diluted with H$_2$O (100 mL) and extracted with EtOAc (2×50 mL). The combined organic layers were washed with brine (100 mL), dried (Na$_2$SO$_4$), filtered and concentrated under reduced pressure.

Note: The same reaction was performed with 0.275 g of starting N-((4-hydroxy-3-methylbenzofuran-2-yl)methyl)-N-methylacrylamide 82.

Both batches were combined and the crude mixture was purified by CC (silica gel, n-Hexane/EtOAc, 80/20 v/v) to yield the title compound 83 (0.1 g, 0.000226 mol, 18.5%) as an off white solid. LCMS (Method 3): m/z 443.47 [M+H].$^+$ Step 11. tert-Butyl ((1r,4r)-4-((2-(((E)-3-(7-((tert-butoxycarbonyl)amino)-8-oxo-6,7,8,9-tetrahydro-5H-pyrido [2,3-b]azepin-3-yl)-N-methylacrylamido)methyl)-3-methylbenzofuran-4-yl)oxy)cyclohexyl)carbamate (compound 84). A 20 mL vial flask was successively charged with tert-butyl ((1r,4r)-4-((3-methyl-2-((N-methylacrylamido)methyl)benzofuran-4-yl)oxy)cyclohexyl)carbamate 83 (0.4 g, 0.000905 mol, 1.0 eq), tert-butyl (3-bromo-8-oxo-6,7,8,9-tetrahydro-5H-pyrido[2,3-b]azepin-7-yl)carbamate 68 (0.32 g, 0.000905 mol, 1.0 eq), DIPEA (0.929 g, 0.00724 mol, 8.0 eq) and CH$_3$CH$_2$CN:DMF mixture (8:2 v/v) (10 ml). The nitrogen was bubbled into the reaction mixture for 10 min, then Pd(OAc)$_2$ (0.02 g, 0.0000905 mol, 0.1 eq) and tri (o-tolyl) phosphine (0.055 g, 0.000181 mol, 0.2 eq) were added and the nitrogen was bubbled for an additional 5 min. The reaction vial was sealed and heated at 100° C. for 16 h. The resulting mixture was cooled to RT, diluted with water (25 mL), and extracted with EtOAc (2×5 mL), dried (Na$_2$SO$_4$), filtered and concentrated under reduced pressure to afford the crude product which was further purified by CC (eluent: EtOAc). The title compound 84 (0.24 g, 0.000334 mol, 37%) as an off-white solid was obtained (racemic mixture). LCMS (Method 3): m/z 718.71 [M+H].$^+$ Step 12. tert-Butyl ((1r,4r)-4-((2-(((E)-3-((S)-7-((tert-butoxycarbonyl)amino)-8-oxo-6,7,8,9-tetrahydro-5H-pyrido[2,3-b]azepin-3-yl)-N-methylacrylamido) methyl)-3-methylbenzofuran-4-yl)oxy)cyclohexyl) carbamate (compound 85) was obtained by chiral separation of 0.24 g of racemic tert-butyl ((1r,4r)-4-((2-(((E)-3-(7-((tert-butoxycarbonyl)amino)-8-oxo-6, 7,8,9-tetrahydro-5H-pyrido[2,3-b]azepin-3-yl)-N-methylacrylamido)methyl)-3-methylbenzofuran-4-yl) oxy)cyclohexyl)carbamate (compound 84). The title product 85 was obtained as a yellowish solid (0.075 g, PEAK-1). LCMS (Method 3): m/z 718.65 [M+H].$^+$ Chiral method separation: Column Name: Chiralpak IC (4.6×250) mm, 5u. Mobile phase: 0.1% DEA in Hexane/EtOH=35/65 (v/v). Flow rate: 1.0 mL/min. Flow mode: isocratic. Temperature: Ambient.

Step 13. (E)-3-((S)-7-Amino-8-oxo-6,7,8,9-tetrahydro-5H-pyrido[2,3-b]azepin-3-yl)-N-((4-(((1r,4r)-4-aminocyclohexyl)oxy)-3-methylbenzofuran-2-yl)methyl)-N-methylacrylamide bis(2,2,2-trifluoroacetate) (compound 86). To a stirring solution of tert-butyl ((1r,4r)-4-((2-(((E)-3-((S)-7-((tert-butoxycarbonyl)amino)-8-oxo-6,7,8,9-tetrahydro-5H-pyrido[2,3-b]azepin-3-yl)-N-methylacrylamido)methyl)-3-methylbenzofuran-4-yl)oxy)cyclohexyl)carbamate 85 (0.07 g, 0.0000975 mol, 1.0 eq) in DCM (2 mL), 2 M HCl in Et$_2$O (1.0 mL) was added dropwise at 0° C. The reaction mixture was stirred for 16 h (0° C. to RT), then concentrated under reduced pressure to get the crude residue (0.1 g) which was purified by preparative HPLC to afford the title compound 86 (0.017 g, 0.0000228 mol, 29.8%) as an off white solid. LCMS (Method 3): m/z 518.42 [M+H].$^+$ $^1$H NMR (DMSO-d$_6$, 400 MHZ): δ (ppm): 10.93 (s, 1H), 8.65-8.60 (m, 1H), 8.24-8.13 (m, 4H), 7.84-7.81 (m, 3H), 7.58-7.50 (m, 1H), 7.32-7.00 (m, 3H), 6.84-6.82 (m, 1H), 4.98-4.73 (2H), 4.43-4.35 (m, 1H), 3.92-3.88 (m, 1H), 3.17-2.87 (m, 5H), 2.84-2.74 (m, 2H), 2.36 (s, 3H), 2.22-1.94 (m, 5H), 1.55-1.46 (m, 4H). The stereochemistry for compound 86 was arbitrarily attributed.

Example 9. Synthesis of (E)-3-(7-amino-8-oxo-6,7,8,9-tetrahydro-5H-pyrido[2,3-b]azepin-3-yl)-N-((7-chloro-3-methylbenzofuran-2-yl)methyl)-N-methylacrylamide 2,2,2-trifluoroacetate (compound 92)

General Synthetic Scheme.

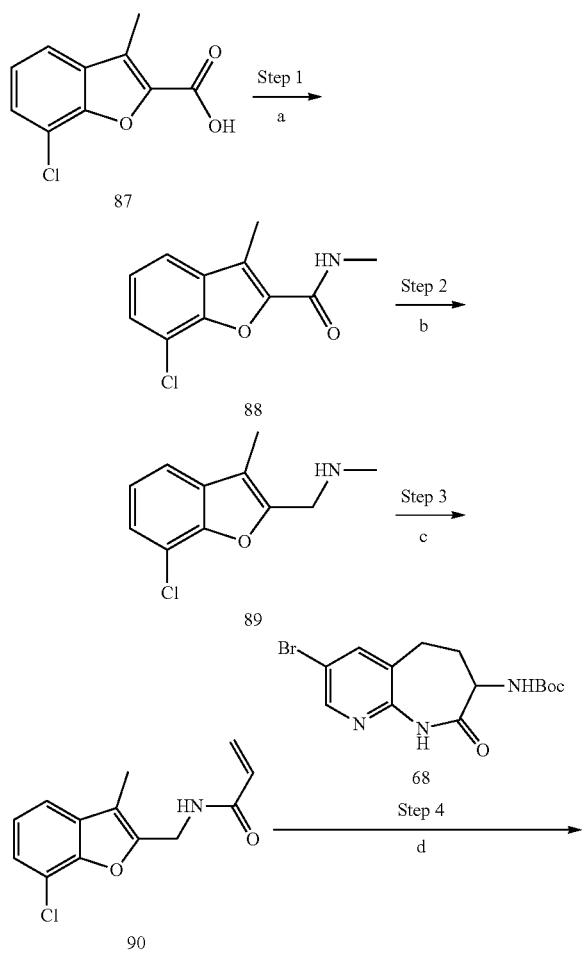

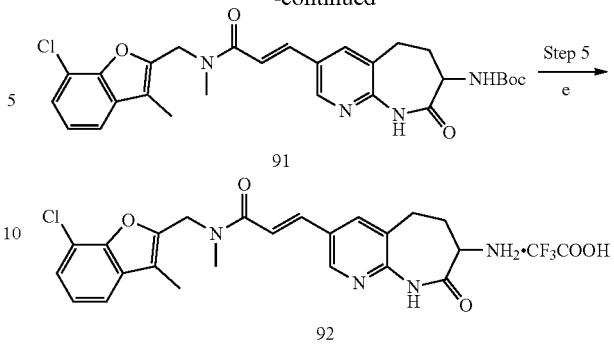

Reaction conditions: a) MENH$_2$ in THF, T$_3$P, DCM, TEA, RT, 3 h; b) 1M BMS in THF, THF, 57° C., 10 h; c) acryloyl chloride, TEA, DCM, 0° C.-RT, 3 h; d) Pd(OAc)$_2$, X-Phos, DIPEA, DMF, 100° C., 2 h; e) i. 4M HCl in 1,4-dioxane, DCM, 0° C.-RT, 2 h, ii. HPLC purification Step 1. 7-Chloro-N,3-dimethylbenzofuran-2-carboxamide (compound 88). To a stirred solution of 7-chloro-3-methylbenzofuran-2-carboxylic acid 87 (2.0 g, 9.52 mmol, 1.0 eq) in DCM (20 mL) was added Et$_3$N (3.3 mL, 23.8 mmol, 2.5 eq), and 2M MeNH$_2$ in THF (12 mL, 23.80 mmol, 2.5 eq) at 0° C. To this reaction mixture was added T$_3$P (50 wt % in ethyl acetate) (2.3 mL, 14.28 mmol, 1.5 eq) and the reaction mixture was stirred at RT for 3 h. After completion of the reaction (TLC), the resulting mixture was diluted with DCM (20 mL) and washed with H$_2$O (2×20 mL), followed by brine solution (1×20 mL), then dried (Na$_2$SO$_4$), filtered and evaporated, and then the crude residue was purified by flash CC on silica gel (PE/EtOAc, 95:5 v/v) to afford the final product 88 as a light brown solid. Yield 76% (1.6 g, 7.17 mmol). $^1$H NMR (400 MHZ, DMSO-d$_6$) δ: 8.43-8.40 (m, 1H), 7.72-7.70 (m, 1H), 7.57-7.55 (m, 1H), 7.36-7.32 (m, 1H), 2.81 (s, 3H), 2.52 (s, 3H). LCMS: m/z 224.3 [M+H]$^+$.

Step 2. 1-(7-Chloro-3-methylbenzofuran-2-yl)-N-methylmethanamine (compound 89). 7-Chloro-N,3-dimethylbenzofuran-2-carboxamide 88 (1.6 g, 7.17 mmol, 1.0 eq) was suspended in dry THF (20 mL) and cooled in an ice bath. 2 M BMS complex in THF (5.38 mL, 10.76 mmol. 1.5 eq) was added dropwise to the reaction mixture and refluxed for 16 h. The reaction mass was quenched with MeOH under cooling (20 mL) and then refluxed for another 1 h. The crude reaction mixture was concentrated and purified by CC (silica gel, DCM/MeOH, 95:5 v/v) to afford the title compound 89 as a light yellow solid. LCMS (Method 4): m/z 210.3 [M+H]$^+$.

Step 3. N-((7-Chloro-3-methylbenzofuran-2-yl)methyl)acrylamide (compound 90). To a stirred solution of 1-(7-chloro-3-methylbenzofuran-2-yl)-N-methylmethanamine 89 (200 mg, 0.9569 mmol, 1.0 eq) in dry DCM (10 mL) was added Et$_3$N (0.154 mL, 1.148 mmol, 1.2 eq) followed by acroloyl chloride (0.092 mL, 1.148 mmol, 1.2 eq) at 0° C. under nitrogen. The reaction mixture was stirred at RT for 3 h. Then, the reaction mass was diluted with DCM, and washed with 10% NaHCO$_3$ and brine. The organic layer was separated, dried (Na$_2$SO$_4$), filtered and concentrated to get the crude product which was purified by flash CC on silica using 20% AcOEt/PE as an eluent to get the tiltle compound 90 as a brown gummy liquid. Yield 55% (150 mg, 0.60 mmol). LCMS (Method 4): m/z 250.2 [M+H]$^+$.

Step 4. tert-Butyl (E)-(3-(3-(((7-chloro-3-methylbenzofuran-2-yl)methyl)(methyl)amino)-3-oxo prop-1-en-1-yl)-8-oxo-6,7,8,9-tetrahydro-5H-pyrido[2,3-b]azepin-7-yl)carbamate (compound 91). A stirred solution of tert-butyl (3-bromo-8-oxo-6,7,8,9-tetrahydro-5H-pyrido[2,3-b]azepin-7-yl)carbamate 68 (150 mg, 0.42 mmol, 1 eq) in dry DMF (2 mL) was degassed with nitrogen for 15 min, then to this N-((7-chloro-3-methylbenzofuran-2-yl)methyl)-N-methylacrylamide 90 (88 mg, 0.33 mmol, 0.8 eq), DIPEA (0.23 mL, 1.26 mmol, 3 eq), X-Phos (20 mg, 0.042 mmol, 0.1 eq) and Pd(OAc)$_2$ (5 mg, 0.021 mmol, 0.05 eq) were added and the reaction mixture was heated to 100° C. for 2 h. After completion of the reaction (TLC), the reaction mixture was filtered and the filtrate was concentrated to get the crude product which was purified by column chromatography using 60-70% of AcOEt in PE to get the desired product 91 as an off-white solid. Yield 18% (40 mg, 0.074 mmol). LCMS (Method 4): m/z 483.0 [M+H]$^+$ tert-butyl group cleaved mass.

Step 5. (E)-3-(7-Amino-8-oxo-6,7,8,9-tetrahydro-5H-pyrido[2,3-b]azepin-3-yl)-N-((7-chloro-3-methylbenzofuran-2-yl)methyl)-N-methylacrylamide 2,2,2-trifluoroacetate (compound 92). To a stirred solution of tert-butyl (E)-(3-(3-(((7-chloro-3-methylbenzofuran-2-yl)methyl)(methyl)amino)-3-oxoprop-1-en-1-yl)-8-oxo-6,7,8,9-tetrahydro-5H-pyrido[2,3-b]azepin-7-yl)carbamate 91 (40 mg, 0.074 mmol, 1 eq) in dry DCM (5 mL) was added 4.5 M HCl in 1,4-dioxane (2 mL) at 0° C., then the reaction mixture was stirred at RT for 2 h. After completion of the reaction (TLC), the resulting mixture was concentrated to get the crude solid which was purified by preparative HPLC to get the title compound 92 as an off-white solid. Yield 20% (7.5 mg, 0.17 mmol). $^1$H NMR (400 MHZ, DMSO-d$_6$) δ: 10.93 (s, 1H), 8.65-8.62 (d, J=12 Hz, 1H), 8.23-8.20 (m, 4H), 7.62-7.56 (m, 2H), 7.41-7.25 (m, 3H), 5.05-4.84 (rotamers, s, 2H), 3.94-3.90 (m, 1H), 3.24-2.97 (rotamers, s, 3H), 2.81-2.75 (m, 2H), 2.51-2.49 (m, 1H), 2.23 (s, 3H), 2.20-2.18 (m, 1H). LCMS (Method 4): m/z 439.3 [M+H]$^+$.

Example 10. Synthesis of (E)-3-(7-amino-8-oxo-6,7,8,9-tetrahydro-5H-pyrido[2,3-b]azepin-3-yl)-N-methyl-N-((2-methylbenzofuran-3-yl)methyl)acrylamide hydrochloride (compound 94)

General Synthetic Scheme.

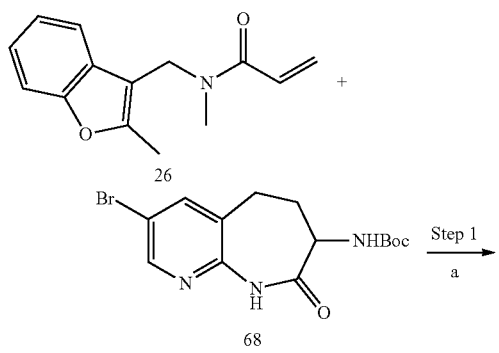

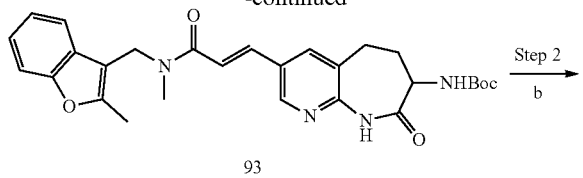

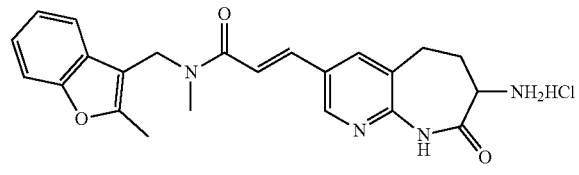

Reaction conditions: a) Pd(OAc)$_2$, X-Phos, DIPEA, DMF, 100° C., 2 h; (d) 4M HCl in dioxane, DCM, 0° C.-rt, 2 h.

Step 1. tert-Butyl (E)-(3-(3-(methyl((2-methylbenzofuran-3-yl)methyl)amino)-3-oxoprop-1-en-1-yl)-8-oxo-6,7,8,9-tetrahydro-5H-pyrido[2,3-b]azepin-7-yl) carbamate (compound 93). To a stirred solution of tert-butyl (3-bromo-8-oxo-6,7,8,9-tetrahydro-5H-pyrido[2,3-b]azepin-7-yl)carbamate 68 (150 mg, 0.42 mmol, 1 eq) in DMF (2 mL) was degassed with nitrogen for 15 min, then to this N-methyl-N-((2-methylbenzofuran-3-yl)methyl)acrylamide 26 (77 mg, 0.33 mmol, 0.8 eq), DIPEA (0.23 mL, 1.26 mmol, 3 eq), X-Phos (20 mg, 0.042 mmol, 0.1 eq) and Pd(OAc)$_2$ (5 mg, 0.021 mmol, 0.05 eq) were added and the reaction mixture was heated to 100° C. for 2 h. After completion of the reaction (TLC analysis), the reaction mixture was filtered and the filtrate was concentrated to dryness. The crude product was purified by column chromatography using 80-90% of AcOEt in PE to get the title compound 93 as an off-white solid. Yield 26% (55 mg, 0.108 mmol). LCMS (Method 4): m/z 505.2 [M+H]$^+$.

Step 2. (E)-3-(7-Amino-8-oxo-6,7,8,9-tetrahydro-5H-pyrido[2,3-b]azepin-3-yl)-N-methyl-N-((2-methylbenzofuran-3-yl)methyl)acrylamide hydrochloride (compound 94). To a stirred solution of tert-butyl (E)-(3-(3-(methyl((2-methylbenzofuran-3-yl)methyl)amino)-3-oxoprop-1-en-1-yl)-8-oxo-6,7,8,9-tetraydro-5H-pyrido [2,3-b]azepin-7-yl)carbamate 93 (55 mg, 0.108 mmol, 1 eq) in DCM (5 mL) was added 4.5 M HCl in 1,4-dioxane (2 mL) at 0° C., then the reaction mixture was stirred at RT for 2 h. After completion of the reaction (TLC), the resulting mixture was concentrated to get the crude solid which was washed with a mixture of Et$_2$O: MeOH: DCM (8.5:0.5:1 v/v) and then dried under vacuum to get the title compound 94 as a pale yellow solid. Yield 34% (15 mg, 0.03 mmol). $^1$H NMR (400 MHZ, DMSO-d$_6$): 10.90 (s, 1H), 8.65-8.63 (d, J=12 Hz, 1H), 8.29-8.23 (m, 4H), 7.63-7.55 (m, 2H), 7.48-7.45 (m, 1H), 7.32-7.15) m, 3H), 4.94-4.73 (rotamers, s, 2H), 3.86-3.85 (d, J=4 Hz, 1H), 3.05-2.88 (rotamers, s, 3H), 2.79-2.72 (m, 1H), 2.51-2.50 (m, 1H), 2.49 (s, 3H), 2.22-2.17 (m, 1H). LCMS (Method 4): m/z: 405.2 [M+H]$^+$.

Example 11. Synthesis of (E)-3-(7-(dimethylamino)-8-oxo-6,7,8,9-tetrahydro-5H-pyrido[2,3-b]azepin-3-yl)-N-methyl-N-((3-methylbenzofuran-2-yl)methyl)acrylamide (compound 95)

General Synthetic Scheme.

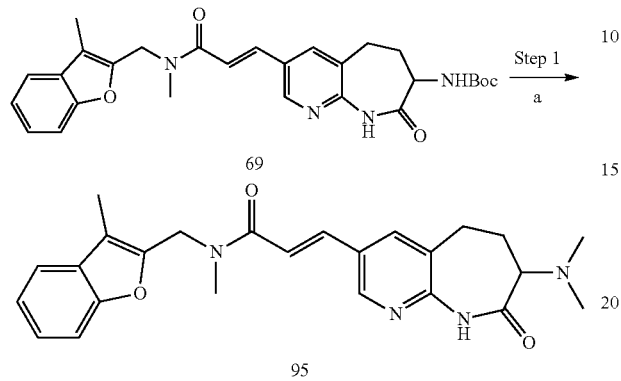

Reaction conditions: a) i. 2M HCl in Et₂O/DCM, ii. Paraformaldehyde, MP-CNBH₃ resin, TEA, MeOH 65° C., 2 h Step 1. (E)-3-(7-(Dimethylamino)-8-oxo-6,7,8,9-tetrahydro-5H-pyrido[2,3-b]azepin-3-yl)-N-methyl-N-((3-methylbenzofuran-2-yl)methyl)acrylamide (compound 95). To a stirred solution of tert-butyl (E)-(3-(3-(methyl((3-methylbenzofuran-2-yl)methyl)amino)-3-oxoprop-1-en-1-yl)-8-oxo-6,7,8,9-tetrahydro-5H-pyrido[2,3-b]azepin-7-yl)carbamate 69 (91.7 mg, 0.18 mmol, 1 eq.) in DCM (2 mL) was added 2 M HCl in Et2O (1 mL) and the resulting mixture was stirred for ca. 4 hrs (TLC control). The reaction mass was concentrated to dryness and vacuumed for 1 h. The crude product (80 mg) was dissolved in MeOH (5 mL), TEA (0.07 mL, 0.54 mmol, 3 eq), paraformaldehyde (27 mg, 0.909 mmol, 5 eq) and MP-CNBH₃ resin (30 mg) were added, the reaction mixture was heated to 65° C. for 2 h. After completion of the reaction (TLC), the reaction mixture was filtered and the filtrate was concentrated to get the crude product which was purified by CC using 2-3% of MeOH in DCM to get the title compound 95 as an off-white solid. Yield 20% (16 mg, 0.036 mmol). ¹H NMR (400 MHZ, DMSO-d₆) δ: 10.13 (s, 1H), 8.52-8.48 (d, J=16 Hz, 1H), 8.15-8.13 (d, J=8 Hz, 1H), 7.58-7.49 (m, 3H), 7.29-7.22 (m, 3H), 5.01-4.80 (rotamers, s, 2H), 3.19 (s, 2H), 2.93 (s, 3H), 2.76-2.73 (m, 2H), 2.67-2.63 (m, 1H), 2.27-2.20 (m, 12H). LCMS (Method 4): m/z: 433.3 [M+H]⁺.

Example 12. Synthesis of (S,E)-3-(7-(dimethylamino)-8-oxo-6,7,8,9-tetrahydro-5H-pyrido[2,3-b]azepin-3-yl)-N-methyl-N-((3-methylbenzofuran-2-yl)methyl)acrylamide (compound 96)

Synthetic Scheme General.

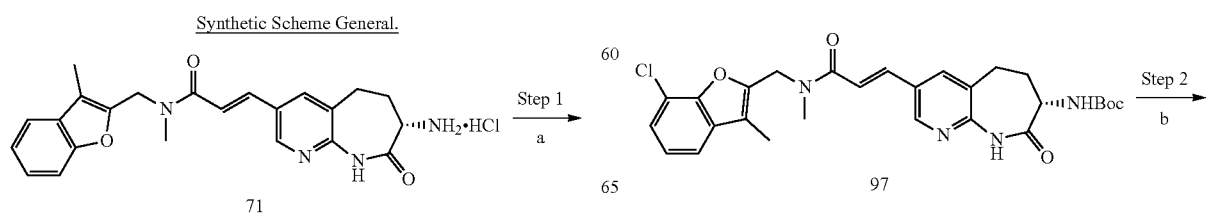

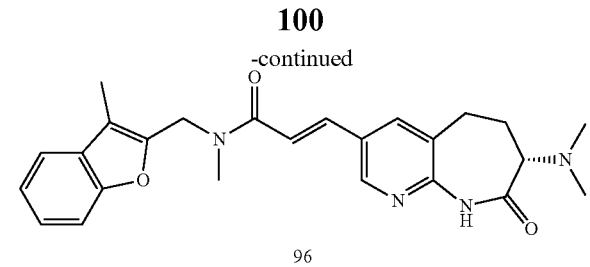

Reaction conditions: a) Paraformaldehyde, MP-CNBH₃ resin, TEA, MeOH, 65° C., 2 h Step 1. (S,E)-3-(7-(Dimethylamino)-8-oxo-6,7,8,9-tetrahydro-5H-pyrido[2,3-b]azepin-3-yl)-N-methyl-N-((3-methylbenzofuran-2-yl)methyl)acrylamide (compound 96). To a stirred solution of (S,E)-3-(7-amino-8-oxo-6,7,8,9-tetrahydro-5H-pyrido[2,3-b]azepin-3-yl)-N-methyl-N-((3-methylbenzofuran-2-yl)methyl)acrylamide hydrochloride 71 (30 mg, 0.068 mmol, 1 eq) in MeOH (5 mL), TEA (0.03 mL, 0.20 mmol, 3 eq), paraformaldehyde (30 mg) and MP-CNBH₃ resin (30 mg) were added and the reaction mixture was heated to 65° C. for 2 h (TLC analysis). The reaction mixture was filtered and the filtrate was concentrated to get the crude product which was purified by column chromatography using 2-3% of MeOH in DCM. The title compound 96 as a pale pink solid was obtained. Yield 22% (7 mg, 0.016 mmol). ¹H NMR (400 MHZ, DMSO-d₆) δ: 10.14 (s, 1H), 8.52-8.49 (m, 1H), 8.15-8.13 (m, 1H), 7.58-7.48 (m, 3H), 7.30-7.24 (m, 3H), 5.01-4.80 (rotamers, s, 2H), 3.19 (s, 2H), 2.99-2.89 (m, 2H), 2.77-2.67 (m, 2H), 2.66-2.62 (m, 2H), 2.49 (s, 12H). LCMS (Method 4): m/z: 433.3 [M+H]⁺. (Note: During the reaction condition the compound racemizes in the ratio of 75:25 (S: R isomer). The stereochemistry for compound 96 was arbitrarily attributed.

Example 13. Synthesis of (S,E)-3-(7-amino-8-oxo-6,7,8,9-tetrahydro-5H-pyrido[2,3-b]azepin-3-yl)-N-((7-chloro-3-methylbenzofuran-2-yl)methyl)-N-methylacrylamide hydrochloride (compound 98)

General Synthetic Scheme.

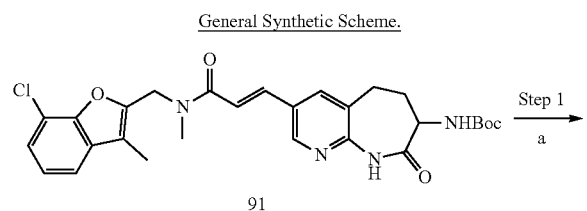

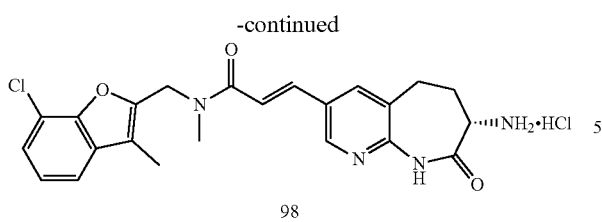

98

Reaction conditions: a) Chiral Preparative HPLC; b) 4M HCl in 1,4-dioxane, DCM, 0° C.-RT, 2 h Step 1. tert-Butyl (S,E)-(3-(3-(((7-chloro-3-methylbenzofuran-2-yl)methyl)(methyl)amino)-3-oxoprop-1-en-1-yl)-8-oxo-6,7,8,9-tetrahydro-5H-pyrido[2,3-b]azepin-7-yl)carbamate (compound 97). A racemic mixture of tert-butyl (E)-(3-(3-(((7-chloro-3-methyl benzofuran-2-yl)methyl)(methyl)amino)-3-oxoprop-1-en-1-yl)-8-oxo-6,7,8,9-tetrahydro-5H-pyrido[2,3-b]azepin-7-yl) carbamate 91 (85 mg) was passed through a preparative HPLC chiral column and both enantiomers were separated.

The first eluting fraction (compound 97): $t_{ret}$=22.47 min was obtained as a off white solid (15 mg, 0.02 mmol). LCMS (Method 4): m/z 541.2 [M+H]⁺.

Note: The separation of the isomers in the given method gave the pure compound with a good chiral purity. The SFC and other methods for the chiral separation were also tested, unfortunately there was no clear seperation.

Chiral method separation: Mobile Phase: 0.1% DEA in n-Hexane: EtOH (40:60 v/v). Column: CHIRALPAK IC (250×4.6) mm, 5 μm. Flow: 1.0 mL/min Step 2. (S,E)-3-(7-Amino-8-oxo-6,7,8,9-tetrahydro-5H-pyrido[2,3-b]azepin-3-yl)-N-((7-chloro-3-methylbenzofuran-2-yl)methyl)-N-methylacrylamide hydrochloride (compound 98). tert-Butyl (S,E)-(3-(3-(((7-chloro-3-methylbenzofuran-2-yl)methyl)(methyl)amino)-3-oxoprop-1-en-1-yl)-8-oxo-6,7,8,9-tetrahydro-5H-pyrido[2,3-b]azepin-7-yl)carbamate 97 (15 mg, 0.02 mmol, 1.0 eq) was suspended in dry 1,4-dioxane (0.2 mL) and 4 M HCl in 1,4-dioxane (0.2 mL) was added and allowed to stir for 2 h. After the completion of the reaction, the free solvent was decanted and the crude residue was triturated with Et₂O to afford the pure product 98. Yield 66% (8 mg, 0.018 mmol). ¹H NMR (400 MHZ, DMSO-d₆) δ: 10.93 (s, 1H), 8.66-8.61 (m, 1H), 8.26-8.22 (m, 4H), 7.60-7.55 (m, 2H), 7.36-7.01 (m, 3H), 5.06-4.84 (rotamers, s, 2H), 3.89 (s, 1H), 3.20-2.96 (rotamers, s, 3H), 2.72-2.70 (m, 2H), 2.46-2.43 (m, 1H), 2.33 (s, 3H), 2.18 (s, 1H). LCMS (Method 4): m/z 439.2 [M+H]⁺. Chiral purity: 99.68% ($t_{ret}$: 83.02 min). The stereochemistry for compound 98 was arbitrarily attributed.

Example 14. Synthesis of (S,E)-3-(7-amino-8-oxo-6,7,8,9-tetrahydro-5H-pyrido[2,3-b]azepin-3-yl)-N-((7-fluoro-3-methylbenzofuran-2-yl)methyl)-N-methylacrylamide hydrochloride (compound 107)

General Synthetic Scheme.

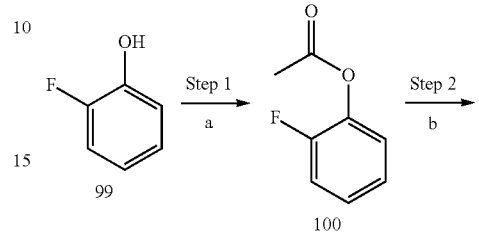

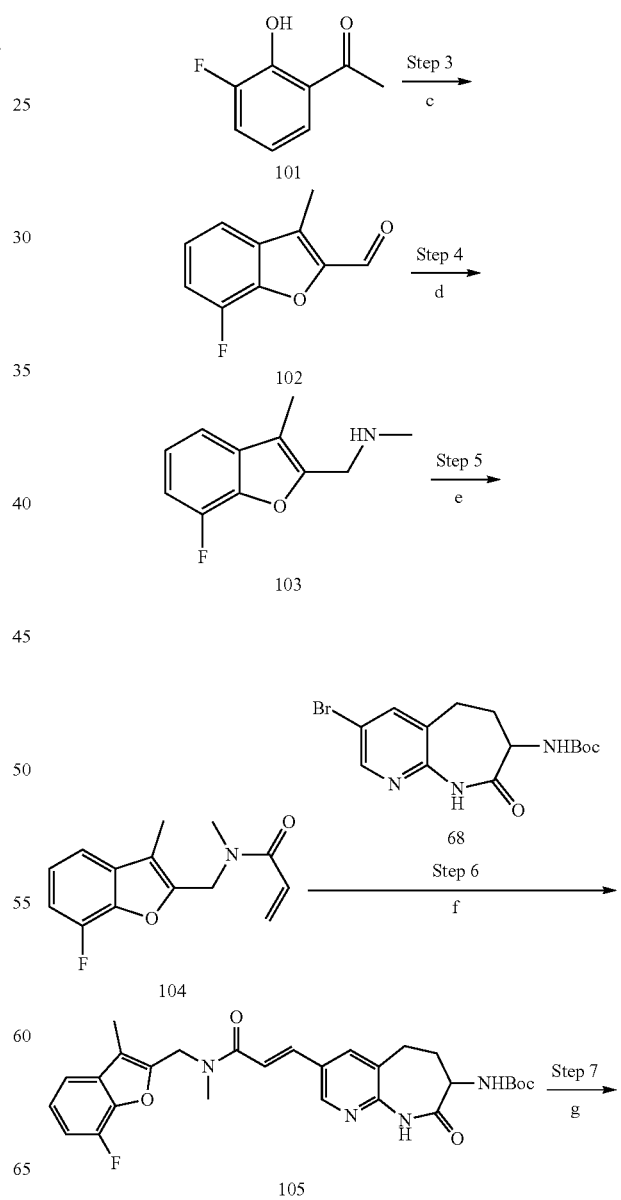

-continued

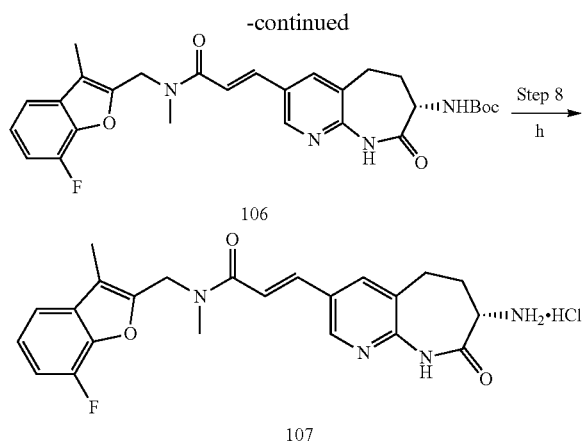

106

107

Reaction conditions: a) acetyl chloride, pyridine, DCM; b) AlCl₃, 1,2-dichlorobenzene; c) 1,1-dichloroethene, KOt-Bu, THF, H₂SO₄, DCM; d) MeNH₂, NaBH₄, EtOH; e) acryloyl chloride, Et3N, DCM; f) Pd(OAc)₂; tri(o-tolyl)phosphine, DIPEA, Propionitrile; g) chiral HPLC separation; h) Etheral HCl (2M), DCM Step 1. 2-Fluorophenyl acetate (compound 100). To a solution of 2-fluorophenol 99 (25.0 g, 0.223 mol) in dry DCM (250 ml) at 0° C., pyridine (19.39 g, 0.245 mol, 1.1 eq) was added. Subsequently, acetyl chloride (15.83 g, 0.223 mol, 1.2 eq) was added dropwise and the reaction mixture was stirred at RT for 6 h. After the completion of the reaction, the reaction mass was diluted with H₂O (400 mL) and extracted with DCM (400 mL), dried (Na₂SO₄), filtered and evaporated to afford the crude product which was further purified by CC (silica gel, n-hexane/EtOAc, 95:5 v/v). The title compound 100 (34.4 g, 0.22 mol, 98%) as a pale yellow oil was obtained. $^1$H NMR (CDCl₃, 400 MHZ): δ (ppm): 7.23-7.10 (m, 4H), 2.34 (s, 3H).

Step 2. 1-(3-Fluoro-2-hydroxyphenyl) ethan-1-one (compound 101). A solution of 2-fluorophenyl acetate 100 (34.0 g, 0.2222 mol, 1.0 eq) in 1,2-dichlorobenzene (15 mL) was added dropwise to a solution of AlCl₃ (32.62 g, 0.2456 mol, 1.1 eq) in 1,2-dichlorobenzene (30 mL). The reaction mixture was heated at 100° C. for 16 h and then cooled to room temperature. The mixture was quenched with 2 M NaOH (40 mL), extracted with DCM (500 mL), the organic phase was washed with water (50 mL), dried (Na₂SO₄), filtered and evaporated to afford the crude material as a 1:1 mixture of regioisomers. The product was further purified by CC (silica gel, n-Hexane/EtOAc, 90:10 v/v) to afford the title compound 101 (10.10 g, 0.0655 mol, 29.5%) as a yellow sticky liquid. LCMS (Method 3): m/z: 153.14 [M−H]⁻.

Step 3. 7-Fluoro-3-methylbenzofuran-2-carbaldehyde (compound 102). To a stirred solution of 1-(3-fluoro-2-hydroxyphenyl) ethan-1-one 101 (10 g, 0.0649 mol, 1 eq) in THF (100 mL) at room temperature, t-BuOK (58.2 g, 0.5197 mol, 8.0 eq) was added under N₂ atmosphere. To this, 1,1-dichloroethene (18.7 g, 0.1948 mol, 3.0 eq) was added at 0° C. and the reaction mixture was stirred at RT for 16 h (TLC monitoring). The reaction mass was diluted with H₂O (200 mL) and extracted with DCM (300 mL), dried (Na₂SO₄), filtered and evaporated to afford the crude residue. This residue was further dissolved in DCM (100 mL), followed by the addition of 5 M H2SO₄ (100 mL) and the reaction mixture was stirred overnight at RT (16 h). After the completion of the reaction, the resulting mixture was diluted with H₂O (200 mL), extracted with DCM (300 mL), dried (Na₂SO₄), filtered and evaporated to afford the crude product which was purified by CC (silica gel, n-hexane/EtOAc, 95:5 v/v). The title aldehyde 102 (4.5 g, 0.0252 mol, 38.9%) as a yellow solid was isolated. $^1$H NMR (CDCl₃, 400 MHZ): δ (ppm): 10.07 (s, 1H), 7.47-7.45 (m, 1H), 7.30-7.22 (m, 2H), 2.63 (s, 3H).

Step 4. 1-(7-Fluoro-3-methylbenzofuran-2-yl)-N-methyl-methanamine (compound 103). To a stirred solution of 7-fluoro-3-methylbenzofuran-2-carbaldehyde 102 (4.0 g, 0.0224 mol, 1 eq) in EtOH (40 mL), 40% aq. MeNH₂ solution (40 mL) was added slowly under N₂ atmosphere. The reaction was stirred at RT for 18 h and then the solution was concentrated under reduced pressure. The resulting crude material was re-dissolved in EtOH (40 mL) under nitrogen, NaBH₄ was added at 0° C. and the mixture was stirred at RT for an additional for 18 h (TLC monitoring). The reaction was quenched with water (200 mL), extracted with DCM (400 mL), dried (Na₂SO₄), filtered and evaporated to afford the crude product which was purified by CC (silica gel, DCM/MeOH, 90:10 v/v). The desired amine 103 (4.1 g, 0.0212 mol, 90.9%) as a yellow liquid was obtained. LCMS (Method 3): m/z: 194.13 [M+H].⁺

Step 5. N-((7-Fluoro-3-methylbenzofuran-2-yl)methyl)-N-methylacrylamide (compound 104). To a stirred solution of 1-(7-fluoro-3-methylbenzofuran-2-yl)-N-methylmethanamine 103 (4.3 g, 0.022 mol, 1 eq) in DCM (40 mL) at 0° C., Et3N (4.48 g, 0.0445 mol, 2.0 eq) and acryloyl chloride (2.2 g, 0.0245 mol, 1.1 eq) were added. The reaction was stirred at 0° C. for 1 h. The reaction was quenched with water (20 mL), extracted with DCM (100 mL), dried (Na₂SO₄), filtered and evaporated to afford the the crude product which was further purified by CC (silica gel, n-hexane/EtOAc, 60:40 v/v). The title acrylamide 104 (2.8 g, 0.0113 mol, 51.09%) as a yellow liquid was obtained. LCMS (Method 3): m/z: 248.31 [M+H].⁺

Step 6. tert-Butyl (E)-(3-(3-(((7-fluoro-3-methylbenzofuran-2-yl)methyl)(methyl)amino)-3-oxoprop-1-en-1-yl)-8-oxo-6,7,8,9-tetrahydro-5H-pyrido[2,3-b]azepin-7-yl)carbamate (compound 105). A 20 mL vial flask was charged with N-((7-fluoro-3-methylbenzofuran-2-yl)methyl)-N-methylacrylamide 104 (0.156 g, 0.00067 mol, 1.2 eq), tert-butyl (3-bromo-8-oxo-6,7,8,9-tetrahydro-5H-pyrido[2,3-b]azepin-7-yl)carbamate 68 (0.19 g, 0.00056 mol, 1.0 eq), DIPEA (0.58 g, 0.0045 mol, 8.0 eq) and CH₃CH₂CN:DMF mixture (8:2 v/v) (5 mL). The nitrogen was bubbled into the reaction mixture for 10 min. Pd(OAc)₂ (0.013 g, 0.000056 mol, 0.1 eq) and tri (o-tolyl) phosphine (0.035 g, 0.00011 mol, 0.2 eq) were added and the nitrogen was bubbled into the mixture for an additional 5 min. The reaction vial was sealed and stirred at 100° C. for 16 h. The resulting mixture was cooled to RT, filtered through a Celite bed and the cake was washed with EtOAc (50 mL). The filtarate was washed with water (20 mL), brine (20 mL), dried (Na₂SO₄), filtered and concentrated under reduced pressure. The crude product was purified by CC (eluent: DCM/MeOH, 98/2 v/v) to give the expected molecule 105 (0.1 g) as an off-white solid. This product was further separated by chiral preparative HPLC into pure enantiomers. LCMS (Method 3): m/z 523.41 [M+H].⁺

Step 7. tert-Butyl (S,E)-(3-(3-(((7-fluoro-3-methylbenzofuran-2-yl)methyl)(methyl)amino)-3-oxoprop-1-en-1-yl)-8-oxo-6,7,8,9-tetrahydro-5H-pyrido[2,3-b]azepin- 7-yl)carbamate (compound 106). A racemic mixture of tert-butyl (E)-(3-(3-(((7-fluoro-3-methylbenzofuran-2-yl)methyl)(methyl)amino)-3-oxoprop-1-en-1-yl)-8-oxo-6,7,8,9-tetrahydro-5H-pyrido[2,3-b]azepin-7-yl) carbamate 105 (0.1 g) was submitted for chiral HPLC separation and both enantiomers were separated. The first eluting fraction (compound 106): t$_{ret}$=18.03 min was obtained (0.03 g). LCMS (Method 3): m/z 523.40 [M+H].$^+$ Chiral method separation: Column Name: Chiralpak IC (4.6×250) mm, 5u. Mobile phase: 0.1% DEA in Hexane/EtOH=40/60 (v/v). Flow rate: 1.0 mL/min. Flow mode: isocratic. Temperature: Ambient.

Step 8. (S,E)-3-(7-Amino-8-oxo-6,7,8,9-tetrahydro-5H-pyrido[2,3-b]azepin-3-yl)-N-((7-fluoro-3-methylbenzofuran-2-yl)methyl)-N-methylacrylamide hydrochloride (compound 107). To a stirred solution of tert-butyl (S,E)-(3-(3-(((7-fluoro-3-methylbenzofuran-2-yl)methyl)(methyl)amino)-3-oxoprop-1-en-1-yl)-8-oxo-6,7,8,9-tetrahydro-5H-pyrido[2,3-b]azepin-7-yl)carbamate 106 (0.025 g, 0.000047 mol) in DCM (0.5 mL), 2 M HCl in Et$_2$O (0.5 mL), was added dropwise at 0° C. The reaction mixture was stirred from 0° C. to RT over 1 h, then cold Et$_2$O (5 mL) was added to precipitate the product, the solvent was decanted and the product was dried. The title compound 107 (0.017 g, 0.000037 mol, 80%) as an off white solid was isolated. Chiral HPLC purity: 99.72%. LCMS (Method 3): m/z 423.46 [M+H].$^+$ $^1$H NMR (DMSO-d$_6$, 400 MHZ): δ (ppm): 10.92 (s, 1H), 8.65-8.61 (m, 1H), 8.28-8.24 (m, 4H), 7.64-7.17 (m, 5H), 5.05-4.82 (2H), 3.88 (s, 1H), 3.22-2.94 (3H), 2.81-2.74 (m, 2H), 2.59-2.53 (m, 1H), 2.28 (s, 3H), 2.23-2.18 (s, 1H). The stereochemistry for compound 107 was arbitrarily attributed.

Example 15. Synthesis of (S,E)-N-((7-fluoro-3-methylbenzofuran-2-yl)methyl)-N-methyl-3-(7-morpholino-8-oxo-6,7,8,9-tetrahydro-5H-pyrido[2,3-b]azepin-3-yl)acrylamide (compound 113)

General Synthetic Scheme.

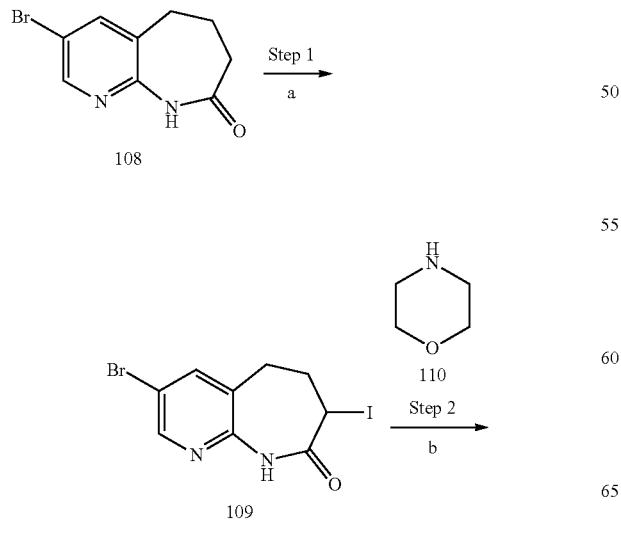

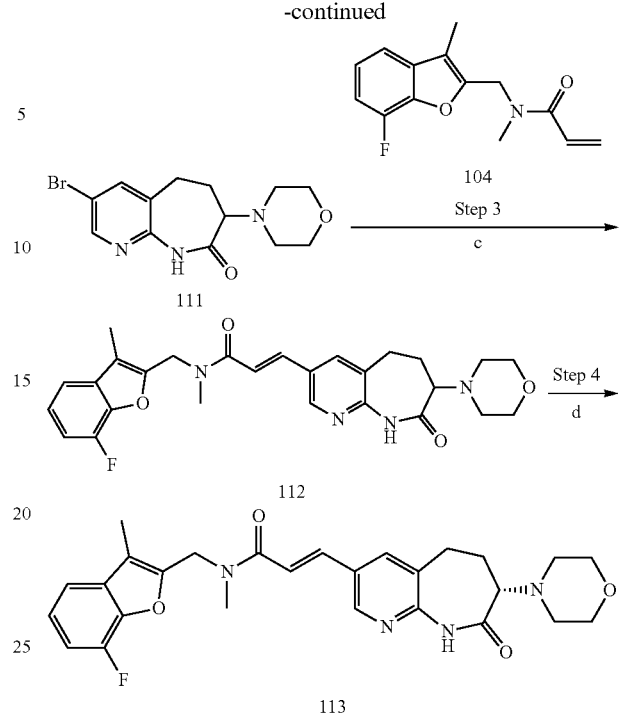

Reaction conditions: a) TMSI, I$_2$, TMEDA, DCM; b) K$_2$CO$_3$, ACN; c) Pd(OAc)$_2$; tri(o-tolyl)phosphine, DIPEA, propionitrile; d) chiral separation 3-Bromo-5,6,7,9-tetrahydro-8H-pyrido[2,3-b]azepin-8-one (compound 108) was prepared as described in AFFINIUM PHARMACEUTICALS, INC.—WO2007/67416, 2007, A2.

Step 1. 3-Bromo-7-iodo-5,6,7,9-tetrahydro-8H-pyrido[2,3-b]azepin-8-one (compound 109). To a stirred solution of 3-bromo-5,6,7,9-tetrahydro-8H-pyrido[2,3-b]azepin-8-one 108 (4.0 g, 0.0167 mol, 1.0 eq) in DCM (40 mL) under N$_2$ atmosphere at 0° C., TMEDA (8.16 g, 0.0703 mol, 4.2 eq) and trimethylsilyl iodide (7.4 g, 0.0368 mol, 2.2 eq) were added, then stirred for 1 h at 0° C. and iodine (7.5 g, 0.0585 mol, 3.5 eq) was added. The resulting mixture was stirred at 0° C. for an additional 1 h. The reaction was diluted with H$_2$O (100 mL) and extracted with DCM (2×100 mL). The combined organic layers were washed with aq. Na$_2$S$_2$O$_3$ (100 mL), dried (Na$_2$SO$_4$), filtered and concentrated under reduced pressure. The crude product was washed with MeOH to afford the title compound 109 (4.0 g, 0.0109 mol, 65.3%) as a white solid. LCMS (Method 3): m/z 368.94 [M+H].$^+$ Step 2. 3-Bromo-7-morpholino-5,6,7,9-tetrahydro-8H-pyrido[2,3-b]azepin-8-one (compound 111). To a stirred solution of 3-bromo-7-iodo-5,6,7,9-tetrahydro-8H-pyrido[2,3-b]azepin-8-one 109 (0.35 g, 0.000956 mol, 1.0 eq) in ACN (5 mL) under nitrogen atmosphere, K$_2$CO$_3$ (0.264 g, 0.00191 mol, 2.0 eq) and morpholine 110 (7.4 g, 0.00114 mol, 1.2 eq) were added and the reaction mixture was heated at 80° C. for 12 h. The reaction was diluted with H$_2$O (50 mL) and extracted with EtOAc (2×50 mL). The combined organic layers were washed with brine (20 mL), dried (Na$_2$SO$_4$), filtered and concentrated under reduced pressure to afford the crude material which was recrystallized from MeOH (5 mL) and DCM (5 mL) mixture to afford the expected 111 (0.13 g, 0.000398 mol, 41.8%) as an off white solid. LCMS (Method 3): m/z 328.2 [M+H].+

Step 3. (E)-N-((7-Fluorobenzofuran-2-yl)methyl)-N-methyl-3-(7-morpholino-8-oxo-6,7,8,9-tetrahydro-5H-pyrido[2,3-b]azepin-3-yl)acrylamide (compound 112). A 20 mL vial flask was successively charged with 3-bromo-7-morpholino-5,6,7,9-tetrahydro-8H-pyrido[2,3-b]azepin-8-one 111 (0.12 g, 0.000368 mol, 1.0 eq), N-((7-fluoro-3-methylbenzofuran-2-yl)methyl)-N-methylacrylamide 104 (0.1 g, 0.000404 mol, 1.1 eq), DIPEA (0.38 g, 0.00294 mol, 8.0 eq) and a mixture of propionitrile: DMF (4:1 v/v) (5 mL). Dry nitrogen was bubbled through the reaction mixture for 10 min. Subsequently, Pd(OAc)$_2$ (0.008 g, 0.0000368 mol, 0.1 eq) and tri (o-tolyl) phosphine (0.023 g, 0.0000736 mol, 0.2 eq) was added and the nitrogen was bubbled for an additional 5 min. The reaction vial was sealed and stirred at 100° C. for 16 h. Then, cooled down to RT, diluted with H$_2$O (50 mL), extracted with EtOAc (2×50 ml), dried (Na$_2$SO$_4$), filtered and concentrated to dryness. The crude product was recrystallized from a mixture of MeOH (5 mL) and DCM (5 ml). The title compound 112 (0.05 g, 0.000101 mol, 27.6%) as an off white solid was obtained. LCMS (Method 3): m/z 493.58 [M+H].+ $^1$H NMR (DMSO-d$_6$, 400 MHZ): δ (ppm): 10.17 (bs, 1H), 8.52-8.49 (m, 1H), 8.11 (s, 1H), 7.56-7.16 (m, 5H), 5.04-4.82 (2H), 3.42-3.36 (m, 4H), 3.21-2.94 (m, 5H), 2.80-2.59 (m, 5H), 2.32-2.19 (m, 5H).

Step 4. (S,E)-N-((7-Fluoro-3-methylbenzofuran-2-yl)methyl)-N-methyl-3-(7-morpholino-8-oxo-6,7,8,9-tetrahydro-5H-pyrido[2,3-b]azepin-3-yl)acrylamide (compound 113). A racemic mixture of E)-N-((7-Fluorobenzofuran-2-yl)methyl)-N-methyl-3-(7-morpholino-8-oxo-6,7,8,9-tetrahydro-5H-pyrido[2,3-b]azepin-3-yl)acrylamide 112 (22 mg) was submitted for chiral separation and both enantiomers were separated. Pure fractions of second enantiomer were collected and concentrated. Then slurring in diethyl ether and filtration by centrifugation were repeated twice before drying at 25° C. under vacuum. The second enantiomer 113 was obtained as white powder (m=6.26 mg; chiral purity: 99.4%). LCMS (Method 3): m/z 493.3 [M+H].+ The stereochemistry for compound 113 was arbitrarily attributed. Chiral method separation: Apparatus: Isolera (Biotage). Column: Chiralpak IA (20 µm; glass column; 250 mm×25 mm). Eluent: Acetonitrile/THF (8/2). Flow 40 mL/min. Temperature: 25° C. Run time: 18 min.

Example 16. Synthesis of (S,E)-3-(7-amino-8-oxo-6,7,8,9-tetrahydro-5H-pyrido[2,3-b]azepin-3-yl)-N-methyl-N-((3-methylbenzo[b]thiophen-2-yl)methyl) acrylamide hydrochloride (compound 119)

General Synthetic Scheme.

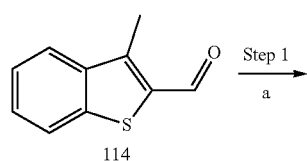

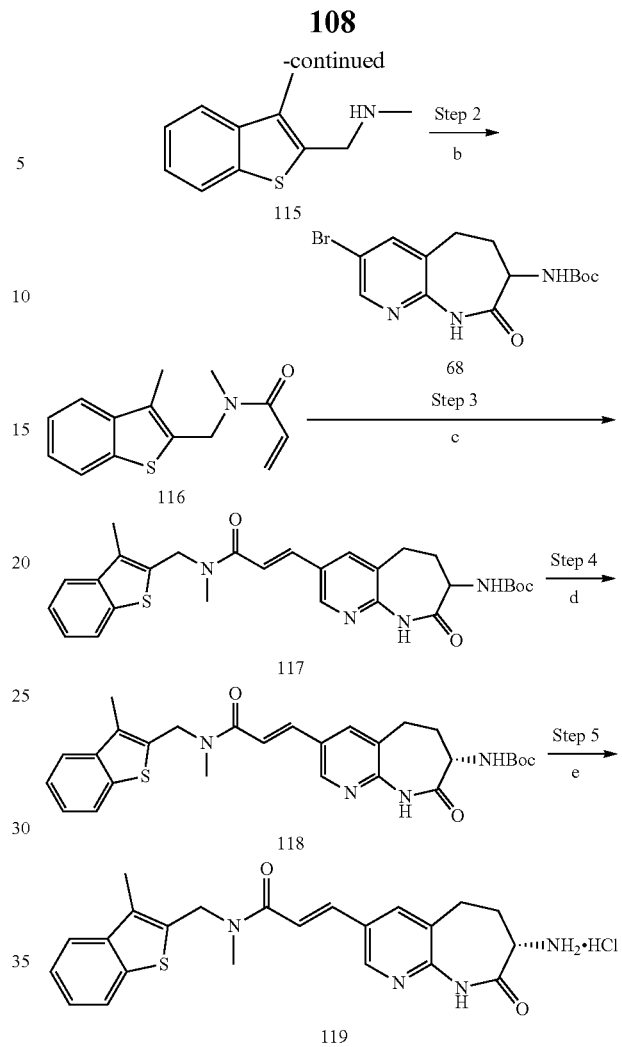

Reaction conditions: a) MENH$_2$, NaBH$_4$, EtOH; b) acryloyl chloride, Et$_3$N, DCM; c) Pd(OAc)$_2$; tri(o-tolyl)phosphine, DIPEA, propionitrile; d) chiral HPLC separation; e) Etheral HCl, (2M), DCM Step 1. N-Methyl-1-(3-methylbenzo[b]thiophen-2-yl)methanamine (compound 115). To a mixture of 3-methylbenzo[b]thiophene-2-carbaldehyde 114 (1.0 g, 0.00568 mol, 1.0 eq) in MeOH (20 mL), 40% aq. MeNH$_2$ solution (20 mL) was added under N$_2$ atmosphere. The reaction was stirred at room temperature for 16 h and the solution was concentrated under reduced pressure. The resulting residue was re-dissolved in EtOH (20 mL) and NaBH$_4$ was added at 0° C. under N$_2$. The mixture was stirred at room temperature for 1 h (TLC control), then quenched with ice water (50 mL), extracted with EtOAc (2×50 mL), dried (Na$_2$SO$_4$), filtered and evaporated. The crude amine was further purified by CC (silica gel, DCM/MeOH, 95:5 v/v) to give title compound 115 (0.9 g, 0.004705 mol, 83%) as a colourless viscous oil was obtained. LCMS (Method 3): m/z: 191.93 [M+H].+

Step 2. N-Methyl-N-((3-methylbenzo[b]thiophen-2-yl)methyl)acrylamide (compound 116). To a stirred solution of N-methyl-1-(3-methylbenzo[b]thiophen-2-yl)methanamine 115 (0.9 g, 0.0047 mol, 1.0 eq) in DCM (20 mL), Et$_3$N (1.42 g, 0.0141 mol, 3.0 eq) and acryloyl chloride (0.511 g, 0.0056 mol, 1.2 eq) were added at 0° C. The reaction was stirred and warming up to RT over 30 min, then poured into water (50 mL), extracted with DCM (2×50 mL), dried (Na$_2$SO$_4$), filtered and evaporated. The product was purified by CC (silica gel, n-Hexane/EtOAc, 70:30 v/v). The title acrylamide 116 (0.7 g, 0.00285 mol, 60.5%) as a colourless viscous oil was obtained. LCMS (Method 3): m/z: 245.96 [M+H].+

Step 3. tert-Butyl (E)-(3-(3-(methyl((3-methylbenzo[b]thiophen-2-yl)methyl)amino)-3-oxoprop-1-en-1-yl)-8-oxo-6,7,8,9-tetrahydro-5H-pyrido[2,3-b]azepin-7-yl)carbamate (compound 117). To a solution of N-methyl-N-((3-methylbenzo[b]thiophen-2-yl)methyl)acrylamide 116 (0.2 g, 0.000816 mol, 1.0 eq) and tert-butyl (3-bromo-8-oxo-6,7,8,9-tetrahydro-5H-pyrido[2,3-b]azepin-7-yl)carbamate 68 (0.29 g, 0.000816 mol, 1.0 eq) in propionitrile: DMF mixture (4:1 v/v, 10 mL), DIPEA (0.84 g, 0.00653 mol, 8.0 eq) was added and the resulting mixture was purged with N$_2$ for 10 minutes. Subsequently, Pd(OAc)$_2$ (0.018 g, 0.0000816 mol, 0.1 eq) and tri (o-tolyl) phosphine (0.049 g, 0.000163 mol, 0.2 eq) were added. The reaction was stirred and heated at 100° C. for 16 h. The resulting mixture was cooled down to RT, diluted with water (50 mL) and extracted with EtOAc (2×50 mL). The organic layers were dried (Na$_2$SO$_4$), filtered and concentrated under reduced pressure to afford the crude product which was further purified by CC (silica gel, n-Hexane/EtOAc, 20:80 v/v) to afford the title compound 117 (0.15 g, 0.000288 mol, 35.29%) as a white solid. LCMS (method 3): m/z: 521.47 [M+H].+

Step 4. tert-Butyl (S,E)-(3-(3-(methyl((3-methylbenzo[b]thiophen-2-yl)methyl)amino)-3-oxoprop-1-en-1-yl)-8-oxo-6,7,8,9-tetrahydro-5H-pyrido[2,3-b]azepin-7-yl)carbamate (compound 118). A racemic mixture of tert-butyl (E)-(3-(3-(methyl((3-methylbenzo[b]thiophen-2-yl)methyl)amino)-3-oxoprop-1-en-1-yl)-8-oxo-6,7,8,9-tetrahydro-5H-pyrido[2,3-b]azepin-7-yl)carbamate 117 (0.15 g) submitted for chiral HPLC separation and both enantiomers were separated. Pure fractions of first enantiomer 118 (PEAK-1) were collected, concentrated under reduced pressure and dried (0.05 g). t$_{ret}$=17.88 min. LCMS (Method 3): m/z 521.49 [M+H].+

Chiral method separation: Column Name: Chiralpak IC (4.6×250) mm, 5μ. Mobile phase: 0.1% DEA in Hexane/EtOH=40/60 (v/v). Flow rate: 1.0 mL/min. Flow mode: isocratic. Temperature: ambient.

Step 5. (S,E)-3-(7-Amino-8-oxo-6,7,8,9-tetrahydro-5H-pyrido[2,3-b]azepin-3-yl)-N-methyl-N-((3-methylbenzo[b]thiophen-2-yl)methyl)acrylamide hydrochloride (compound 119). To a stirred solution of enantiomerically pure tert-butyl (S,E)-(3-(3-(methyl((3-methylbenzo[b]thiophen-2-yl)methyl)amino)-3-oxoprop-1-en-1-yl)-8-oxo-6,7,8,9-tetrahydro-5H-pyrido[2,3-b]azepin-7-yl)carbamate 118 (0.045 g, 0.0000864 mol, 1.0 eq) in DCM (2.0 mL), 2 M HCl in ether (0.5 mL) was added dropwise at 0° C. The reaction mixture was stirred at 0° C. for 30 min and then for 1.5 h at RT. The organic phase (DCM) was decanted and the residue was triturated with ether (2×5 mL) and the desired product recovered by filtration. The title target 119 (0.021 g, 0.0000459 mol, 53.8%) as an off white solid was produced. LCMS (Method 3): m/z 421.44 [M+H].+ $^1$HNMR (DMSO-d$_6$, 400 MHZ): δ (ppm): 10.91 (s, 1H), 8.63-8.62 (m, 1H), 8.30-8.23 (m, 4H), 7.87 (d, J=7.96 Hz, 1H), 7.74 (d, J=7.76 Hz, 1H), 7.61-7.31 (m, 4H), 5.13-4.89 (2H), 3.86 (bs, 1H), 3.17-2.94 (3H), 2.81-2.74 (m, 2H), 2.55-2.53 (m, 1H), 2.42 (s, 3H), 2.20-2.18 (m, 1H). Chiral purity: 99.92%). The stereochemistry for compound 119 was arbitrarily attributed.

Example 17. Synthesis of (S,E)-3-(7-amino-8-oxo-6,7,8,9-tetrahydro-5H-pyrido[2,3-b]azepin-3-yl)-N-((4-fluoro-3-methylbenzofuran-2-yl)methyl)-N-methylacrylamide hydrochloride (compound 130)

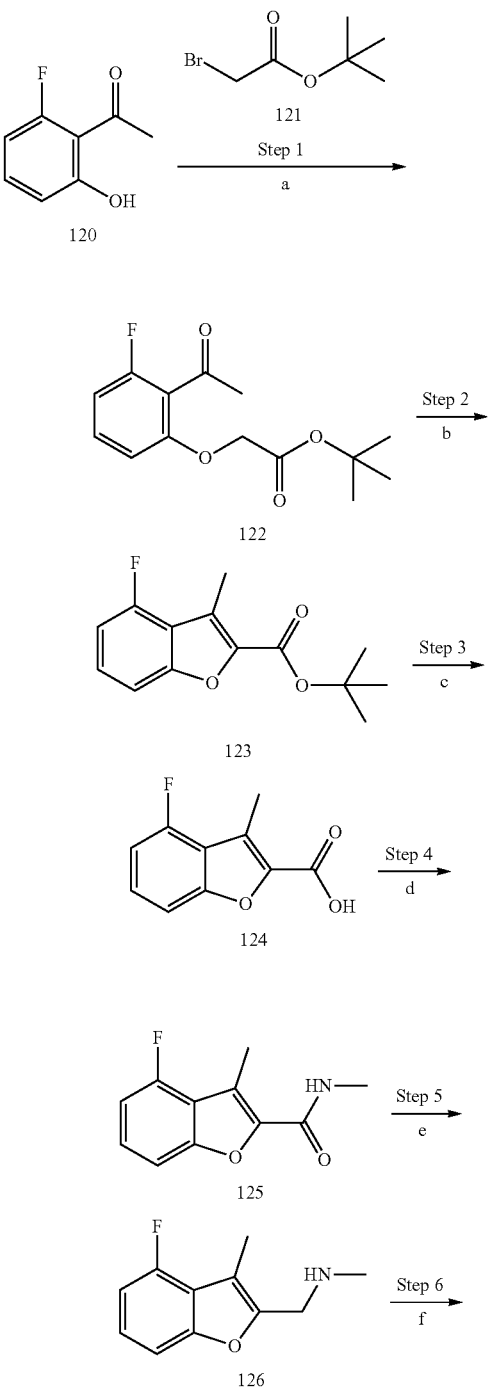

General Synthetic Scheme.

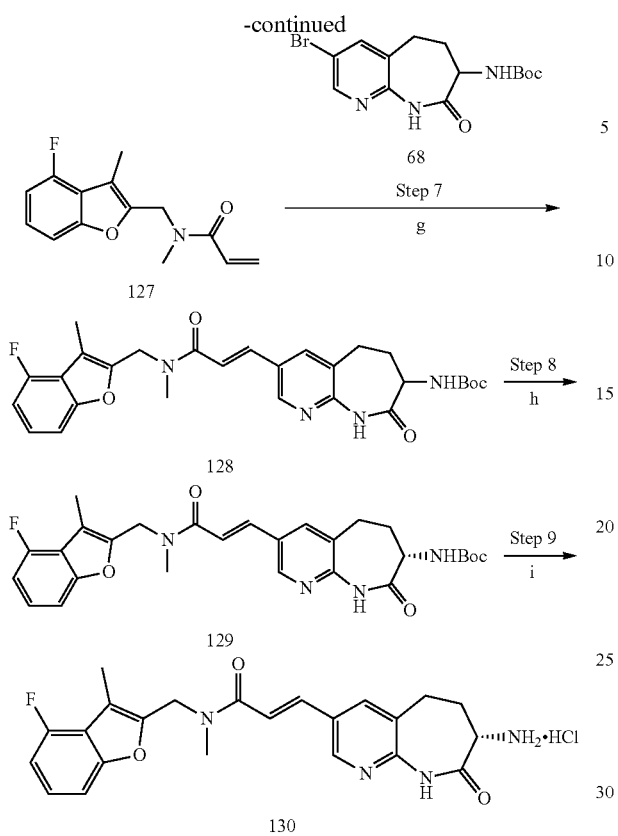

Reaction conditions: a) K₂CO₃, DMF; b) DBU, DMF; c) TFA, DCM; d) MeNH₂•HCl, EDC, HOBT, DIPEA, DMF; e) LAH, THF; f) acryloyl chloride, TEA, DCM; g) Pd(OAc)₂, tri(o-tolyl)phosphine, DIPEA, propionitrile; h) chiral separation; i) Etheral HCl, DCM Step 1. tert-Butyl 2-(2-acetyl-3-fluorophenoxy) acetate (compound 122). To a solution of commercially available 1-(2-fluoro-6-hydroxyphenyl) ethan-1-one 120 (2.7 g, 0.0175 mol, 1.0 eq) in DMF (30 mL), K₂CO₃ (6.03 g, 0.0437 mol, 2.5 eq) was added. To this, tert-butyl 2-bromoacetate 121 (4.1 g, 0.021 mol, 1.2 eq) was added dropwise and the reaction mixture was stirred at room temperature for 3 h. The reaction mixture was diluted with water (100 mL), extracted with EtOAc (100 mL), dried (Na₂SO₄), filtered and evaporated to afford the crude product which was further purified by CC (silica gel, n-Hexane/EtOAc, 90:10 v/v). The desired compound 122 (4.6 g, 0.0171 mol, 94.4%) as brown oil was obtained. LCMS (Method 3): m/z: 269.26 [M+H].⁺

Step 2. tert-Butyl 4-Fluoro-3-methylbenzofuran-2-carboxylate (compound 123). To a stirred solution of tert-butyl 2-(2-acetyl-3-fluorophenoxy) acetate 122 (4.5 g, 0.017 mol, 1 eq) in DMF (40 mL), was added DBU (5.16 g, 0.034 mol, 2.0 eq) at RT and the reaction mixture was heated at 110° C. for 1 h. After the completion of the reaction, it was diluted with H₂O (100 mL) and extracted with EtOAc (150 mL), dried over Na₂SO₄, filtered and evaporated to afford the crude product which was further purified by CC (silica gel, n-Hexane/EtOAc, 90:10 v/v). The expected intermediate 123 (2.0 g, 0.08 mol, 46.6%) as a white solid was obtained. LCMS (Method 3): m/z: 251.27 [M+H].⁺

Step 3. 4-Fluoro-3-methylbenzofuran-2-carboxylic acid (compound 124). To a stirred solution of tert-butyl 4-fluoro-3-methylbenzofuran-2-carboxylate 123 (1.98 g, 0.00792 mol, 1.0 eq) in DCM (15 mL) at 0° C., TFA (1.0 mL) was added dropwise and the reaction was stirred at 0° C. to RT for 12 h. The crude mixture was concentrated to dryness to afford the title compound 124 (1.45 g, 0.007468 mol, 94.3%) as a white solid. LCMS (Method 3): m/z: 193.2 [M–H].

Step 4. 4-Fluoro-N,3-dimethylbenzofuran-2-carboxamide (compound 125). To a stirred solution of 4-fluoro-3-methylbenzofuran-2-carboxylic acid 124 (1.45 g, 0.00746 mol, 1.0 eq) in DMF (5 mL), EDCI (2.317 g, 0.0149 mol, 2.0 eq), HOBt (2.279 g, 0.0149 mol, 2.0 eq), DIPEA (0.93 g, 0.0444 mol, 6.0 eq) and methylamine HCl (1.01 g, 0.0149 mol, 2.0 eq) were added. The reaction was heated at 60° C. overnight. Then, the reaction mixture was diluted with water (200 ml), extracted with EtOAc (200 ml), dried (Na₂SO₄), filtered and evaporated to afford the crude product which was further purified by flash CC (silica gel, n-Hexane/EtOAc, 70:30 v/v). The title compound 125 (1.1 g, 0.053 mol, 73.3%) as a white solid was obtained. LCMS (Method 3): m/z: 208.1 [M+H].⁺

Step 5. 1-(4-Fluoro-3-methylbenzofuran-2-yl)-N-methylmethanamine (compound 126). To a stirred solution of 4-fluoro-N,3-dimethylbenzofuran-2-carboxamide 125 (1.1 g, 0.0053 mol) in THF (15 mL) at 0° C., 1 M LAH in THF (5.3 mL, 0.0106 mol, 2.0 eq) was added dropwise. The reaction mixture was stirred at 0° C.-RT for 16 h. After the completion of the reaction (TLC control), the resulting mixture was cooled to 0° C. and quenched with 2 N NaOH (5 mL). The crude mixture was filtered through a pad of Celite and washed with THF (25 mL). The filtrate was dried over Na₂SO₄, filtered and evaporated to afford the crude product which was further purified by CC (silica gel, EtOAc). The title compound 126 (0.37 g, 0.0019 mol, 36.2%) as a colourless oil was obtained. ¹H NMR (CDCl₃, 400 MHZ): δ (ppm): 7.21-7.11 (m, 2H), 6.88-6.83 (m, 1H), 3.83 (s, 2H), 2.45 (s, 3H), 2.35 (s, 3H).

Step 6. N-((4-Fluoro-3-methylbenzofuran-2-yl)methyl)-N-methylacrylamide (compound 127). To a stirred solution of 1-(4-fluoro-3-methylbenzofuran-2-yl)-N-methylmethanamine 126 (0.37 g, 0.00191 mol, 1 eq) in DCM (15 mL) at 0° C., Et3N (0.578 g, 0.0057 mol, 3.0 eq) and acryloyl chloride (0.26 g, 0.00287 mol, 1.5 eq) were added. The reaction was stirred at 0° C. for 1 h. The resulting mixture was quenched with water (20 mL), extracted with DCM (100 mL), dried (Na₂SO₄), filtered and evaporated to afford the crude product which was further purified by CC (silica gel, n-Hexane/EtOAc, 50:50 v/v). The title compound 127 (0.24 g, 0.00097 mol, 50%) as a colouless liquid was obtained. LCMS (Method 3): m/z: 248.28 [M+H].⁺

Step 7. tert-Butyl (E)-(3-(3-(((4-fluoro-3-methylbenzofuran-2-yl)methyl)(methyl)amino)-3-oxoprop-1-en-1-yl)-8-oxo-6,7,8,9-tetrahydro-5H-pyrido[2,3-b]azepin-7-yl)carbamate (compound 128). A 20 mL vial flask was successively charged with N-((4-fluoro-3-methylbenzofuran-2-yl)methyl)-N-methylacrylamide 127 (0.12 g, 0.000485 mol, 1.2 eq), tert-butyl (3-bromo-8-oxo-6,7,8,9-tetrahydro-5H-pyrido[2,3-b]azepin-7-yl)carbamate 68 (0.171 g, 0.000485 mol, 1.0 eq), DIPEA (0.5 g, 0.00308 mol, 8 eq) and a mixture of CH₃CH₂CN:DMF (4:1 v/v) (5 mL). Nitrogen was bubbled into the reaction mixture for 10 min. Pd(OAc)₂ (0.011 g, 0.0000485 mol, 0.1 eq) and tri (o-tolyl) phosphine (0.029 g, 0.000097 mol, 0.2 eq) were added to the reaction mixture and nitrogen was bubbled into it for an additional 5 min. The reaction vial was sealed and heated at 100° C. overnight. The reaction mixture was cooled to RT, filtered through the Celite bed, rinsed with EtOAc (50 mL) and the filtrate was concentrated under reduced pressure to afford the crude product which was purified by CC (silica gel, EtOAc). The desired molecule 128 (0.055 g, 0.0001 mol, 21.7%) as a white solid was isolated. LCMS (Method 3): m/z 523.16 [M+H].+

Step 8. tert-Butyl (S,E)-(3-(3-(((4-fluoro-3-methylbenzofuran-2-yl)methyl)(methyl)amino)-3-oxoprop-1-en-1-yl)-8-oxo-6,7,8,9-tetrahydro-5H-pyrido[2,3-b]azepin-7-yl)carbamate (compound 129). The racemic mixture of tert-butyl (E)-(3-(3-(((4-fluoro-3-methylbenzofuran-2-yl)methyl)(methyl)amino)-3-oxoprop-1-en-1-yl)-8-oxo-6,7,8,9-tetrahydro-5H-pyrido[2,3-b]azepin-7-yl) carbamate 128 (0.064 g) was submitted for chiral HPLC separation and both enantiomers were isolated.

Pure fractions of first enantiomer (compound 129, PEAK-1) were collected, concentrated under reduced pressure and dried (0.015 g). $t_{ret}$=10.56 min. LCMS (Method 3): m/z 523.42 [M+H].+

Chiral method separation: Column Name: Chiralpak IC (4.6×250) mm, 5u. Mobile phase: 0.1% DEA in Hexane/EtOH=20/80 (v/v). Flow rate: 1.0 mL/min. Flow mode: isocratic. Temperature: ambient.

Step 9. (S,E)-3-(7-Amino-8-oxo-6,7,8,9-tetrahydro-5H-pyrido[2,3-b]azepin-3-yl)-N-((4-fluoro-3-methylbenzofuran-2-yl)methyl)-N-methylacrylamide hydrochloride (compound 130). To a stirring solution of tert-butyl (S,E)-(3-(3-(((4-fluoro-3-methylbenzofuran-2-yl)methyl)(methyl)amino)-3-oxoprop-1-en-1-yl)-8-oxo-6,7,8,9-tetrahydro-5H-pyrido[2,3-b]azepin-7-yl)carbamate 129 (0.015 g, 0.0000287 mol, 1.0 eq) in DCM (0.5 mL), 2 M HCl in ether (0.5 mL) was added dropwise at 0° C. The reaction mixture was stirred for 1 h (0° C. to RT), then cold ether (10 mL) was added to precipitate out the HCl salt of 130. The solid was dried under high vacuum to afford the title product 130 (0.011 g, 0.00002397 mol, 83.5%) as an off white solid. LCMS (Method 3): m/z 423.17 [M+H].+ ¹H NMR (DMSO-d₆, 400 MHZ): δ (ppm): 10.92 (s, 1H), 8.64-8.61 (m, 1H), 8.28-8.18 (m, 4H), 7.59-7.01 (m, 4H), 5.01-4.79 (2H), 3.91-3.90 (m, 1H), 3.20-2.92 (3H), 2.84-2.74 (m, 2H), 2.54-2.50 (m, 1H), 2.37 (s, 3H), 2.23-2.09 (m, 1H). The stereochemistry for compound 130 was arbitrarily attributed.

Example 18. Synthesis of (S,E)-3-(7-amino-8-oxo-6,7,8,9-tetrahydro-5H-pyrido[2,3-b]azepin-3-yl)-N-((7-fluoro-3-methylbenzo[b]thiophen-2-yl)methyl)-N-methylacrylamide hydrochloride (compound 140)

General Synthetic Scheme.

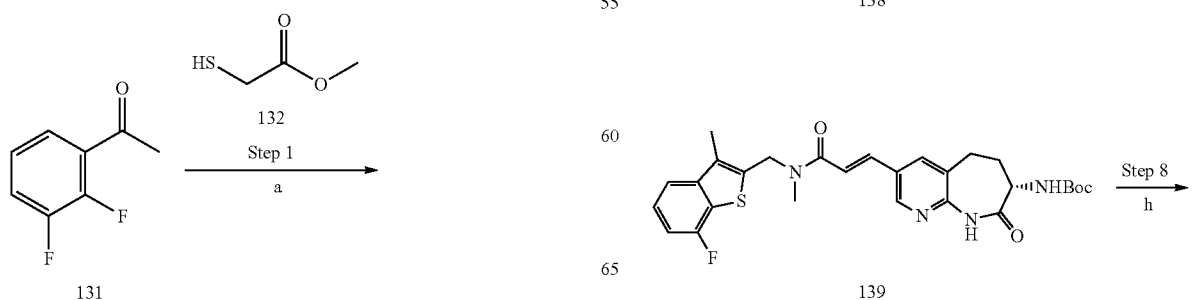

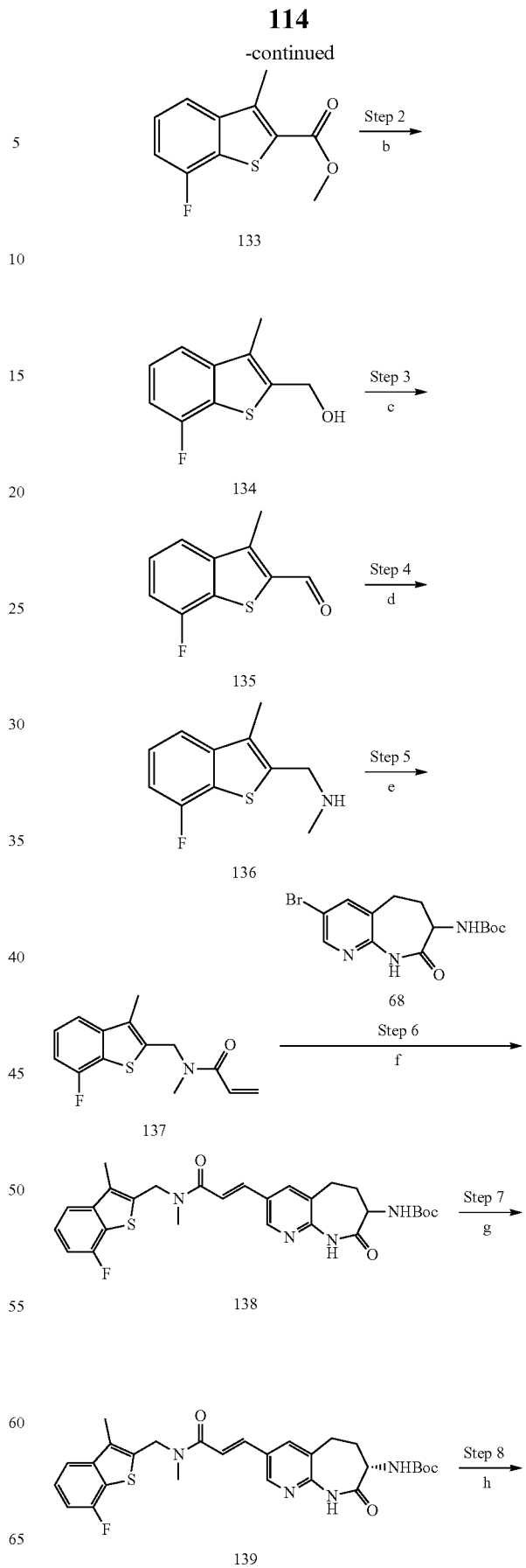

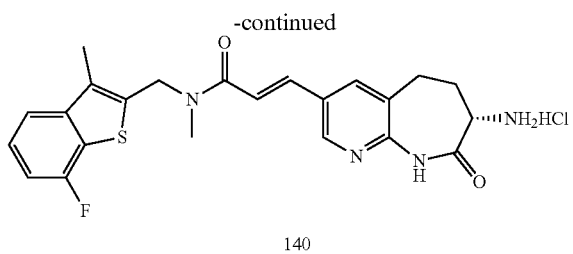

140

Reaction conditions: a) DBU; b) LAH, THF; c) Dess-Martin, DCM; d) MeNH$_2$, EtOH, NaBH$_4$, RT; e) acryloyl chloride, TEA, DCM; f) Pd(OAc)$_2$, tri(o-tolyl)phosphine, DIPEA,, propionitrile; g) chiral separation; h) Etheral HCl, DCM Step 1. Methyl 7-fluoro-3-methylbenzo[b]thiophene-2-carboxylate (compound 133). To a mixture of 1-(2,3-difluorophenyl) ethan-1-one 131 (4.5 g, 0.0288 mol, 1.0 eq) and methyl thioglycolate 132 (3.06 g, 0.0288 mol, 1.0 eq), DBU (8.76 g, 0.0576 mol, 2.0 eq) was added at 0° C. under N$_2$ atmosphere. The reaction was stirred at 0° C. for 3 h and then at room temperature for 12 h (TLC monitoring). Subsequently, the reaction was quenched with water (200 mL), extracted with EtOAc (2×200 mL), dried (Na$_2$SO$_4$), filtered and evaporated to afford the title benzo[b]thiophene 133 (6.4 g, 0.02854 mol, 96.96%) as a white solid. $^1$H NMR (DMSO-d$_6$, 400 MHZ): δ (ppm): 7.86 (d, J=8.0 Hz, 1H), 7.57-7.42 (m, 2H), 3.89 (s, 3H), 2.74 (s, 3H).

Step 2. (7-Fluoro-3-methylbenzo[b]thiophen-2-yl) methanol (compound 134). To a stirred solution of methyl 7-fluoro-3-methylbenzo[b]thiophene-2-carboxylate 133 (5.0 g, 0.0223 mol, 1.0 eq) in THF (30 mL) at 0° C., 2 M LAH in THF (16.7 mL, 0.0334 mol, 1.5 eq) was added dropwise. The reaction was stirred at room temperature for 2 h (TLC), quenched with 2 M NaOH (30 mL), filtered through Celite and the filter cake was rinsed with EtOAc (2×150 mL). The filtrate was washed with brine solution (100 mL), dried (Na$_2$SO$_4$), filtered and evaporated to afford the title compound 134 (4.0 g, 0.02038 mol, 91.53%) as a white solid. $^1$H NMR (DMSO-d$_6$, 400 MHZ): δ (ppm): 7.56 (d, J=7.92 Hz, 1H), 7.43-7.16 (m, 2H), 4.75 (d, J=5.44 Hz, 1H), 5.69 (t, J=5.56 Hz, 2H), 2.31 (s, 3H).

Step 3. 7-Fluoro-3-methylbenzo[b]thiophene-2-carbaldehyde (compound 135). To a stirred solution of (7-fluoro-3-methylbenzo[b]thiophen-2-yl) methanol 134 (4.0 g, 0.02038 mol, 1.0 eq) in DCM (100 mL), Dess Martin periodinane (25.9 g, 0.0611 mol, 3.0 eq) was added. The resulting mixture was stirred at room temperature for 16 h. The reaction mass was quenched with water (100 mL), extracted with DCM (2×100 mL), dried (Na$_2$SO$_4$), filtered and evaporated to afford the title compound 135 (3.7 g, 0.01907 mol, 93.67%) as a white solid. $^1$H NMR (DMSO-d$_6$, 400 MHZ): δ (ppm): 10.37 (s, 1H), 8.05 (d, J=7.68 Hz, 1H), 7.65-7.47 (m, 2H), 2.82 (s, 3H).

Step 4. 1-(7-Fluoro-3-methylbenzo[b]thiophen-2-yl)-N-methylmethanamine (compound 136). To a stirred solution of 7-fluoro-3-methylbenzo[b]thiophene-2-carbaldehyde 135 (3.7 g, 0.01907 mol, 1.0 eq) in EtOH (40 mL), 40% aq. MeNH$_2$ solution (40 mL) was added. The reaction mixture was stirred at RT overnight (18 h) and the solution was concentrated under reduced pressure. The residue was suspended in EtOH (40 mL) under N$_2$, NaBH$_4$ (3.62 g, 0.09535 mol, 5.0 eq) was added portionwise at 0° C. and the reaction was stirred at room temperature for 2 h (TLC control). The reaction was quenched with H$_2$O (100 mL), extracted with DCM (2×150 mL), dried (Na$_2$SO$_4$), filtered and evaporated to dryness. The crude product was purified by CC (silica gel, DCM/MeOH, 96:4 v/v). The desired amine 136 (3.0 g, 0.01433 mol, 75.18%) as a yellow solid was obtained. $^1$H NMR (DMSO-d$_6$, 400 MHZ): δ (ppm): 7.42 (d, J=7.92 Hz, 1H), 7.33-7.25 (m, 1H), 7.02-6.97 (m, 1H), 4.01 (s, 2H), 2.36 (s, 3H).

Step 5. N-((7-Fluoro-3-methylbenzo[b]thiophen-2-yl)methyl)-N-methylacrylamide (compound 137). To a stirred solution of 1-(7-fluoro-3-methylbenzo[b]thiophen-2-yl)-N-methylmethanamine 136 (3.0 g, 0.01433 mol, 1.0 eq) in DCM (30 mL) at 0° C., Et$_3$N (2.89 g, 0.02866 mol, 2.0 eq) and acryloyl chloride (1.42 g, 0.01576 mol, 1.1 eq) were added. The reaction was stirred at 0° C. for 2 h, quenched with water (80 mL), extracted with DCM (2×100 mL), dried (Na$_2$SO$_4$), filtered and evaporated to dryness. The crude product was further purified by CC (silica gel, n-hexane/EtOAc, 75:25 v/v). The title compound 137 (2.3 g, 0.0113 mol, 61%) as yellow solid was obtained. LCMS (Method 3): m/z: 264.10 [M+H].$^+$ Step 6. tert-Butyl (E)-(3-(3-(((7-fluoro-3-methylbenzo[b]thiophen-2-yl)methyl)(methyl)amino)-3-oxoprop-1-en-1-yl)-8-oxo-6,7,8,9-tetrahydro-5H-pyrido[2,3-b]azepin-7-yl)carbamate (compound 138). A 20 mL vial flask was successively charged with N-((7-fluoro-3-methylbenzo[b]thiophen-2-yl)methyl)-N-methylacrylamide 137 (0.57 g, 0.0021 mol, 1.1 eq), tert-butyl (3-bromo-8-oxo-6,7,8,9-tetrahydro-5H-pyrido[2,3-b]azepin-7-yl)carbamate 68 (0.7 g, 0.0019 mol, 1.0 eq), DIPEA (1.96 g, 0.0152 mol, 8.0 eq) and CH$_3$CH$_2$CN: DMF mixture (8:2 v/v) (15 mL). The nitrogen was bubbled into the reaction mixture for 10 min, Pd(OAc)$_2$ (0.042 g, 0.00019 mol, 0.1 eq) and tri (o-tolyl) phosphine (0.119 g, 0.00038 mol, 0.2 eq) were added and an inert gas was bubbled for an additional 5 min. The reaction vial was sealed and stirred for 16 h at 100° C. The reaction mass was cooled to RT, diluted with water (80 mL) and extracted with EtOAc (2×100 mL). The organic layers were dried (Na$_2$SO$_4$), filtered and concentrated under reduced pressure to afford the crude product which was isolated by CC (eluent: DCM/MeOH, 95/5 v/v). The title molecule 138 (0.37 g, 0.000686 mol, 34.9%) as an off-white solid was prepared. LCMS (Method 3): m/z 539.45 [M+1].$^+$ Step 7. tert-Butyl (S,E)-(3-(3-(((7-fluoro-3-methylbenzo[b]thiophen-2-yl)methyl)(methyl)amino)-3-oxoprop-1-en-1-yl)-8-oxo-6,7,8,9-tetrahydro-5H-pyrido[2,3-b]azepin-7-yl)carbamate (compound 139). Racemic tert-butyl (E)-(3-(3-(((7-fluoro-3-methylbenzo[b]thiophen-2-yl)methyl)(methyl)amino)-3-oxoprop-1-en-1-yl)-8-oxo-6,7,8,9-tetrahydro-5H-pyrido[2,3-b]azepin-7-yl) carbamate 138 (0.37 g) was submitted for chiral preparative HPLC separation and both enantiomers were isolated. Pure fractions of first enantiomer (compound 139, PEAK-1) corresponding to expected product were collected, concentrated under reduced pressure and dried (0.12 g). t$_{ret}$=10.65 min. LCMS (Method 3): m/z 539.23 [M+H].$^+$ Chiral purity: 98.04%.

Chiral method separation: Column Name: Chiralpak IC (4.6×250) mm, 5μ. Mobile phase: 0.1% DEA in Hexane/EtOH=20/80 (v/v). Flow rate: 1.0 mL/min. Flow mode: isocratic. Temperature: ambient.

Step 8. (S,E)-3-(7-Amino-8-oxo-6,7,8,9-tetrahydro-5H-pyrido[2,3-b]azepin-3-yl)-N-((7-fluoro-3-methylbenzo

[b]thiophen-2-yl)methyl)-N-methylacrylamide hydrochloride (compound 140). To a stirred solution of tert-butyl (S,E)-(3-(3-(((7-fluoro-3-methylbenzo[b]thiophen-2-yl)methyl)(methyl)amino)-3-oxoprop-1-en-1-yl)-8-oxo-6,7,8,9-tetrahydro-5H-pyrido[2,3-b]azepin-7-yl)carbamate 139 (0.12 g 0.0002227 mol, 1.0 eq) in DCM (2 mL), 2 M HCl in Et$_2$O (2 mL) was added dropwise at 0° C. The reaction mixture was stirred from 0° C. to RT over 2 h, then cold Et$_2$O (10 mL) was added to DCM solution, the precipitated product was filtered off, washed with ether (2×5 mL) and dried under high vacuum. The final target 140 (0.086 g, 0.000181 mol, 81.9%) as a white solid was obtained. LCMS (Method 3): m/z 439.12 [M+H].+ $^1$H NMR (DMSO-d$_6$, 400 MHZ): δ (ppm): 10.92 (s, 1H), 8.63 (s, 1H), 8.26-8.23 (m, 4H), 7.63-7.20 (m, 5H), 5.17-4.90 (2H), 3.89 (bs, 1H), 3.19-2.95 (3H), 2.81-2.74 (m, 2H), 2.44 (s, 3H), 2.24-2.16 (m, 1H). Chiral purity: 95.40%. The stereochemistry for compound 140 was arbitrarily attributed.

Example 19. Synthesis of (S,E)-3-(7-amino-8-oxo-6,7,8,9-tetrahydro-5H-pyrido[2,3-b]azepin-3-yl)-N-methyl-N-((3-methyl-5-(pyridin-3-yloxy)benzofuran-2-yl)methyl)acrylamide hydrochloride (compound 151)

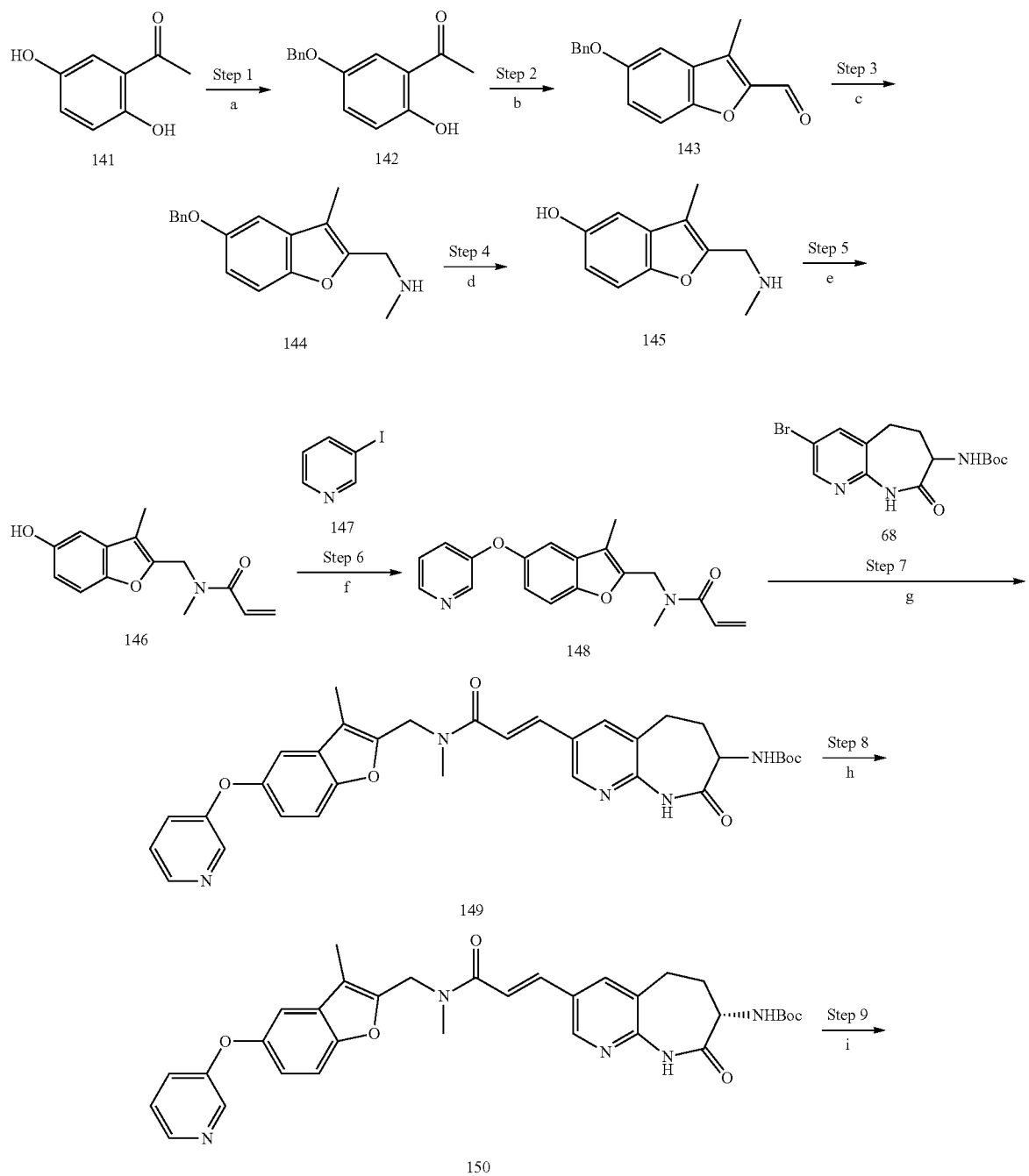

-continued

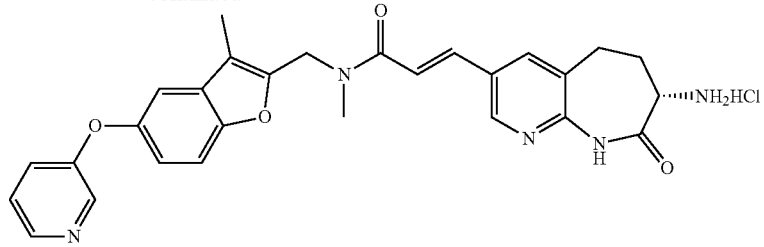

151

Reaction conditions: a) BnBr, K$_2$CO$_3$, MeCN; b) i. 1,1-dichloroethene, t-BuOK, THF, ii. 1M H$_2$SO$_4$; c) i. MeNH$_2$, DCM, ii. NaBH$_4$, DCM/MeOH; d) H$_2$, Pd/C, MeOH/THF; e) acryloyl chloride, 2N NaOH, THF; f) TMHD,CuI, Cs$_2$CO$_3$, DMF; g= Pd(OAc)$_2$, tri(o-tolyl)phosphine, DIPEA, propionitrile; h) chiral separation; i) etheral HCl Step 1. 1-[5-(Benzyloxy)-2-hydroxyphenyl]ethan-1-one (compound 142). To a solution of 2',5'-dihydroxyacetophenone 141 (1 eq., 50 g, 328 mmol) in MeCN (499 mL) is added at room temperature potassium carbonate (1.5 eq., 68.1 g, 492 mmol). Benzyl bromide (1.1 eq., 61.8 g, 43.2 mL, 361 mmol) is then added dropwise and the reaction mixture is stirred at RT for 18 hours. The crude reaction mixture is filtered on Buchner and the mother liquors are evaporated to dryness. The residue is dissolved in EtOAc (300 mL). The organic layer is washed with water (300 mL), brine (300 mL), dried over sodium sulfate, filtered and evaporated to dryness. Four successive triturations from diethyl ether afford the title compound 142 (58.7 g, 74%) as a yellow solid. $^1$H NMR (400 MHZ, DMSO-d$_6$): δ (ppm) 2.63 (t, 3H, J=1.6 Hz), 5.1 (s, 2H), 6.91 (d, 1H, J=9.0 Hz), 7.25 (d, 1H, J=8.8 Hz, 2.8 Hz), 7.4 (m, 6H), 11.46 (s, 1H).

Step 2. 5-(Benzyloxy)-3-methyl-1-benzofuran-2-carbaldehyde (compound 143). To a solution of 1-[5-(benzyloxy)-2-hydroxyphenyl]ethan-1-one 142 (1 eq., 30 g, 123 mmol) in THF (442 mL) are added successively at 0° C. t-BuOK (3.8 eq., 52.8 g, 470 mmol) followed by 1,1-dichloroethylene (1.4 eq., 16.8 g, 13.8 mL, 173 mmol) dropwise. The reaction mixture is allowed to warm to RT and stirred for 3 hours. The reaction is quenched with aqueous 1 M sulfuric acid (100 mL). The aqueous layer was extracted with EtOAc (3×100 mL). The combined organic layers were concentrated to dryness. The residue is dissolved in DCM (300 mL) and aq. 1 M H2SO$_4$ sulfuric acid (70 mL) is added at room temperature. The reaction mixture is then stirred at 50° C. for 18 hours. The reaction mixture is diluted with water (100 mL) and extracted with DCM (3×100 mL). The combined organic layers are washed with brine (150 mL), dried over sodium sulfate, filtered and evaporated to dryness. The residue is diluted with Et$_2$O (300 mL) and filtered on a short pad of silica. The solvent is evaporated to dryness to afford the title compound 143 (33 g, 100%) as a yellow solid. $^1$H NMR 400 MHZ, CDCl$_3$): δ (ppm) 2.58 (s, 3H), 5.12 (s, 2H), 7.13 (s, 1H), 7.21 (d, 1H, J=8.8 Hz), 7.38 (m, 6H), 9.99 (s, 1H).

Step 3. {[5-(Benzyloxy)-3-methyl-1-benzofuran-2-yl]methyl}(methyl)amine (compound 144). Methylamine (33% in EtOH; 4 eq., 46.7 g, 61.7 mL, 495 mmol) is added to a solution of 5-(benzyloxy)-3-methyl-1-benzofuran-2-carbaldehyde 143 (1 eq., 33 g, 123 mmol) in DCM (247 mL). The reaction mixture is stirred at RT overnight and concentrated to dryness. The residue is taken up in a mixture DCM (302 mL) and MeOH (75.6 mL), cooled to 0° C. and sodium borohydride (3 eq., 14.1 g, 371 mmol) is added. The reaction mixture was stirred at RT for 5 hours. The reaction mixture is diluted with DCM (100 mL). The organic layer is washed with saturated aqueous NaHCO$_3$ (200 mL), brine (200 mL), dried (Na$_2$SO$_4$), filtered and evaporated to dryness. The crude is purified by chromatography (SiO$_2$ pretreated with Et$_3$N; DCM/MeOH, 100/0 to 95/5 v/v) to afford the title compound 144 (14.0 g, 40%) as a yellow oil. $^1$H NMR (400 MHZ, CDCl$_3$): δ (ppm) 2.19 (s, 3H), 2.44 (s, 3H), 3.84 (s, 2H), 5.1 (s, 2H), 6.93 (dd, 1H, J=8.9 Hz, 2.6 Hz), 7.01 (d, 1H, J=2.6 Hz), 7.3 (d, 1H, J=8.7 Hz), 7.34 (d, 1H, J=6.8 Hz), 7.4 (t, 2H, J=7.6 Hz), 7.47 (m, 2H).

Step 4. 3-Methyl-2-[(methylamino)methyl]-1-benzofuran-5-ol (compound 145). A solution of {[5-(benzyloxy)-3-methyl-1-benzofuran-2-yl]methyl}(methyl)amine 144 (1 eq., 10.7 g, 37.9 mmol) in a mixture of MeOH (99 mL) and THF (99 mL) is purged and backfilled with argon (operation repeated twice). 10% Palladium on carbon (10% w/w, 1.07 g) is added. The mixture is purged and backfilled with argon (operation repeated twice) and stirred at RT for 18 hours. The reaction mixture is filtered through Clarcel, rinsed with THE/MeOH (1/1 v/v; 150 mL), concentrated and dried under vacuum to afford the title compound 145 (7.26 g, 100%) as a brown solid. $^1$H NMR (400 MHZ, DMSO-d$_6$): δ (ppm) 2.1 (s, 3H), 2.24 (s, 3H), 3.72 (s, 2H), 6.71 (d, 1H, J=8.7 Hz), 6.82 (s, 1H), 7.23 (d, 1H, J=8.7 Hz).

Step 5. N-((5-Hydroxy-3-methylbenzofuran-2-yl)methyl)-N-methylacrylamide (compound 146). To a stirred solution of 3-methyl-2-((methylamino) methyl) benzofuran-5-ol 145 (5.76 g, 0.03012 mol, 1.0 eq) in a mixture of THF and 2 M NaOH (10 mL, 1:1 v/v), acryloyl chloride (3.275 g, 0.03615 mol, 1.2 eq) was added dropwise at 0° C. The reaction was stirred at the same temperature for 30 min (TLC monitoring). Then, the reaction mass was diluted with H$_2$O (100 ml), extracted with EtOAc (2×50 mL), dried (Na$_2$SO$_4$), filtered and concentrated to dryness. The crude material was re-dissolved once again in a mixture of THF and 2 M NaOH (10 mL, 1:1 v/v) and stirred at RT for 20 min, then diluted with water (50 mL), extracted with EtOAc (100 mL), dried (Na$_2$SO$_4$), filtered and evaporated. The product was separated by CC (silica gel, DCM/MeOH, 98:2 v/v) to yield the expected acrylamide 146 (1.6 g, 0.006523 mol, 21.6%) as a yellow solid. LCMS (Method 3): m/z: 245.94 [M+H].[+]

Step 6. N-Methyl-N-((3-methyl-5-(pyridin-3-yloxy)benzofuran-2-yl)methyl)acrylamide (compound 148). A 20 mL vial flask was successively charged with N-((5-hydroxy-3-methylbenzofuran-2-yl)methyl)-N-methylacrylamide 146 (0.3 g, 0.001223 mol, 1.0 eq), 3-iodopyridine 147 (0.597 g, 0.00293 mol, 2.4 eq), $Cs_2CO_3$ (2.02 g, 0.006237 mol, 5.1 eq) and DMF (10 mL). To this reaction mixture, 2,2,6,6-tetramethyl-3,5-heptanedione (0.224 g, 0.001223 mol, 1.0 eq) and CuI (0.232 g, 0.001223 mol, 1.0 eq) were added under oxygen ballon and the reaction vial was sealed and stirred at 60° C. for 16 h. The resulting mixture was cooled to RT, filtered through the Celite bed, diluted with water (50 mL), extracted with with EtOAc (2×50 mL), dried ($Na_2SO_4$), filtered and evaporated. The crude mixture was further separated by CC (silica gel, n-Hexane/EtOAc, 50:50 v/v) to give the title compound 148 (0.17 g, 0.000527 mol, 43.1%) as a yellow solid. LCMS (Method 3): m/z 323.33 [M+H].$^+$ Step 7. tert-Butyl (E)-(3-(3-(methyl((3-methyl-5-(pyridin-3-yloxy)benzofuran-2-yl)methyl)amino)-3-oxoprop-1-en-1-yl)-8-oxo-6,7,8,9-tetrahydro-5H-pyrido[2,3-b]azepin-7-yl)carbamate (compound 149). A 20 ml vial flask was charged with N-methyl-N-((3-methyl-5-(pyridin-3-yloxy)benzofuran-2-yl)methyl)acrylamide 148 (0.588 g, 0.00182 mol, 1.0 eq), tert-butyl (3-bromo-8-oxo-6,7,8,9-tetrahydro-5H-pyrido[2,3-b]azepin-7-yl)carbamate 68 (0.715 g, 0.002 mol, 1.1 eq), DIPEA (1.87 g, 0.0145 mol, 8.0 eq) and $CH_3CH_2CN$:DMF mixture (8:2 v/v) (10 mL). The nitrogen was bubbled into the reaction mixture for 10 min. Then, $Pd(OAc)_2$ (0.041 g, 0.000182 mol, 0.1 eq) and tri(o-tolyl) phosphine (0.114 g, 0.000364 mol, 0.2 eq) were added and the nitrogen was bubbled for an additional 5 min. The reaction vial was sealed and heated overnight (100° C.; 16 h). The reaction mixture was cooled to RT, diluted with water (80 mL) and extracted with EtOAc (2×100 mL). The organic layers were dried ($Na_2SO_4$), filtered and concentrated under reduced pressure to afford the crude product which was further purified by CC (eluent: n-Hexane/EtOAc, 15/85v/v). The expected molecule 149 (0.45 g, 0.000753 mol, 41.28%) as an off-white solid was prepared. LCMS (Method 3): m/z 598.52 [M+H].$^+$ Step 8. tert-Butyl (S,E)-(3-(3-(methyl((3-methyl-5-(pyridin-3-yloxy)benzofuran-2-yl)methyl)amino)-3-oxoprop-1-en-1-yl)-8-oxo-6,7,8,9-tetrahydro-5H-pyrido[2,3-b]azepin-7-yl)carbamate (compound 150). Racemic tert-butyl (E)-(3-(3-(methyl((3-methyl-5-(pyridin-3-yloxy)benzofuran-2-yl)methyl)amino)-3-oxoprop-1-en-1-yl)-8-oxo-6,7,8,9-tetrahydro-5H-pyrido[2,3-b]azepin-7-yl)carbamate 149 (0.45 g) was submitted for chiral HPLC separation and both enantiomers were separated. Pure fractions of second enantiomer (PEAK-2) corresponding to expected product 150 were collected, concentrated under reduced pressure and dried (0.17 g). $t_{ret}$=8.99 min. LCMS (Method 3): m/z 598.31 [M+H].$^+$ Chiral purity: 99.60%.

Chiral method separation: Column Name: Chiralpak IC (4.6×250) mm, 5u. Mobile phase: 0.1% DEA in Hexane/EtOH=20/80 (v/v). Flow rate: 1.0 mL/min. Flow mode: isocratic. Temperature: ambient.

Note: Confirmed Peak-1 as R-Enantiomer and Peak-2 as S-Enantiomer by analogy with chiral HPLC of standard compound of 107 on IB column.

Step 9. (S,E)-3-(7-Amino-8-oxo-6,7,8,9-tetrahydro-5H-pyrido[2,3-b]azepin-3-yl)-N-methyl-N-((3-methyl-5-(pyridin-3-yloxy)benzofuran-2-yl)methyl)acrylamide hydrochloride (compound 151). To a stirring solution of tert-butyl (S,E)-(3-(3-(methyl((3-methyl-5-(pyridin-3-yloxy)benzofuran-2-yl)methyl)amino)-3-oxoprop-1-en-1-yl)-8-oxo-6,7,8,9-tetrahydro-5H-pyrido[2,3-b]azepin-7-yl)carbamate 150 (0.105 g, 0.0001758 mol, 1.0 eq) in DCM (1.5 mL), 2 M HCl in ether (1.5 mL) was added dropwise at 0° C. The reaction mixture was stirred for about 2 h (0° C. to RT), then cold ether (10 mL) was added to the reaction mixture, the precipitating product was filtered off and dried under high vacuum to afford the title compound molecule 151 (0.069 g, 0.000129 mol, 79.31%) as a white solid.

LCMS (Method 3): m/z 498.12 [M+H].$^+$ $^1$H NMR (DMSO-$d_6$, 400 MHZ): δ (ppm): 10.91 (s, 1H), 8.64-8.34 (m, 6H), 8.24 (s, 1H), 7.72-7.31 (m, 6H), 7.12 (d, J=8.6 Hz, 1H), 5.03-4.81 (2H), 3.87 (bs, 1H), 3.22-2.94 (3H), 2.84-2.74 (m, 2H), 2.23-2.12 (m, 5H). Chiral purity: 99.34%.

Example 20. Synthesis of (S,E)-3-(7-amino-8-oxo-6,7,8,9-tetrahydro-5H-pyrido[2,3-b]azepin-3-yl)-N-methyl-N-((3-methyl-4-((pyridin-3-ylamino)methyl)benzofuran-2-yl)methyl)acrylamide dihydrochloride (compound 167)

General Synthetic Scheme.

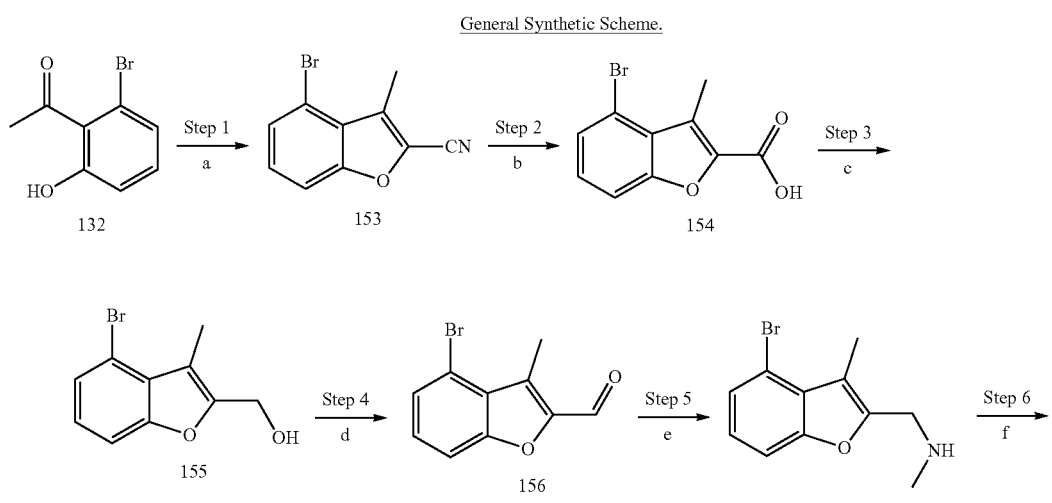

-continued
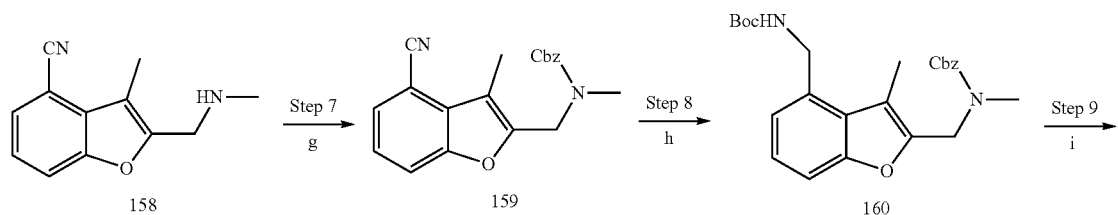
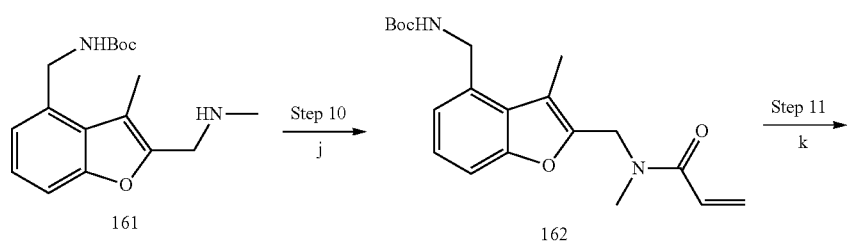
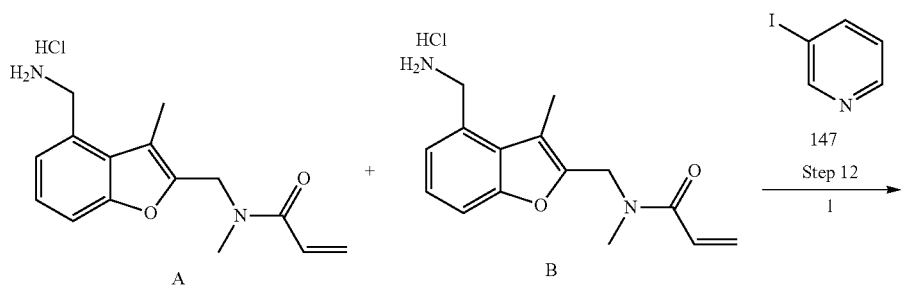
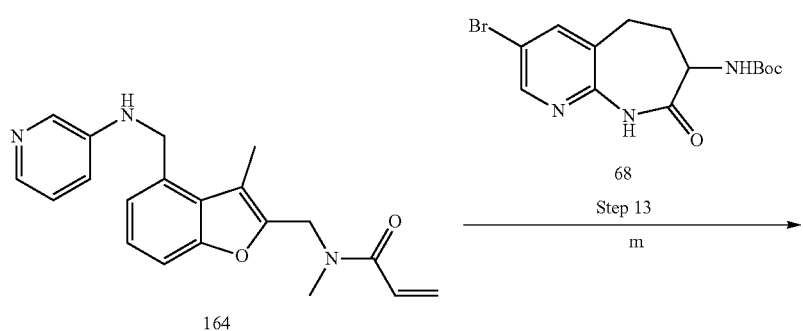
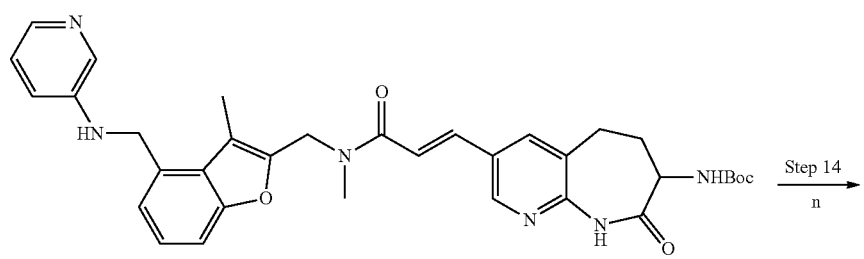

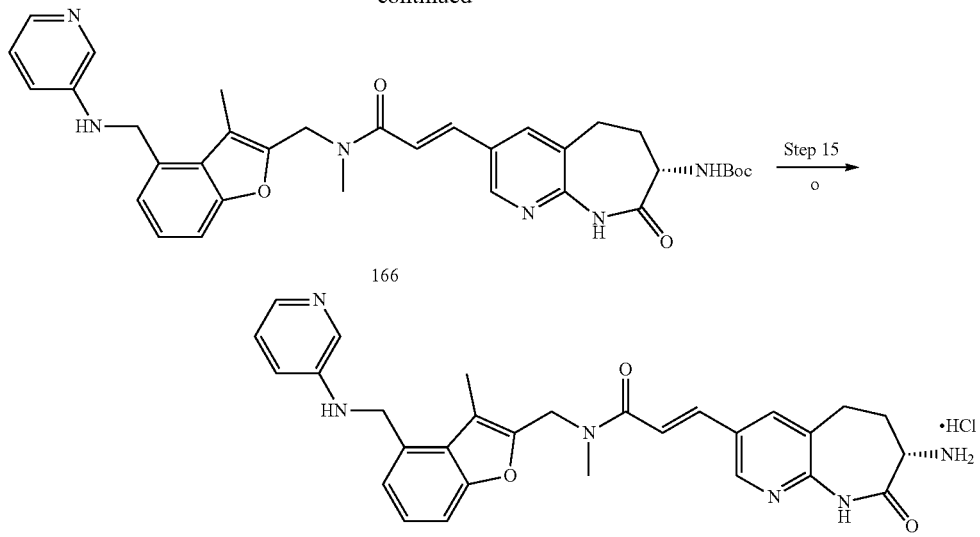

Reaction conditions: a) chloroacetonitrile; b) NaOH, c) BDMS, d) Dess-Martin, e) MeNH₂; f) Zn(CN)₂; g) CbzCl; h) NiCl₂•6H₂O, NaBH₄, Boc anhydrid; i) H₂, Pd/C; j) acryloyl chloride, TEA,DCM; k) Dioxane HCl, DCM; l) BINOL,Cu, CuI, Cs₂CO₃, DMF; m) Pd(OAc)₂,trio(o-toly)phosphine, DIPEA, propionitrile; n) chiral separation; o) etheral HCl Step 1. 4-Bromo-3-methylbenzofuran-2-carbonitrile (compound 153). To a stirred solution of K₂CO₃ (29.8 g, 0.21 mol, 3.0 eq) in dry DMF (150 mL) was added 1-(2-bromo-6-hydroxyphenyl) ethan-1-one 152 (15.5 g, 0.072 mol, 1 eq). To this solution, chloroacetonitrile (8.15 g, 0.108 mol, 1.5 eq) was then added over 5 minutes and the reaction mixture was stirred at 100° C. for 16 h. After the completion of the reaction, it was diluted with cold H₂O (1.0 L) and extracted with EtOAc (500 mL), dried (Na₂SO₄), filtered and evaporated to afford the crude product which was further purified by CC (silica gel, n-Hexane/EtOAc, 90:10 v/v). The expected compound 153 (15.8 g, 0.066 mol, 92.9%) as a yellow oil was obtained. ¹H NMR (CDCl₃, 400 MHZ): δ (ppm) 7.49-7.44 (m, 1H), 7.34-7.30 (t, J=8 Hz, 1H), 2.65 (s, 3H).

Step 2. 4-Bromo-3-methylbenzofuran-2-carboxylic acid (compound 154). To a stirred solution of 4-bromo-3-methylbenzofuran-2-carbonitrile 153 (15.7 g, 0.115 mol, 1 eq) in 200 mL (H₂O) and 100 ml (MeOH) was added NaOH (13.8 g, 0.346 mol, 3.0 eq). The reaction was heated at 100° C. for 72 h. The resulting mixture was cooled to 10° C., pH adjusted to ~2 with 1 N HCl (50 mL), extracted with EtOAc (250 ml), dried (Na₂SO₄), filtered and evaporated to afford the title compound 154 (15.0 g, 0.058 mol, 88%) as an off white solid. LCMS (Method 3): m/z: 252.98 [M-2H].⁺

Step 3. (4-Bromo-3-methylbenzofuran-2-yl) methanol (compound 155). To a solution of 4-bromo-3-methylbenzofuran-2-carboxylic acid 154 (10.0 g, 0.039 mol) in dry THF (100 mL) at 0° C. was added borane-methyl sulfide complex (5.88 g, 0.078 mol, 2.0 eq). The reaction was stirred at RT overnight. The reaction mixture was cooled to 0° C., quenched with MeOH (50 mL) and evaporated under reduced pressure. The crude product was dissolved in EtOAc (200 ml), washed with water (100 mL), dried (Na₂SO₄), filtered and evaporated to afford the title compound 155 (10.0 g, crude) as an off-white solid. LCMS (Method 3): m/z 222.90 [M-OH].⁺

Step 4. 4-Bromo-3-methylbenzofuran-2-carbaldehyde (compound 156). To a solution of (4-bromo-3-methylbenzofuran-2-yl) methanol 155 (9.94 g, 0.0414 mol) in dry DCM (100 mL) at 0° C. was added Dess-Martin periodinate (26.3 g, 0.0622 mol, 1.5 eq). The reaction was stirred at 0° C. to RT for 24 h. The reaction mixture was filtered through a Celite bed, washed with DCM (200 ml). The filtarate was washed with 1 N NaHCO₃ (200 mL), dried (Na₂SO₄), filtered and evaporated to afford the title compound 156 (10.0 g, crude) as an off-white solid. LCMS (Method 3): m/z: 241.04 [M+H].⁺

Step 5. 1-(4-Bromo-3-methylbenzofuran-2-yl)-N-methylmethanamine (compound 157). To a solution of 4-bromo-3-methylbenzofuran-2-carbaldehyde 156 (1.0 g, 0.042 mol) in EtOH (100 mL) was added 40% aq. MeNH₂ solution (100 mL). The reaction was stirred at RT overnight. The solution was concentrated under reduced pressure. The resulting dark yellow oil was solvated in EtOH (100 mL) under N₂. To the solution was added NaBH₄ (3.2 g, 0.84 mol, 2.0 equiv.) and the mixture allowed to stir at the same temperature for 2 h. The solution was concentrated under reduced pressure. The resulting residue was diluted with EtOAc (200 mL), washed with water (100 mL), dried (Na₂SO₄), filtered and evaporated. The crude product was further purified by CC (silica gel, DCM/MeOH, 95:5 v/v) to yield the expected molecule 157 (6.5 g, 0.0255 mol, 60.6%) as a brown oil. LCMS (Method 3): m/z: 253.8 [M−H].⁻

Step 6. 3-Methyl-2-((methylamino) methyl)benzofuran-4-carbonitrile (compound 158). A 20 mL vial flask was successively charged with 1-(4-bromo-3-methylbenzofuran-2-yl)-N-methylmethanamine 157 (2.0 g, 0.0078 mol, 1.0 eq), Zn (CN) 2 (1.09 g, 0.0094 mol, 1.2 eq), Zn dust (0.51 g, 0.0078 mol, 1.0 eq) and DMA (20 mL). Nitrogen was bubbled into the reaction mixture for 10 min. Pd₂(dba)₃ (0.72 g, 0.00078 mol, 0.1 eq) and dppf (0.21 g, 0.00039 mol, 0.05 eq) was added to the reaction mixture and nitrogen was bubbled into it for an additional 5 min. The reaction vial was sealed and heated at 130° C. overnight. The reaction mixture was cooled to RT, filtered through the celite bed and rinsed with EtOAc (200 mL) and the filtrate was washed with water (100 mL), dried ($Na_2SO_4$), filtered and evaporated to afford the crude product which was further purified by CC (silica gel, DCM/MeOH, 95:5 v/v) gave the title compound 158 (1.1 g, 0.0055 mol, 70%) as a brown oil. LCMS (Method 3): m/z: 201.12 [M+H].$^+$ Step 7. Benzyl ((4-cyano-3-methylbenzofuran-2-yl) methyl)(methyl)carbamate (compound 159). To a solution of 3-methyl-2-((methylamino) methyl)benzofuran-4-carbonitrile 158 (0.5 g, 0.0025 mol) in DCM (10 mL) at 0° C. was added TEA (0.75 g, 0.0075 mol, 3.0 eq). Benzyl chloroformate (Cbz chloride; 0.63 g, 0.0037 mol, 1.5 eq) was added dropwise and allowed to stir at 0° C. to RT for 2 h.

Note: The same reaction was performed on a 1.45 g of starting (3-methyl-2-((methylamino) methyl)benzofuran-4-carbonitrile) 158 and both batches were mixed together while work up and the purification. After the completion of the reaction, the reaction mixture was diluted with $H_2O$ (200 mL) and extracted with EtOAc (200 mL), dried ($Na_2SO_4$), filtered and evaporated to afford the crude product which was further purified by CC (eluent: n-Hexane/EtOAc, 90/10/v) gave the title compound 159 (2.5 g, 0.0074 mol, 76%) as a colourless oil. LCMS (Method 3): m/z: 335.27 [M+H].$^+$ Step 8. Benzyl ((4-(((tert-butoxycarbonyl)amino) methyl)-3-methylbenzofuran-2-yl)methyl)(methyl)carbamate (compound 160). To a cooled (0° C.) solution of benzyl ((4-cyano-3-methylbenzofuran-2-yl)methyl) (methyl)carbamate 159 (0.4 g, 0.0011 mol) in MeOH (10 mL) at 0° C. was added $Boc_2O$ (0.65 g, 0.0029 mol, 2.5 eq) and $NiCl_2 \cdot 6H_2O$ (0.28 g, 0.0011 mol, 1.0 eq). $NaBH_4$ (0.091 g, 0.0023 mol, 2.0 eq) was added in portions to the reaction mixture. The reaction mixture was stirred at 0° C. to RT for 2 h.

Note: The same reaction was performed on a 2.1 g of starting (benzyl ((4-cyano-3-methylbenzofuran-2-yl) methyl)(methyl)carbamate) 159 and both batches were mixed together for further work-up and purification.

After the completion of the reaction (TLC monitoring), the reaction mass was quenched with water, filtered through a Celite bed, washed with EtOAc (100 mL) and concentrated under reduced pressure. The residue was dissolved in EtOAc (150 mL), washed with $H_2O$ (100 mL), brine (50 mL), dried ($Na_2SO_4$) and evaporated under reduced pressure to afford the crude product. The crude material was purified by CC (eluent: n-Hexane/EtOAc, 90/10/v) to afford the title compound 160 (2.5 g, 0.0057 mol, 72.4%) as a colourless oil. LCMS (Method 3): m/z: 456.2 [M+18].$^+$ Step 9. tert-Butyl ((3-methyl-2-((methylamino) methyl) benzofuran-4-yl)methyl)carbamate (compound 161). To a stirred solution of benzyl ((4-(((tert-butoxycarbonyl)amino)methyl)-3-methylbenzofuran-2-yl)methyl) (methyl)carbamate 160 (0.7 g, 0.0015 mol) in MeOH (20 mL) was added 10% Pd/C (50% wet) (0.35 g). The reaction mixture was stirred at RT under hydrogen atmosphere for 2 h. The reaction mixture was filtered through a Celite bed, washed with MeOH (100 mL) and the filtrate was concentrated under reduced pressure to give the title compound 161 (0.5 g, 0.0016 mol, quantitative) as an off white solid. LCMS (Method 3): m/z: 305.28 [M+H]$^+$.

Step 10. tert-Butyl ((3-methyl-2-((N-methylacrylamido) methyl)benzofuran-4-yl)methyl)carbamate (compound 162). To a solution of tert-butyl ((3-methyl-2-((methylamino) methyl)benzofuran-4-yl)methyl)carbamate 161 (0.5 g, 0.0016 mol) in DCM (10 mL) at 0° C. was added TEA (0.49 g, 0.0049 mol, 3.0 eq). Acryloyl chloride (0.22 g, 0.0024 mol, 1.5 eq) was added dropwise and allowed to stir at 0° C. for 1 h. The reaction mass was diluted with $H_2O$ (100 ml), extracted with EtOAc (100 ml), dried ($Na_2SO_4$), filtered and evaporated to dryness. The crude product was purified by CC (silica gel, DCM/MeOH, 98:2 v/v) to yield the title compound 162 (0.3 g, 0.00083 mol, 66%) as an off white solid. LCMS (Method 3): m/z: 359.35 [M+H].$^+$ Step 11. N-((4-(Aminomethyl)-3-methylbenzofuran-2-yl) methyl)-N-methylacrylamide hydrochloride (compound 163). To a stirring solution of tert-butyl ((3-methyl-2-((N-methylacrylamido)methyl)benzofuran-4-yl)methyl)carbamate 162 (0.3 g, 0.000836 mol, 1.0 eq) in DCM (5 mL), 4 M HCl in dioxane (1 mL) was added dropwise at 0° C. The reaction mixture was stirred from 0° C. to RT over 2 h and then concentrated under reduced pressure to afford the crude product 163 (0.23 g, a mixture of A and B in a ratio of ca 3:2) as an off white solid. LCMS (Method 3): m/z 259.15 [M+H].$^+$ Note: The LCMS analysis showed 56.46% of desired product in the mixture, the crude material was used in the next step without further purification (inseparable mixture of desired salt A and adduct B).

Step 12. N-Methyl-N-((3-methyl-4-((pyridin-3-ylamino) methyl)benzofuran-2-yl)methyl)acrylamide (compound 164). A 20 ml sealed tube was charged with a mixture of N-((4-(aminomethyl)-3-methylbenzofuran-2-yl)methyl)-N-methylacrylamide hydrochloride 163 (A and B) (0.01 g, 0.0000339 mol, 1.0 eq), 3-iodopyridine 147 (0.008 g, 0.00004 mol, 1.2 eq), $Cs_2CO_3$ (0.066 g, 0.0002 mol, 6.0 eq) and DMF (0.5 mL). The reaction mixture was purged with nitrogen for 10 min and 1,1-binaphthol (0.002 g, 0.0000067 mol, 1.0 eq), Cu (0.00021 g, 0.00000339 mol, 0.1 eq) and CuI (0.0006 g, 0.00000339 mol, 0.1 eq) were added sequentially and the nitrogen was bubbled through the resulting mixture for an additional 5 min. The reaction vial was sealed and stirred at 100° C. for 16 h.

Note: The same reaction was performed on a 0.2 g scale of N-((4-(aminomethyl)-3-methylbenzofuran-2-yl)methyl)-N-methylacrylamide hydrochloride 163 (A and B) and both batches were mixed together (work up and purification).

The reaction mixture was cooled to RT, filtered through a celite bed, the filtrate was diluted with $H_2O$ (50 mL), extracted with EtOAc (2×50 mL), the organic phase was dried ($Na_2SO_4$), filtered and evaporated. The crude material was purified by CC (silica gel, DCM/MeOH, 95:5 v/v) to give the title intermediate 164 (0.155 g, inseparable mixture of products) as a brown oil. LCMS (Method 3): m/z 336.39 [M+H].$^+$ Note: The LCMS analysis showed 21.08% of desired product in the isolated mixture which was used in the next step without further purification.

Step 13. tert-Butyl (E)-(3-(3-(methyl((3-methyl-4-((pyridin-3-ylamino) methyl)benzofuran-2-yl)methyl) amino)-3-oxoprop-1-en-1-yl)-8-oxo-6,7,8,9-tetrahydro-5H-pyrido[2,3-b]azepin-7-yl)carbamate (compound 165). A 20 mL vial flask was charged with N-methyl-N-((3-methyl-4-((pyridin-3-ylamino) methyl)benzofuran-2-yl)methyl)acrylamide 164 (0.2 g, 0.000596 mol, 1.0 eq), tert-butyl (3-bromo-8-oxo-6,7,8,9-tetrahydro-5H-pyrido[2,3-b]azepin-7-yl)carbamate 68 (0.212 g, 0.000596 mol, 1.0 eq), DIPEA (0.615 g, 0.004768 mol, 8.0 eq) and CH$_3$CH$_2$CN:DMF mixture (8:2 v/v) (10 mL). The nitrogen was bubbled into the reaction mixture for 10 min, Pd(OAc)$_2$ (0.026 g, 0.0001192 mol, 0.2 eq) and tri (o-tolyl) phosphine (0.072 g, 0.0002385 mol, 0.4 eq) were added and the nitrogen was bubbled for an additional 5 min. The reaction vial was sealed and heated at 100° C. for 16 h.

Note: The 2$^{nd}$ batch was performed on a 0.14 g of starting N-methyl-N-((3-methyl-4-((pyridin-3-ylamino) methyl) benzofuran-2-yl)methyl)acrylamide 164 and both batches were mixed together for further work up and purification.

The reaction mixture was cooled to RT, diluted with water (25 mL) and extracted with EtOAc (2×25 mL). The organic layers were dried (Na$_2$SO$_4$), filtered and concentrated under reduced pressure to afford the crude product which was further purified by CC (eluent: n-hexane/EtOAc, 20/80 v/v). The title compound 165 (0.17 g, 0.000278 mol, 29.3%) as an off-white solid was prepared. LCMS (Method 3): m/z 611.37 [M+1].$^+$ Step 14. Synthesis of tert-butyl (S,E)-(3-(3-(methyl((3-methyl-4-((pyridin-3-ylamino) methyl)benzofuran-2-yl)methyl)amino)-3-oxoprop-1-en-1-yl)-8-oxo-6,7,8,9-tetrahydro-5H-pyrido[2,3-b]azepin-7-yl)carbamate (compound 166). The racemic compound 165 (0.17 g) was submitted for chiral HPLC separation and both enantiomers were isolated. Pure fractions of first enantiomer (PEAK-1) corresponding to expected product 166 were collected, concentrated under reduced pressure and dried (0.055 g). t$_{ret}$=13.34 min. LCMS (Method 3): m/z 611.41 [M+H].$^+$ Chiral purity: 99.34%.

Chiral method separation: Column Name: Chiralpak IC (4.6×250) mm, 5μ. Mobile phase: 0.1% DEA in Hexane/EtOH=10/90 (v/v). Flow rate: 1.0 mL/min. Flow mode: isocratic. Temperature: ambient.

Step 15. (S,E)-3-(7-Amino-8-oxo-6,7,8,9-tetrahydro-5H-pyrido[2,3-b]azepin-3-yl)-N-methyl-N-((3-methyl-4-((pyridin-3-ylamino) methyl)benzofuran-2-yl)methyl) acrylamide dihydrochloride (compound 167).To a stirring solution of tert-butyl (S,E)-(3-(3-(methyl((3-methyl-4-((pyridin-3-ylamino) methyl)benzofuran-2-yl)methyl)amino)-3-oxoprop-1-en-1-yl)-8-oxo-6,7,8,9-tetrahydro-5H-pyrido[2,3-b]azepin-7-yl)carbamate 166 (0.05 g, 0.0000818 mol, 1.0 eq) in DCM (2 mL), 2 M HCl in Et$_2$O (1.0 mL) was added dropwise at 0° C. The reaction mixture was stirred for 30 min (0° C.→RT), DCM was evaporated under reduced pressure to get the crude product which was precipitated from DCM (1 mL) and Et$_2$O (5 ml). The title compound 167 (0.032 g, 0.0000548 mol, 68%) as a white solid was isolated. LCMS (Method 3): m/z 511.53 [M+H].$^+$ $^1$H NMR (DMSO-d$_6$, 400 MHZ): δ (ppm): 10.92 (s, 1H), 8.66-8.61 (m, 1H), 8.35-8.24 (m, 4H), 8.14 (s, 1H), 8.06 (s, 1H), 7.78-7.72 (m, 2H), 7.59-7.54 (m, 2H), 7.49-7.44 (m, 1H), 7.35-7.14 (m, 3H), 5.02-4.74 (m, 4H), 3.86 (bs, 1H), 3.21-2.93 (3H), 2.82-2.72 (m, 3H), 2.41 (s, 3H), 2.23-2.18 (m, 1H). The stereochemistry for compound 167 was arbitrarily attributed.

Example 21. Synthesis of ((S,E)-3-(7-(3-hydroxyazetidin-1-yl)-8-oxo-6,7,8,9-tetrahydro-5H-pyrido[2,3-b]azepin-3-yl)-N-methyl-N-((3-methyl-benzofuran-2-yl)methyl)acrylamide (compound 171)

General Synthetic Scheme.

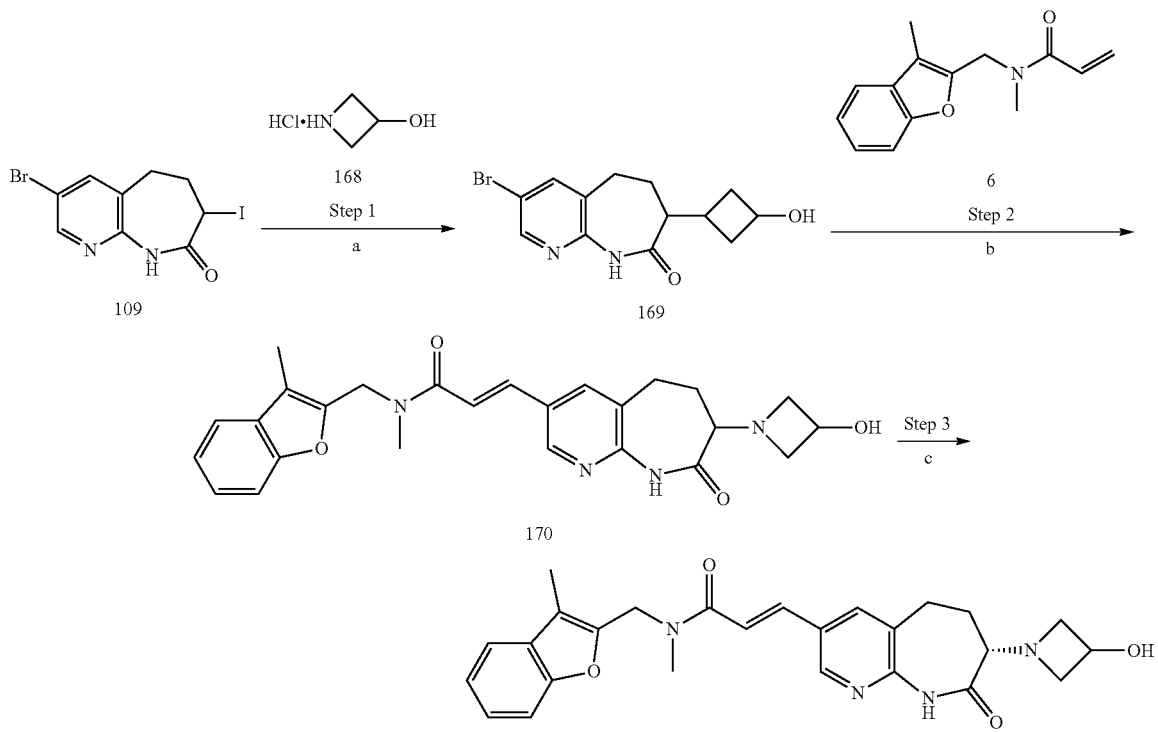

Reaction conditions: a) K$_2$CO$_3$, MeCN, 50° C., b) Pd-162, NCy$_2$NMe, NBu$_4$Cl, 1,4-dioxane, 80° C.; c) chiral separation Step 1. 3-Bromo-7-(3-hydroxyazetidin-1-yl)-6,7-dihydro-5H-pyrido[2,3-b]azepin-8 (9H)-one (compound 169). To a suspension of 3-bromo-7-iodo-6,7-dihydro-5H-pyrido[2,3-b]azepin-8 (9H)-one 109 (200 mg, 0.54 mmol) and K$_2$CO$_3$ (200 mg, 0.54 mmol) in acetonitrile (2 mL) was added azetidin-3-ol HCl salt 168 (50 mg, 0.46 mmol) and the reaction was heated to 50° C. for 18 h. The reaction mixture was allowed to cool to RT, diluted with 10% MeOH in DCM (10 mL) and pre absorbed onto silica. Purification by chromatography (0-10% MeOH in DCM) afforded the title compound 169 (129 mg, 65% yield), as a white foam. R$^t$ 0.27 min (Method 1a); m/z 312/314 [M+H]$^+$ (ES$^+$). $^1$H NMR (400 MHZ, DMSO-d$_6$): δ, ppm 10.60 (s, 1H), 8.43 (d, J=2.4 Hz, 1H), 8.03 (d, J=2.4 Hz, 1H), 5.66 (s, 1H), 4.33-4.21 (m, 1H), 3.95 (s, 1H), 3.82 (s, 1H), 3.42 (s, 1H), 3.17 (d, J=4.5 Hz, 1H), 2.80 (dd, J=13.9, 6.4 Hz, 1H), 2.72-2.61 (m, 1H), 2.46-2.32 (m, 1H), 1.92 (s, 2H).

Step 2. (E)-3-(7-(3-Hydroxyazetidin-1-yl)-8-oxo-6,7,8,9-tetrahydro-5H-pyrido[2,3-b]azepin-3-yl)-N-methyl-N-((3-methylbenzofuran-2-yl)methyl)acrylamide (compound 170). A reaction vial was charged with N-methyl-N-((3-methylbenzofuran-2-yl)methyl)acrylamide 6 (95 mg, 0.41 mmol), 3-bromo-7-(3-hydroxyazetidin-1-yl)-6,7-dihydro-5H-pyrido[2,3-b]azepin-8 (9H)-one 169 (130 mg, 0.41 mmol), tetrabutylammonium chloride hydrate (12 mg, 0.04 mmol), [P(tBu)$_3$]Pd(crotyl)Cl (Pd-162) (16 mg, 0.04 mmol). The vial was flushed with nitrogen for 5 mins, then 1,4-dioxane (3 mL) and N-cyclohexyl-N-methylcyclohexanamine (0.18 mL, 0.83 mmol) were added and the reaction mixture was purged with nitrogen for further 5 mins. The mixture was heated to 80° C. for 1 h and was cooled to RT. The solvent was removed in vacuo and the crude product was purified by silica chromatography (0-10% MeOH in DCM) to afford the title compound 170 (93 mg, 49% yield) as a white solid. R$^t$ 1.40 min (Method 1a); m/z 461 [M+H]$^+$ (ES$^+$). $^1$H NMR (400 MHZ, DMSO-d$_6$): δ, ppm 9.65 (1H, s), 8.46 (1H, d, J=2.3 Hz), 7.98 (1H, d, J=2.3 Hz), 7.62-7.41 (3H, m), 7.34-7.17 (3H, m), 4.87 (2H, s), 4.84 (1H, d, J=6.4 Hz), 4.11 1H, q, J=6.1 Hz), 3.51 (1H, t, J=6.6 Hz), 3.44 (1H, t, J=6.7 Hz), 3.12 (3H, s), 2.96 (1H, dd, J=5.2, 2.4 Hz), 2.82-2.67 (4H, m), 2.28 (3H, s), 2.26-2.17 (1H, m), 1.94-1.84 (1H, m).

Step 3. (S,E)-3-(7-(3-hydroxyazetidin-1-yl)-8-oxo-6,7,8,9-tetrahydro-5H-pyrido[2,3-b]azepin-3-yl)-N-methyl-N-((3-methylbenzofuran-2-yl)methyl)acrylamide (compound 171). The racemic mixture 170 was separated by chiral HPLC using chiralpak IC column-30% EtOH, 16% CH$_2$Cl$_2$, 64% i-hexane, 0.2% diethylamine. Pure fractions of second eluting isomer corresponding to expected product 171 were collected, concentrated under reduced pressure and dried. R$^t$ 1.40 min (Method 1a) m/z 461 [M+H]$^+$ (ES$^+$). $^1$H NMR (400 MHZ, DMSO-d$_6$): δ, ppm 9.65 (1H, s), 8.46 (1H, d, J=2.3 Hz), 7.98 (1H, d, J=2.3 Hz), 7.62-7.41 (3H, m), 7.34-7.17 (3H, m), 4.87 (2H, s), 4.84 (1H, d, J=6.4 Hz), 4.11 (1H, q, J=6.1 Hz), 3.51 (1H, t, J=6.6 Hz), 3.44 (1H, t, J=6.7 Hz), 3.12 (3H, s), 2.96 (1H, dd, J=5.2 Hz, 2.4 Hz), 2.82-2.67 (4H, m), 2.28 (3H, s), 2.26-2.17 (1H, m), 1.94-1.84 (1H, m). Chirality for compound 171 was arbitrarily assigned.

Example 22. Synthesis of (E)-N-methyl-N-((2-methylbenzofuran-3-yl)methyl)-3-(7-morpholino-8-oxo-6,7,8,9-tetrahydro-5H-pyrido[2,3-b]azepin-3-yl) acrylamide (compound 173)

General Synthetic Scheme.

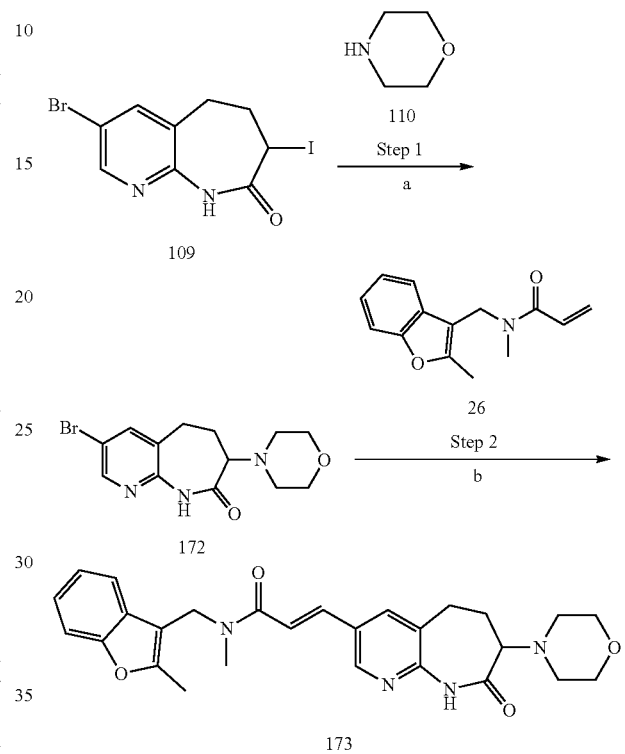

Reaction conditions: a) K$_2$CO$_3$, MeCN, morpholine, 80° C.,
b) Intermediate M, Pd-162, NCy$_2$NMe, NBu$_4$Cl, 1,4-dioxane, 80° C.

Step 1. 3-Bromo-7-morpholino-5,6,7,9-tetrahydro-8H-pyrido[2,3-b]azepin-8-one (compound 172). To a solution of 3-bromo-7-iodo-6,7-dihydro-5H-pyrido[2,3-b]azepin-8 (9H)-one 109 (1.0 g, 2.7 mmol) in acetonitrile (1 5 mL) under nitrogen was added potassium carbonate (0.75 g, 5.5 mmol) and morpholine 110 (0.29 mL, 3.3 mmol). The reaction mixture was stirred at 80° C. for 18 h. After cooling to RT, the reaction mixture was partitioned between water (150 mL) and ethyl acetate (150 ml). The aqueous phase was extracted with ethyl acetate (150 mL). Combined organics were washed with brine (50 mL), dried (MgSO$_4$) and concentrated in vacuo. The residue was triturated from MTBE to afford the title compound 172 (395 mg, 43% yield) as an off white solid. R$^t$ 0.33 min (Method 1a); m/z 326/328 [M+H]$^+$ (ES$^+$). $^1$H NMR (400 MHZ, DMSO-d$_6$): δ, ppm 10.12 (s, 1H), 8.32 (d, J=2.4 Hz, 1H), 7.92 (d, J=2.5 Hz, 1H), 3.41 (t, J=4.7 Hz, 4H), 3.17 (d, J=5.2 Hz, OH), 2.99 (dd, J=9.6, 7.0 Hz, 1H), 2.79 (ddd, J=13.8, 7.4, 3.7 Hz, 1H), 2.65-2.52 (m, 3H), 2.46 (dd, J=11.1, 4.8 Hz, 2H), 2.33-2.10 (m, 2H).

Step 2. (E)-N-Methyl-N-((2-methylbenzofuran-3-yl)methyl)-3-(7-morpholino-8-oxo-6,7,8,9-tetrahydro-5H-pyrido[2,3-b]azepin-3-yl)acrylamide (compound 173). A reaction vial was charged with N-methyl-N-((2-methylbenzofuran-3-yl)methyl)acrylamide 26 (50 mg, 0.2 mmol), 3-bromo-7-morpholino-6,7-dihydro-5H-pyrido[2,3-b]azepin-8 (9H)-one 172 (71 mg, 0.2 mmol), tetrabutylammonium chloride hydrate (6.5 mg, 0.022 mmol), [P(tBu)₃]Pd(crotyl)Cl (Pd-162) (8.7 mg, 0.02 mmol). The tube was flushed with nitrogen for 5 mins then 1,4-dioxane (3 mL) and N-cyclohexyl-N-methylcyclohexanamine (93 μL, 0.44 mmol) were added and the reaction mixture was purged with nitrogen for further 5 mins. The mixture was heated to 80° C. for 1 h, then cooled to RT. The solvent was removed in vacuo and the crude residue purified by chromatography (0-10% MeOH in DCM) to afford the title compound 173 (17 mg, 16% yield) as a white solid. R$^t$ 1.41 min (Method 1a); m/z 475 [M+H]$^+$ (ES$^+$). $^1$H NMR (400 MHZ, DMSO-d$_6$, 373K): δ, ppm 9.68 (s, 1H), 8.46 (d, J=2.3 Hz, 1H), 7.98 (d, J=2.3 Hz, 1H), 7.56 (d, J=15.5 Hz, 2H), 7.45 (dt, J=8.3, 0.8 Hz, 1H), 7.30-7.13 (m, 3H), 4.79 (s, 2H), 3.48-3.35 (m, 4H), 3.13-3.01 (m, 1H), 2.95 (d, J=1.3 Hz, OH), 2.83 (ddd, J=14.3, 7.5, 4.6 Hz, 1H), 2.76-2.50 (m, 4H), 2.34-2.14 (m, 2H).

Example 23. Synthesis of (E)-N-methyl-N-((3-methylbenzofuran-2-yl)methyl)-3-(8-oxo-7-(7-oxa-2-azaspiro[3.5]nonan-2-yl)-6,7,8,9-tetrahydro-5H-pyrido[2,3-b]azepin-3-yl)acrylamide (compound 176)

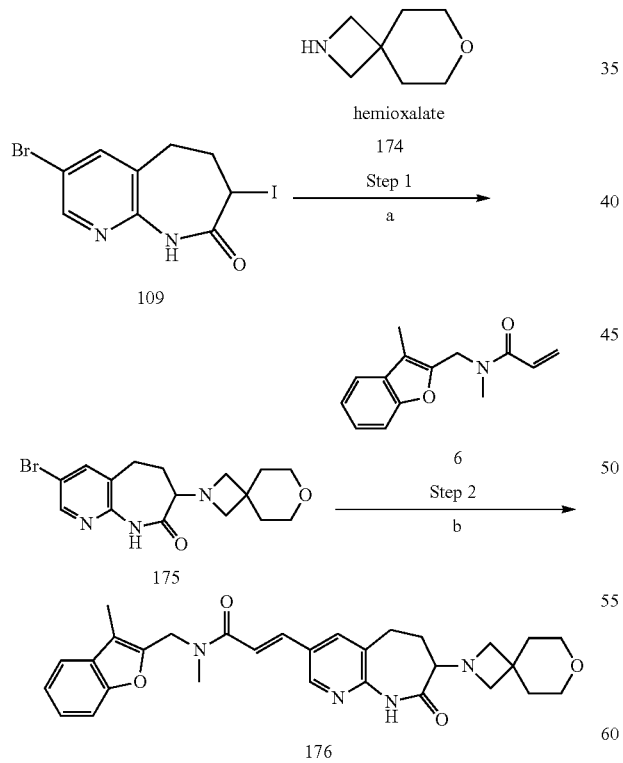

Reaction conditions: a) K₂CO₄, MeCN, 7-oxa-2-azaspiro[3.5]nonane, 50° C.; b) Pd-162, Cy₂NMe, NBu₄Cl, 1,4-dioxane, 80° C.

Step 1. 3-Bromo-7-(7-oxa-2-azaspiro[3.5]nonan-2-yl)-6,7-dihydro-5H-pyrido[2,3-b]azepin-8 (9H)-one (compound 175). To a suspension of 3-bromo-7-iodo-6,7-dihydro-5H-pyrido[2,3-b]azepin-8 (9H)-one 109 (200 mg, 0.55 mmol) and K₂CO₃ (230 mg, 1.64 mmol) in acetonitrile (4 mL) was added 7-oxa-2-azaspiro[3.5]nonane (hemioxalate salt) 174 (110 mg, 0.65 mmol) and the reaction was heated at 50° C. for 18 h. The reaction mixture was allowed to cool to RT, diluted with 10% MeOH in DCM (10 mL) and preabsorbed onto silica. Purification by chromatography (0-10% MeOH in DCM) afforded the title compound 175 (218 mg, quant. yield) as a yellow solid. R$^t$ 0.51 min (Method 1a); m/z 366/368 [M+H]$^+$ (ES$^+$). $^1$H NMR (400 MHZ, DMSO-d$_6$): δ, ppm 10.05 (s, 1H), 8.31 (d, J=2.4 Hz, 1H), 7.91 (d, J=2.4 Hz, 1H), 3.50 (t, J=5.3 Hz, 4H), 3.01 (dd, J=9.7, 6.7 Hz, 1H), 2.85-2.72 (m, 1H), 2.64-2.52 (m, 2H), 2.50-2.41 (m, 3H), 2.38-2.23 (m, 1H), 2.22-2.09 (m, 1H), 1.36-1.27 (m, 4H).

Step 2. (E)-N-Methyl-N-((3-methylbenzofuran-2-yl)methyl)-3-(8-oxo-7-(7-oxa-2-azaspiro[3.5]nonan-2-yl)-6,7,8,9-tetrahydro-5H-pyrido[2,3-b]azepin-3-yl)acrylamide (compound 176). A reaction vial was charged with N-methyl-N-((3-methylbenzofuran-2-yl)methyl)acrylamide 6 (140 mg, 0.59 mmol), 3-bromo-7-(7-oxa-2-azaspiro[3.5]nonan-2-yl)-6,7-dihydro-5H-pyrido[2,3-b]azepin-8 (9H)-one 175 (220 mg, 0.59 mmol), tetrabutylammonium chloride hydrate (18 mg, 0.06 mmol), [P(tBu)₃]Pd(crotyl)Cl (Pd-162) (24 mg, 0.06 mmol). The vial was flushed with nitrogen for 5 min. 1,4-Dioxane (3 mL) and N-cyclohexyl-N-methylcyclohexanamine (0.25 mL, 1.2 mmol) were added and the reaction mixture was purged with nitrogen for further 5 min. The mixture was heated to 80° C. for 1 h and was cooled to RT. The solvent was removed in vacuo. The crude residue was taken up in EtOAc (2 mL) and isohexane (1 mL) was added. The resulting suspension was filtered and the solid washed twice with isohexane (2×3 mL). The crude product was purified by column chromatography (0-10% MeOH in DCM) to afford the title compound 176 (243 mg, 78% yield) as a white solid. R$^t$ 1.45 min (Method 1a); m/z 515 [M+H]$^+$ (ES$^+$). $^1$H NMR (400 MHZ, DMSO-d$_6$): δ, ppm 9.63 (s, 1H), 8.43 (d, J=2.3 Hz, 1H), 7.96 (d, J=2.3 Hz, 1H), 7.58-7.54 (m, 1H), 7.52 (d, J=15.5 Hz, 1H), 7.49-7.43 (m, 1H), 7.32-7.21 (m, 3H), 4.87 (s, 2H), 3.46-3.40 (m, 4H), 3.12 (s, 3H), 3.04 (dd, J=7.9, 6.8 Hz, 1H), 2.95 (d, J=6.4 Hz, 2H), 2.89 (d, J=6.4 Hz, 2H), 2.81-2.66 (m, 2H), 2.28 (s, 3H), 2.22 (ddd, J=13.9, 6.9, 1.8 Hz, 1H), 1.90 (dt, J=7.7, 5.8 Hz, 1H), 1.55-1.50 (m, 4H).

Example 24. Synthesis of (E)-3-(7-(1,1-dioxidothiomorpholino)-8-oxo-6,7,8,9-tetrahydro-5H-pyrido[2,3-b]azepin-3-yl)-N-methyl-N-((3-methylbenzofuran-2-yl)methyl)acrylamide (compound 179)

General Synthetic Scheme.

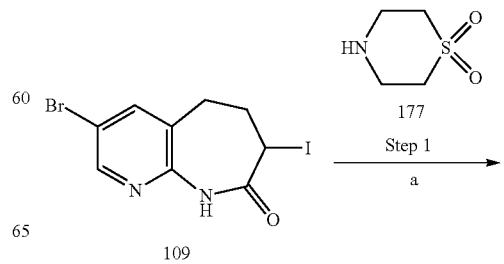

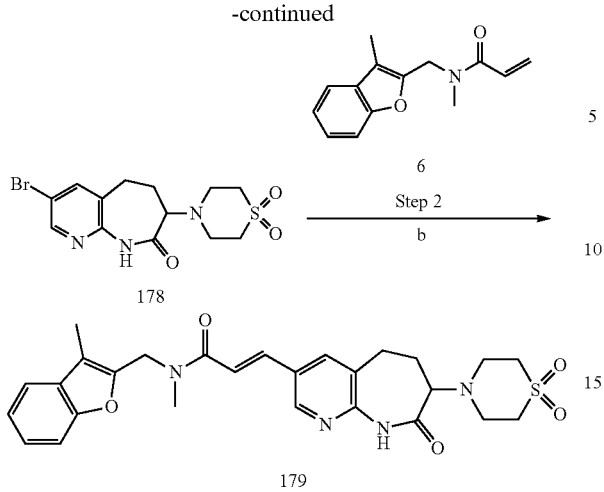

Reaction conditions: a) K₂CO₄, MeCN, 50° C.; b) Pd-162, Cy₂NMe, NBu₄Cl, 1,4-dioxane, 80° C.

Step 1. 3-Bromo-7-(1,1-dioxidothiomorpholino)-6,7-dihydro-5H-pyrido[2,3-b]azepin-8 (9H)-one (compound 178). To a stirred suspension of 3-bromo-7-iodo-6,7-dihydro-5H-pyrido[2,3-b]azepin-8 (9H)-one 109 (0.2 g, 0.55 mmol) in MeCN (4 mL) was added thiomorpholine 1,1-dioxide 177 (0.074 g, 0.55 mmol) followed by K₂CO₃ (0.23 g, 1.64 mmol). The reaction mixture was stirred at 50° C. for 24 h, then 80° C. for 24 h. The reaction mixture was allowed to cool to RT then AcOH (glacial) was added dropwise until solid K₂CO₃ could no longer be seen. The solution was diluted with 10% MeOH in DCM (50 mL) and pre-absorbed onto silica. The crude product was purified by chromatography (0-10% MeOH in DCM) but the product was not separated from a side product. The product was again purified by chromatography (0-100% EtOAc in isohexane) to afford the desired product 178 as an off-white solid (0.06 g, 29%). R$^t$ 0.85 min (Method 2a); m/z 374/376 [M+H]⁺ (ES⁺). ¹H NMR (400 MHZ, DMSO-d₆): δ, ppm 10.19 (s, 1H), 8.35 (d, J=2.4 Hz, 1H), 7.97 (d, J=2.4 Hz, 1H), 3.40 (dd, J=11.6, 7.4 Hz, 1H), 3.28-3.21 (m, 2H), 3.19-3.07 (m, 2H), 2.98-2.95 (m, 4H), 2.82-2.75 (m, 1H), 2.63-2.55 (m, 1H), 2.41-2.31 (m, 1H), 2.20-2.14 (m, 1H).

Step 2. (E)-3-(7-(1,1-Dioxidothiomorpholino)-8-oxo-6,7,8,9-tetrahydro-5H-pyrido[2,3-b]azepin-3-yl)-N-methyl-N-((3-methylbenzofuran-2-yl)methyl)acrylamide (compound 179). A microwave tube was flushed with N₂ then N-methyl-N-((3-methylbenzofuran-2-yl)methyl)acrylamide 6 (0.037 g, 0.16 mmol), 3-bromo-7-(1,1-dioxidothiomorpholino)-6,7-dihydro-5H-pyrido[2,3-b]azepin-8 (9H)-one 178 (0.06 g, 0.16 mmol), tetrabutylammonium chloride hydrate (5 mg, 0.016 mmol), and [P(ᵗBu)₃]Pd(crotyl)Cl (Pd-162) (5 mg, 0.011 mmol) were added. The tube was flushed for a further 5 mins with N₂ then 1,4-dioxane (1.5 mL) and N-cyclohexyl-N-methylcyclohexanamine (0.069 ml, 0.32 mmol) were added. The reaction mixture was heated to 80° C. under an atmosphere of N₂ and stirred for 2 h. The reaction mixture was cooled to RT, concentrated in vacuo, then taken up in EtOAc (30 mL), washed with water (2×20 mL) and brine (2×20 mL). The organic phase was passed through a phase separator and concentrated in vacuo before being triturated with isohexane. The crude product was purified by chromatography (0-10% MeOH in DCM) to give the desired product 179 as an pale yellow solid (32 mg, 37%). R$^t$ 1.92 min (Method 1a); m/z 523 [M+H]⁺ (ES⁺). ¹H NMR (400 MHZ, DMSO-d₆, 363 K): δ, ppm 9.77 (s, 1H), 8.49 (d, J=2.2 Hz, 1H), 8.02 (d, J=2.2 Hz, 1H), 7.59-7.40 (m, 3H), 7.34-7.20 (m, 3H), 4.86 (s, 2H), 3.43 (dd, J=11.0, 7.1 Hz, 1H), 3.33-3.20 (m, 2H), 3.20-3.07 (m, 5H), 2.93 (q, J=3.8 Hz, 4H), 2.83 (ddd, J=10.5, 7.2, 3.6 Hz, 1H), 2.78-2.65 (m, 1H), 2.39-2.31 (m, 1H), 2.27 (s, 3H), 2.26-2.17 (m, 1H).

Example 25. Synthesis of (E)-N-methyl-N-((3-methylbenzofuran-2-yl)methyl)-3-(8-oxo-7-(pyrrolidin-1-yl)-6,7,8,9-tetrahydro-5H-pyrido[2,3-b]azepin-3-yl)acrylamide (compound 182)

General Synthetic Scheme.

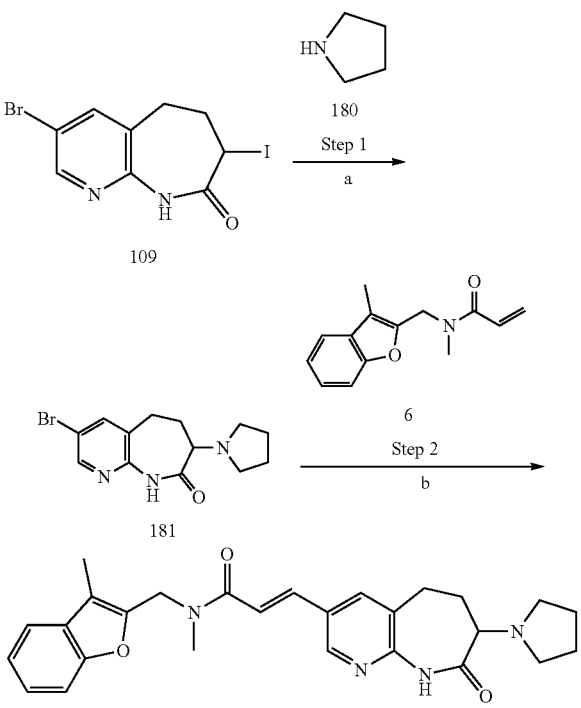

Reaction conditions: a) K₂CO₃, MeCN, pyrrolidine, 50° C.; b) Pd-162, Cy₂NMe, NBu₄Cl, 1,4-dioxane, 80° C.

Step 1. 3-Bromo-7-(pyrrolidin-1-yl)-6,7-dihydro-5H-pyrido[2,3-b]azepin-8 (9H)-one (compound 181). To a solution of 3-bromo-7-iodo-6,7-dihydro-5H-pyrido[2,3-b]azepin-8 (9H)-one 109 (180 mg, 0.49 mmol) in MeCN (5 mL) under nitrogen was added K₂CO₃ (200 mg, 1.47 mmol) and pyrrolidine 180 (49 µL, 0.59 mmol). The reaction mixture was stirred at 80° C. for 18 h. After cooling to RT, the reaction mixture was partitioned between water (7 mL) and ethyl acetate (7 mL). The aqueous phase was extracted with ethyl acetate (7 mL). Combined organics were washed with brine (5 mL), dried (MgSO₄) and concentrated in vacuo. The residue was triturated from MTBE to give the title compound 181 (100 mg, 66% yield) as an off white solid. R$^t$ 1.44 min (Method 1a); m/z 310/312 [M+H]⁺ (ES⁺).

Step 2. (E)-N-Methyl-N-((3-methylbenzofuran-2-yl)methyl)-3-(8-oxo-7-(pyrrolidin-1-yl)-6,7,8,9-tetrahydro-5H-pyrido[2,3-b]azepin-3-yl)acrylamide (compound 182). A reaction vial was charged with N-methyl-N-((3-methylbenzofuran-2-yl)methyl)acrylamide 6 (74 mg, 0.32 mmol), 3-bromo-7-(pyrrolidin-1-yl)-6,7-dihydro-5H-pyrido[2,3-b]azepin-8(9H)-one 181 (100 mg, 0.32 mmol), tetrabutylammonium chloride hydrate (10 mg, 0.032 mmol), [P(tBu)$_3$]Pd(crotyl)Cl (Pd-162) (13 mg, 0.032 mmol). The vial was flushed with nitrogen for 5 mins. 1,4-Dioxane (3 mL) and N-cyclohexyl-N-methylcyclohexanamine (140 µL, 0.65 mmol) were added and the reaction mixture was purged with nitrogen for further 5 mins. The mixture was heated at 80° C. for 18 h. The reaction was cooled to RT and the solvent was removed in vacuo. The crude product was purified by chromatography (0-10% MeOH in DCM) to give the title compound 182 (20 mg, 14% yield). R$^t$ 1.43 min (Method 1a); m/z 459 [M+H]$^+$ (ES$^+$). $^1$H NMR (DMSO-d$_6$): δ, ppm 10.20 (s, 1H), 8.51 (d, J=9.5 Hz, 1H), 8.13 (s, 1H), 7.64-7.41 (m, 4H), 7.35-7.15 (m, 2H), 4.91 (d, J=82.2 Hz, 2H), 3.20 (s, 3H), 2.94 (s, 1H), 2.82-2.71 (m, 1H), 2.73-2.69 (m, 1H), 2.59-2.56 (m, 2H), 2.28 (m, 4H), 1.65-1.59 (m, 4H).

Example 26. Synthesis of (E)-N-methyl-N-((3-methylbenzofuran-2-yl)methyl)-3-(7-(4-(methylsulfonyl)piperazin-1-yl)-8-oxo-6,7,8,9-tetrahydro-5H-pyrido[2,3-b]azepin-3-yl)acrylamide (compound 187)

General Synthetic Scheme.

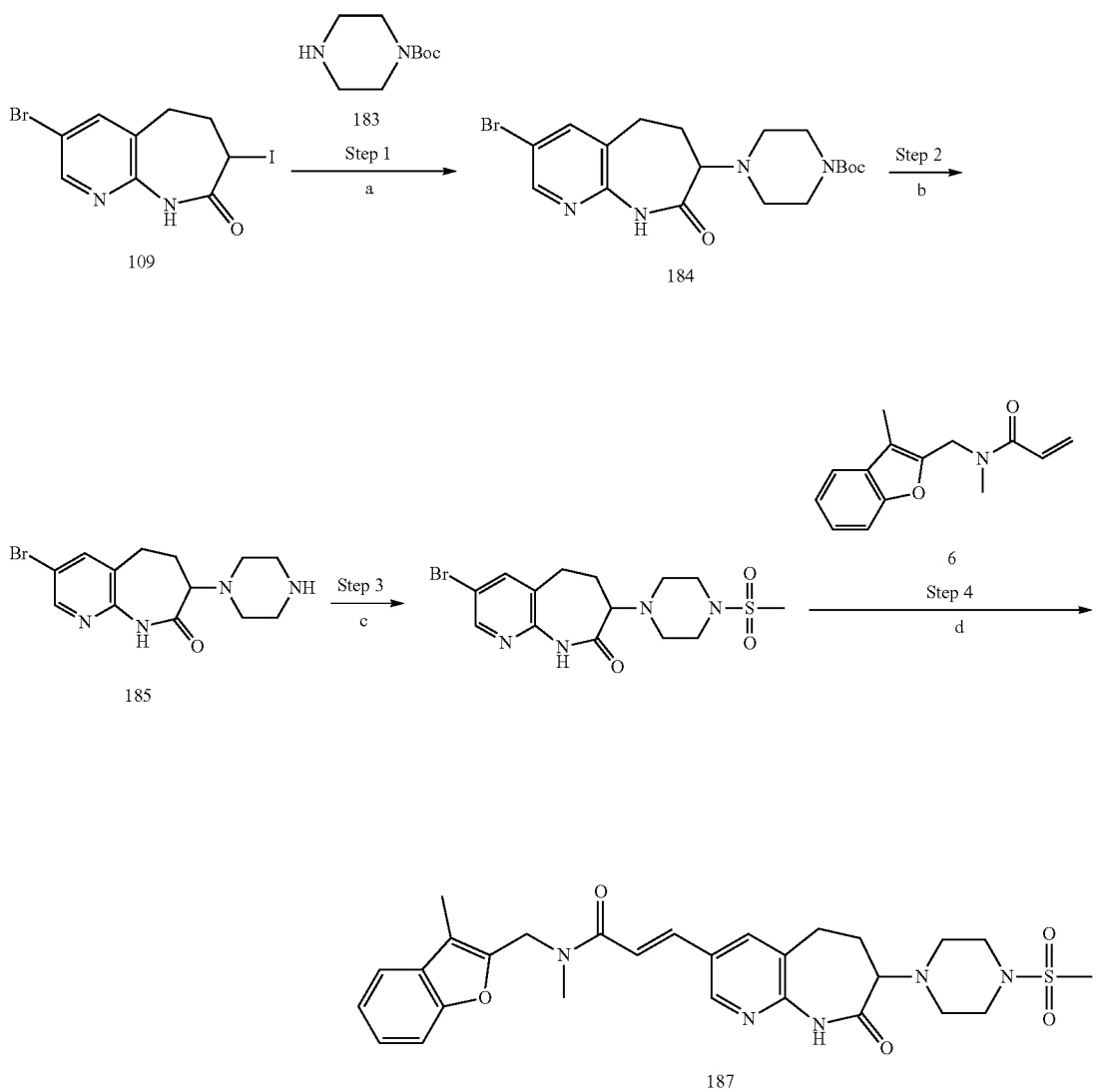

Reaction conditions: a) K$_2$CO$_3$, MeCN, 50° C.; b) TFA, DCM; c) Mesyl chloride, TEA, DCM, 0° C.; d) Pd-162, Cy$_2$NMe, NBu$_4$Cl, 1,4-dioxane, 80° C.

Step 1. tert-Butyl 4-(3-bromo-8-oxo-6,7,8,9-tetrahydro-5H-pyrido[2,3-b]azepin-7-yl) piperazine-1-carboxylate (compound 184). To a suspension of 3-bromo-7-iodo-6,7-dihydro-5H-pyrido[2,3-b]azepin-8(9H)-one 109 (400 mg, 1.09 mmol) and $K_2CO_3$ (450 mg, 3.27 mmol) in MeCN (4 mL) was added tert-butyl piperazine-1-carboxylate 183 (200 mg, 1.09 mmol) and the reaction was heated to 50° C. for 18 h. The reaction mixture was allowed to cool to RT, diluted with 10% MeOH in DCM (10 mL) and preabsorbed onto silica. Purification by chromatography (0-10% MeOH in DCM) afforded the title compound 184 (439 mg, 93% yield) as a white solid. $R^t$ 1.27 min (Method 1a); m/z 425/427 [M+H]$^+$ (ES$^+$). $^1$H NMR (DMSO-d$_6$): δ, ppm 10.13 (s, 1H), 8.34 (d, J=2.4 Hz, 1H), 7.94 (d, J=2.4 Hz, 1H), 3.30 (s, 1H), 3.17 (s, 4H), 3.09 (dd, J=10.4, 7.1 Hz, 1H), 2.83-2.76 (m, 1H), 2.68-2.56 (m, 3H), 2.49-2.45 (m, 1H), 2.35-2.27 (m, 1H), 2.21-2.11 (m, 1H), 1.38 (s, 9H).

Step 2. 3-Bromo-7-(piperazin-1-yl)-6,7-dihydro-5H-pyrido[2,3-b]azepin-8 (9H)-one (compound 185). Trifluoroacetic acid (5 ml) was added dropwise to a stirred solution of tert-butyl 4-(3-bromo-8-oxo-6,7,8,9-tetrahydro-5H-pyrido[2,3-b]azepin-7-yl) piperazine-1-carboxylate 184 (439 mg, 1.03 mmol) in DCM (5 mL) at RT. The reaction was stirred for 2 h and the solvent was removed in vacuo. The resulting oil was taken up in MeOH (10 mL) and applied to an SCX column. The column was washed with MeOH (20 mL) and the product eluted with 10% methanolic ammonia (20 mL) to give the title compound 185 (336 mg, 93% yield) as a thick colourless oil. The crude product was used in the next step without further purification. $R^t$ 1.04 min (Method 1a); m/z 325/327 [M+H]$^+$ (ES$^+$).

Step 3. 3-Bromo-7-(4-(methylsulfonyl) piperazin-1-yl)-6,7-dihydro-5H-pyrido[2,3-b]azepin-8 (9H)-one (compound 186). To a stirred solution of 3-bromo-7-(piperazin-1-yl)-6,7-dihydro-5H-pyrido[2,3-b]azepin-8(9H)-one 185 (130 mg, 0.41 mmol) in DCM (4 mL) was added TEA (0.17 mL, 1.22 mmol) followed by methanesulfonyl chloride (0.04 mL, 0.49 mmol). The reaction mixture was stirred at 0° C. for 1 h and allowed to warm slowly to RT. The reaction mixture was partitioned between H$_2$O (10 mL) and DCM (6 mL). The aqueous phase was extracted with DCM (2×4 mL). The combined organic phases were dried (MgSO$_4$), filtered and concentrated in vacuo to give the title compound 186 (148 mg, 84% yield) as a white solid. The crude product was used in the next step without further purification. $R^t$ 1.47 min (Method 1a); m/z 403/405 [M+H]$^+$ (ES$^+$). $^1$H NMR (DMSO-d$_6$): δ, ppm 10.16 (s, 1H), 8.35 (d, J=2.4 Hz, 1H), 7.96 (d, J=2.4 Hz, 1H), 3.17-3.12 (m, 1H), 2.99 (t, J=5.1 Hz, 4H), 2.84 (s, 3H), 2.83-2.76 (m, 3H), 2.73-2.64 (m, 2H), 2.64-2.53 (m, 1H), 2.36-2.29 (m, 1H), 2.25-2.12 (m, 1H).

Step 4. (E)-N-Methyl-N-((3-methylbenzofuran-2-yl)methyl)-3-(7-(4-(methylsulfonyl) piperazin-1-yl)-8-oxo-6,7,8,9-tetrahydro-5H-pyrido[2,3-b]azepin-3-yl) acrylamide (compound 187). A reaction vial was charged with N-methyl-N-((3-methylbenzofuran-2-yl)methyl)acrylamide 6 (85 mg, 0.37 mmol), 3-bromo-7-(4-(methylsulfonyl) piperazin-1-yl)-6,7-dihydro-5H-pyrido[2,3-b]azepin-8 (9H)-one 186 (150 mg, 0.37 mmol), tetrabutylammonium chloride hydrate (11 mg, 0.04 mmol), [P(tBu)$_3$]Pd(crotyl)Cl (Pd-162) (15 mg, 0.04 mmol). The vial was flushed with nitrogen for 5 min. 1,4-Dioxane (3 mL) and Cy$_2$NMe (0.16 mL, 0.74 mmol) were added and the reaction mixture was purged with nitrogen for further 5 min. The mixture was heated to 80° C. for 4 h and was cooled to RT. The solvent was removed in vacuo. Formation of a precipitate was observed. The reaction mixture was filtered and the solid washed twice with 1,4-dioxane (2×5 mL). The crude product was purified by column chromatography (0-10% MeOH in DCM) to afford the title compound 187 (78 mg, 38% yield) as a white solid. $R^t$ 1.95 min (Method 1a); m/z 552 [M+H]$^+$ (ES$^+$). $^1$H NMR (DMSO-d$_6$): δ, ppm 9.71 (s, 1H), 8.48 (d, J=2.2 Hz, 1H), 8.01 (d, J=2.2 Hz, 1H), 7.58-7.55 (m, 1H), 7.52 (d, J=15.5 Hz, 1H), 7.48-7.45 (m, 1H), 7.32-7.21 (m, 3H), 4.87 (s, 2H), 3.21 (dd, J=10.2, 6.9 Hz, 1H), 3.11 (s, 3H), 3.03 (t, J=5.0 Hz, 4H), 2.88-2.81 (m, 3H), 2.80 (s, 3H), 2.78-2.66 (m, 3H), 2.38-2.28 (m, 1H), 2.28 (s, 3H), 2.29-2.18 (m, 1H).

Example 27. Synthesis of (S,E)-N-methyl-N-((3-methylbenzofuran-2-yl)methyl)-3-(8-oxo-7-(2-oxa-6-azaspiro[3.3]heptan-6-yl)-6,7,8,9-tetrahydro-5H-pyrido[2,3-b]azepin-3-yl)acrylamide (compound 190)

General Synthetic Scheme.

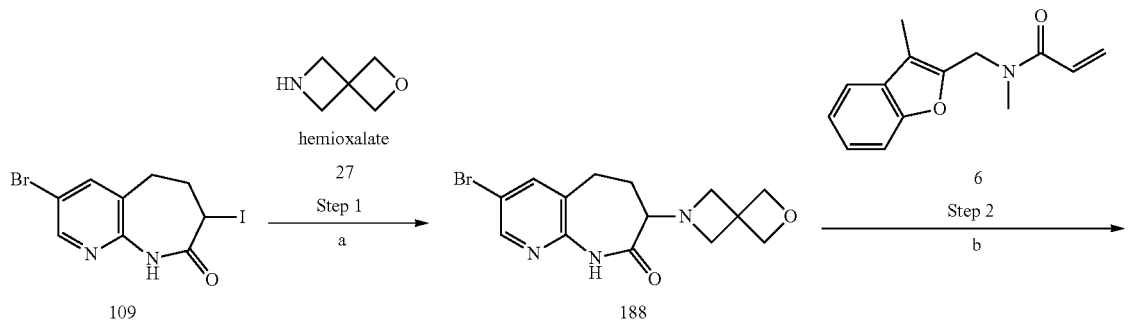

-continued

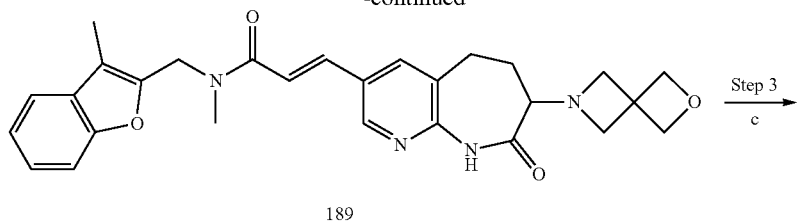

189

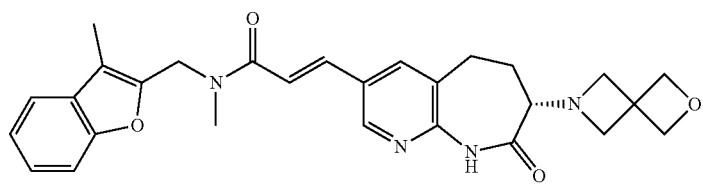

190

Reaction conditions: a) K₂CO₃, MeCN, 50° C.; b) Pd-162, Cy₂NMe, NBu₄Cl, 1,4-dioxane, 80° C; c) chiral separation Step 1. 3-Bromo-7-(2-oxa-6-azaspiro[3.3]heptan-6-yl)-6,7-dihydro-5H-pyrido[2,3-b]azepin-8 (9H)-one (compound 188). To a stirred suspension of 3-bromo-7-iodo-6,7-dihydro-5H-pyrido[2,3-b]azepin-8 (9H)-one 109 (0.30 g, 0.82 mmol) in MeCN (5 mL) was added 2-oxa-6-azaspiro[3.3]heptane hemioxalate salt 27 (0.14 g, 0.98 mmol) followed by K₂CO₃ (0.34 g, 2.45 mmol). The reaction mixture was heated at 50° C. for ~16 h. The reaction mixture was allowed to cool to room temperature then AcOH (glacial) was added dropwise until solid K₂CO₃ could no longer be seen. The solution was diluted with 10% MeOH in DCM (50 mL) and preabsorbed onto silica. The crude product was purified by column chromatography (0-5% MeOH/in DCM) to afford the desired product 188 as an off-white solid (0.30 g, quantitative yield). Rt 0.14 min (Method 2a); m/z 338/340 [M+H]⁺ (ES⁺). ¹H NMR (400 MHZ, DMSO-d₆): δ, ppm 10.10 (s, 1H), 8.33 (d, J=2.4 Hz, 1H), 7.93 (d, J=2.4 Hz, 1H), 4.51 (s, 4H), 3.30-3.18 (m, 4H), 2.86 (dd, J=10.0, 7.4 Hz, 1H), 2.75-2.55 (m, 2H), 2.23-2.14 (m, 1H), 1.78 (dddd, J=12.9, 10.5, 7.8, 2.9 Hz, 1H).

Step 2. (E)-N-Methyl-N-((3-methylbenzofuran-2-yl)methyl)-3-(8-oxo-7-(2-oxa-6-azaspiro[3.3]heptan-6-yl)-6,7,8,9-tetrahydro-5H-pyrido[2,3-b]azepin-3-yl)acrylamide (compound 189). A microwave tube was flushed with N₂ then N-methyl-N-((3-methylbenzofuran-2-yl)methyl)acrylamide 6 (0.20 g, 0.86 mmol), 3-bromo-7-(2-oxa-6-azaspiro[3.3]heptan-6-yl)-6,7-dihydro-5H-pyrido[2,3-b]azepin-8 (9H)-one 188 (0.29 g, 0.86 mmol), tetrabutylammonium chloride hydrate (25 mg, 0.086 mmol), and [P(ᵗBu)₃]Pd(crotyl)Cl (Pd-162) (24 mg, 0.06 mmol) were added. The tube was flushed for 5 mins with N₂ then 1,4-dioxane (2 mL) and N-cyclohexyl-N-methylcyclohexanamine (0.37 ml, 1.72 mmol) were added. The reaction mixture was heated to 80° C. under an atmosphere of N₂ and stirred for 1 h. The reaction mixture was cooled to RT, concentrated in vacuo, then taken up in EtOAc (30 mL), washed with water (2×20 mL) and brine (2×20 mL). The organic phase was passed through a phase separator and concentrated in vacuo before being triturated with isohexane. The crude product was purified by chromatography (0-10% MeOH in DCM) to give the desired product 189 as an off white solid (270 mg, 64%). Rᵗ 1.39 min (Method 1a); m/z 487 [M+H]⁺ (ES⁺). ¹H NMR (400 MHZ, DMSO-d₆, 363 K): δ, ppm 9.70 (s, 1H), 8.45 (d, J=2.3 Hz, 1H), 7.98 (d, J=2.3 Hz, 1H), 7.60-7.42 (m, 3H), 7.34-7.18 (m, 3H), 4.86 (s, 2H), 4.52 (s, 4H), 3.42-3.27 (m, 4H), 3.11 (s, 3H), 2.97 (m, 1H), 2.81-2.62 (m, 2H), 2.27 (s, 3H), 2.20 (ddt, J=13.2, 10.2, 7.4 Hz, 1H), 1.95-1.78 (m, 1H).

Step 3. (S,E)-N-methyl-N-((3-methylbenzofuran-2-yl)methyl)-3-(8-oxo-7-(2-oxa-6-azaspiro[3.3]heptan-6-yl)-6,7,8,9-tetrahydro-5H-pyrido[2,3-b]azepin-3-yl)acrylamide (compound 190). The racemic mixture 189 was separated by chiral prep HPLC using Method Ib. The eluting fractions were immediately neutralised by washing with NaHCO₃(Sat Aq., equal volume to fractions). Second eluting isomer (compound 190). Rᵗ 15.7 min (Method IIb). Rᵗ 1.38 min (Method 1a) m/z 487 [M+H]⁺ (ES⁺). ¹H NMR (400 MHz, DMSO-d₆): δ, ppm 9.66 (s, 1H), 8.45 (d, J=2.3 Hz, 1H), 7.98 (d, J=2.2 Hz, 1H), 7.59-7.44 (m, 3H), 7.31-7.17 (m, 3H), 4.86 (s, 2H), 4.51 (s, 4H), 3.37-3.23 (m, 4H), 3.11 (s, 3H), 2.95 (dd, J=9.3, 7.1 Hz, 1H), 2.73 (ddd, J=14.5, 10.5 Hz, 6.9 Hz, 2H), 2.27 (s, 3H), 2.24-2.14 (m, 1H), 1.93-1.81 (m, 1H). Chiral purity: 98.94%. Chirality for compound 190 was arbitrarily assigned.

143

Example 28. Synthesis of (E)-N-((7-amino-2-methylbenzofuran-3-yl)methyl)-N-methyl-3-(8-oxo-7-(pyrrolidin-1-yl)-6,7,8,9-tetrahydro-5H-pyrido[2,3-b]azepin-3-yl)acrylamide (compound 191)

General Synthetic Scheme.

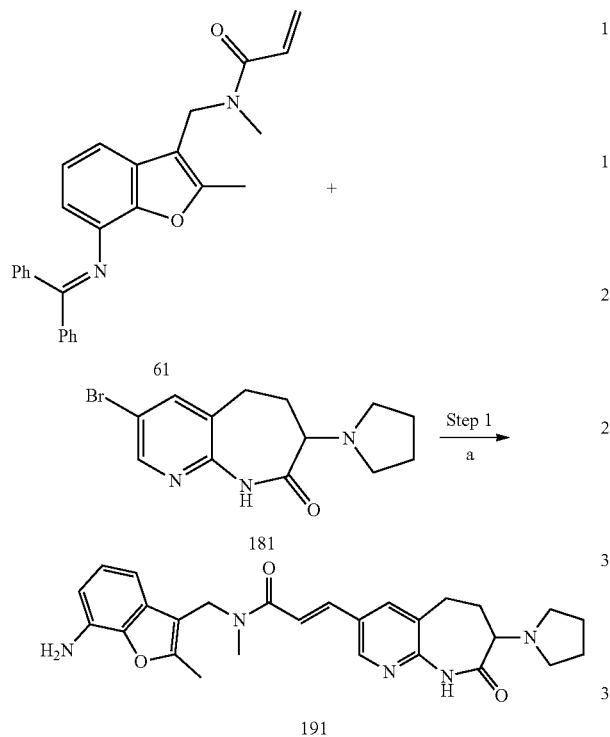

Reaction conditions: a) i. DIPEA, Pd-116, 1,4-Dioxane, 90° C.; ii. HCl.

Step 1. (E)-N-((7-Amino-2-methylbenzofuran-3-yl)methyl)-N-methyl-3-(8-oxo-7-(pyrrolidin-1-yl)-6,7,8,9-tetrahydro-5H-pyrido[2,3-b]azepin-3-yl)acrylamide (compound 191). A mixture of N-((7-(((diphenylmethylene)amino)-2-methylbenzofuran-3-yl)methyl)-N-methylacrylamide 61 (94 mg, 0.23 mmol), 3-bromo-7-(pyrrolidin-1-yl)-6,7-dihydro-5H-pyrido[2,3-b]azepin-8 (9H)-one 181 (65 mg, 0.21 mmol) and Pd-116 (11 mg, 0.02 mmol) was evacuated and backfilled with $N_2$ three times. 1,4-Dioxane (2 mL) and DIPEA (0.18 mL, 1.05 mmol) were added and the reaction mixture was heated to 90° C. and stirred for 2 h. A further portion of Pd-116 (11 mg, 0.02 mmol) was added and heating was continued for ~16 h. The reaction was allowed to cool to RT, then was diluted with HCl (1 M Aq, 5 mL) and MeOH (5 mL) and stirred for 30 mins. The reaction was extracted with DCM (3×20 mL) and the combined organic layers were back extracted with HCl (1 M Aq, 2×10 mL). The aqueous layer was then basified with solid $NaHCO_3$ to ~pH 8 and then was extracted again with DCM (3×20 mL). The combined organic extracts were dried by passing through a phase separation cartridge, concentrated in vacuo and the crude material was purified by column chromatography (12 g, 0-10% MeOH/DCM) to give the desired product 191 as a yellow solid (29 mg, 28%). R' 0.96 min (Method 1a) m/z 474 (M+H)+ (ES+). $^1$H NMR (500

144

MHZ, DMSO-$d_6$, 363K) δ 9.64 (s, 1H), 8.43 (d, J=2.2 Hz, 1H), 7.97 (d, J=2.3 Hz, 1H), 7.53 (d, J=15.4 Hz, 1H), 7.25 (d, J=15.5 Hz, 1H), 6.87 (td, J=7.7, 1.0 Hz, 1H), 6.75 (d, J=7.7 Hz, 1H), 6.53 (dd, J=7.7, 1.2 Hz, 1H), 4.87 (s, 2H), 4.73 (s, 2H), 3.08 (dd, J=9.1, 6.8 Hz, 1H), 2.98 (s, 3H), 2.83-2.76 (m, 1H), 2.76-2.67 (m, 1H), 2.60-2.54 (m, 4H), 2.47 (s, 3H), 2.35-2.20 (m, 2H), 1.63-1.56 (m, 4H).

Example 29. Synthesis of (S,E)-N-((7-amino-2-methylbenzofuran-3-yl)methyl)-3-(7-amino-8-oxo-6,7,8,9-tetrahydro-5H-pyrido[2,3-b]azepin-3-yl)-N-methylacrylamide (compound 193)

General Synthetic Scheme.

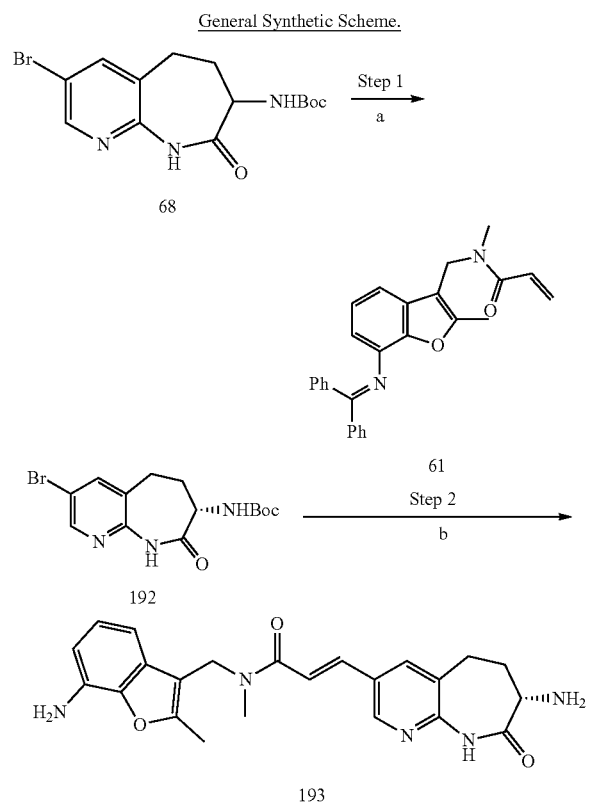

Reaction conditions: a) chiral separation; b) i. Pd-116, DIPEA, 1,4-Dioxane, 90° C.; ii. TMS-OTf, DCM; iii. 1M HCl, MeOH.

Step 1. tert-Butyl(S)-(3-bromo-8-oxo-6,7,8,9-tetrahydro-5H-pyrido[2,3-b]azepin-7-yl)carbamate (compound 192). The racemic mixture 68 was separated by chiral prep SFC using a Chiralpak® IA (Daicel Ltd.) column (2.1×150 mm, 3 μm particle size) flow rate 0.6 mL/min-1 eluting with 30% Ethanol. The product was analysed by analytical SFC (Waters UPC2, CHIRALPAK® IC-3 (Daicel Ltd.) column (2.1×150 mm, 3 μm particle size) flow rate 0.6 mL/min-1 eluting with 30% of ethanol). First eluting isomer (compound 192): R' 1.84 min. $^1$H NMR (400 MHZ, DMSO-$d_6$) δ, ppm 10.29 (s, 1H), 8.41 (d, J=2.4 Hz, 1H), 8.00 (d, J=2.4 Hz, 1H), 7.12 (d, J=8.3 Hz, 1H), 3.89-3.81 (m, 1H), 2.79-2.72 (m, 1H), 2.65-2.54 (m, 1H), 2.31-2.20 (m, 1H), 2.14-2.03 (m, 1H), 1.35 (s, 9H). Chirality arbitrarily assigned.

Step 2. (S,E)-N-((7-Amino-2-methylbenzofuran-3-yl)methyl)-3-(7-amino-8-oxo-6,7,8,9-tetrahydro-5H- pyrido[2,3-b]azepin-3-yl)-N-methylacrylamide (compound 193). A mixture of N-((7-((diphenylmethylene)amino)-2-methylbenzofuran-3-yl)methyl)-N-methylacrylamide 61 (92 mg, 0.23 mmol), (S)-tert-butyl (3-bromo-8-oxo-6,7,8,9-tetrahydro-5H-pyrido[2,3-b]azepin-7-yl)carbamate 192 (80 mg, 0.23 mmol) and Pd-116 (11 mg, 0.02 mmol) was evacuated and backfilled with $N_2$ three times. 1,4-Dioxane (2 mL) and DIPEA (0.12 mL, 0.67 mmol) were added and the reaction mixture was heated to 90° C. and stirred for 5 h. The reaction mixture was allowed to cool to RT, then $H_2O$ (20 mL) was added and the resulting precipitate was collected by filtration. The crude material was purified by column chromatography (0-10% MeOH/DCM) to give the Boc and diphenyl imine protected intermediate as a yellow solid (0.14 g, 80%). The intermediate was dissolved in DCM (3 mL), TMS-OTf (0.12 mL, 0.67 mmol) was added dropwise and the reaction mixture was stirred for 30 mins at RT. The reaction mixture was diluted with MeOH (5 mL), then 1M aq. HCl (10 mL) was added and the reaction was stirred for a further 10 mins. The reaction mixture was extracted with DCM (3×15 mL) and the combined organic layers were back extracted with 1M aq. HCl (20 mL). The aqueous layer was then basified with solid $NaHCO_3$ to ~pH 8 and was extracted with DCM (3×20 mL). The combined organic layers were washed with brine (1×20 mL), dried by passing through a phase separation cartridge, concentrated in vacuo and purified by column chromatography (0-10% MeOH/DCM) to give the desired product 193 as an off-white solid (34 mg, 36%). $R^t$ 0.90 min (Method 1a) m/z 420 (M+H)$^+$ (ES$^+$);

$^1$H NMR (500 MHZ, DMSO-d$_6$, 363K) δ 9.79 (s, 1H), 8.48 (d, J=2.2 Hz, 1H), 8.03 (d, J=2.2 Hz, 1H), 7.54 (d, J=15.4 Hz, 1H), 7.36-7.17 (m, 1H), 6.87 (t, J=7.7 Hz, 1H), 6.75 (d, J=7.8 Hz, 1H), 6.53 (dd, J=7.7, 1.2 Hz, 1H), 4.87 (s, 2H), 4.73 (s, 2H), 3.26 (dd, J=11.2, 7.5 Hz, 1H), 2.76-2.65 (m, 2H), 2.47 (s, 3H), 2.42-2.30 (m, 1H), 1.94-1.48 (m, 3H). N—CH$_3$ obscured by solvent peak—visible in RT NMR.

The product was analysed by Chiral HPLC (Agilent 1100, CHIRALPAK® IC, column (250×4.6 mm, 5 μm particle size) flow rate 1.5 mL/min$^{-1}$ eluting with a gradient of 5-95% acetonitrile and water in 10 mM Ammonium Bicarbonate): $R^t$ 37.29 min, 98% e.r. (254 nm). The stereochemistry for compound 193 was arbitrarily attributed.

Example 30. Synthesis of (E)-3-((2R,3S)-3-hydroxy-2-methyl-4-oxo-2,3,4,5-tetrahydro-1H-pyrido[2,3-b][1,4]diazepin-8-yl)-N-methyl-N-((3-methyl-4-(pyridin-3-yloxy)benzofuran-2-yl)methyl)acrylamide (compound 198)

General Synthetic Scheme.

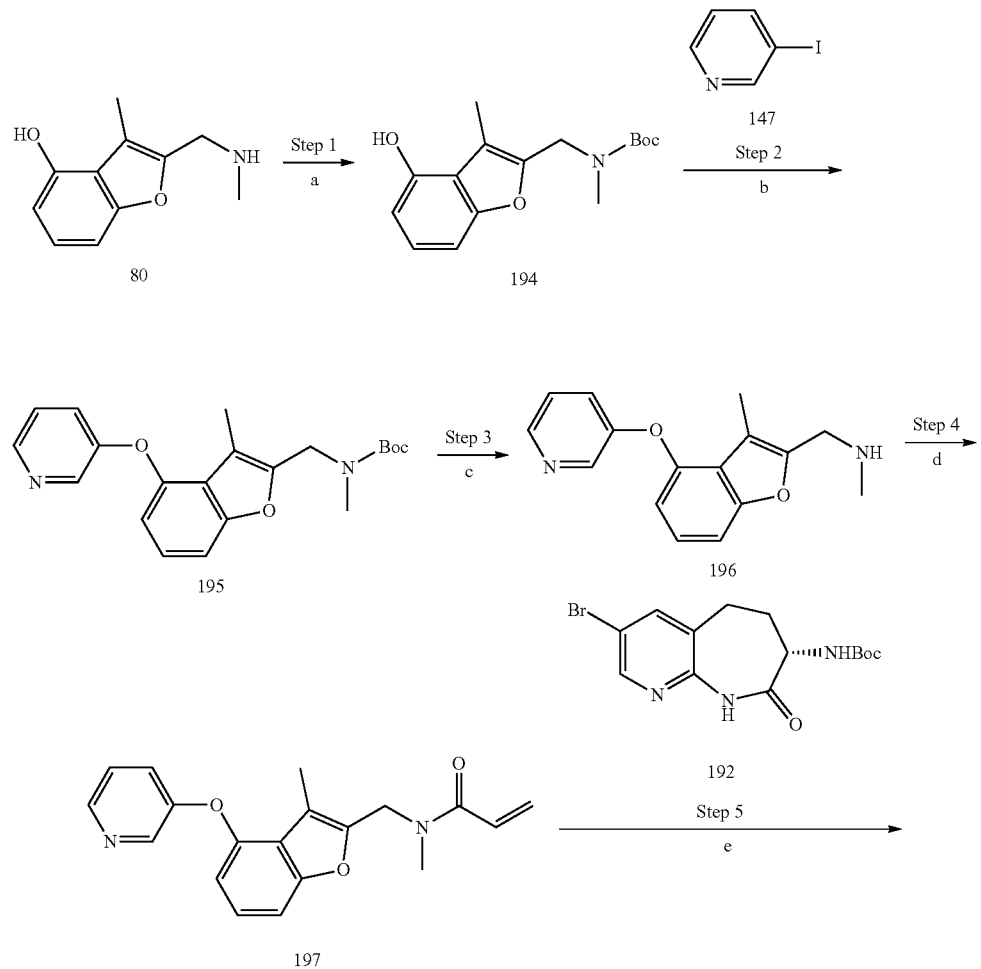

-continued

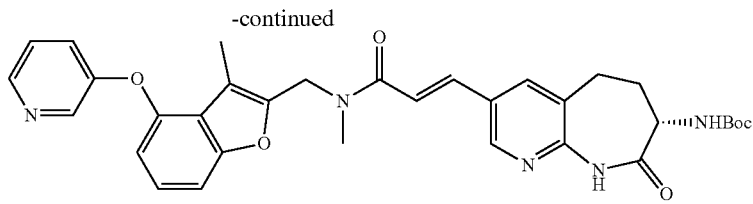

198

Reaction conditions: a) Boc₂O, DMAP; b) CuI, N,N-dimethylglycine, K₃PO₄, DMSO, 110° C.; c) TFA, DCM; d) Acryloyl chloride, TEA, DCM, 0° C.
e) Pd-116, DIPEA, 1,4-dioxane, 90° C., ii) TMSOTf, DCM Step 1. tert-Butyl ((4-hydroxy-3-methylbenzofuran-2-yl) methyl)(methyl)carbamate (compound 194). To a stirred solution of 3-methyl-2-((methylamino) methyl) benzofuran-4-ol 80 (1.4 g, 7.32 mmol) in DCM (50 mL) was added Boc₂O (2.55 mL, 11.0 mmol) and DMAP (0.98 g, 8.05 mmol). The reaction mixture was stirred at RT for 3 h then the solvent was concentrated in vacuo. The resulting residue was taken up in THF (25 mL) and MeOH (5 mL) and 2M aq. NaOH (25 mL) was added and the mixture was stirred for 2 h. The organic solvent was removed in vacuo and the remaining aqueous material was extracted with DCM (3×50 mL). The combined organic layers were washed with brine (1×50 mL), dried by passing through a phase separation cartridge and concentrated in vacuo. The crude material was purified by column chromatography (0-100% EtOAc/isohexane) to give the desired product 194 as a colourless oil (1.21 g, 56%) which crystallised on standing. $R^t$ 2.24 min (Method 1b) m/z 236 (M-tBu)⁺ (ES⁺); ¹H NMR (500 MHZ, DMSO-d₆) δ 9.78 (s, 1H), 7.01 (t, J=8.0 Hz, 1H), 6.88 (d, J=8.2 Hz, 1H), 6.56 (dd, J=7.9, 0.8 Hz, 1H), 4.45 (s, 2H), 2.79 (s, 3H), 2.32 (s, 3H), 1.42 (s, 9H).

Step 2. tert-Butyl methyl((3-methyl-4-(pyridin-3-yloxy) benzofuran-2-yl)methyl)carbamate (compound 195). To a stirred solution of tert-butyl ((4-hydroxy-3-methylbenzofuran-2-yl)methyl)(methyl)carbamate 194 (0.2 g, 0.69 mmol) in DMSO (2 mL) was added 3-iodopyridine 147 (0.28 g, 1.37 mmol), N,N-dimethylglycine (0.07 g, 0.69 mmol), K₃PO₄ (0.29 g, 1.37 mmol) and CuI (0.07 g, 0.34 mmol). The reaction mixture was stirred at 110° C. for ~16 h. The reaction mixture was allowed to cool to RT, then H₂O (10 mL) and EtOAc (10 mL) were added. The aqueous layer was separated and extracted with EtOAc (2×10 mL). The combined organic phases was washed with H₂O (2×10 mL), dried using MgSO₄, filtered and concentrated in vacuo. The crude product was purified by chromatography (0-100% EtOAc/isohexane) to afford the title compound 195 as a thick brown oil (0.1 g, 41%). $R^t$ 2.31 min (Method 1a) m/z 369 (M+H)⁺ (ES⁺). ¹H NMR (500 MHZ, DMSO-d₆) δ 8.40 (d, J=2.8 Hz, 1H), 8.37 (dd, J=4.5, 1.5 Hz, 1H), 7.45-7.34 (m, 3H), 7.29 (t, J=8.1 Hz, 1H), 6.80 (d, J=7.9 Hz, 1H), 4.52 (s, 2H), 2.83 (s, 3H), 2.17 (s, 3H), 1.41 (s, 9H).

Step 3. N-Methyl-1-(3-methyl-4-(pyridin-3-yloxy)benzofuran-2-yl) methanamine (compound 196). To a stirred solution of tert-butyl methyl((3-methyl-4-(pyridin-3-yloxy)benzofuran-2-yl)methyl)carbamate 195 (0.1 g, 0.28 mmol) in DCM (1 mL) was added TFA (1 mL) and the reaction mixture was stirred at RT for 3 h. The solvents were removed in vacuo and the crude residue was taken up in MeOH (10 mL) and applied to a SCX column. The column was washed with MeOH (20 mL) and the product eluted with 10% methanolic ammonia (20 mL) to afford the title compound 196 as a brown oil (76 mg, 100%). $R^t$ 0.66 min (Method 1a) m/z 238 (M-NHCH₃)⁺ (ES⁺).

Step 4. N-Methyl-N-((3-methyl-4-(pyridin-3-yloxy)benzofuran-2-yl)methyl)acrylamide (compound 197). To a stirred solution of N-methyl-1-(3-methyl-4-(pyridin-3-yloxy)benzofuran-2-yl) methanamine 196 (74 mg, 0.28 mmol) in DCM (3 mL) was added TEA (0.07 mL, 0.52 mmol) and acryloyl chloride (0.03 mL, 0.33 mmol) at 0° C. The reaction mixture was stirred at 0° C. for 15 min, allowed to warm to RT and stirred for 30 min. The reaction mixture was diluted with H₂O (5 mL) and then the aqueous phase was separated and extracted with EtOAc (2×10 mL). The combined organic phases were washed with brine (10 mL), dried using MgSO₄, filtered and concentrated in vacuo. The crude product was purified by chromatography (0-100% EtOAc/isohexane) to afford the title compound 197 as a colourless oil (174 mg, 60%). $R^t$ 1.50 min (Method 1a) m/z 323 (M+H)+ (ES⁺). ¹H NMR (500 MHZ, DMSO-d₆) δ 8.49-8.30 (m, 2H), 7.54-7.33 (m, 3H), 7.32-7.24 (m, 1H), 7.07-6.96 (m, 1H), 6.85-6.73 (m, 1H), 6.23-6.13 (m, 1H), 5.79-5.68 (m, 1H), 4.81 (s, 0.8H), 4.72 (s, 1.2H), 3.08 (s, 1.7H), 2.89 (s, 1.3H), 2.24-2.16 (m, 3H).

Step 4. (S,E)-3-(7-Amino-8-oxo-6,7,8,9-tetrahydro-5H-pyrido[2,3-b]azepin-3-yl)-N-methyl-N-((3-methyl-4-(pyridin-3-yloxy)benzofuran-2-yl)methyl)acrylamide (compound 198). To a mixture of N-methyl-N-((3-methyl-4-(pyridin-3-yloxy)benzofuran-2-yl)methyl) acrylamide 197 (26 mg, 0.08 mmol), (S)-tert-butyl (3-bromo-8-oxo-6,7,8,9-tetrahydro-5H-pyrido[2,3-b] azepin-7-yl)carbamate 192 (30 mg, 0.09 mmol) and Pd-116 (4 mg, 8.1 µmol) were added 1,4-dioxane (2 mL) and DIPEA (0.03 mL, 0.16 mmol). The reaction mixture was purged with N₂, heated to 90° C., stirred for 30 min and allowed to cool to RT. The solvent was removed in vacuo and the crude product was purified by chromatography (0-10% MeOH/DCM) to afford the N-Boc-protected intermediate as a colourless solid. The N-Boc-protected intermediate was dissolved in DCM (2 mL) and TMSOTf (1 mL) was added. The reaction mixture was stirred at RT for 4 h. The solvent was removed in vacuo and the crude product was purified by chromatography on RP Flash C18 (5-50% MeCN/10 mM Ammonium Bicarbonate) to afford the title compound 198 as a colourless solid (8 mg, 18%). $R^t$ 1.67 min (Method 1b) m/z 498 (M+H)⁺ (ES⁺); ¹H NMR (400 MHZ, DMSO-d₆, 363K) δ 9.77 (s, 1H), 8.48 (d, J=2.3 Hz, 1H), 8.41-8.33 (m, 2H), 8.03 (d, J=2.3 Hz, 1H), 7.52 (d, J=15.5 Hz, 1H), 7.41-7.34 (m, 3H), 7.31-7.24 (m, 2H), 6.79 (dd, J=7.9, 0.8 Hz, 1H), 4.85 (s, 2H), 3.27 (dd, J=11.2, 7.5 Hz, 1H), 3.12 (s, 3H), 2.75-2.67 (m, 2H), 2.40-2.32 (m, 1H), 2.26 (s, 3H), 1.90-1.82 (m, 1H), 1.62 (s, 2H).

The product was analysed by Chiral HPLC (Agilent 1100, CHIRALPAK® IC, column (250×4.6 mm, 5 µm particle size) flow rate 2.0 mL/min-1 eluting with an gradient mixture of 25-95% acetonitrile and 10 Mm Ammonium bicarbonate in water over 40 mins: R$^r$ 33.97 min, 97% e.r. (254 nm). The stereochemistry for compound 198 was arbitrarily attributed.

Example 31. Synthesis of (S,E)-3-(7-amino-8-oxo-6,7,8,9-tetrahydro-5H-pyrido[2,3-b]azepin-3-yl)-N-methyl-N-((2-methylbenzofuran-3-yl)methyl)acrylamide (compound 200)

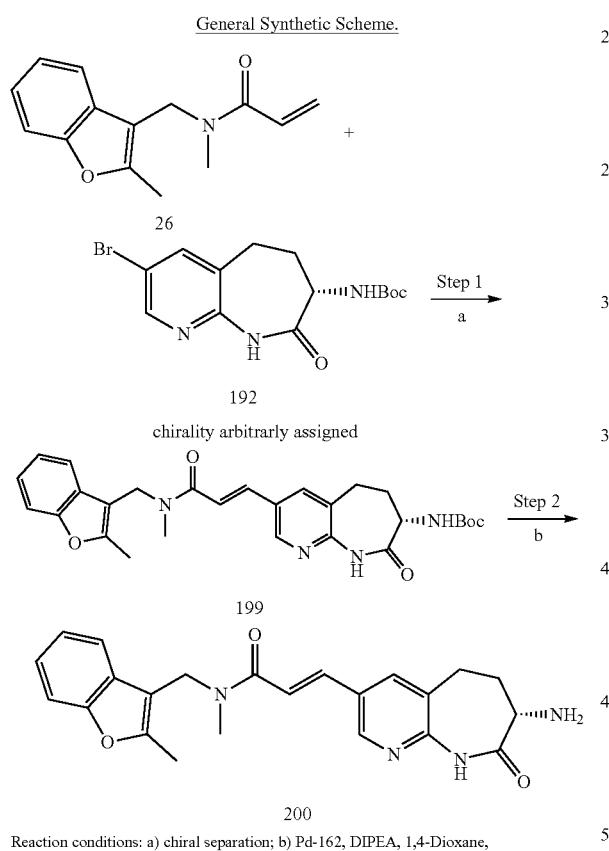

General Synthetic Scheme.

Reaction conditions: a) chiral separation; b) Pd-162, DIPEA, 1,4-Dioxane, 90° C.; b) i. TFA, DCM; ii. sat aq NaHCO3:H2O (1:1, 5 mL)

Step 1. tert Butyl (S,E)-(3-(3-(methyl((2-methylbenzofuran-3-yl)methyl)amino)-3-oxoprop-1-en-1-yl)-8-oxo-6,7,8,9-tetrahydro-5H-pyrido[2,3-b]azepin-7-yl)carbamate (compound 199). A mixture of N-methyl-N-((2-methylbenzofuran-3-yl)methyl)acrylamide 26 (63 mg, 0.28 mmol), tert-butyl(S)-(3-bromo-8-oxo-6,7,8,9-tetrahydro-5H-pyrido[2,3-b]azepin-7-yl)carbamate 192 (0.10 g, 0.28 mmol), DIPEA (0.1 mL, 0.55 mmol) and Pd-162 (11 mg, 0.03 mmol) in 1,4-dioxane (2 mL) was degassed for 10 min with N$_2$. The resulting mixture was stirred at 90° C. for 1 h and then cooled to RT. Water (2 mL) was added and a solid precipitated. The crude product was collected by filtration and purified by column chromatography (0-10% MeOH/DCM) to afford the title compound 199 as an off-white solid (140 mg, quant). R$^r$ 2.16 min (Method 1b) m/z 449 (M+H-tBu)$^+$ (ES$^+$).

Step 2. (S,E)-3-(7-Amino-8-oxo-6,7,8,9-tetrahydro-5H-pyrido[2,3-b]azepin-3-yl)-N-methyl-N-((2-methylbenzofuran-3-yl)methyl)acrylamide (compound 200). To a stirred solution of tert-butyl (S,E)-(3-(3-(methyl((2-methylbenzofuran-3-yl)methyl)amino)-3-oxoprop-1-en-1-yl)-8-oxo-6,7,8,9-tetrahydro-5H-pyrido[2,3-b]azepin-7-yl)carbamate 199 (62 mg, 0.12 mmol) in DCM (5 mL) was added TFA (1 mL) and the reaction mixture was stirred at RT for 5 h. The solvent was removed in vacuo. The resulting oil was taken up in a mixture of sat aq NaHCO$_3$:H$_2$O (1:1, 5 mL) and sonicated. A solid precipitated and was collected by filtration and further washed with H$_2$O (2 mL). The resulting solid was sonicated in MeCN (2 mL) and concentrated in vacuo. The crude product was purified by column chromatography (0-10% MeOH/DCM) to afford the title compound 200 as a colourless solid (15 mg, 29%). R$^r$ 1.67 min (Method 1a) m/z 405 (M+H)$^+$ (ES$^+$). $^1$H NMR (363 K, 400 MHZ, DMSO-d$_6$) δ 9.81 (s, 1H), 8.49 (d, J=2.2 Hz, 1H), 8.04 (d, J=2.3 Hz, 1H), 7.62-7.49 (m, 2H), 7.45 (dd, J=7.6, 1.3 Hz, 1H), 7.34-7.12 (m, 3H), 4.79 (s, 2H), 3.25 (dd, J=11.2, 7.5 Hz, 1H), 3.02 (s, 3H), 2.73-2.66 (m, 2H), 2.50 (s, 3H, under DMSO peak), 2.41-2.29 (m, 1H), 1.91-1.78 (m, 1H), 1.68 (br s, 2H).

The product was analyzed by Chiral HPLC (Agilent 1100, Phenomenex Lux C4, C18, 3 µm, 150×20 mm) under isocratic basic conditions: 60% Water (1% DEA)/40% MeCN for 9 minutes. R$^r$ 6.4 min, 98% e.r. (diode array). The stereochemistry for compound 200 was arbitrarily attributed and later on confirmed by co-crystallization.

Example 32. Synthesis of (E)-3-(6-amino-7-oxo-5,6,7,8-tetrahydro-1,8-naphthyridin-3-yl)-N-methyl-N-((3-methylbenzofuran-2-yl)methyl)acrylamide hydrochloride (Compound 201, Comparator)

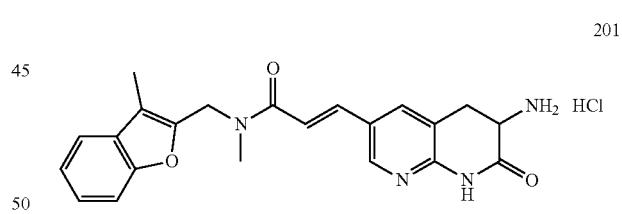

Compound 201 was made according to WO2019177975.

Example 33—Compositions Comprising the Compounds of the Invention

A compound of the present invention is formulated as a nanosuspension or microsuspension in water or oil and stabilized by a polymer such as cellulose, 2-hydroxypropyl ether, or Cellulose ethyl ether in a concentration between 0.01 and 10%, said formulation further comprises a surfactant such as Polyoxyethylene 20 sorbitan monooleate in a concentration of between 0.01 and 10%. This formulation is suitable for administration via the oral route.

A compound of the present invention is formulated as a nanosuspension or microsuspension in water or oil. The formulation further comprises a polymer such as Polyethylene Glycol 4000 or a-Hydro-o-hydroxypoly (oxy-1,2-ethanediyl) in a concentration between 0.01 and 10%, and a surfactant such as Polyoxyethylene 20 sorbitan monooleate in a concentration between 0.01 and 10%. This formulation is suitable for administration via the intramuscular route.

A compound of the present invention is formulated as a solution at a concentration of 10 mg/ml in a 40% Captisol SBE-beta-cyclodextrin aqueous vehicle or 30% Kleptose hydroxypropyl β-cyclodextrin aqueous vehicle. This formulation is suitable for administration via the intravascular route after dilution.

A compound of the present invention is formulated as a solution in concentration of from 0.05 mg/ml to 200 mg/ml in water, isotonicity is obtained with glucose 5%.
wt or less, sodium chloride 0.9% wt or less. This formulation is suitable for administration via the intravascular route.

A compound of the present invention is formulated as a pre concentrate of solvent (ethanol), associated with surfactants (polyoxyl castor oil), this pre concentrate is further diluted with water, and made isotonic with glucose or sodium dichloride. A metastable solution suitable with intravascular administration.

Example 34 Antibacterial Activity

The exemplified compounds were tested for activity on the target enzyme and on the bacteria, relying on the following test procedures:
Inhibition of FabI Proteins:

Inhibition of FabI enzyme from *Acinetobacter baumannii* and *Escherichia coli* was tested by measuring the rate of NADH consumption (Δabsorbance at 340 nm/min) at 30° C. in 96-well plate format using an automated plate reader in the presence or absence of the test compounds. The assay mixture contained 100 mM Tris-HCl, pH 7.25 (*A. baumannii*) or 7.5 (*E. coli*), 100 mM ammonium acetate, 0.02% (*A. baumannii*) or 0.05% (*E. coli*) Pluronic F-68, 25 µM crotonyl ACP, 50 µM NADH, 25 pM (*A. baumannii*) or 50 pM (*E. coli*) recombinant FabI protein, and 7.5% DMSO. Test compounds were added at concentrations ranging from 0.17 to 10,000 nM in a final well volume of 100 µl. This dose-response inhibitory assay was performed using a 10-point, serial dilution series for each test compound. IC50 values for each test compound were assigned from logistical sigmoid curve-fitting of the inhibition dose response curves.
MIC:

The antibacterial activity of FabI inhibitors against select Gram-negative and Gram-positive bacterial species including susceptible and multi-drug resistant *A. baumannii, E. coli, K. pneumoniae* and *S. aureus* was tested using the broth microdilution Minimal Inhibitory Concentration (MIC) assay following CLSI guidelines for insoluble compounds. Test articles were serially diluted 2-fold in 100% dimethyl sulfoxide (DMSO) and then diluted 100-fold into cation adjusted Mueller-Hinton broth (CA-MHB) to achieve a 10-point test concentration range in 1% DMSO. Final compound concentrations were 0.016-8 µg/ml for *S. aureus* or 0.06-32 µg/ml for the Gram-negative species. MIC test plates were then prepared by transferring 100 µl of the final assay medium (test article in CA-MHB, 1% DMSO) into the appropriate wells of a sterile, low binding 96-well polystyrene plate. Direct colony suspension inoculums of the test strains were freshly prepared per CLSI guidelines, and the appropriate test wells were inoculated to achieve a final bacterial cell density of $5 \times 10^5$ CFU/ml. Growth control (no test article) and negative control (no bacterial inoculum) wells were also included. Exposure to light was minimized during all stages of assay preparation. MIC test plates were incubated at 35° C. for 20 hours. Bacterial growth was then determined by measuring the optical density at 600 nm ($OD_{600}$) using a SpectraMax Plus plate-reader spectrophotometer. MIC values were assigned, following assessment of both $OD_{600}$ values and visual inspection of wells, as the lowest test article concentration that resulted in no visible bacterial growth.

Results are shown in table I below.

TABLE 1

| Compound Number | Compound screened | *A. baumannii* FabI IC50 (nM) | *E. coli* FabI IC50 (nM) | *E. coli* AG100 MIC (µg/mL) | *A. baumannii* ATCC BAA1605 MIC (µg/mL) | *K. pneumoniae* A6030827 MIC (µg/mL) | *S. aureus* ATCC 29213 MIC (µg/mL) |
|---|---|---|---|---|---|---|---|
| 62 | (E)-3-((2R,3S)-3-Amino-2-methyl-4-oxo-2,3,4,5-tetrahydro-1H-pyrido[2,3-b][1,4]diazepin-8-yl)-N-((7-amino-2-methylbenzofuran-3-yl)methyl)-N-methylacrylamide | <10 | | ≤4 | ≤4 | | ≤4 |
| 52 | (E)-3-((2R,3S)-3-amino-2-methyl-4-oxo-2,3,4,5-tetrahydro-1H-pyrido[2,3-b][1,4]diazepin-8-yl)-N-methyl-N-((3-methylbenzofuran-2-yl)methyl)acrylamide | <10 | | ≤4 | ≤4 | | ≤4 |
| 42 | E)-3-(3-acetamido-4-oxo-2,3,4,5-tetrahydro-1H-pyrido[2,3-b][1,4]diazepin-8-yl)-N-methyl-N-((3-methylbenzofuran-2-yl)methyl)acrylamide | | | | ≤4 | | ≤4 |

TABLE 1-continued

| Compound Number | Compound screened | *A. baumannii* FabI IC50 (nM) | *E. coli* FabI IC50 (nM) | *E. coli* AG100 MIC (µg/mL) | *A. baumannii* ATCC BAA1605 MIC (µg/mL) | *K. pneumoniae* A6030827 MIC (µg/mL) | *S. aureus* ATCC 29213 MIC (µg/mL) |
|---|---|---|---|---|---|---|---|
| 35 | (S,E)-N-methyl-N-((2-methylbenzofuran-3-yl)methyl)-3-(4-oxo-3-(2-oxa-6-azaspiro[3.3]heptan-6-yl)-2,3,4,5-tetrahydro-1H-pyrido[2,3-b][1,4]diazepin-8-yl)acrylamide | <10 | <10 | | ≤4 | | ≤4 |
| 21 | E)-3-((R)-3-((2S,6R)-2,6-dimethylmorpholino)-4-oxo-2,3,4,5-tetrahydro-1H-pyrido[2,3-b][1,4]diazepin-8-yl)-N-methyl-N-((3-methylbenzofuran-2-yl)methyl)acrylamide | | <10 | | ≤4 | 16 | ≤4 |
| 8 | (S,E)-3-(3-amino-4-oxo-2,3,4,5-tetrahydro-1H-pyrido[2,3-b][1,4]diazepin-8-yl)-N-methyl-N-((3-methylbenzofuran-2-yl)methyl)acrylamide | <10 | <10 | ≤4 | ≤4 | ≤4 | ≤4 |
| 92 | (E)-3-(7-amino-8-oxo-6,7,8,9-tetrahydro-5H-pyrido[2,3-b]azepin-3-yl)-N-((7-chloro-3-methylbenzofuran-2-yl)methyl)-N-methylacrylamide 2,2,2-trifluoroacetate | <10 | | ≤4 | 8 | ≤4 | ≤4 |
| 94 | (E)-3-(7-amino-8-oxo-6,7,8,9-tetrahydro-5H-pyrido[2,3-b]azepin-3-yl)-N-methyl-N-((2-methylbenzofuran-3-yl)methyl)acrylamide hydrochloride | <10 | | 16 | ≤4 | ≤4 | ≤4 |
| 71 | Hydrochloride salt of (S,E)-3-(7-amino-8-oxo-6,7,8,9-tetrahydro-5H-pyrido[2,3-b]azepin-3-yl)-N-methyl-N-((3-methylbenzofuran-2-yl)methyl)acrylamide hydrochloride | <10 | <10 | ≤4 | ≤4 | ≤4 | ≤4 |
| 95 | (E)-3-(7-(dimethylamino)-8-oxo-6,7,8,9-tetrahydro-5H-pyrido[2,3-b]azepin-3-yl)-N-methyl-N-((3-methylbenzofuran-2-yl)methyl)acrylamide | <10 | | ≤4 | ≤4 | ≤4 | ≤4 |
| 96 | (S,E)-3-(7-(dimethylamino)-8-oxo-6,7,8,9-tetrahydro-5H-pyrido[2,3-b]azepin-3-yl)-N-methyl-N-((3-methylbenzofuran-2-yl)methyl)acrylamide | <10 | | 8 | ≤4 | ≤4 | ≤4 |
| 98 | (S,E)-3-(7-amino-8-oxo-6,7,8,9-tetrahydro-5H-pyrido[2,3-b]azepin-3-yl)-N-((7-chloro-3-methylbenzofuran-2-yl)methyl)-N-methylacrylamide hydrochloride | <10 | | ≤4 | ≤4 | ≤4 | ≤4 |
| 107 | (S,E)-3-(7-amino-8-oxo-6,7,8,9-tetrahydro-5H-pyrido[2,3-b]azepin-3-yl)-N-((7-fluoro-3-methylbenzofuran-2-yl)methyl)-N-methylacrylamide hydrochloride | <10 | | ≤4 | ≤4 | ≤4 | ≤4 |
| 119 | (S,E)-3-(7-amino-8-oxo-6,7,8,9-tetrahydro-5H-pyrido[2,3-b]azepin-3-yl)-N-methyl-N-((3-methylbenzo[b]thiophen-2-yl)methyl)acrylamide hydrochloride | <10 | <10 | ≤4 | ≤4 | ≤4 | ≤4 |

TABLE 1-continued

| Compound Number | Compound screened | A. baumannii FabI IC50 (nM) | E. coli FabI IC50 (nM) | E. coli AG100 MIC (µg/mL) | A. baumannii ATCC BAA1605 MIC (µg/mL) | K. pneumoniae A6030827 MIC (µg/mL) | S. aureus ATCC 29213 MIC (µg/mL) |
|---|---|---|---|---|---|---|---|
| 130 | (S,E)-3-(7-amino-8-oxo-6,7,8,9-tetrahydro-5H-pyrido[2,3-b]azepin-3-yl)-N-((4-fluoro-3-methylbenzofuran-2-yl)methyl)-N-methylacrylamide hydrochloride | <10 | | ≤4 | ≤4 | ≤4 | ≤4 |
| 140 | (S,E)-3-(7-amino-8-oxo-6,7,8,9-tetrahydro-5H-pyrido[2,3-b]azepin-3-yl)-N-((7-fluoro-3-methylbenzo[b]thiophen-2-yl)methyl)-N-methylacrylamide hydrochloride | <10 | | ≤4 | ≤4 | ≤4 | ≤4 |
| 151 | (S,E)-3-(7-amino-8-oxo-6,7,8,9-tetrahydro-5H-pyrido[2,3-b]azepin-3-yl)-N-methyl-N-((3-methyl-5-(pyridin-3-yloxy)benzofuran-2-yl)methyl)acrylamide hydrochloride | <10 | | ≤4 | | ≤4 | ≤4 |
| 86 | (E)-3-((S)-7-amino-8-oxo-6,7,8,9-tetrahydro-5H-pyrido[2,3-b]azepin-3-yl)-N-((4-(((1r,4r)-4-aminocyclohexyl)oxy)-3-methylbenzofuran-2-yl)methyl)-N-methylacrylamide bis(2,2,2-trifluoroacetate) | <10 | | ≤4 | ≤4 | ≤4 | ≤4 |
| 167 | (S,E)-3-(7-amino-8-oxo-6,7,8,9-tetrahydro-5H-pyrido[2,3-b]azepin-3-yl)-N-methyl-N-((3-methyl-4-((pyridin-3-ylamino)methyl)benzofuran-2-yl)methyl)acrylamide dihydrochloride | <10 | | ≤4 | ≤4 | ≤4 | ≤4 |
| 113 | (S,E)-N-((7-fluoro-3-methylbenzofuran-2-yl)methyl)-N-methyl-3-(7-morpholino-8-oxo-6,7,8,9-tetrahydro-5H-pyrido[2,3-b]azepin-3-yl)acrylamide | <10 | | 8 | ≤4 | ≤4 | ≤4 |
| 173 | (E)-N-methyl-N-((2-methylbenzofuran-3-yl)methyl)-3-(7-morpholino-8-oxo-6,7,8,9-tetrahydro-5H-pyrido[2,3-b]azepin-3-yl)acrylamide | <10 | <10 | | ≤4 | | ≤4 |
| 176 | (E)-N-methyl-N-((3-methylbenzofuran-2-yl)methyl)-3-(8-oxo-7-(7-oxa-2-azaspiro[3.5]nonan-2-yl)-6,7,8,9-tetrahydro-5H-pyrido[2,3-b]azepin-3-yl)acrylamide | <10 | | ≤4 | ≤4 | ≤4 | ≤4 |
| 179 | (E)-3-(7-(1,1-Dioxidothiomorpholino)-8-oxo-6,7,8,9-tetrahydro-5H-pyrido[2,3-b]azepin-3-yl)-N-methyl-N-((3-methylbenzofuran-2-yl)methyl)acrylamide | <10 | | 8 | ≤4 | 8 | ≤4 |
| 182 | (E)-N-Methyl-N-((3-methylbenzofuran-2-yl)methyl)-3-(8-oxo-7-(pyrrolidin-1-yl)-6,7,8,9-tetrahydro-5H-pyrido[2,3-b]azepin-3-yl)acrylamide | <10 | <10 | ≤4 | ≤4 | ≤4 | ≤4 |
| 187 | (E)-N-Methyl-N-((3-methylbenzofuran-2-yl)methyl)-3-(7-(4-(methylsulfonyl)piperazin-1- | <10 | | 16 | ≤4 | | ≤4 |

TABLE 1-continued

| Compound Number | Compound screened | A. baumannii FabI IC50 (nM) | E. coli FabI IC50 (nM) | E. coli AG100 MIC (μg/mL) | A. baumannii ATCC BAA1605 MIC (μg/mL) | K. pneumoniae A6030827 MIC (μg/mL) | S. aureus ATCC 29213 MIC (μg/mL) |
|---|---|---|---|---|---|---|---|
| | yl)-8-oxo-6,7,8,9-tetrahydro-5H-pyrido[2,3-b]azepin-3-yl)acrylamide | | | | | | |
| 190 | S,E)-N-methyl-N-((3-methylbenzofuran-2-yl)methyl)-3-(8-oxo-7-(2-oxa-6-azaspiro[3.3]heptan-6-yl)-6,7,8,9-tetrahydro-5H-pyrido[2,3-b]azepin-3-yl)acrylamide | <10 | <10 | ≤4 | ≤4 | ≤4 | ≤4 |
| 171 | ((S,E)-3-(7-(3-hydroxyazetidin-1-yl)-8-oxo-6,7,8,9-tetrahydro-5H-pyrido[2,3-b]azepin-3-yl)-N-methyl-N-((3-methylbenzofuran-2-yl)methyl)acrylamide | <10 | | ≤4 | ≤4 | ≤4 | ≤4 |
| 191 | (E)-N-((7-Amino-2-methylbenzofuran-3-yl)methyl)-N-methyl-3-(8-oxo-7-(pyrrolidin-1-yl)-6,7,8,9-tetrahydro-5H-pyrido[2,3-b]azepin-3-yl)acrylamide | | <10 | 8 | ≤4 | | ≤4 |
| 193 | (S,E)-N-((7-amino-2-methylbenzofuran-3-yl)methyl)-3-(7-amino-8-oxo-6,7,8,9-tetrahydro-5H-pyrido[2,3-b]azepin-3-yl)-N-methylacrylamide | | <10 | ≤4 | ≤4 | | ≤4 |
| 198 | (E)-3-((2R,3S)-3-hydroxy-2-methyl-4-oxo-2,3,4,5-tetrahydro-1H-pyrido[2,3-b][1,4]diazepin-8-yl)-N-methyl-N-((3-methyl-4-(pyridin-3-yloxy)benzofuran-2-yl)methyl)acrylamide | | <10 | ≤4 | ≤4 | | ≤4 |
| 200 | (S,E)-3-(7-amino-8-oxo-6,7,8,9-tetrahydro-5H-pyrido[2,3-b]azepin-3-yl)-N-methyl-N-((2-methylbenzofuran-3-yl)methyl)acrylamide | | <10 | ≤4 | ≤4 | | ≤4 |
| 201 (comparator) | (E)-3-(6-amino-7-oxo-5,6,7,8-tetrahydro-1,8-naphthyridin-3-yl)-N-methyl-N-((3-methylbenzofuran-2-yl)methyl)acrylamide hydrochloride | 19 | | 8 | 16 | | |

Example 35 In Vivo Activity

The exemplified compounds were tested for efficacy in murine infection models, relying on the following test procedures:
Mouse Thigh Infection Model
Protocol (Thigh)

Groups of 5 female specific-pathogen-free BALB/c mice weighing 18±2 g were used. In the 24 hr model (bacterial counts determined 24 hr after treatment start), mice were rendered neutropenic with cyclophosphamide intraperitoneal (IP) administration conducted at Days −4 (150 mg/kg), and day −1 (100 mg/kg). In the 72 hr model (bacterial counts determined 72 hr after treatment start), animals were rendered persistently neutropenic for the duration of the infection period with cyclophosphamide intraperitoneal (IP) administration conducted at Days −4 (150 mg/kg), −1 (100 mg/kg) and +1 (100 mg/kg). Persistent neutropenia is required to prevent pathogen clearance from thigh tissue in the 74 hr model. Nutritional supplementation (diet gel) plus saline SC injections were provided daily to help animals tolerate the cyclophosphamide treatment.

On day 0, animals were inoculated intramuscularly (0.1 ml/thigh) with a $1.67 \times 10^4$ inoculum count of Acinetobacter baumannii ATCC 17978. Vehicle control (40% Captisol), positive control (tigecycline) or test substances were then administered 2 hr post infection by the subcutaneous (SC) route of administration. Each dosing group consisted of 5 female mice. The MICs of the compounds against the test strain were 8 μg/ml, 2 μg/ml and 0.5 g/ml for compound 201, compound 71 and compound 200, respectively. The dose levels and frequencies are indicated in Table 1 below (Results). At 26 or 74 hours after inoculation (24 or 72 hr after treatment initiation), animals were euthanized with $CO_2$ asphyxiation and the thigh tissue harvested from each of the test animals. The tissues were homogenized in 3 mL of PBS, pH 7.4 with a homogenizer. Homogenates, 0.1 mL, were used for serial 10-fold dilutions and plated onto NB agar for colony counts. Efficacy is calculated as the change in log CFU/g thigh vs. the time 0 (treatment initiation) control.

All aspects of this work including housing, experimentation, and animal disposal were performed in accordance with the "Guide for the Care and Use of Laboratory Animals:

Eighth Edition" (The National Academies Press, Washington, D C, 2011) in an AAALAC-accredited laboratory animal facility.

Results (Thigh)

TABLE 1

Mean logCFU and change logCFU per g thigh in the mouse thigh model for the indicated dose regimens and treatment durations following SC administration of the test articles:

| Treatment | Dose (mg/kg) | Dose schedule | Total daily dose (mg/kg) | Mean Log CFU/g thigh | | | Mean Change log CFU/g thigh | |
|---|---|---|---|---|---|---|---|---|
| | | | | Time 0 | 24 hr | 72 hr | 24 hr | 72 hr |
| Time 0 | NA | NA | NA | 4.85 | | | | |
| Vehicle | 0 | q6h | 0 | | 6.70 | 6.94 | 1.65 | 2.10 |
| Tigecycline | 3 | q12h | 6 | | 2.37 | 1.36 | -2.48 | -3.48 |
| Compound 201 | 25 | q6h | 100 | | | 7.09 | | 2.24 |
| | 50 | q6h | 200 | | 7.11 | 6.70 | 2.26 | 1.86 |
| Compound 71 | 25 | q6h | 100 | | | 7.09 | | 2.25 |
| | 50 | q6h | 200 | | 5.45 | 5.95 | 0.60 | 1.10 |
| Compound 200 | 25 | q6h | 100 | | | 2.58 | | -2.27 |
| | 50 | q6h | 200 | | 2.31 | 2.71 | -2.53 | -2.14 |

Summary (Thigh)

Vehicle controls show robust growth and sustained infection throughout the treatment period, and the positive control (tigecycline) showed the expected high efficacy, with better efficacy at 72 hr than at 24 hr. Compound 200 showed excellent efficacy (2.1-2.4 log kill) following both 24 hr and 72 hr treatment. Compound 71 showed very slight efficacy, better than the vehicle controls, but not reaching stasis (0 change log CFU/g thigh), whereas compound 201 showed no efficacy, similar to the vehicle controls.

Mouse Lung Infection Model

Protocol (Lung)

Groups of 5 female specific-pathogen-free BALB/c mice weighing 18±2 g were used. In the 24 hr model (bacterial counts determined 24 hr after treatment start), mice were rendered neutropenic with cyclophosphamide intraperitoneal (IP) administration conducted at Days -4 (150 mg/kg), and day -1 (100 mg/kg). In the 72 hr model (bacterial counts determined 72 hr after treatment start), animals were rendered persistently neutropenic for the duration of the infection period with cyclophosphamide intraperitoneal (IP) administration conducted at Days -4 (150 mg/kg), -1 (100 mg/kg) and +1 (100 mg/kg). Persistent neutropenia is required to prevent pathogen clearance from lung tissue in the 74 hr model. Nutritional supplementation (diet gel) plus saline SC injections were provided daily to help animals tolerate the cyclophosphamide treatment.

On day 0, animals were anesthetized with etomidate-lipuro emulsion (20 mg/10 mL; 20 mg/kg dose, IV) and then inoculated intranasally with an *A. baumannii* ATCC 17978 suspension, $1.36 \times 10^5$ CFU/mouse, 0.02 mL/mouse. Vehicle control (40% Captisol), positive control (tigecycline) or test substances were then administered 2 hr post infection by the subcutaneous (SC) route of administration. Each dosing group consisted of 5 female mice. The MICs of the compounds against the test strain were 8 µg/ml and 0.5 µg/ml for compound 201 and compound 200, respectively. The dose levels and frequencies are indicated in Table 2 below (Results). At 26 or 74 hours after inoculation (24 or 72 hr after treatment initiation), animals were euthanized with $CO_2$ asphyxiation and the lung tissue harvested from each of the test animals. The tissues were homogenized in 1 ml of PBS, pH 7.4 with a homogenizer. Homogenates, 0.1 mL, were used for serial 10-fold dilutions and plated onto MacConkey II agar for colony counts. Efficacy is calculated as the change in log CFU/g thigh vs. the time 0 (treatment initiation) control.

All aspects of this work including housing, experimentation, and animal disposal were performed in accordance with the "Guide for the Care and Use of Laboratory Animals: Eighth Edition" (The National Academies Press, Washington, D C, 2011) in an AAALAC-accredited laboratory animal facility.

Results (Lung)

TABLE 2

Mean log CFU and mean change log CFU per g lung in the mouse lung model for the indicated dose regimens and treatment durations following SC administration of the test articles:

| Treatment | Dose (mg/kg) | Dose schedule | Total daily dose (mg/kg) | Mean Log CFU/g lung | | | Mean change log CFU/g lung | |
|---|---|---|---|---|---|---|---|---|
| | | | | Time 0 | 24 hr | 72 hr | 24 hr | 72 hr |
| Time 0 | NA | NA | NA | 6.30 | | | | |
| Vehicle | 0 | q6h | 0 | | 7.69 | 7.61 | 1.39 | 1.31 |
| Tigecycline | 3 | q12h | 6 | | 2.87 | 1.57 | -3.44 | -4.74 |
| Compound 201 | 25 | q6h | 100 | | 7.32 | 6.51 | 1.02 | 0.21 |
| | 50 | q6h | 200 | | 6.56 | 5.95 | 0.26 | -0.35 |
| Compound 200 | 25 | q6h | 100 | | 3.86 | 4.09 | -2.44 | -2.21 |
| | 50 | q6h | 200 | | 2.80 | 2.91 | -3.50 | -3.39 |

Summary (Lung)

Vehicle controls show robust growth and sustained infection throughout the treatment period, and the positive control (tigecycline) showed the expected high efficacy, with better efficacy at 72 hr than at 24 hr. Compound 200 showed excellent efficacy (2.5-3.5 log kill) following both 24 hr and 72 hr treatment. Compound 201 showed very slight efficacy, better than the vehicle controls, but only approaching, or at, stasis (0 change log CFU/g lung).

The invention claimed is:

1. A compound of formula (I)

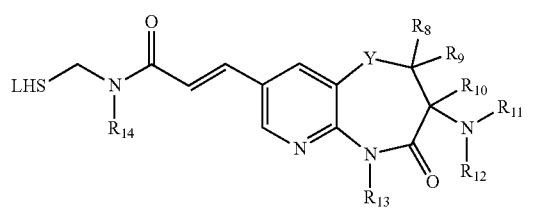

or a pharmaceutically acceptable prodrug, salt and/or solvate thereof, wherein

LHS is selected from the group consisting of LHSa and LHSb

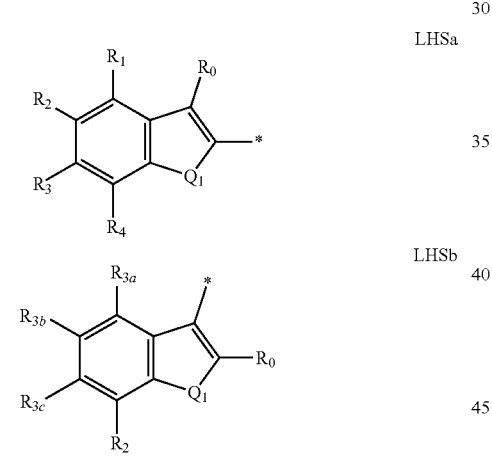

wherein, the asterisk (*) marks the point of attachment;

Y is selected from the group consisting of $CH_2$, NH, and $NR_d$;

$Q_1$ is selected from the group consisting of O, S, NH and N—$C_{1-4}$-alkyl;

$R_0$ is selected from the group consisting of $CH_3$ and Cl, or alternatively $R_0$ together with $R_{14}$ form a heterocycle comprising the N to which $R_{14}$ is attached and having 5 to 8 ring members, wherein preferably the only heteroatom in said ring is the N to which $R_{14}$ is attached;

$R_1$ is selected from the group consisting of H, F, Cl, Br, I, $C_{1-4}$-alkyl, $OR_5$, CN, $NR_5R_6$, CO—$NR_5R_6$, $C_{1-4}$-alkylene-$NR_5R_6$, $C_{1-4}$-alkylene-$OR_5$, NH—CO—$C_{1-4}$-alkylene-$R_5$, NH—CO—$NR_5R_6$, NH—$COOR_5$, $NHSO_2$—$C_{1-4}$-alkylene-$R_5$, $C_{3-6}$-cycloalkyl, phenyl, and a heterocyclic group having 5 or 6 ring members and 1, 2 or 3 heteroatoms independently selected from N, O and S, wherein said $C_{1-4}$-alkyl, cycloalkyl, phenyl, or heterocyclic group may optionally be substituted with 1-3 $R_7$ groups;

$R_2$ is selected from the group consisting of H, F, Cl, Br, I, $C_{1-4}$-alkyl, $OR_5$, $C_{1-4}$-alkylene-$OR_5$, CN, $NR_5R_6$, CO—$NR_5R_6$, $C_{1-4}$-alkylene-$NR_5R_6$, $C_{3-6}$-cycloalkyl, phenyl, and a heterocyclic group having 5 or 6 ring members and 1, 2 or 3 heteroatoms independently selected from N, O and S, wherein said $C_{1-4}$-alkyl, cycloalkyl, phenyl, or heterocyclic group may optionally be substituted with 1-3 $R_7$ groups;

$R_3$ is selected from the group consisting of H, F, Cl, Br, I, CN, $C_{1-4}$-alkyl, O—$C_{1-4}$ alkyl, OH, $NH_2$, $NHC_{1-4}$-alkyl, and S—$C_{1-4}$-alkyl;

$R_{3a}$, $R_{3b}$ and $R_{3c}$ are independently selected from the group consisting of H, F, Cl, Br, I, CN, $C_{1-4}$-alkyl, O—$C_{1-4}$-alkyl, OH, $NH_2$, $NHC_{1-4}$-alkyl, and S—$C_{1-4}$-alkyl;

$R_4$ is selected from the group consisting of H, F, Cl, Br, I, $C_{1-4}$-alkyl, $OR_5$, CN, $COR_{10}$, phenyl, OH, $NH_2$, S—$C_{1-4}$-alkyl, $NR_5R_6$, and a heterocyclic group having 5 or 6 ring members and 1, 2 or 3 heteroatoms independently selected from N, O and S;

$R_5$ and $R_6$ are independently selected from is selected from the group consisting of H, $COR_{10}$, $C_{1-4}$-alkyl, $C_{3-6}$-cycloalkyl, $SO_2R_7$, phenyl, and a heterocyclic group having 5 or 6 ring members and 1, 2 or 3 heteroatoms independently selected from N, O and S, wherein said cycloalkyl, phenyl, or heterocyclic group may optionally be substituted with 1-3 $R_7$ groups;

$R_7$ is selected from the group consisting of H, F, I, Br, Cl, O, $C_{1-4}$-alkyl, $CONH_2$, OH, $NH_2$, O—$C_{1-4}$-alkyl, NH—$C_{1-4}$-alkyl, $N(C_{1-4}$-alkyl$)_2$, $C_{1-4}$-alkylene-OH, and $C_{1-4}$-alkylene-$NH_2$, $NO_2$, CN, $C_{2-4}$-alkenyl, $C_{2-4}$-alkynyl, $C_{2-4}$-alkynylene-OH, $C_{2-4}$-alkynylene-$NH_2$, $SO_2CH_3$, and O—$C_{1-4}$-alkylene-OH;

$R_8$ and $R_9$ are independently selected from the group consisting of H, $C_{1-4}$-alkyl, $C_{1-4}$-alkyl-F, CN, OH, $NH_2$, O—$C_{1-4}$-alkyl, NH—$C_{1-4}$-alkyl, $N(C_{1-4}$-alkyl$)_2$, $C_{1-4}$-alkylene-OH, and $C_{1-4}$-alkylene-$NH_2$;

$R_{10}$ is selected from the group consisting of H, $C_{1-4}$-alkyl, $C_{1-4}$-alkyl-F, $C_{1-4}$-alkylene-OH, and $C_{1-4}$-alkylene-$NH_2$;

$R_{11}$ and $R_{12}$ are independently selected from the group consisting of H, $R_d$, $C_{1-4}$-alkyl, CO—$C_{1-4}$-alkyl, $SO_2(C_{1-4}$-alkyl$)_1$, $C_{1-4}$-alkyl-F, $C_{1-4}$-alkylene-OH, and $C_{1-4}$-alkylene-$NH_2$, or alternatively, $R_{11}$ and $R_{12}$ together with the N to which they are attached form a heterocyclic group having 4 to 9 ring members and 1, 2 or 3 heteroatoms independently selected from N, O and S or form a heterocyclic spiro group having 7 to 11 ring members and 1, 2 or 3 heteroatoms independently selected from N, O and S, wherein said heterocyclic or heterocyclic spiro group may be substituted with 1-3 $R_7$ groups;

$R_{13}$ is selected from the group consisting of H or $R_d$;

$R_{14}$ is $CH_3$, or alternatively $R_{14}$ together with $R_0$ of $LHS_a$ or $LHS_b$ form a heterocycle comprising the N to which $R_{14}$ is attached and having 5 to 8 ring members, wherein preferably the only heteroatom in said ring is the N to which $R_{14}$ is attached;

and, $R_d$ is selected from the group consisting of —$PO_3R_{e2}$, —$CH_2$—$OPO_3R_{e2}$, wherein $R_e$ is selected from the group consisting of H and a cation suitable for forming a pharmaceutically acceptable salt.

2. A compound, or a pharmaceutically acceptable prodrug, salt and/or solvate thereof, according to claim 1 wherein LHS is LHSa.

3. A compound, or a pharmaceutically acceptable prodrug, salt and/or solvate thereof, according to claim 1 wherein LHS is LHSb.

4. A compound, or a pharmaceutically acceptable prodrug, salt and/or solvate thereof, according to claim 1 wherein $Q_1$ is selected from the group consisting of O or S.

5. A compound, or a pharmaceutically acceptable prodrug, salt and/or solvate thereof, according to claim 1 wherein $R_0$ is $CH_3$ and $R_{14}$ is $CH_3$.

6. A compound, or a pharmaceutically acceptable prodrug, salt and/or solvate thereof, according to claim 1 wherein $R_0$ together with $R_{14}$ form a heterocycle comprising the N to which $R_{14}$ is attached and having 5 to 8 ring members.

7. A compound, or a pharmaceutically acceptable prodrug, salt and/or solvate thereof, according to claim 1 wherein $R^1$ is selected from the group consisting of H, F, Cl, Br, $C_{1-4}$-alkyl, $OR_5$, CN, $NR_5R_6$, $C_{1-4}$-alkylene-$NR_5R_6$, $C_{1-4}$-alkylene-$OR_5$, NH—CO—$C_{1-4}$-alkylene-$R_5$, NH—CO—$NR_5R_6$, NH—$COOR_5$, $NHSO_2$—$C_{1-4}$-alkylene-$R_5$, $C_{3-6}$-cycloalkyl, phenyl, and a heterocyclic group having 5 or 6 ring members and 1, 2 or 3 heteroatoms independently selected from N, O and S, wherein said $C_{1-4}$-alkyl, cycloalkyl, phenyl, or heterocyclic group may optionally be substituted with 1-3 $R_7$ groups.

8. A compound, or a pharmaceutically acceptable prodrug, salt and/or solvate thereof, according to claim 1 wherein $R_2$ is selected from the group consisting of H, F, Cl, Br, $C_{1-4}$-alkyl, $OR_5$, $C_{1-4}$-alkylene-$OR_5$, CN, $NR_5R_6$, $C_{1-4}$-alkylene-$NR_5R_6$, $C_{3-6}$-cycloalkyl, wherein said $C_{1-4}$-alkyl and cycloalkyl may optionally be substituted with 1-3 $R_7$ groups.

9. A compound, or a pharmaceutically acceptable prodrug, salt and/or solvate thereof, according to claim 1 wherein $R^3$ is selected from the group consisting of H, F, Cl, Br, OH, $NH_2$, and $NHC_{1-4}$-alkyl.

10. A compound, or a pharmaceutically acceptable prodrug, salt and/or solvate thereof, according to claim 1 wherein $R_{3a}$, $R_{3b}$ and $R_{3c}$ are independently selected from the group consisting of H, F, Cl, Br, OH, $NH_2$, and $NHC_{1-4}$-alkyl.

11. A compound, or a pharmaceutically acceptable prodrug, salt and/or solvate thereof, according to claim 1 wherein $R^4$ is selected from the group consisting of H, F, Cl, Br, $OR_5$, $COR_{10}$, OH, $NH_2$, and $NR_5R_6$.

12. A compound, or a pharmaceutically acceptable prodrug, salt and/or solvate thereof, according to claim 1 wherein $R_7$ is selected from the group consisting of H, F, $C_{1-4}$-alkyl, $C_{2-4}$-alkenyl, $C_{2-4}$-alkynyl, OH, $NH_2$, O—$C_{1-4}$-alkyl, NH—$C_{1-4}$-alkyl, N($C_{1-4}$-alkyl)$_2$, $C_{1-4}$-alkylene-OH, $C_{1-4}$-alkylene-$NH_2$, and O—$C_{1-4}$-alkylene-OH, $C_{2-4}$-alkynylene-OH, and $C_{2-4}$-alkynylene-$NH_2$.

13. A compound, or a pharmaceutically acceptable prodrug, salt and/or solvate thereof, according to claim 1 wherein Rs and $R_9$ are independently selected from the group consisting of H, $C_{1-4}$-alkyl, $C_{1-4}$-alkyl-F, O—$C_{1-4}$-alkyl.

14. A compound, or a pharmaceutically acceptable prodrug, salt and/or solvate thereof, according to claim 1 wherein Rio is selected from the group consisting of H, $C_{1-4}$-alkyl, $C_{1-4}$-alkyl-F.

15. A compound, or a pharmaceutically acceptable prodrug, salt and/or solvate thereof, according to claim 1 wherein $R_{11}$ and $R_{12}$ are independently selected from the group consisting of H, $R_d$, $C_{1-4}$-alkyl, $C_{1-4}$-alkyl-F, $C_{1-4}$-alkylene-OH, and $C_{1-4}$-alkylene-$NH_2$, or alternatively, $R_{11}$ and $R_{12}$ together with the N to which they are attached form a heterocyclic group having 4 to 9 ring members and 1, 2 or 3 heteroatoms independently selected from N, O and S or form a heterocyclic spiro group having 7 to 11 ring members and 1, 2 or 3 heteroatoms independently selected from N, O and S, wherein said heterocyclic or heterocyclic spiro group may be substituted with 1-3 $R_7$ groups.

16. A compound, or a pharmaceutically acceptable prodrug, salt and/or solvate thereof, according to claim 1 wherein,
$R_1$ is selected from the group consisting of H, F, Cl, Br, $C_{1-4}$-alkyl, $OR_5$, $NR_5R_6$, $C_{1-4}$-alkylene-$NR_5R_6$, $C_{1-4}$-alkylene-$OR_5$, NH—CO—$C_{1-4}$-alkylene-$R_5$, NH—CO—$NR_5R_6$, NH—$COOR_5$, $NHSO_2$—$C_{1-4}$-alkylene-$R_5$, $C_{3-6}$-cycloalkyl, wherein said $C_{1-4}$-alkyl and cycloalkyl may optionally be substituted with 1-3 $R_7$ groups;
$R_2$ is selected from the group consisting of H, F, Cl, Br, $C_{1-4}$-alkyl, $OR_5$, $C_{1-4}$-alkylene-$OR_5$, CN, $NR_5R_6$, $C_{1-4}$-alkylene-$NR_5R_6$, $C_{3-6}$-cycloalkyl, wherein said $C_{1-4}$-alkyl, cycloalkyl, phenyl, or heterocyclic group may optionally be substituted with 1-3 $R_7$ groups;
$R_3$ is selected from the group consisting of H, F, Cl, Br, OH, $NH_2$, and $NHC_{1-4}$-alkyl;
$R_{3a}$, $R_{3b}$ and $R_{3c}$ are independently selected from the group consisting of H, F, Cl, Br, OH, $NH_2$, and $NHC_{1-4}$-alkyl;
$R_4$ is selected from the group consisting of H, F, Cl, Br, $OR_5$, $COR_{10}$, OH, $NH_2$, and $NR_5R_6$;
$R_7$ is selected from the group consisting of H, F, $C_{1-4}$-alkyl, $C_{2-4}$-alkenyl, $C_{2-4}$-alkynyl, OH, $NH_2$, O—$C_{1-4}$-alkyl, NH—$C_{1-4}$-alkyl, N($C_{1-4}$-alkyl)$_2$, $C_{1-4}$-alkylene-OH, and $C_{1-4}$-alkylene-$NH_2$, O—$C_{1-4}$-alkylene-OH, $C_{2-4}$-alkynylene-OH, and $C_{2-4}$-alkynylene-$NH_2$;
$R_8$ and $R_9$ are independently selected from the group consisting of H, $C_{1-4}$-alkyl, $C_{1-4}$-alkyl-F, and O—$C_{1-4}$-alkyl;
$R_{10}$ is selected from the group consisting of H, $C_{1-4}$-alkyl, and $C_{1-4}$-alkyl-F;
and,
$R_{11}$ and $R_{12}$ are independently selected from the group consisting of H, $R_d$, $C_{1-4}$-alkyl, $C_{1-4}$-alkyl-F, $C_{1-4}$-alkylene-OH, and $C_{1-4}$-alkylene-$NH_2$, or alternatively, $R_{11}$ and R 12 together with the N to which they are attached form a heterocyclic group having 4 to 9 ring members and 1, 2 or 3 heteroatoms independently selected from N, O and S or form a heterocyclic spiro group having 7 to 11 ring members and 1, 2 or 3 heteroatoms independently selected from N, O and S, wherein said heterocyclic or heterocyclic spiro group may be substituted with 1-3 $R_7$ groups.

17. A compound, or a pharmaceutically acceptable prodrug, salt and/or solvate thereof, according to claim 1 wherein Y is $CH_2$.

18. A compound, or a pharmaceutically acceptable prodrug, salt and/or solvate thereof, according to claim 1 wherein Y is NH.

19. A compound, or a pharmaceutically acceptable prodrug, salt and/or solvate thereof, according to claim 1 selected from the group consisting of:
(E)-3-((2R,3S)-3-Amino-2-methyl-4-oxo-2,3,4,5-tetrahydro-1H-pyrido[2,3-b][1,4]diazepin-8-yl)-N-((7-amino-2-methylbenzofuran-3-yl)methyl)-N-methylacrylamide,
(E)-3-((2R,3S)-3-amino-2-methyl-4-oxo-2,3,4,5-tetrahydro-1H-pyrido[2,3-b][1,4]diazepin-8-yl)-N-methyl-N-((3-methylbenzofuran-2-yl)methyl)acrylamide, (E)-3-(3-acetamido-4-oxo-2,3,4,5-tetrahydro-1H-pyrido[2,3-b][1,4]diazepin-8-yl)-N-methyl-N-((3-methylbenzofuran-2-yl)methyl)acrylamide, (S,E)-N-methyl-N-((2-methylbenzofuran-3-yl)methyl)-3-(4-oxo-3-(2-oxa-6-azaspiro[3.3]heptan-6-yl)-2,3,4,5-tetrahydro-1H-pyrido[2,3-b][1,4]diazepin-8-yl)acrylamide, (E)-3-((R)-3-((2S,6R)-2,6-dimethylmorpholino)-4-oxo-2,3,4,5-tetrahydro-1H-pyrido[2,3-b][1,4]diazepin-8-yl)-N-methyl-N-((3-methylbenzofuran-2-yl)methyl)acrylamide, and (S,E)-3-(3-amino-4-oxo-2,3,4,5-tetrahydro-1H-pyrido[2,3-b][1,4]diazepin-8-yl)-N-methyl-N-((3-methylbenzofuran-2-1) methyl)acrylamide, (E)-3-(7-amino-8-oxo-6,7,8,9-tetrahydro-5H-pyrido[2,3-b]azepin-3-yl)-N-((7-chloro-3-methylbenzofuran-2-yl)methyl)-N-methylacrylamide, (E)-3-(7-amino-8-oxo-6,7,8,9-tetrahydro-5H-pyrido[2,3-b]azepin-3-yl)-N-methyl-N-((2-methylbenzofuran-3-yl)methyl)acrylamide, (S,E)-3-(7-amino-8-oxo-6,7,8,9-tetrahydro-5H-pyrido[2,3-b]azepin-3-yl)-N-methyl-N-((3-methylbenzofuran-2-yl)methyl)acrylamide, (E)-3-(7-(dimethylamino)-8-oxo-6,7,8,9-tetrahydro-5H-pyrido[2,3-b]azepin-3-yl)-N-methyl-N-((3-methylbenzofuran-2-yl)methyl)acrylamide, (S,E)-3-(7-(dimethylamino)-8-oxo-6,7,8,9-tetrahydro-5H-pyrido[2,3-b]azepin-3-yl)-N-methyl-N-((3-methylbenzofuran-2-yl)methyl)acrylamide, (S,E)-3-(7-amino-8-oxo-6,7,8,9-tetrahydro-5H-pyrido[2,3-b]azepin-3-yl)-N-((7-chloro-3-methylbenzofuran-2-yl)methyl)-N-methylacrylamide, (S,E)-3-(7-amino-8-oxo-6,7,8,9-tetrahydro-5H-pyrido[2,3-b]azepin-3-yl)-N-((7-fluoro-3-methylbenzofuran-2-yl)methyl)-N-methylacrylamide, (S,E)-3-(7-amino-8-oxo-6,7,8,9-tetrahydro-5H-pyrido[2,3-b]azepin-3-yl)-N-methyl-N-((3-methylbenzo[b]thiophen-2-yl)methyl)acrylamide, (S,E)-3-(7-amino-8-oxo-6,7,8,9-tetrahydro-5H-pyrido[2,3-b]azepin-3-yl)-N-((4-fluoro-3-methylbenzofuran-2-yl)methyl)-N-methylacrylamide, (S,E)-3-(7-amino-8-oxo-6,7,8,9-tetrahydro-5H-pyrido[2,3-b]azepin-3-yl)-N-((7-fluoro-3-methylbenzo[b]thiophen-2-yl)methyl)-N-methylacrylamide, (S,E)-3-(7-amino-8-oxo-6,7,8,9-tetrahydro-5H-pyrido[2,3-b]azepin-3-yl)-N-methyl-N-((3-methyl-5-(pyridin-3-yloxy)benzofuran-2-yl)methyl)acrylamide, (E)-3-((S)-7-amino-8-oxo-6,7,8,9-tetrahydro-5H-pyrido[2,3-b]azepin-3-yl)-N-((4-(((1r,4r)-4-aminocyclohexyl)oxy)-3-methylbenzofuran-2-yl)methyl)-N-methylacrylamide, (S,E)-3-(7-amino-8-oxo-6,7,8,9-tetrahydro-5H-pyrido[2,3-b]azepin-3-yl)-N-methyl-N-((3-methyl-4-((pyridin-3-ylamino) methyl)benzofuran-2-yl)methyl)acrylamide, (S,E)-N-((7-fluoro-3-methylbenzofuran-2-yl)methyl)-N-methyl-3-(7-morpholino-8-oxo-6,7,8,9-tetrahydro-5H-pyrido[2,3-b]azepin-3-yl)acrylamide, (E)-N-methyl-N-((2-methylbenzofuran-3-yl)methyl)-3-(7-morpholino-8-oxo-6,7,8,9-tetrahydro-5H-pyrido[2,3-b]azepin-3-yl)acrylamide, (E)-N-methyl-N-((3-methylbenzofuran-2-yl)methyl)-3-(8-oxo-7-(7-oxa-2-azaspiro[3.5]nonan-2-yl)-6,7,8,9-tetrahydro-5H-pyrido[2,3-b]azepin-3-yl)acrylamide, (E)-3-(7-(1,1-Dioxidothiomorpholino)-8-oxo-6,7,8,9-tetrahydro-5H-pyrido[2,3-b]azepin-3-yl)-N-methyl-N-((3-methylbenzofuran-2-yl)methyl)acrylamide, (E)-N-Methyl-N-((3-methylbenzofuran-2-yl)methyl)-3-(8-oxo-7-(pyrrolidin-1-yl)-6,7,8,9-tetrahydro-5H-pyrido[2,3-b]azepin-3-yl)acrylamide, (E)-N-Methyl-N-((3-methylbenzofuran-2-yl)methyl)-3-(7-(4-(methylsulfonyl) piperazin-1-yl)-8-oxo-6,7,8,9-tetrahydro-5H-pyrido[2,3-b]azepin-3-yl)acrylamide, (S,E)-N-methyl-N-((3-methylbenzofuran-2-yl)methyl)-3-(8-oxo-7-(2-oxa-6-azaspiro[3.3]heptan-6-yl)-6,7,8,9-tetrahydro-5H-pyrido[2,3-b]azepin-3-yl)acrylamide, (S,E)-3-(7-(3-hydroxyazetidin-1-yl)-8-oxo-6,7,8,9-tetrahydro-5H-pyrido[2,3-b]azepin-3-yl)-N-methyl-N-((3-methylbenzofuran-2-yl)methyl)acrylamide, (E)-N-((7-Amino-2-methylbenzofuran-3-yl)methyl)-N-methyl-3-(8-oxo-7-(pyrrolidin-1-yl)-6,7,8,9-tetrahydro-5H-pyrido[2,3-b]azepin-3-yl)acrylamide, (S,E)-N-((7-amino-2-methylbenzofuran-3-yl)methyl)-3-(7-amino-8-oxo-6,7,8,9-tetrahydro-5H-pyrido[2,3-b]azepin-3-yl)-N-methylacrylamide, and (E)-3-((2R,3S)-3-hydroxy-2-methyl-4-oxo-2,3,4,5-tetrahydro-1H-pyrido[2,3-b][1,4]diazepin-8-yl)-N-methyl-N-((3-methyl-4-(pyridin-3-yloxy)benzofuran-2-yl)methyl)acrylamide, (S,E)-3-(7-amino-8-oxo-6,7,8,9-tetrahydro-5H-pyrido[2,3-b]azepin-3-yl)-N-methyl-N-((2-methylbenzofuran-3-yl)methyl)acrylamide, and any pharmaceutically acceptable prodrugs, salts and/or solvates thereof.

20. A pharmaceutical composition comprising a compound, or a pharmaceutically acceptable prodrug, salt and/or solvate thereof, according to claim 1.

21. A method of treating a bacterial infection by means of FabI inhibition in a subject comprising administration to the subject of a compound or a pharmaceutically acceptable prodrug, salt and/or solvate thereof, according to claim 1.

22. A method for producing a compound, or a pharmaceutically acceptable prodrug, salt and/or solvate thereof, as defined in claim 1 wherein said method is selected from a first variant that comprises the step of coupling a precursor compound of formula M1 or M1'

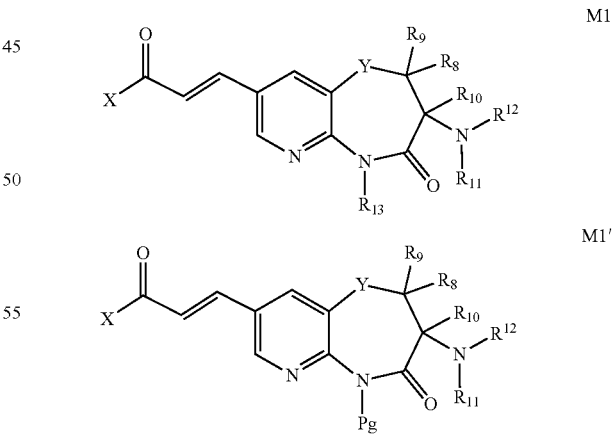

wherein X represents a leaving group, and Pg represents a protective group, and $R_{11}$ and or $R_{12}$ in addition of being defined as herein may also comprise a protective group, with an amine compound of formula M2a or M2b, as appropriate M2a

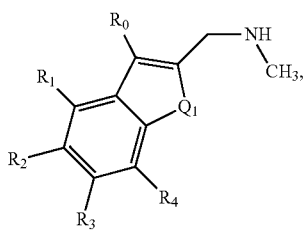

M2b

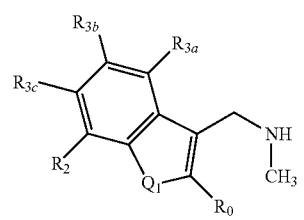

wherein Y, $Q_1$, and all R groups have the same meanings as specified in claim 1;

and a second variant that comprises the step of coupling a compound of formula M6 or M6'

M6

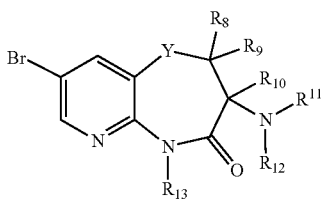

M6'

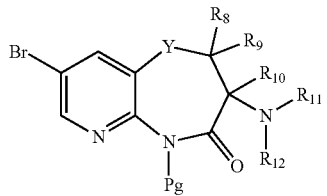

with a compound of formula M7a or M7b, as appropriate

M7a

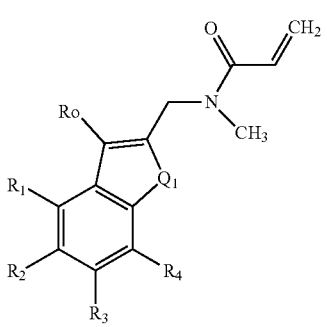

M7b

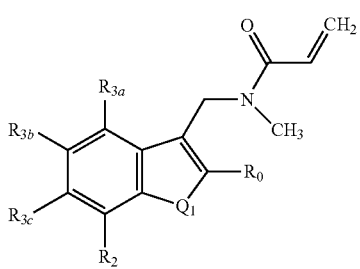

wherein Pg represents a protective group, wherein Y, $Q_1$ and all R groups have the same meaning as specified in claim 1, wherein $R_{11}$ and $R_{12}$ may be a group as defined in claim 1 or may be such a defined group that also comprises a protective group.

* * * * *